United States Patent
Chin et al.

(10) Patent No.: US 12,448,435 B2
(45) Date of Patent: Oct. 21, 2025

(54) ANTI-TMPRSS6 ANTIBODIES AND USES THEREOF

(71) Applicant: Regeneron Pharmaceuticals, Inc., Tarrytown, NY (US)

(72) Inventors: Harvey Chin, Ridgefield, CT (US); Sarah J. Hatsell, Piermont, NY (US); Heinrich Emil Lob, Ossining, NY (US); Andrew J. Murphy, Croton-on-Hudson, NY (US); William Olson, Yorktown Heights, NY (US); Kei Saotome, Englewood, NJ (US); Bojie Zhang, White Plains, NY (US)

(73) Assignee: REGENERON PHARMACEUTICALS, INC., Tarrytown, NY (US)

(*) Notice: Subject to any disclaimer, the term of this patent is extended or adjusted under 35 U.S.C. 154(b) by 291 days.

(21) Appl. No.: 17/741,234

(22) Filed: May 10, 2022

(65) Prior Publication Data
US 2022/0411487 A1    Dec. 29, 2022

Related U.S. Application Data

(60) Provisional application No. 63/187,150, filed on May 11, 2021.

(51) Int. Cl.
| | | |
|---|---|---|
| *C07K 16/18* | (2006.01) | |
| *A61K 39/00* | (2006.01) | |
| *A61P 1/16* | (2006.01) | |
| *A61P 7/00* | (2006.01) | |
| *C07K 16/28* | (2006.01) | |

(52) U.S. Cl.
CPC .......... *C07K 16/18* (2013.01); *A61P 1/16* (2018.01); *A61K 2039/505* (2013.01); *A61P 7/00* (2018.01); *C07K 16/28* (2013.01); *C07K 2317/565* (2013.01); *C07K 2317/76* (2013.01); *C07K 2317/92* (2013.01)

(58) Field of Classification Search
CPC .............. C07K 16/18; C07K 2317/565; C07K 2317/76; C07K 2317/31; C07K 2317/92; C07K 16/28; A61P 1/16; A61P 7/00; A61K 2039/505
See application file for complete search history.

(56) References Cited

U.S. PATENT DOCUMENTS

| | | |
|---|---|---|
| 7,582,298 B2 | 9/2009 | Stevens et al. |
| 8,246,995 B2 | 8/2012 | Dai et al. |
| 8,257,740 B1 | 9/2012 | Sung et al. |
| 2014/0243504 A1 | 8/2014 | Davis et al. |
| 2017/0029499 A1 | 2/2017 | Kakkar et al. |

FOREIGN PATENT DOCUMENTS

| | | | |
|---|---|---|---|
| WO | WO 2005/103081 A2 | 11/2005 | |
| WO | WO-2011036443 A2 * | 3/2011 | ............. A61K 38/16 |
| WO | WO 2021/207072 A1 | 10/2012 | |
| WO | WO 2021/105389 A1 | 6/2021 | |
| WO | WO 2022/240877 A1 | 11/2022 | |

OTHER PUBLICATIONS

MacCallum RM, et al. Antibody-antigen interactions: contact analysis and binding site topography. J Mol Biol. Oct. 11, 1996;262(5):732-45. doi: 10.1006/jmbi.1996.0548. PMID: 8876650. (Year: 1996).*
Casset F, et al. A peptide mimetic of an anti-CD4 monoclonal antibody by rational design. Biochem Biophys Res Commun. Jul. 18, 2003;307(1):198-205. doi: 10.1016/s0006-291x(03)01131-8. PMID: 12850000. (Year: 2003).*
D'Angelo S, et al. Many Routes to an Antibody Heavy-Chain CDR3: Necessary, Yet Insufficient, for Specific Binding. Front Immunol. Mar. 8, 2018;9:395. doi: 10.3389/fimmu.2018.00395. PMID: 29568296; PMCID: PMC5852061. (Year: 2018).*
Frydlova J, et al. Effect of Erythropoietin, Iron Deficiency and Iron Overload on Liver Matriptase-2 (TMPRSS6) Protein Content in Mice and Rats. PLoS One. Feb. 4, 2016;11(2):e0148540. doi: 10.1371/journal.pone.0148540. PMID: 26845567; PMCID: PMC4742081. (Year: 2016).*
Lee, BS., et al. (2016) Antibody Production with Synthetic Peptides. In: Schwartzbach, S., Skalli, O., Schikorski, T. (eds) High-Resolution Imaging of Cellular Proteins. Methods in Molecular Biology, vol. 1474. Humana Press, New York, NY. https://doi.org/10.1007/978-1-4939-6352-2_2 (Year: 2016).*
Abcam "ab56182 Anti-Matriptase 2 antibody—Catalytic domain" product sheet and MSDS. (Year: 2016).*
Arruebo, et al., "Antibody-Conjugated Nanoparticles for Biomedical Applications", Journal of Nanomaterials, Jun. 19, 2009, vol. 2009, Article ID439389, 24 Pages.
Cappellini, et al., "A Phase 3 Trial of Luspatercept in Patients with Transfusion-Dependent β-Thalassemia", The New England Journal of Medicine, 2020, vol. 382, No. 13, pp. 1219-1231.
Dion, et al., "Functional Diversity of TMPRSS6 Isoforms and Variants Expressed in Hepatocellular Carcinoma Cell Lines", Scientific Reports, Aug. 22, 2018, vol. 8, No. 12562, pp. 1-9.
Ehring, "Hydrogen Exchange/Electrospray Ionization Mass Spectrometry Studies of Structural Features of Proteins and Protein/Protein Interactions", Analytical Biochemistry, Feb. 15, 1999, vol. 267, Issue 2, pp. 252-259.

(Continued)

*Primary Examiner* — Misook Yu
*Assistant Examiner* — Alec Jon Peters
(74) *Attorney, Agent, or Firm* — LATHROP GPM LLP; James H. Velema; James V. DeGiulio

(57) ABSTRACT

Provided herein are monoclonal antibodies that bind to the transmembrane serine protease 6 (TMPRSS6) protein, and methods of use thereof. In various embodiments of the disclosure, the antibodies are fully human antibodies that bind to TMPRSS6. In some embodiments, the antibodies disclosed herein are useful in a method for treating or preventing a disease, disorder or condition associated with TMPRSS6 in humans.

16 Claims, 8 Drawing Sheets

Specification includes a Sequence Listing.

(56) References Cited

OTHER PUBLICATIONS

Engen, et al., "Investigating Protein Structure and Dynamics by Hydrogen Exchange MS", Analytical Chemistry, May 1, 2001, vol. 73, No. 9, pp. 256A-265A.

Finberg, et al. "Tmprss6 is a Genetic Modifier of the Hfe-hemochromatosis Phenotype in Mice", Blood, Apr. 28, 2011, vol. 117, No. 7, pp. 4590-4599.

Frýdlová, et al. "Effect of Erythropoietin, Iron Deficiency and Iron Overload on Liver Matriptase-2 (TMPRSS6) Protein Content in Mice and Rats", PLoS One, Feb. 4, 2016, vol. 11, No. 2, Article No. e148540, pp. 1-17.

Ginzburg, et al. "β-thalassemia: A Model for Elucidating the Dynamic Regulation of Ineffective Erythropoiesis and Iron Metabolism", Blood, Oct. 20, 2011, vol. 118, No. 16, pp. 4321-4330.

Gonnet, et al., "Exhaustive Matching of the Entire Protein Sequence Database", Science, 1992, vol. 256, No. 5062, pp. 1443-1445.

Hatcher, et al., "Synthetic and Natural Iron Chelators: Therapeutic Potential and Clinical Use", Future Medicinal Chemistry, Dec. 8, 2009, vol. 1, No. 9, pp. 1643-1670.

Hochleitner, et al., "Characterization of a Discontinuous Epitope of the Human Immunodeficiency Virus (HIV) Core Protein p24 by Epitope Excision and Differential Chemical Modification Followed by Mass Spectrometric Peptide Mapping Analysis", Protein Science, 2000, vol. 9, No. 3, pp. 487-496.

International Search Report and Written Opinion received for PCT Patent Application No. PCT/US2022/028595, mailed on Aug. 16, 2022, 12 Pages.

Junghans, et al., "Anti-Tac-H, a Humanized Antibody to the Interleukin 2 Receptor with New Features for Immunotherapy in Malignant and Immune Disorders", Cancer Research, Mar. 1, 1990, vol. 50, No. 5, pp. 1495-152.

Langer, "New Methods of Drug Delivery", Science, Sep. 28, 1990, vol. 249, No. 4976, pp. 1527-1533.

Lee, "Role of Matriptase-2 (TMPRSS6) in Iron Metabolism", Acta Haematologica, Nov. 10, 2009, vol. 122, pp. 87-96.

Mobarra, et al., "A Review on Iron Chelators in Treatment of Iron Overload Syndromes", International Journal of Hematology-Oncology and Stem Cell Research, 2016, vol. 10, No. 4, pp. 239-247.

Padlan, et al. "Identification of Specificity-determining Residues in Antibodies", The FASEB Journal, 1995, vol. 9, No. 1, pp. 133-139.

Pearson, "Using the FASTA Program to Search Protein and DNA Sequence Databases", Methods in Molecular Biology, Jan. 1, 1994, vol. 24, pp. 307-331.

Powell, et al. "Compendium of Excipients for Parenteral Formulations", PDA Journal of Pharmaceutical Science and Technology, Sep. 1998, vol. 52, No. 55, pp. 238-311.

Ramsay, et al. "The Type II Transmembrane Serine Protease Matriptase-2—Identification, Structural Features, Enzymology, Expression Pattern and Potential Roles", Frontiers in Bioscience—Landmark, 2008, vol. 13, No. 2, pp. 569-579.

Rausa, et al., "Identification of TMPRSS6 Cleavage Sites of Hemojuvelin", Journal of Cellular and Molecular Medicine, 2015, vol. 19, No. 4, pp. 879-888.

Reineke, "Antibody Epitope Mapping Using Arrays of Synthetic Peptides", Methods in Molecular Biology, 2004, vol. 248, pp. 443-463.

Summermatter, et al., "Skeletal Muscle PGC-1α Controls Whole-body Lactate Homeostasis Through Estrogen-related Receptor A-dependent Activation of LDH B and Repression of LDH A", Proceedings of the National Academy of Sciences of the United States of America, 2013, vol. 110, No. 21, pp. 8738-8743.

Suragani, et al., "Modified Activin Receptor IIB Ligand Trap Mitigates Ineffective Erythropoiesis and Disease Complications in Murine β-thalassemia", Blood, 2014, vol. 123, No. 25, pp. 3864-3872.

Vajdos, et al., "Comprehensive Functional Maps of the Antigen-binding Site of an Anti-ErbB2 Antibody Obtained with Shotgun Scanning Mutagenesis", Journal of Molecular Biology, 2002, vol. 320, No. 2, pp. 415-428.

Wake, et al., "Generation and Characterisation of KY1066, a Fully Human Antibody Targeting the Enzymatic Activity of Matriptase-2 for the Treatment of Iron Overload in Beta Thalassemia", Blood, Nov. 13, 2019, vol. 134, Supplement 1.

Wake et al., "KY1066: Generation and characterisation of a fully human antibody targeting the enzymatic activity of matriptase-2 for the treatment of iron overload in β thalassemia", Poster 3532, American Society of Hematology (ASH), 61st Annual Meeting and Exposition, Dec. 7-10, 2019, Orlando, Florida, USA.

Wang, et al., "The Role of TMPRSS6/matriptase-2 in Iron Regulation and Anemia", Frontiers in Pharmacology, May 19, 2014, vol. 5, Article No. 114, pp. 1-6.

Wu, et al., "Receptor-Mediated in Vitro Gene Transformation by a Soluble DNA Carrier System", Journal of Biological Chemistry, Apr. 5, 1987, vol. 262, No. 10, pp. 4429-4432.

Yuan, et al., "Structure of Catalytic Domain of Matriptase in Complex With Sunflower Trypsin Inhibitor-1", BMC Structural Biology, 2011, vol. 11, Article No. 30, 10 Pages.

* cited by examiner

ANTI-TMPRSS6 ANTIBODIES AND USES THEREOF

RELATED APPLICATIONS

This application claims priority to U.S. Provisional Patent Application Ser. No. 63/187,150, filed May 11, 2021, the entire disclosure of which is hereby incorporated herein by reference.

SEQUENCE LISTING

The content of the electronically submitted sequence listing in ASCII text file (Name: 711971_RGN9-002-1_v2_ST25.txt; Size: 143,905 bytes; Date of Creation: Aug. 23, 2022) is incorporated herein by reference in its entirety.

FIELD OF THE INVENTION

Disclosed herein are antibodies and antigen-binding fragments thereof that specifically bind to transmembrane serine protease 6 (TMPRSS6). Also disclosed herein are nucleic acids comprising nucleotide sequences that encode such antibodies, host cells comprising the same, and therapeutic methods of using the antibodies and antigen-binding fragments thereof.

BACKGROUND

Transmembrane serine protease 6 (TMPRSS6; also known as Matriptase-2 or MTP-2) is a type II transmembrane serine protease comprised of a short N-terminal intracellular region followed by a single transmembrane domain, a single SEA domain, two CUB domains, three LDLRa repeat domains, and a C-terminal catalytic serine protease domain. TMPRSS6 is highly expressed in the liver and plays a role in iron homeostasis by negatively regulating hepcidin expression. High levels of hepcidin block iron export from cells by decreasing the levels of an iron efflux channel, ferroportin, from the cell surface. TMPRSS6 cleaves hemojuvelin (HJV), which results in decreased SMAD signaling and subsequent downregulation of the transcription of HAMP, the gene that encodes hepcidin.

Attenuation of hepcidin expression levels can result in iron overload or hemochromatosis. Iron overload disorders are a group of disorders that lead to the storage of excess iron in the body. As the body cannot excrete excess iron, the excess iron is stored in certain organs, for example, the liver, heart, and pancreas. Excess iron that is stored in such organs can lead to organ damage and other associated diseases such as diabetes.

Examples of iron overload disorders include hereditary hemochromatosis (HHC), a genetic disorder in which too much iron from the diet is absorbed by the body, and secondary hemochromatosis, which may arise as a complication in patients with certain hematological disorders such as thalassemia (a type of hereditary anemia caused by decreased hemoglobulin production) or myelodysplastic syndrome (a blood cancer which result in acquired anemia). In the case of beta-thalassemia and/or myelodyspastic syndrome, the administration of repeated blood transfusions for treating the anemia associated with disease can often result iron overload.

Treatment options for iron overload disorders are limited and typically are required throughout a patient's lifetime. Treatment options include iron chelation therapy, regular removal iron-rich blood by phlebotomy or venesection, and dietary restrictions to reduce iron intake. There is a need in the art for additional and improved compositions and methods for the treatment of iron overload disorders.

BRIEF SUMMARY OF THE DISCLOSURE

Disclosed herein are antibodies and antigen-binding fragments thereof that specifically bind the transmembrane serine protease 6 (TMPRSS6) protein (i.e., anti-TMPRSS6 antibodies). In certain embodiments, the anti-TMPRSS6 antibodies are fully human antibodies that bind with high affinity to human TMPRSS6 and inhibit its protease activity.

In one aspect, the disclosure provides an isolated antibody or antigen-binding fragment thereof that binds specifically to Transmembrane Protease Serine 6 (TMPRSS6) protein, wherein the antibody or antigen-binding fragment thereof binds to the catalytic domain of TMPRSS6 but does not bind to the catalytic triad of TMPRSS6.

In certain embodiments, the antibody or antigen-binding fragment thereof further binds at a site comprised within the LDLRa domain 2 of TMPRSS6. In one embodiment, binding of the antibody or antigen-binding fragment thereof to TMPRSS6 does not directly occlude the catalytic triad of TMPRSS6. In other embodiments, binding of the antibody or antigen-binding fragment thereof to TMPRSS6 mediates allosteric regulation of TMPRSS6. In certain embodiments, binding of the antibody or antigen-binding fragment thereof to TMPRSS6 mediates allosteric inhibition of TMPRSS6.

In another aspect, the disclosure provides an isolated antibody or antigen-binding fragment thereof that binds specifically to Transmembrane Protease Serine 6 (TMPRSS6) protein, wherein the antibody or antigen-binding fragment thereof is an allosteric inhibitor of TMPRSS6. In certain embodiments, the antibody or antigen-binding fragment maintains TMPRSS6 in an inactive conformation that is capable of binding to but not cleaving a TMPRSS6 substrate. In certain embodiments, the TMPRSS6 substrate is hemojuvelin (HJV).

In another aspect, the disclosure provides an isolated antibody or antigen-binding fragment thereof that binds specifically to Transmembrane Protease Serine 6 (TMPRSS6) protein, wherein the antibody or antigen-binding fragment binds within the catalytic domain of TMPRSS6 at a site that sterically occludes the catalytic triad of TMPRSS6. In certain embodiments, the antibody or antigen-binding fragment thereof competes with hemojuvelin (HHV) for binding to TMPRSS6.

In another aspect, the disclosure provides an isolated antibody or antigen-binding fragment thereof that binds specifically to human Transmembrane Protease Serine 6 (hTMPRSS6) protein (SEQ ID NO: 126), wherein the antibody or antigen-binding fragment thereof interacts with one or more amino acids contained within the extracellular domain of hTMPRSS6, as determined by hydrogen/deuterium exchange.

In certain embodiments, the antibody or antigen-binding fragment thereof interacts with an amino acid sequence selected from: (a) amino acids 125 to 133 of SEQ ID NO: 126; (b) amino acids 586-594 of SEQ ID NO: 126; (c) amino acids 626 to 650 of SEQ ID NO: 126; (d) amino acids 693 to 703 of SEQ ID NO: 126; (e) amino acids 704 to 724 of SEQ ID NO: 126; and/or (e) amino acids 780 to 805 of SEQ ID NO: 126, as determined by hydrogen/deuterium exchange. In other embodiments, the antibody or antigen-binding fragment thereof interacts with an amino acid sequence selected from: (a) amino acids 693 to 703 of SEQ ID NO: 126; and/or (b) amino acids 780 to 805 of SEQ ID NO: 126, as determined by hydrogen/deuterium exchange. In certain embodiments, the antibody or antigen-binding fragment thereof interacts with an amino acid sequence selected from: (a) amino acids 125 to 133 of SEQ ID NO: 126; (b) amino acids 586-594 of SEQ ID NO: 126; (c) amino acids 626 to 650 of SEQ ID NO: 126; and/or (d) amino acids 704 to 724 of SEQ ID NO: 126, as determined by hydrogen/deuterium exchange.

In another aspect, the disclosure provides an isolated antibody or antigen-binding fragment thereof that binds specifically to Transmembrane Protease Serine 6 (TMPRSS6) protein, wherein the antibody or antigen-binding fragment thereof interacts with residues G699, H701, D724, Q726, L727, I728, P729, L732, E735, G749, Y750, R751, K752, and N791 of human TMPRSS6 (SEQ ID NO: 126), as determined by cryoelectron microscopy structural modeling.

In certain embodiments, the antibody or antigen-binding fragment thereof further interacts with residues V490, S501, T502, C503, I504, S505, and K508 of human TMPRSS6 (SEQ ID NO: 126), as determined by cryoelectron microscopy structural modeling.

In another aspect, the disclosure provides an isolated antibody or antigen-binding fragment thereof that binds specifically to Transmembrane Protease Serine 6 (TMPRSS6) protein, wherein the antibody or antigen-binding fragment thereof interacts with residues R597, R599, I601, D622, L710, R711, E712, G713, G714, P715, and I716 of human TMPRSS6, as determined by cryoelectron microscopy structural modeling.

In another aspect, the disclosure provides an isolated antibody or antigen-binding fragment thereof that binds specifically to Transmembrane Protease Serine 6 (TMPRSS6) protein, wherein the antibody or antigen-binding fragment thereof comprises three heavy chain complementarity determining regions (CDRs) (HCDR1, HCDR2 and HCDR3) contained within a heavy chain variable region (HCVR); and three light chain CDRs (LCDR1, LCDR2 and LCDR3) contained within a light chain variable region (LCVR), wherein the HCDR3 has an amino acid sequence selected from a HCDR3 sequence listed in Table 1.

In certain embodiments, the LCDR3 sequence has an amino acid sequence selected from a LCDR3 sequence listed in Table 1. In certain embodiments, the antibody or antigen binding fragment comprises a HCDR1, HCDR2, and HCDR3 sequence listed in Table 1. In certain embodiments, the antibody or antigen binding fragment comprise a LCDR1, LCDR2, and LCDR3 sequence listed in Table 1.

In certain embodiments, (a) the HCDR1 domain has an amino acid sequence selected from SEQ ID NOs: 4, 24, 34, 44, 64, 84, or 102; (b) the HCDR2 domain has an amino acid sequence selected from SEQ ID NOs: 6, 26, 36, 46, 66, 86, or 104; (c) the HCDR3 domain has an amino acid sequence selected from SEQ ID NOs: 8, 28, 38, 48, 68, 88, or 106; (d) the LCDR1 domain has an amino acid sequence selected from SEQ ID NOs: 12, 52, 72, 92, or 110; (e) the LCDR2 domain has an amino acid sequence selected from SEQ ID NOs: 14, 54, or 74; and (f) the LCDR3 domain has an amino acid sequence selected from SEQ ID NOs: 16, 56, 76, 94, or 112.

In certain embodiments, the three heavy chain CDRs and three light chain CDRs comprise one of the following sets of CDRs: (a) SEQ ID NO: 4 (HCDR1), SEQ ID NO:6 (HCDR2), SEQ ID NO:8 (HCDR3), SEQ ID NO:12 (LCDR1), SEQ ID NO:14 (LCDR2), and SEQ ID NO:16 (LCDR3); (b) SEQ ID NO: 24 (HCDR1), SEQ ID NO:26 (HCDR2), SEQ ID NO:28 (HCDR3), SEQ ID NO: 12 (LCDR1), SEQ ID NO:14 (LCDR2), and SEQ ID NO:16 (LCDR3); (c) SEQ ID NO: 34 (HCDR1), SEQ ID NO:36 (HCDR2), SEQ ID NO:38 (HCDR3), SEQ ID NO:12 (LCDR1), SEQ ID NO: 14 (LCDR2), and SEQ ID NO:16 (LCDR3); (d) SEQ ID NO: 44 (HCDR1), SEQ ID NO:46 (HCDR2), SEQ ID NO:48 (HCDR3), SEQ ID NO:52 (LCDR1), SEQ ID NO:54 (LCDR2), and SEQ ID NO: 56 (LCDR3); (e) SEQ ID NO: 64 (HCDR1), SEQ ID NO:66 (HCDR2), SEQ ID NO:68 (HCDR3), SEQ ID NO:72 (LCDR1), SEQ ID NO:74 (LCDR2), and SEQ ID NO:76 (LCDR3); (f) SEQ ID NO: 84 (HCDR1), SEQ ID NO:86 (HCDR2), SEQ ID NO:88 (HCDR3), SEQ ID NO:92 (LCDR1), SEQ ID NO: 14 (LCDR2), and SEQ ID NO:94 (LCDR3); or (g) SEQ ID NO: 102 (HCDR1), SEQ ID NO:104 (HCDR2), SEQ ID NO:106 (HCDR3), SEQ ID NO:110 (LCDR1), SEQ ID NO:14 (LCDR2), and SEQ ID NO: 112 (LCDR3).

In certain embodiments, the three heavy chain CDRs and three light chain CDRs comprise the following set of CDRs: SEQ ID NO: 44 (HCDR1), SEQ ID NO:46 (HCDR2), SEQ ID NO: 48 (HCDR3), SEQ ID NO:52 (LCDR1), SEQ ID NO:54 (LCDR2), and SEQ ID NO:56 (LCDR3).

In other embodiments, the three heavy chain CDRs and three light chain CDRs comprise the following set of CDRs: SEQ ID NO: 102 (HCDR1), SEQ ID NO:104 (HCDR2), SEQ ID NO: 106 (HCDR3), SEQ ID NO:110 (LCDR1), SEQ ID NO:14 (LCDR2), and SEQ ID NO:112 (LCDR3).

In another aspect, the disclosure provides an antibody or antigen-binding fragment thereof that binds to TMPRSS6, wherein the antibody or antigen-binding fragment thereof comprises three heavy chain CDRs (HCDR1, HCDR2 and HCDR3) contained within a HCVR and three light chain CDRs (LCDR1, LCDR2 and LCDR3) contained within a LCVR; wherein the HCVR comprises: (i) an amino acid sequence selected from SEQ ID NOs: 2, 22, 32, 42, 62, 82, or 100; (ii) an amino acid sequence having at least 90% identity to an amino acid sequence selected from SEQ ID NOs: 2, 22, 32, 42, 62, 82, or 100; (iii) an amino acid sequence having at least 95% identity to an amino acid sequence selected from SEQ ID NOs: 2, 22, 32, 42, 62, 82, or 100; or (iv) an amino acid sequence having no more than 12 amino acid substitutions with respect to a sequence selected from SEQ ID NOs: 2, 22, 32, 42, 62, 82, or 100.

In certain embodiments, the LCVR comprises: (a) an amino acid sequence selected from SEQ ID NOs: 10, 50, 70, 90, or 108; (b) an amino acid sequence having at least 90% identity to an amino acid sequence selected from SEQ ID NOs: 10, 50, 70, 90, or 108; (c) an amino acid sequence having at least 95% identity to an amino acid sequence selected from SEQ ID NOs: 10, 50, 70, 90, or 108; or (d) an amino acid sequence having no more than 10 amino acid substitutions with respect to a sequence selected from SEQ ID NOs: 10, 50, 70, 90, or 108.

In certain embodiments, the HCVR comprises an amino acid sequence selected from SEQ ID NOs: 2, 22, 32, 42, 62, 82, or 100. In certain embodiments, the LCVR comprises an amino acid sequence selected from SEQ ID NOs: 10, 50, 70, 90, or 108.

In certain embodiments, the antibody or antigen-binding fragment thereof comprises HCVR/LCVR amino acid sequence pair selected from SEQ ID NOs: 2/10, 22/10, 32/10, 42/50, 62/70, 82/90, or 100/108. In certain embodiments, the antibody or antigen binding-fragment comprises the HCVR/LCVR amino acid sequence pair of SEQ ID NOs: 42/50. In other embodiments, the antibody or antigen binding-fragment comprises the HCVR/LCVR amino acid sequence pair of SEQ ID NOs: 100/108.

In another aspect, the disclosure provides an antibody that binds to TMPRSS6, wherein the antibody comprises a heavy chain (HC) and a light chain (LC), wherein the heavy chain comprises an amino acid sequence selected from the group consisting of SEQ ID NOs: 18, 30, 40, 58, 78, 96 and 114.

In certain embodiments, the light chain comprises an amino acid sequence selected from the group consisting of SEQ ID NOs: 20, 60, 80, 98 and 116. In certain embodiments, the antibody comprises a HC/LC amino acid sequence pair selected from SEQ ID NOs: 18/20, 30/20, 40/20, 58/60, 78/80, 96/98 or 114/116. In certain embodiments, the antibody comprises the HC/LC amino acid sequence pair of 58/60. In other embodiments, the antibody comprises the HC/LC amino acid sequence pair of 114/116.

In certain embodiments, the antibody or antigen binding fragments of the disclosure have one or more properties selected from: (a) is a fully human monoclonal antibody or antigen binding fragment thereof; (b) binds to human TMPRSS6 at 25° C. and at 37° C. with a dissociation constant ($K_D$) of less than about 21.2 nM, as measured in a surface plasmon resonance assay; (c) binds to monkey TMPRSS6 at 25° C. and at 37° C. with a $K_D$ of less than about 25.7 nM, as measured in a surface plasmon resonance assay; (d) binds to mouse TMPRSS6 at 25° C. and at 37° C. with a $K_D$ of less than about 703 nM, as measured in a surface plasmon resonance assay; (e) binds to cells expressing human TMPRSS6 with $EC_{50}$ less than about 2.7 nM; (f) binds to cells expressing monkey TMPRSS6 with $EC_{50}$ less than about 3.6 nM; (g) binds to cells expressing mouse TMPRSS6 with $EC_{50}$ less than about 35 nM; (h) inhibits protease-dependent release of cell surface hemojuvelin in the presence of human TMPRSS6, e.g., inhibits human TMPRSS6, with percent inhibition greater than about 90%; (i) inhibits protease-dependent release of cell surface hemojuvelin in the presence of human TMPRSS6, e.g., inhibits human TMPRSS6 and exhibits an IC50 less than about 200 pM; (j) inhibits protease-dependent release of cell surface hemojuvelin in the presence of mouse TMPRSS6, e.g., inhibits mouse TMPRSS6, with percent inhibition greater than about 42%; (k) inhibits protease-dependent release of cell surface hemojuvelin in the presence of mouse TMPRSS6, e.g., inhibits mouse TMPRSS6 and exhibits an IC50 less than about 274 pM; (l) inhibits human TMPRSS6 at 25° C. and at 37° C. with percent inhibition greater than about 65%; (m) inhibits human TMPRSS6 at 25° C. and at 37° C. and exhibits an IC50 less than about 10 nM; (n) inhibits monkey TMPRSS6 at 25° C. and at 37° C. with percent inhibition greater than about 66%; (o) inhibits monkey TMPRSS6 at 25° C. and at 37° C. and exhibits an IC50 less than about 50 nM; (p) inhibits mouse TMPRSS6 at 25° C. and at 37° C. with percent inhibition greater than about 58%; (q) inhibits mouse TMPRSS6 at 25° C. and at 37° C. and exhibits an IC50 less than about 35 nM; (r) when administered to a subject in need thereof, decreases serum iron levels of the subject; (s) when administered to a subject in need thereof, increases serum hepcidin levels of the subject; (t) when administered to a subject in need thereof, increases mature red blood cell levels of the subject; (u) when administered to a subject in need thereof, increases mature red blood cell levels in the spleen and/or bone marrow of the subject; (v) when administered to a subject in need thereof, increases hemoglobin levels of the subject; or (w) when administered to a subject in need thereof, decreases transferrin saturation levels of the subject. In certain embodiments, the antibody is a fully human monoclonal antibody.

In another aspect, the disclosure provides an antibody or antigen-binding fragment thereof that competes for binding to TMPRSS6 with an antibody or antigen-binding fragment thereof disclosed herein.

In another aspect, the disclosure provides an antibody or antigen-binding fragment thereof that binds to the same epitope as an antibody or antigen-binding fragment thereof disclosed herein.

In another aspect, the disclosure provides a pharmaceutical composition comprising an isolated antibody or antigen-binding fragment thereof that binds to TMPRSS6 as disclosed herein and a pharmaceutically acceptable carrier or diluent.

In another aspect, the disclosure provides an isolated polynucleotide molecule comprising a polynucleotide sequence that encodes a HCVR of an antibody or antigen-binding fragment thereof as disclosed herein.

In another aspect, the disclosure provides an isolated polynucleotide molecule comprising a polynucleotide sequence that encodes a LCVR of an antibody or antigen-binding fragment thereof as disclosed herein.

In another aspect, the disclosure provides a vector comprising a polynucleotide sequence disclosed herein.

In another aspect, the disclosure provides a set of vectors comprising a first vector comprising a polynucleotide sequence that encodes a HCVR of an antibody or antigen-binding fragment thereof as disclosed herein and a second vector comprising a polynucleotide sequence that encodes a LCVR of an antibody or antigen-binding fragment thereof as disclosed herein.

In another aspect, the disclosure provides a host cell comprising a vector or set of vectors as disclosed herein.

In another aspect, the disclosure provides a method of producing an antibody or antigen-binding fragment thereof that binds specifically to TMPRSS6, comprising culturing a host cell of the disclosure under conditions permitting production of the antibody or antigen-binding fragment thereof, and recovering the antibody or antigen-binding fragment thereof so produced. In certain embodiment, the method further comprises formulating the antibody or antigen-binding fragment thereof as a pharmaceutical composition comprising a pharmaceutically acceptable carrier.

In another aspect, the disclosure provides a method of treating, preventing, or ameliorating at least one symptom or indication of a disease or disorder associated with iron overload, the method comprising administering a pharmaceutical composition comprising a therapeutically effective amount of an antibody or antigen-binding fragment thereof of the disclosure to a subject in need thereof.

In certain embodiments, the disease or disorder is a congenital dyserythropoietic anemia, Diamond-Blackfan anemia, alpha thalassemia, beta thalassemia, a transfusion-dependent hemolytic anemia, myelodysplastic syndrome, sickle cell disease, polycythemia vera, hereditary hemochromatosis, or chronic liver disease. In certain embodiments, the disease or disorder is beta thalassemia. In certain embodiments, the disease or disorder is beta thalassemia major or beta thalassemia intermedia. In certain embodiments, the disease or disorder is myelodysplastic syndrome. In certain embodiments, the disease or disorder is myelodysplastic syndrome with ring sideroblasts. In certain embodiments, the disease or disorder is a transfusion-dependent hemolytic anemia. In certain embodiments, the disease or disorder is a transfusion-dependent hemolytic anemia due to pyruvate kinase deficiency, or a sideroblastic transfusion-dependent hemolytic anemia. In certain embodiments, the disease or disorder is a chronic liver disease. In certain embodiments, the disease or disorder is an alcohol related chronic liver disease, hepatitis C, or autoimmune hepatitis.

In certain embodiments, the pharmaceutical composition is administered prophylactically or therapeutically to the subject in need thereof. In other embodiment, the pharmaceutical composition is administered subcutaneously, intravenously, intradermally, intraperitoneally, or intramuscularly.

Other embodiments will become apparent from a review of the ensuing detailed description.

DETAILED DESCRIPTION

Figure 1:
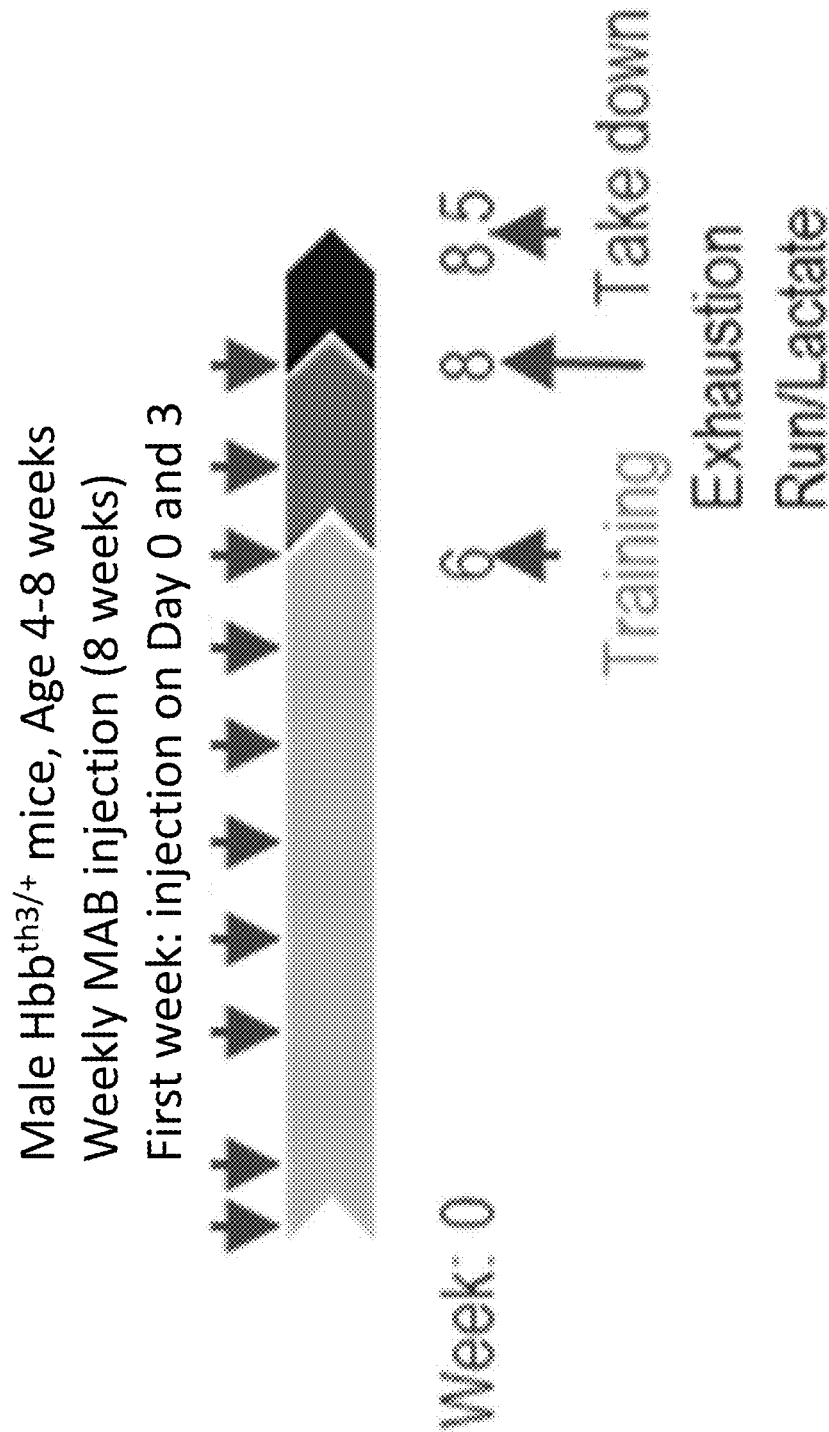
FIG. 1 is a graphical depiction of the study plan for the mice forced running studies in Example 15.

Before the present methods are described, it is to be understood that this disclosure is not limited to particular methods, and experimental conditions described, as such methods and conditions may vary. It is also to be understood that the terminology used herein is for the purpose of describing particular embodiments only and is not intended to be limiting.

Unless defined otherwise, all technical and scientific terms used herein have the same meaning as commonly understood by one of ordinary skill in the art in the related field. Although any methods and materials similar or equivalent to those described herein can be used in the practice or testing of the disclosed embodiments, preferred methods and materials are now described. All publications mentioned herein are incorporated herein by reference in their entirety.

Definitions

The term "TMPRSS6", also called "Matriptase-2" or "MTP-2" refers to transmembrane serine protease 6. TMPRSS6 is a type II transmembrane serine protease comprised of a short N-terminal intracellular region (residues 1-55 of human TMPRSS6 (SEQ ID NO: 126)) followed by a single transmembrane domain (residues 56-76 of SEQ ID NO: 126), a single SEA (sea urchin sperm protein, enteropeptidase, and agrin) domain (residues 84-209 of SEQ ID NO: 126), two CUB (Cls/Clr, urchin embryonic growth factor, and bone morphogeneic protein (BMP)-1) domains (residues 213-336 of SEQ ID NO: 126 for CUB domain 1 and residues 335-452 of SEQ ID NO: 126 for CUB domain 2) three LDLRa (low-density-lipoprotein receptor, class A) repeat domains (residues 457-489 of SEQ ID NO: 126 for LDLRa domain 1, residues 492-526 of SEQ ID NO: 126 for LDLRa domain 2, and residues 530-567 of SEQ ID NO: 126 for LDLRa domain 3), and a C-terminal catalytic serine protease domain (residues 577-811 of SEQ ID NO: 126). The catalytic serine protease domain contains a catalytic triad of histidine (residue 617 of human TMPRSS6 (SEQ ID NO: 126)), aspartate (residue 668 of SEQ ID NO: 126), and serine residues (residue 762 of SEQ ID NO: 126) (Lee, *Acta Haematol.* (2009) 122 (2-3): 87-96; Ramsay et al., *Front. Biosci.* (2008) 13:569-579). TMPRSS6 has been shown to play a role in iron homeostasis by acting as a negative regulator of hepcidin production through the cleavage of the BMP coreceptor hemojuvelin (HJV) (Dion et al., *Scientific Reports* (2018) 8:12562). The amino acid sequence of full-length human TMPRSS6 protein (isoform 2) is exemplified by the 811 amino acid sequence provided in UniProtKB/Swiss-Prot as accession number Q8IU80 and corresponds to NCBI accession number NP_705837.1 (TMPS6_HUMAN; SEQ ID NO: 126). Human TMPRSS6 protein is encoded by the nucleic acid sequence represented by NCBI Reference Sequence NM_153609.3 (SEQ ID NO: 127). The amino acid sequence of full-length cynomolgous monkey TMPRSS6 protein is exemplified by the amino acid sequence provided in UniProtKB/Swiss-Prot as accession number A0A2K5VAP0 and corresponds to NCBI accession number XP_005567441.1 (A0A2K5VAP0_MACFA; SEQ ID NO: 128). Cynomolgous monkey TMPRSS6 protein is encoded by the nucleic acid sequence represented by NCBI Reference Sequence XM_005567384 (SEQ ID NO: 129). The amino acid sequence of full-length mouse TMPRSS6 protein is exemplified by the amino acid sequence provided in UniProtKB/Swiss-Prot as accession number Q9DBI0 and corresponds to NCBI accession number NP_082178.2 (TMPS6_MOUSE; SEQ ID NO: 130). Mouse TMPRSS6 protein is encoded by the nucleic acid sequence represented by NCBI Reference Sequence NM_027902.2 (SEQ ID NO: 131). The term "TMPRSS6" includes recombinant TMPRSS6 protein or a fragment thereof. The term also encompasses TMPRSS6 protein or a fragment thereof coupled to, for example, histidine tag, mouse or human Fc, or a signal sequence such as ROR1 (for example, SEQ ID NOs: 117-119).

The term "about", when used in reference to a particular recited numerical value, means that the value may vary from the recited value by no more than 1%. For example, as used herein, the expression "about 100" includes 99 and 101 and all values in between (e.g., 99.1, 99.2, 99.3, 99.4 . . . 100.7, 100.8, 100.9).

The term "antibody", as used herein, is intended to refer to immunoglobulin molecules comprised of four polypeptide chains, two heavy (H) chains and two light (L) chains inter-connected by disulfide bonds (i.e., "full antibody molecules"), as well as multimers thereof (e.g. IgM) or antigen-binding fragments thereof. Each heavy chain is comprised of a heavy chain variable region ("HCVR" or "$V_H$") and a heavy chain constant region (comprised of domains $C_H1$, $C_H2$ and $C_H3$). Each light chain is comprised of a light chain variable region ("LCVR or "$V_L$") and a light chain constant region ($C_L$). The $V_H$ and $V_L$ regions can be further subdivided into regions of hypervariability, termed complementarity determining regions (CDR), interspersed with regions that are more conserved, termed framework regions (FR). Each $V_H$ and $V_L$ is composed of three CDRs and four FRs, arranged from amino-terminus to carboxy-terminus in the following order: FR1, CDR1, FR2, CDR2, FR3, CDR3, FR4. In certain embodiments of the disclosure, the FRs of the antibody (or antigen binding fragment thereof) may be identical to the human germline sequences, or may be naturally or artificially modified. An amino acid consensus sequence may be defined based on a side-by-side analysis of two or more CDRs.

Substitution of one or more CDR residues or omission of one or more CDRs is also possible. Antibodies have been described in the scientific literature in which one or two CDRs can be dispensed with for binding. Padlan et al. (1995, FASEB J. 9:133-139) analyzed the contact regions between antibodies and their antigens, based on published crystal structures, and concluded that only about one fifth to one third of CDR residues actually contact the antigen. Padlan also found many antibodies in which one or two CDRs had no amino acids in contact with an antigen (see also, Vajdos et al. (2002) J Mol Biol 320:415-428).

CDR residues not contacting antigen can be identified based on previous studies (for example residues H60-H65 in CDRH2 are often not required), from regions of Kabat CDRs lying outside Chothia CDRs, by molecular modeling and/or empirically. If a CDR or residue(s) thereof is omitted, it is usually substituted with an amino acid occupying the corresponding position in another human antibody sequence or a consensus of such sequences. Positions for substitution within CDRs and amino acids to substitute can also be selected empirically. Empirical substitutions can be conservative or non-conservative substitutions.

The fully human anti-TMPRSS6 monoclonal antibodies disclosed herein may comprise one or more amino acid substitutions, insertions and/or deletions in the framework and/or CDR regions of the heavy and light chain variable domains as compared to the corresponding germline sequences. Such mutations can be readily ascertained by comparing the amino acid sequences disclosed herein to germline sequences available from, for example, public antibody sequence databases. The present disclosure includes antibodies, and antigen-binding fragments thereof, which are derived from any of the amino acid sequences disclosed herein, wherein one or more amino acids within one or more framework and/or CDR regions are mutated to the corresponding residue(s) of the germline sequence from which the antibody was derived, or to the corresponding residue(s) of another human germline sequence, or to a conservative amino acid substitution of the corresponding germline residue(s) (such sequence changes are referred to herein collectively as "germline mutations"). A person of ordinary skill in the art, starting with the heavy and light chain variable region sequences disclosed herein, can easily produce numerous antibodies and antigen-binding fragments which comprise one or more individual germline mutations or combinations thereof. In certain embodiments, all of the framework and/or CDR residues within the $V_H$ and/or $V_L$ domains are mutated back to the residues found in the original germline sequence from which the antibody was derived. In other embodiments, only certain residues are mutated back to the original germline sequence, e.g., only the mutated residues found within the first 8 amino acids of FR1 or within the last 8 amino acids of FR4, or only the mutated residues found within CDR1, CDR2 or CDR3. In other embodiments, one or more of the framework and/or CDR residue(s) are mutated to the corresponding residue(s) of a different germline sequence (i.e., a germline sequence that is different from the germline sequence from which the antibody was originally derived). Furthermore, the antibodies disclosed herein may contain any combination of two or more germline mutations within the framework and/or CDR regions, e.g., wherein certain individual residues are mutated to the corresponding residue of a particular germline sequence while certain other residues that differ from the original germline sequence are maintained or are mutated to the corresponding residue of a different germline sequence. Once obtained, antibodies and antigen-binding fragments that contain one or more germline mutations can be easily tested for one or more desired property such as, improved binding specificity, increased binding affinity, improved or enhanced antagonistic biological properties, reduced immunogenicity, etc. Antibodies and antigen-binding fragments obtained in this general manner are encompassed within the present disclosure.

Also disclosed herein are fully human anti-TMPRSS6 monoclonal antibodies comprising variants of any of the HCVR, LCVR, and/or CDR amino acid sequences disclosed herein having one or more conservative substitutions. For example, the present disclosure includes anti-TMPRSS6 antibodies having HCVR, LCVR, and/or CDR amino acid sequences with, e.g., 10 or fewer, 8 or fewer, 6 or fewer, 4 or fewer, etc. conservative amino acid substitutions relative to any of the HCVR, LCVR, and/or CDR amino acid sequences disclosed herein.

The term "human antibody", or "fully human antibody", as used herein, is intended to include antibodies having variable and constant regions derived from human germline immunoglobulin sequences. The human mAbs disclosed herein may include amino acid residues not encoded by human germline immunoglobulin sequences (e.g., mutations introduced by random or site-specific mutagenesis in vitro or by somatic mutation in vivo), for example in the CDRs and in particular CDR3. However, the term "human antibody", or "fully human antibody", as used herein, is not intended to include mAbs in which CDR sequences derived from the germline of another mammalian species (e.g., mouse), have been grafted onto human FR sequences. The term includes antibodies that are recombinantly produced in a non-human mammal, or in cells of a non-human mammal. The term is not intended to include antibodies isolated from or generated in a human subject.

The term "recombinant", as used herein, refers to antibodies or antigen-binding fragments thereof created, expressed, isolated or obtained by technologies or methods known in the art as recombinant DNA technology which include, e.g., DNA splicing and transgenic expression. The term refers to antibodies expressed in a non-human mammal (including transgenic non-human mammals, e.g., transgenic mice), or a cell (e.g., CHO cells) expression system or isolated from a recombinant combinatorial human antibody library.

The term "specifically binds," or "binds specifically to", or the like, means that an antibody or antigen-binding fragment thereof forms a complex with an antigen that is relatively stable under physiologic conditions. Specific binding can be characterized by an equilibrium dissociation constant of at least about $1 \times 10^{-8}$ M or less (e.g., a smaller $K_D$ denotes a tighter binding). Methods for determining whether two molecules specifically bind are well known in the art and include, for example, equilibrium dialysis, surface plasmon resonance, and the like. As described herein, antibodies have been identified by surface plasmon resonance, e.g., BIACORE™, which bind specifically to TMPRSS6. Moreover, multi-specific antibodies that bind to one domain in TMPRSS6 and one or more additional antigens or a bi-specific that binds to two different regions of TMPRSS6 are nonetheless considered antibodies that "specifically bind", as used herein.

The term "high affinity" antibody refers to those mAbs having a binding affinity to TMPRSS6, expressed as $K_D$, of at least $10^{-8}$ M; preferably $10^{-9}$ M; more preferably $10^{-10}$ M, even more preferably $10^{-11}$ M, as measured by surface plasmon resonance, e.g., BIACORE™ or solution-affinity ELISA.

By the term "slow off rate", "Koff" or "kd" is meant an antibody that dissociates from TMPRSS6, with a rate constant of $1 \times 10^{-3}$ s$^{-1}$ or less, preferably $1 \times 10^{-4}$ s$^{-1}$ or less, as determined by surface plasmon resonance, e.g., BIACORE™.

The terms "antigen-binding portion" of an antibody, "antigen-binding fragment" of an antibody, and the like, as used herein, include any naturally occurring, enzymatically obtainable, synthetic, or genetically engineered polypeptide or glycoprotein that specifically binds an antigen to form a complex. The terms "antigen-binding fragment" of an antibody, or "antibody fragment", as used herein, refers to one or more fragments of an antibody that retain the ability to bind to TMPRSS6 protein.

In specific embodiments, antibody or antibody fragments of the disclosure may be conjugated to a moiety such a ligand or a therapeutic moiety ("immunoconjugate"), a second anti-TMPRSS6 antibody, or any other therapeutic moiety useful for treating a TMPRSS6-associated disease or disorder.

An "isolated antibody", as used herein, is intended to refer to an antibody that is substantially free of other antibodies (Abs) having different antigenic specificities (e.g., an isolated antibody that specifically binds TMPRSS6, or a fragment thereof, is substantially free of Abs that specifically bind antigens other than TMPRSS6.

The term "surface plasmon resonance", as used herein, refers to an optical phenomenon that allows for the analysis of real-time biomolecular interactions by detection of alterations in protein concentrations within a biosensor matrix, for example using the BIACORE™ system (Pharmacia Biosensor AB, Uppsala, Sweden and Piscataway, N.J.).

The term "$K_D$", as used herein, is intended to refer to the equilibrium dissociation constant of a particular antibody-antigen interaction.

The term "epitope" refers to an antigenic determinant that interacts with a specific antigen binding site in the variable region of an antibody molecule known as a paratope. A single antigen may have more than one epitope. Thus, different antibodies may bind to different areas on an antigen and may have different biological effects. The term "epitope" also refers to a site on an antigen to which B and/or T cells respond. It also refers to a region of an antigen that is bound by an antibody. Epitopes may be defined as structural or functional. Functional epitopes are generally a subset of the structural epitopes and have those residues that directly contribute to the affinity of the interaction. Epitopes may also be conformational, that is, composed of non-linear amino acids. In certain embodiments, epitopes may include determinants that are chemically active surface groupings of molecules such as amino acids, sugar side chains, phosphoryl groups, or sulfonyl groups, and, in certain embodiments, may have specific three-dimensional structural characteristics, and/or specific charge characteristics.

In some embodiments, the antibodies and antigen-binding fragments disclosed herein comprise an epitope or part of an epitope comprising G699, H701, D724, Q726, L727, I728, P729, L732, E735, G749, Y750, R751, K752, and N791 of human TMPRSS6 (NP_705837.1; SEQ ID NO: 126). In some embodiments, the antibodies and antigen-binding fragments disclosed herein comprise an epitope or part of an epitope comprising V490, S501, T502, C503, I504, S505, and K508 of human TMPRSS6 (NP_705837.1; SEQ ID NO: 126). In some embodiments, the antibodies and antigen-binding fragments disclosed herein comprise an epitope comprising two parts of human TMPRSS6, the first part comprising G699, H701, D724, Q726, L727, I728, P729, L732, E735, G749, Y750, R751, K752, and N791 of human TMPRSS6, and the second part comprising V490, S501, T502, C503, I504, S505, and K508 of human TMPRSS6 (NP_705837.1; SEQ ID NO: 126).

In other embodiments, the antibodies and antigen-binding fragments disclosed herein comprise an epitope or part of an epitope comprising R597, R599, I601, D622, L710, R711, E712, G713, G714, P715, and I716 of human TMPRSS6 (NP_705837.1; SEQ ID NO: 126).

The term "cross-competes", as used herein, means an antibody or antigen-binding fragment thereof binds to an antigen and inhibits or blocks the binding of another antibody or antigen-binding fragment thereof. The term also includes competition between two antibodies in both orientations, i.e., a first antibody that binds and blocks binding of second antibody and vice-versa. In certain embodiments, the first antibody and second antibody may bind to the same epitope. Alternatively, the first and second antibodies may bind to different, but overlapping epitopes such that binding of one inhibits or blocks the binding of the second antibody, e.g., via steric hindrance. Cross-competition between antibodies may be measured by methods known in the art, for example, by a real-time, label-free bio-layer interferometry assay. Cross-competition between two antibodies may be expressed as the binding of the second antibody that is less than the background signal due to self-self binding (wherein first and second antibodies is the same antibody). Cross-competition between 2 antibodies may be expressed, for example, as % binding of the second antibody that is less than the baseline self-self background binding (wherein first and second antibodies is the same antibody).

The term "substantial identity" or "substantially identical," when referring to a nucleic acid or fragment thereof, indicates that, when optimally aligned with appropriate nucleotide insertions or deletions with another nucleic acid (or its complementary strand), there is nucleotide sequence identity in at least about 90%, and more preferably at least about 95%, 96%, 97%, 98% or 99% of the nucleotide bases, as measured by any well-known algorithm of sequence identity, such as FASTA, BLAST, or GAP, as discussed below. A nucleic acid molecule having substantial identity to a reference nucleic acid molecule may, in certain instances, encode a polypeptide having the same or substantially similar amino acid sequence as the polypeptide encoded by the reference nucleic acid molecule.

As applied to polypeptides, the term "substantial similarity" or "substantially similar" means that two peptide sequences, when optimally aligned, such as by the programs GAP or BESTFIT using default gap weights, share at least 90% sequence identity, even more preferably at least 95%, 98% or 99% sequence identity. Preferably, residue positions, which are not identical, differ by conservative amino acid substitutions. A "conservative amino acid substitution" is one in which an amino acid residue is substituted by another amino acid residue having a side chain (R group) with similar chemical properties (e.g., charge or hydrophobicity). In general, a conservative amino acid substitution will not substantially change the functional properties of a protein. In cases where two or more amino acid sequences differ from each other by conservative substitutions, the percent or degree of similarity may be adjusted upwards to correct for the conservative nature of the substitution. Means for making this adjustment are well known to those of skill in the art. See, e.g., Pearson (1994) Methods Mol. Biol. 24:307-331, which is herein incorporated by reference. Examples of groups of amino acids that have side chains with similar chemical properties include 1) aliphatic side chains: glycine, alanine, valine, leucine and isoleucine; 2) aliphatic-hydroxyl side chains: serine and threonine; 3) amide-containing side chains: asparagine and glutamine; 4) aromatic side chains: phenylalanine, tyrosine, and tryptophan; 5) basic side chains: lysine, arginine, and histidine; 6) acidic side chains: aspartate and glutamate, and 7) sulfur-containing side chains: cysteine and methionine. Preferred conservative amino acids substitution groups are: valine-leucine-isoleucine, phenylalanine-tyrosine, lysine-arginine, alanine-valine, glutamate-aspartate, and asparagine-glutamine. Alternatively, a conservative replacement is any change having a positive value in the PAM250 log-likelihood matrix disclosed in Gonnet et al. (1992) Science 256:1443 45, herein incorporated by reference. A "moderately conservative" replacement is any change having a nonnegative value in the PAM250 log-likelihood matrix.

Sequence similarity for polypeptides is typically measured using sequence analysis software. Protein analysis software matches similar sequences using measures of similarity assigned to various substitutions, deletions and other modifications, including conservative amino acid substitutions. For instance, GCG software contains programs such as GAP and BESTFIT which can be used with default parameters to determine sequence homology or sequence identity between closely related polypeptides, such as homologous polypeptides from different species of organisms or between a wild type protein and a mutein thereof. See, e.g., GCG Version 6.1. Polypeptide sequences also can be compared using FASTA with default or recommended parameters; a program in GCG Version 6.1. FASTA (e.g., FASTA2 and FASTA3) provides alignments and percent sequence identity of the regions of the best overlap between the query and search sequences (Pearson (2000) supra). Another preferred algorithm when comparing a sequence to a database containing a large number of sequences from different organisms is the computer program BLAST, especially BLASTP or TBLASTN, using default parameters. See, e.g., Altschul et al. (1990) J. Mol. Biol. 215:403-410 and (1997) Nucleic Acids Res. 25:3389-3402, each of which is herein incorporated by reference.

By the phrase "therapeutically effective amount" is meant an amount that produces the desired effect for which it is administered. The exact amount will depend on the purpose of the treatment, and will be ascertainable by one skilled in the art using known techniques (see, for example, Lloyd (1999) The Art, Science and Technology of Pharmaceutical Compounding).

As used herein, the term "subject" refers to an animal, preferably a mammal, more preferably a human, in need of amelioration, prevention and/or treatment of a TMPRSS6-associated disease or disorder such as beta-thalassemia or myelodysplastic syndrome. The term includes human subjects who have or are at risk of having such a disease or disorder.

As used herein, the terms "treat", "treating", or "treatment" refer to the reduction or amelioration of the severity of at least one symptom or indication of a TMPRSS6-associated disease or disorder due to the administration of a therapeutic agent such as an antibody or antigen binding fragment disclosed herein to a subject in need thereof. The terms include inhibition of progression of disease or of worsening of a symptom/indication. The terms also include positive prognosis of disease, i.e., the subject may be free of disease or may have reduced disease upon administration of a therapeutic agent such as an antibody or antigen binding fragment disclosed herein. The therapeutic agent may be administered at a therapeutic dose to the subject.

The terms "prevent", "preventing" or "prevention" refer to inhibition of manifestation of a TMPRSS6-associated disease or disorder or any symptoms or indications of such a disease or disorder upon administration of an antibody or antigen binding fragment disclosed herein.

Antigen-Binding Fragments of Antibodies

Unless specifically indicated otherwise, the term "antibody," as used herein, shall be understood to encompass antibody molecules comprising two immunoglobulin heavy chains and two immunoglobulin light chains (i.e., "full antibody molecules") as well as antigen-binding fragments thereof. The terms "antigen-binding portion" of an antibody, "antigen-binding fragment" of an antibody, and the like, as used herein, include any naturally occurring, enzymatically obtainable, synthetic, or genetically engineered polypeptide or glycoprotein that specifically binds an antigen to form a complex. The terms "antigen-binding fragment" of an antibody, or "antibody fragment", as used herein, refers to one or more fragments of an antibody that retain the ability to specifically bind to TMPRSS6 protein. An antibody fragment may include a Fab fragment, a F(ab')$_2$ fragment, a Fv fragment, a dAb fragment, a fragment containing a CDR, or an isolated CDR. Antigen-binding fragments of an antibody may be derived, e.g., from full antibody molecules using any suitable standard techniques such as proteolytic digestion or recombinant genetic engineering techniques involving the manipulation and expression of DNA encoding antibody variable and (optionally) constant domains. Such DNA is known and/or is readily available from, e.g., commercial sources, DNA libraries (including, e.g., phage-antibody libraries), or can be synthesized. The DNA may be sequenced and manipulated chemically or by using molecular biology techniques, for example, to arrange one or more variable and/or constant domains into a suitable configuration, or to introduce codons, create cysteine residues, modify, add or delete amino acids, etc.

Non-limiting examples of antigen-binding fragments include: (i) Fab fragments; (ii) F(ab')$_2$ fragments; (iii) Fd fragments; (iv) Fv fragments; (v) single-chain Fv (scFv) molecules; (vi) dAb fragments; and (vii) minimal recognition units consisting of the amino acid residues that mimic the hypervariable region of an antibody (e.g., an isolated complementarity determining region (CDR) such as a CDR3 peptide), or a constrained FR3-CDR3-FR4 peptide. Other engineered molecules, such as domain-specific antibodies, single domain antibodies, domain-deleted antibodies, chimeric antibodies, CDR-grafted antibodies, diabodies, triabodies, tetrabodies, minibodies, nanobodies (e.g. monovalent nanobodies, bivalent nanobodies, etc.), small modular immunopharmaceuticals (SMIPs), and shark variable IgNAR domains, are also encompassed within the expression "antigen-binding fragment," as used herein.

An antigen-binding fragment of an antibody will typically comprise at least one variable domain. The variable domain may be of any size or amino acid composition and will generally comprise at least one CDR, which is adjacent to or in frame with one or more framework sequences. In antigen-binding fragments having a $V_H$ domain associated with a $V_L$ domain, the $V_H$ and $V_L$ domains may be situated relative to one another in any suitable arrangement. For example, the variable region may be dimeric and contain $V_H$-$V_H$, $V_H$-$V_L$ or $V_L$-$V_L$ dimers. Alternatively, the antigen-binding fragment of an antibody may contain a monomeric $V_H$ or $V_L$ domain.

In certain embodiments, an antigen-binding fragment of an antibody may contain at least one variable domain covalently linked to at least one constant domain. Non-limiting, exemplary configurations of variable and constant domains that may be found within an antigen-binding fragment of an antibody disclosed herein include: (i) $V_H$-$C_H1$; (ii) $V_H$-$C_H2$; (iii) $V_H$-$C_H3$; (iv) $V_H$-$C_H1$-$C_H2$; (v) $V_H$-$C_H1$-$C_H2$-$C_H3$; (vi) $V_H$-$C_H2$-$C_H3$; (Vii) $V_H$-$C_L$; (viii) $V_L$-$C_H1$; (ix) $V_L$-$C_H2$; (x) $V_L$-$C_H3$; (xi) $V_L$-$C_H1$-$C_H2$; (xii) $V_L$-$C_H1$-$C_H2$-$C_H3$; (xiii) $V_L$-$C_H2$-$C_H3$; and (xiv) $V_L$-$C_L$. In any configuration of variable and constant domains, including any of the exemplary configurations listed above, the variable and constant domains may be either directly linked to one another or may be linked by a full or partial hinge or linker region. A hinge region may consist of at least 2 (e.g., 5, 10, 15, 20, 40, 60 or more) amino acids, which result in a flexible or semi-flexible linkage between adjacent variable and/or constant domains in a single polypeptide molecule. Moreover, an antigen-binding fragment of an antibody disclosed herein may comprise a homo-dimer or hetero-dimer (or other multimer) of any of the variable and constant domain configurations listed above in non-covalent association with one another and/or with one or more monomeric $V_H$ or $V_L$ domain (e.g., by disulfide bond(s)).

As with full antibody molecules, antigen-binding fragments may be mono-specific or multi-specific (e.g., bi-specific). A multi-specific antigen-binding fragment of an antibody will typically comprise at least two different variable domains, wherein each variable domain is capable of specifically binding to a separate antigen or to a different epitope on the same antigen. Any multi-specific antibody format, including the exemplary bi-specific antibody formats disclosed herein, may be adapted for use in the context of an antigen-binding fragment of an antibody disclosed herein using routine techniques available in the art.

Preparation of Human Antibodies

Methods for generating human antibodies in transgenic mice are known in the art. Any such known methods can be used in the context of the present disclosure to make human antibodies that specifically bind to TMPRSS6.

An immunogen comprising any one of the following can be used to generate antibodies to TMPRSS6 protein. In certain embodiments, the antibodies disclosed herein are obtained from mice immunized with a full length, native TMPRSS6 protein (See, for example, UniProtKB/Swiss-Prot accession number Q8IU80) or with DNA encoding the protein or fragment thereof. Alternatively, the protein or a fragment thereof may be produced using standard biochemical techniques and modified and used as immunogen.

In some embodiments, the immunogen may be a recombinant TMPRSS6 protein or fragment thereof expressed in *E. coli* or in any other eukaryotic or mammalian cells such as Chinese hamster ovary (CHO) cells (for example, SEQ ID NOs: 117-119)

Using VELOCIMMUNE® technology (see, for example, U.S. Pat. No. 6,596,541, Regeneron Pharmaceuticals, VELOCIMMUNE®) or any other known method for generating monoclonal antibodies, high affinity chimeric antibodies to TMPRSS6 are initially isolated having a human variable region and a mouse constant region. The VELOCIMMUNE® technology involves generation of a transgenic mouse having a genome comprising human heavy and light chain variable regions operably linked to endogenous mouse constant region loci such that the mouse produces an antibody comprising a human variable region and a mouse constant region in response to antigenic stimulation. The DNA encoding the variable regions of the heavy and light chains of the antibody are isolated and operably linked to DNA encoding the human heavy and light chain constant regions. The DNA is then expressed in a cell capable of expressing the fully human antibody.

Generally, a VELOCIMMUNE® mouse is challenged with the antigen of interest, and lymphatic cells (such as B-cells) are recovered from the mice that express antibodies. The lymphatic cells may be fused with a myeloma cell line to prepare immortal hybridoma cell lines, and such hybridoma cell lines are screened and selected to identify hybridoma cell lines that produce antibodies specific to the antigen of interest. DNA encoding the variable regions of the heavy chain and light chain may be isolated and linked to desirable isotypic constant regions of the heavy chain and light chain. Such an antibody protein may be produced in a cell, such as a CHO cell. Alternatively, DNA encoding the antigen-specific chimeric antibodies or the variable domains of the light and heavy chains may be isolated directly from antigen-specific lymphocytes.

Initially, high affinity chimeric antibodies are isolated having a human variable region and a mouse constant region. As in the experimental section below, the antibodies are characterized and selected for desirable characteristics, including affinity, selectivity, epitope, etc. The mouse constant regions are replaced with a desired human constant region to generate the fully human antibody as disclosed herein, for example wild-type or modified IgG1 or IgG4. While the constant region selected may vary according to specific use, high affinity antigen-binding and target specificity characteristics reside in the variable region.

Bioequivalents

The anti-TMPRSS6 antibodies and antibody fragments disclosed herein encompass proteins having amino acid sequences that vary from those of the described antibodies, but that retain the ability to bind TMPRSS6 protein. Such variant antibodies and antibody fragments comprise one or more additions, deletions, or substitutions of amino acids when compared to parent sequence, but exhibit biological activity that is essentially equivalent to that of the described antibodies. Likewise, the antibody-encoding DNA sequences disclosed herein encompass sequences that comprise one or more additions, deletions, or substitutions of nucleotides when compared to the disclosed sequence, but that encode an antibody or antibody fragment that is essentially bioequivalent to an antibody or antibody fragment disclosed herein.

Two antigen-binding proteins, or antibodies, are considered bioequivalent if, for example, they are pharmaceutical equivalents or pharmaceutical alternatives whose rate and extent of absorption do not show a significant difference when administered at the same molar dose under similar experimental conditions, either single dose or multiple doses. Some antibodies will be considered equivalents or pharmaceutical alternatives if they are equivalent in the extent of their absorption but not in their rate of absorption and yet may be considered bioequivalent because such differences in the rate of absorption are intentional and are reflected in the labeling, are not essential to the attainment of effective body drug concentrations on, e.g., chronic use, and are considered medically insignificant for the particular drug product studied.

In one embodiment, two antigen-binding proteins are bioequivalent if there are no clinically meaningful differences in their safety, purity, or potency.

In one embodiment, two antigen-binding proteins are bioequivalent if a patient can be switched one or more times between the reference product and the biological product without an expected increase in the risk of adverse effects, including a clinically significant change in immunogenicity, or diminished effectiveness, as compared to continued therapy without such switching.

In one embodiment, two antigen-binding proteins are bioequivalent if they both act by a common mechanism or mechanisms of action for the condition or conditions of use, to the extent that such mechanisms are known.

Bioequivalence may be demonstrated by in vivo and/or in vitro methods. Bioequivalence measures include, e.g., (a) an in vivo test in humans or other mammals, in which the concentration of the antibody or its metabolites is measured in blood, plasma, serum, or other biological fluid as a function of time; (b) an in vitro test that has been correlated with and is reasonably predictive of human in vivo bioavailability data; (c) an in vivo test in humans or other mammals in which the appropriate acute pharmacological effect of the antibody (or its target) is measured as a function of time; and (d) in a well-controlled clinical trial that establishes safety, efficacy, or bioavailability or bioequivalence of an antibody.

Bioequivalent variants of the disclosed antibodies may be constructed by, for example, making various substitutions of residues or sequences or deleting terminal or internal residues or sequences not needed for biological activity. For example, cysteine residues not essential for biological activity can be deleted or replaced with other amino acids to prevent formation of unnecessary or incorrect intramolecular disulfide bridges upon renaturation. In other contexts, bioequivalent antibodies may include antibody variants comprising amino acid changes, which modify the glycosylation characteristics of the antibodies, e.g., mutations that eliminate or remove glycosylation.

Anti-TMPRSS6 Antibodies Comprising Fc Variants

Antibodies referred to herein typically have fully human variable regions, but may have human or mouse constant regions. As will be appreciated by a person of ordinary skill in the art, an antibody having a particular Fc isotype can be converted to an antibody with a different Fc isotype (e.g., an antibody with a mouse IgG1 Fc can be converted to an antibody with a human IgG4, etc.), but in any event, the variable domains (including the CDRs)—which are indicated by the numerical identifiers shown in Table 1—will remain the same, and the binding properties to antigen are expected to be identical or substantially similar regardless of the nature of the Fc domain. In certain embodiments, the antibodies comprise a human IgG4 Fc. In one embodiment, the human IgG4 Fc comprises a serine to proline mutation in the hinge region (S108P) to promote dimer stabilization.

According to certain embodiments disclosed herein, anti-TMPRSS6 antibodies are provided comprising an Fc domain comprising one or more mutations which enhance or diminish antibody binding to the FcRn receptor, e.g., at acidic pH as compared to neutral pH. For example, the present disclosure includes anti-TMPRSS6 antibodies comprising a mutation in the $C_H2$ or a $C_H3$ region of the Fc domain, wherein the mutation(s) increases the affinity of the Fc domain to FcRn in an acidic environment (e.g., in an endosome where pH ranges from about 5.5 to about 6.0). Such mutations may result in an increase in serum half-life of the antibody when administered to an animal. Non-limiting examples of such Fc modifications include, e.g., a modification at position 250 (e.g., E or Q); 250 and 428 (e.g., L or F); 252 (e.g., L/Y/F/W or T), 254 (e.g., S or T), and 256 (e.g., S/R/Q/E/D or T); or a modification at position 428 and/or 433 (e.g., H/L/R/S/P/Q or K) and/or 434 (e.g., A, W, H, F or Y [N434A, N434W, N434H, N434F or N434Y]); or a modification at position 250 and/or 428; or a modification at position 307 or 308 (e.g., 308F, V308F), and 434. In one embodiment, the modification comprises a 428L (e.g., M428L) and 434S (e.g., N434S) modification; a 428L, 259I (e.g., V259I), and 308F (e.g., V308F) modification; a 433K (e.g., H433K) and a 434 (e.g., 434Y) modification; a 252, 254, and 256 (e.g., 252Y, 254T, and 256E) modification; a 250Q and 428L modification (e.g., T250Q and M428L); and a 307 and/or 308 modification (e.g., 308F or 308P). In yet another embodiment, the modification comprises a 265A (e.g., D265A) and/or a 297A (e.g., N297A) modification.

For example, the present disclosure includes anti-TMPRSS6 antibodies comprising an Fc domain comprising one or more pairs or groups of mutations selected from: 250Q and 248L (e.g., T250Q and M248L); 252Y, 254T and 256E (e.g., M252Y, S254T and T256E); 428L and 434S (e.g., M428L and N434S); 257I and 311I (e.g., P257I and Q311I); 257I and 434H (e.g., P257I and N434H); 376V and 434H (e.g., D376V and N434H); 307A, 380A and 434A (e.g., T307A, E380A and N434A); and 433K and 434F (e.g., H433K and N434F). All possible combinations of the foregoing Fc domain mutations and other mutations within the antibody variable domains disclosed herein, are contemplated within the scope of the present disclosure.

Also disclosed herein are anti-TMPRSS6 antibodies comprising a chimeric heavy chain constant ($C_H$) region, wherein the chimeric $C_H$ region comprises segments derived from the $C_H$ regions of more than one immunoglobulin isotype. For example, the antibodies disclosed herein may comprise a chimeric $C_H$ region comprising part or all of a $C_H2$ domain derived from a human IgG1, human IgG2 or human IgG4 molecule, combined with part or all of a $C_H3$ domain derived from a human IgG1, human IgG2 or human IgG4 molecule. According to certain embodiments, the antibodies disclosed herein comprise a chimeric $C_H$ region having a chimeric hinge region. For example, a chimeric hinge may comprise an "upper hinge" amino acid sequence (amino acid residues from positions 216 to 227 according to EU numbering) derived from a human IgG1, a human IgG2 or a human IgG4 hinge region, combined with a "lower hinge" sequence (amino acid residues from positions 228 to 236 according to EU numbering) derived from a human IgG1, a human IgG2 or a human IgG4 hinge region. According to certain embodiments, the chimeric hinge region comprises amino acid residues derived from a human IgG1 or a human IgG4 upper hinge and amino acid residues derived from a human IgG2 lower hinge. An antibody comprising a chimeric $C_H$ region as described herein may, in certain embodiments, exhibit modified Fc effector functions without adversely affecting the therapeutic or pharmacokinetic properties of the antibody. (See, e.g., U.S. Patent Application Publication 2014/0243504, the disclosure of which is hereby incorporated by reference in its entirety).

Biological Characteristics of the Antibodies and Antigen-Binding Fragments Thereof In general, the disclosed antibodies or antigen-binding fragments thereof function by binding to TMPRSS6 protein and inhibiting its activity (e.g., an enzymatic activity). In some embodiments, the inhibited TMPRSS6 activity is proteolytic activity.

Disclosed herein are antibodies and antigen-binding fragments thereof that bind TMPRSS6 protein (i.e. anti-TMPRSS6 antibodies or antigen-binding fragments thereof). In certain embodiments, the anti-TMPRSS6 antibody or antigen-binding fragment thereof binds to the catalytic domain of TMPRSS6. In certain embodiments, the anti-TMPRSS6 antibody or antigen-binding fragment thereof binds to the catalytic domain of TMPRSS6 but does not bind to the catalytic triad of TMPRSS6. Also disclosed herein are antibodies and antigen-binding fragments thereof that bind at a site located within the LDLRa domain 2 of TMPRSS6 (e.g., residues 492-526 of human TMPRSS6 (SEQ ID NO: 126)). In some embodiments, the antibodies and antigen-binding fragments thereof may bind or interact with more than one site on TMPRSS6. For example, an antibody or antigen-binding fragment thereof that binds a site within the catalytic domain of TMPRSS6 may also bind at a site (e.g., secondary site) comprised within the LDLRa domain 2 of TMPRSS6.

Further disclosed herein are antibodies and antigen-binding fragments thereof that bind the catalytic domain of TMPRSS6 (e.g., residues 577-811 of human TMPRSS6 (SEQ ID NO: 126)), wherein the binding does not directly occlude the catalytic triad of TMPRSS6. Without being bound by theory, where binding of the anti-TMPRSS6 antibodies or antigen-binding fragments thereof does not directly occlude the catalytic triad of TMPRSS6, TMPRSS6 may retain its ability to bind a substrate, e.g., hemojuvelin (HJV). For example, in certain embodiments, the anti-TMPRSS6 antibody or antigen-binding fragment thereof binds to TMPRSS6 and maintains TMPRSS6 in an inactive conformation that is capable of binding to but not cleaving a TMPRSS6 substrate. In certain embodiments, the anti-TMPRSS6 antibody or antigen-binding fragment thereof binds to TMPRSS6 and maintains TMPRSS6 in an inactive conformation that is capable of binding to but not cleaving hemojuvelin. Such anti-TMPRSS6 antibodies and antigen-binding fragments thereof may mediate allosteric regulation of TMPRSS6. In certain embodiments, the anti-TMPRSS6 antibody or antigen-binding fragment thereof mediates allosteric inhibition of TMPRSS6. Also disclosed herein are antibodies and antigen-binding fragments thereof that bind human TMPRSS6 protein and are allosteric inhibitors of TMPRSS6.

Also disclosed herein are antibodies and antigen-binding fragments thereof that bind to the catalytic domain of TMPRSS6, wherein the binding directly occludes the catalytic triad of TMPRSS6. Without being bound by theory, occlusion of the catalytic triad of TMPRSS6 may result in steric hindrance of substrate (e.g., hemojuvelin) binding to TMPRSS6.

Disclosed herein are antibodies and antigen-binding fragments of antibodies that bind human TMPRSS6 protein (e.g., at 25° C. or at 37° C.) with a $K_D$ of less than about 25 nM as measured by surface plasmon resonance, e.g., using the assay format as defined in Example 3 herein. In certain embodiments, the antibodies or antigen-binding fragments thereof bind human TMPRSS6 with a $K_D$ of less than about 25 nM, less than about 20 nM, less than about 15 nM, less than about 10 nM, less than about 9 nM, less than about 8 nM, less than about 7 nM, less than about 6 nM, less than about 5 nM, less than about 4 nM, less than about 3 nM, less than about 2 nM, less than about 1 nM, less than about 900 picomolar (pM), less than about 800 pM, less than about 700 pM, less than about 600 pM, less than about 500 pM, less than about 400 pM, less than about 300 pM, less than about 200 pM, or less than about 150 pM, as measured by surface plasmon resonance, e.g., using the assay format as defined in Example 3 herein, or a substantially similar assay. In certain embodiments, the antibodies or antigen-binding fragments thereof bind human TMPRSS6 with a $K_D$ in the range of about 128 pM to about 21.2 nM.

Also disclosed herein are antibodies and antigen-binding fragments of antibodies that bind cynomolgus monkey (e.g., *Macaca fascicularis*) TMPRSS6 protein (e.g., at 25° C. or at 37° C.) with a $K_D$ of less than about 30 nM as measured by surface plasmon resonance, e.g., using the assay format as defined in Example 3 herein. In certain embodiments, the antibodies or antigen-binding fragments thereof bind cynomolgus monkey TMPRSS6 with a $K_D$ of less than about 30 nM, less than about 25 nM, less than about 20 nM, less than about 15 nM, less than about 10 nM, less than about 9 nM, less than about 8 nM, less than about 7 nM, less than about 6 nM, less than about 5 nM, less than about 4 nM, less than about 3 nM, less than about 2 nM, less than about 1 nM, less than about 900 picomolar (pM), less than about 800 pM, less than about 700 pM, less than about 600 pM, less than about 500 pM, less than about 400 pM, less than about 300 pM, less than about 200 pM, less than about 150 pM, less than about 100 pM, or less than about 75 pM, as measured by surface plasmon resonance, e.g., using the assay format as defined in Example 3 herein, or a substantially similar assay. In certain embodiments, the antibodies or antigen-binding fragments thereof bind monkey TMPRSS6 with a $K_D$ in the range of about 65 pM to about 25.7 nM.

Also disclosed herein are antibodies and antigen-binding fragments of antibodies that bind mouse TMPRSS6 protein (e.g., at 25° C. or at 37° C.) with a $K_D$ of less than about 750 nM as measured by surface plasmon resonance, e.g., using the assay format as defined in Example 3 herein. In certain embodiments, the antibodies or antigen-binding fragments thereof bind mouse TMPRSS6 with a $K_D$ of less than about 750 nM, less than about 700 nM, less than about 650 nM, less than about 600 nM, less than about 550 nM, less than about 500 nM, less than about 450 nM, less than about 400 nM, less than about 350 nM, less than about 300 nM, less than about 250 nM, less than about 200 nM, less than about 150 nM, less than about 50 nM, less than about 1000 picomolar (pM), less than about 900 pM, less than about 800 pM, less than about 700 pM, less than about 600 pM, less than about 500 pM, less than about 400 pM, less than about 300 pM, less than about 200 pM, less than about 150 pM, or less than about 100 pM, as measured by surface plasmon resonance, e.g., using the assay format as defined in Example 3 herein, or a substantially similar assay. In certain embodiments, the disclosed antibodies or antigen-binding fragments thereof bind mouse TMPRSS6 with a $K_D$ in the range of about 82.9 pM to about 703 nM.

Also disclosed herein are antibodies and antigen-binding fragments thereof that bind to cells expressing human TMPRSS6 at a $EC_{50}$ of less than about 5 nM, less than about 4 nM, less than about 3 nM, less than about 2 nM, less than about 1 nM, less than about 900 pM, less than about 800 pM, or less than about 700 pM, as measured, e.g., using an assay format as described in Example 5 herein, or a substantially similar assay. In certain embodiments, the disclosed antibodies or antigen-binding fragments thereof bind to cells expressing human TMPRSS6 at a $EC_{50}$ in the range of about 670 pM to about 2.7 nM.

Also disclosed herein are antibodies and antigen-binding fragments thereof that bind to cells expressing cynomolgous monkey TMPRSS6 at a $EC_{50}$ of less than about 5 nM, less than about 4 nM, less than about 3 nM, less than about 2 nM, or less than about 1 nM, as measured, e.g., using an assay format as described in Example 5 herein, or a substantially similar assay. In certain embodiments, the disclosed antibodies or antigen-binding fragments thereof bind to cells expressing cynomolgous monkey TMPRSS6 at a $EC_{50}$ in the range of about 940 pM to about 3.6 nM.

Also disclosed herein are antibodies and antigen-binding fragments thereof that bind to cells expressing mouse TMPRSS6 at a $EC_{50}$ of less than about 40 nM, less than about 35 nM, less than about 30 nM, less than about 25 nM, less than about 20 nM, less than about 15 nM, less than about 10 nM, less than about 5 nM, less than about 4 nM, less than about 3 nM, less than about 2 nM, less than about 1 nM, or less than about 0.9 nM, as measured, e.g., using an assay format as described in Example 5 herein, or a substantially similar assay. In certain embodiments, the disclosed antibodies or antigen-binding fragments thereof bind to cells expressing mouse TMPRSS6 at a $EC_{50}$ in the range of about 840 pM to about 35 nM.

In one embodiment, an isolated recombinant antibody or antigen-binding fragment thereof is disclosed herein which binds specifically to TMPRSS6 protein, wherein the antibody or fragment thereof exhibits one or more of the following characteristics: (a) is a fully human monoclonal antibody; (b) binds to human TMPRSS6 at 25° C. and at 37° C. with a dissociation constant ($K_D$) of less than about 21.2 nM, as measured in a surface plasmon resonance assay; (c) binds to monkey TMPRSS6 at 25° C. and at 37° C. with a $K_D$ of less than about 25.7 nM, as measured in a surface plasmon resonance assay; (d) binds to mouse TMPRSS6 at 25° C. and at 37° C. with a $K_D$ of less than about 703 nM, as measured in a surface plasmon resonance assay; (e) binds to cells expressing human TMPRSS6 with $EC_{50}$ less than about 2.7 nM; (f) binds to cells expressing monkey TMPRSS6 with $EC_{50}$ less than about 3.6 nM; (g) binds to cells expressing mouse TMPRSS6 with $EC_{50}$ less than about 35 nM; (h) comprises a HCDR1, HCDR2, and HCDR3 comprising an amino acid sequence selected from a HCDR1, HCDR2, and HCDR3 sequence listed in Table 1 and/or a LCDR1, LCDR2, and LCDR3 comprising an amino acid sequence selected from a LCDR1, LCDR2, and LCDR3 sequence listed in Table 1; and/or (i) comprises a HCVR comprising an amino acid sequence selected from a HCVR sequence listed in Table 1 and a LCVR comprising an amino acid sequence selected from a LCVR sequence listed in Table 1.

Disclosed herein are antibodies and antigen-binding fragments thereof that bind to TMPRSS6 and decrease serum iron levels of a subject in need thereof, for example, as demonstrated in Examples 10, 11, and 14 herein.

Also disclosed herein are antibodies and antigen-binding fragments thereof that bind to TMPRSS6 and increase serum hepcidin levels of a subject in need thereof, for example, as demonstrated in Examples 10, 11, and 14 herein.

Also disclosed herein are antibodies and antigen-binding fragments thereof that bind to TMPRSS6 and increase mature red blood cell levels of a subject in need thereof. In certain embodiments, the antibodies and antigen-binding fragments thereof that bind to TMPRSS6 increase mature red blood cell levels in the spleen and/or bone marrow of a subject in need thereof. Also disclosed herein are antibodies and antigen-binding fragments thereof that bind to TMPRSS6 and decrease the level of splenic reticulocytes of a subject in need thereof. Without being bound by theory, such antibodies and antigen-binding fragments thereof that bind to TMPRSS6 improve erythropoiesis of a subject in need thereof. In certain embodiments, the disclosed antibodies and antigen-binding fragments thereof bind to TMPRSS6 and improve erythropoiesis of a subject in need thereof, leading to a reduced need for secondary erythropoiesis in the spleen, for example, as demonstrated in Example 12 herein.

Also disclosed herein are antibodies and antigen-binding fragments thereof that bind to TMPRSS6 and increase hemoglobin levels of a subject in need thereof, for example, as demonstrated in Example 13 herein.

Disclosed herein are antibodies and antigen-binding fragments thereof that bind to TMPRSS6 and decrease transferrin saturation levels of a subject in need thereof, for example, as demonstrated in Example 14 herein.

Disclosed herein is an isolated recombinant antibody or antigen-binding fragment thereof which binds specifically to TMPRSS6 protein, wherein the antibody or antigen-binding fragment thereof exhibits one or more of the following characteristics when administered to a subject in need thereof: (a) decreases serum iron levels of the subject; (b) increases serum hepcidin levels of the subject; (c) increases mature red blood cell levels of the subject; (d) increases mature red blood cell levels in the spleen and/or bone marrow of the subject; (e) increases hemoglobin levels of the subject; or (f) decreases transferrin saturation levels of the subject.

Disclosed herein are anti-TMPRSS6 antibodies or antigen-binding fragments thereof that are useful for decreasing serum iron levels of a subject in need thereof. Also disclosed herein are antibodies or antigen-binding fragments thereof that are useful for increasing serum hepcidin levels of a subject in need thereof. Also disclosed herein are antibodies or antigen-binding fragments thereof that are useful for increasing mature red blood cell levels of a subject in need thereof. Also disclosed herein are antibodies or antigen-binding fragments thereof that are useful for increasing mature red blood cell levels in the spleen and/or bone marrow of a subject in need thereof. Also disclosed herein are antibodies or antigen-binding fragments thereof that are useful for increasing hemoglobin levels of a subject in need thereof. Also disclosed herein are antibodies or antigen-binding fragments thereof that are useful for decreasing transferrin saturation levels of a subject in need thereof.

Disclosed herein are anti-TMPRSS6 antibodies or antigen-binding fragments thereof that are useful for treating or preventing at least one symptom or indication that is associated with increased serum iron levels. In certain embodiments, the antibodies or antigen-binding fragments thereof are useful for treating or preventing at least one symptom or indication that is associated with decreased serum hepcidin levels. In certain embodiments, the antibodies or antigen-binding fragments thereof are useful for treating or preventing at least one symptom or indication that is associated with decreased mature red blood cell levels. In certain embodiments, the antibodies or antigen-binding fragments thereof are useful for treating or preventing at least one symptom or indication that is associated with increased mature red blood cell levels in the spleen and/or bone marrow. In certain embodiments, the antibodies or antigen-binding fragments thereof are useful for treating or preventing at least one symptom or indication that is associated with decreased hemoglobin levels. In certain embodiments, the antibodies or antigen-binding fragments thereof are useful for treating or preventing at least one symptom or indication that is associated with increased transferrin saturation levels.

The antibodies and antigen-binding fragments thereof may possess one or more of the aforementioned characteristics, or any combinations thereof. Other characteristics of the disclosed antibodies and antigen-binding fragments thereof will be evident to a person of ordinary skill in the art from a review of the present disclosure including the working Examples herein.

Inhibition of TMPRSS6

Disclosed herein are antibodies and antigen-binding fragments thereof that inhibit protease-dependent release of cell surface hemojuvelin (HJV) in the presence of human TMPRSS6, e.g., antibodies and antigen-binding fragments thereof that inhibit human TMPRSS6, with a percent inhibition greater than about 90% (e.g., greater than about 89.2%, greater than about 89.4%, greater than about 89.6%, greater than about 89.8%, greater than about 90%, greater than about 90.2%, greater than about 90.4%, greater than about 90.6%, greater than about 90.8%), as measured, e.g., using an assay format as described in Example 6 herein, or a substantially similar assay. Also disclosed herein are antibodies and antigen-binding fragments thereof that inhibit protease-dependent release of cell surface hemojuvelin (HJV) in the presence of human TMPRSS6, e.g., antibodies and antigen-binding fragments thereof that inhibit human TMPRSS6, exhibiting an IC50 value ranging from about 70 pM to about 200 pM (e.g., about 69.3 pM, about 70 pM, about 80 pM, about 90 pM, about 100 pM, about 110 pM, about 120 pM, about 130 pM, about 140 pM, about 150 pM, about 160 pM, about 170 pM, about 180 pM, about 190 pM, about 202 pM), as measured, e.g., using an assay format as described in Example 6 herein, or a substantially similar assay.

Also disclosed herein are antibodies and antigen-binding fragments thereof that inhibit protease-dependent release of cell surface hemojuvelin (HJV) in the presence of mouse TMPRSS6, e.g., antibodies and antigen-binding fragments thereof that inhibit mouse TMPRSS6, with a percent inhibition from about 42% to about 98.5% (e.g., about 41.6%, about 45%, about 50%, about 55%, about 60%, about 65%, about 70%, about 75%, about 80%, about 85%, about 90%, about 95%, about 99%), as measured, e.g., using an assay format as described in Example 6 herein, or a substantially similar assay. Also disclosed herein are antibodies and antigen-binding fragments thereof that inhibit protease-dependent release of cell surface hemojuvelin (HJV) in the presence of mouse TMPRSS6, e.g., antibodies and antigen-binding fragments thereof that inhibit mouse TMPRSS6, exhibiting an IC50 value ranging from about 82.6 pM to about 274 pM (e.g., about 81.8 pM, about 90 pM, about 100 pM, about 110 pM, about 120 pM, about 130 pM, about 140 pM, about 150 pM, about 160 pM, about 170 pM, about 180 pM, about 190 pM, about 200 pM, about 210 pM, about 220 pM, about 230 pM, about 240 pM, about 250 pM, about 260 pM, about 276 pM), as measured, e.g., using an assay format as described in Example 6 herein, or a substantially similar assay.

Also disclosed herein are antibodies and antigen-binding fragments thereof that inhibit human TMPRSS6 with a percent inhibition from about 65% to about 98% (e.g., about 64.5%, about 65%, about 70%, about 75%, about 80%, about 85%, about 90%, about 95%, about 98.9%), as measured, e.g., using a "CM bioassay" format as described in Example 7 herein, or a substantially similar assay. Also disclosed herein are antibodies and antigen-binding fragments thereof that inhibit human TMPRSS6 exhibiting an IC50 value ranging from about 710 pM to greater than about 10 nM (e.g., about 703 pM, about 750 pM, about 800 pM, about 850 pM, about 900 pM, about 950 pM, about 1 nM, about 5 nM, about 10.1 nM), as measured, e.g., using a "CM bioassay" format as described in Example 7 herein, or a substantially similar assay.

Also disclosed herein are antibodies and antigen-binding fragments thereof that inhibit monkey TMPRSS6 with a percent inhibition from about 66% to about 98% (e.g., about 65.5%, about 65%, about 70%, about 75%, about 80%, about 85%, about 90%, about 95%, about 98.9%), as measured, e.g., using a "CM bioassay" format as described in Example 7 herein, or a substantially similar assay. Also disclosed herein are antibodies and antigen-binding fragments thereof that inhibit monkey TMPRSS6 exhibiting an IC50 value ranging from about 740 pM to greater than about 50 nM (e.g., about 733 pM, about 750 pM, about 800 pM, about 850 pM, about 900 pM, about 950 pM, about 1 nM, about 10 nM, about 15 nM, about 20 nM, about 25 nM, about 30 nM, about 35 nM, about 40 nM, about 45 nM, about 50.5 nM), as measured, e.g., using a "CM bioassay" format as described in Example 7 herein, or a substantially similar assay.

Also disclosed herein are antibodies and antigen-binding fragments thereof that inhibit human TMPRSS6 (e.g., at 25° C. or at 37° C.) with a percent inhibition from about 86% to about 90% (e.g., about 85.2%, about 85%, about 91%), as measured, e.g., using a "HEK293 bioassay" format as described in Example 7 herein, or a substantially similar assay. Also disclosed herein are antibodies and antigen-binding fragments thereof that inhibit human TMPRSS6 (e.g., at 25° C. or at 37° C.) exhibiting an IC50 value ranging from about 360 pM to about 5.8 nM (e.g., about 357 pM, about 400 pM, about 500 pM, about 600 pM, about 700 pM, about 800 pM, about 900 pM, about 1 nM, about 2 nM, about 3 nM, about 4 nM, about 5 nM), as measured, e.g., using a "HEK293 bioassay" format as described in Example 7 herein, or a substantially similar assay.

Also disclosed herein are antibodies and antigen-binding fragments thereof that inhibit monkey TMPRSS6 (e.g., at 25° C. or at 37° C.) with a percent inhibition from about 81% to about 94% (e.g., about 80.2%, about 85%, about 90%, about 94.9%), as measured, e.g., using a "HEK293 bioassay" format as described in Example 7 herein, or a substantially similar assay. Also disclosed herein are antibodies and antigen-binding fragments thereof that inhibit monkey TMPRSS6 (e.g., at 25° C. or at 37° C.) exhibiting an IC50 value ranging from about 660 pM to about 30 nM (e.g., about 654 pM, about 700 pM, about 750 pM, about 800 pM, about 850 pM, about 900 pM, about 950 pM, about 1 nM, about 10 nM, about 15 nM, about 20 nM, about 25 nM, about 30.3 nM), as measured, e.g., using a "HEK293 bioassay" format as described in Example 7 herein, or a substantially similar assay.

Also disclosed herein are antibodies and antigen-binding fragments thereof that inhibit mouse TMPRSS6 (e.g., at 25° C. or at 37° C.) with a percent inhibition from about 58% to about 103% (e.g., about 57.5%, about 60%, about 65%, about 70%, about 75%, about 80%, about 85%, about 90%, about 95%, about 104%), as measured, e.g., using a "HEK293 bioassay" format as described in Example 7 herein, or a substantially similar assay. Also disclosed herein are antibodies and antigen-binding fragments thereof that inhibit mouse TMPRSS6 (e.g., at 25° C. or at 37° C.) exhibiting an IC50 value ranging from about 1.5 nM to about 35 nM (e.g., about 2 nM, about 10 nM, about 15 nM, about 20 nM, about 25 nM, about 30 nM, about 35.3 nM), as measured, e.g., using a "HEK293 bioassay" format as described in Example 7 herein, or a substantially similar assay.

In one embodiment, an isolated recombinant antibody or antigen-binding fragment thereof is disclosed herein which binds specifically to TMPRSS6 protein, wherein the antibody or fragment thereof exhibits one or more of the following characteristics: (a) inhibits protease-dependent release of cell surface hemojuvelin in the presence of human TMPRSS6, e.g., inhibits human TMPRSS6, with percent inhibition greater than about 90%; (b) inhibits protease-dependent release of cell surface hemojuvelin in the presence of human TMPRSS6, e.g., inhibits human TMPRSS6 and exhibits an IC50 less than about 200 pM; (c) inhibits protease-dependent release of cell surface hemojuvelin in the presence of mouse TMPRSS6, e.g., inhibits mouse TMPRSS6, with percent inhibition greater than about 42%; (d) inhibits protease-dependent release of cell surface hemojuvelin in the presence of mouse TMPRSS6, e.g., inhibits mouse TMPRSS6 and exhibits an IC50 less than about 274 pM; (e) inhibits human TMPRSS6 at 25° C. and at 37° C. with percent inhibition greater than about 65%; (f) inhibits human TMPRSS6 at 25° C. and at 37° C. and exhibits an IC50 less than about 10 nM; (g) inhibits monkey TMPRSS6 at 25° C. and at 37° C. with percent inhibition greater than about 66%; (h) inhibits monkey TMPRSS6 at 25° C. and at 37° C. and exhibits an IC50 less than about 50 nM; (i) inhibits mouse TMPRSS6 at 25° C. and at 37° C. with percent inhibition greater than about 58%; (j) inhibits mouse TMPRSS6 at 25° C. and at 37° C. and exhibits an IC50 less than about 35 nM; (k) is a fully human monoclonal antibody or antigen-binding fragment thereof; (l) comprises a HCDR1, HCDR2, and HCDR3 comprising an amino acid sequence selected from a HCDR1, HCDR2, and HCDR3 sequence listed in Table 1 and/or a LCDR1, LCDR2, and LCDR3 comprising an amino acid sequence selected from a LCDR1, LCDR2, and LCDR3 sequence listed in Table 1; and/or (m) comprises a HCVR comprising an amino acid sequence selected from a HCVR sequence listed in Table 1 and a LCVR comprising an amino acid sequence selected from a LCVR sequence listed in Table 1.

The antibodies and antigen-binding fragments thereof may possess one or more of the aforementioned characteristics, or any combinations thereof. Other characteristics of the disclosed antibodies and antigen-binding fragments thereof will be evident to a person of ordinary skill in the art from a review of the present disclosure including the working Examples herein.

Epitope Mapping and Related Technologies

Disclosed herein are anti-TMPRSS6 antibodies which interact with one or more amino acids found within one or more regions of the TMPRSS6 protein molecule. The epitope to which the antibodies bind may consist of a single contiguous sequence of 3 or more (e.g., 3, 4, 5, 6, 7, 8, 9, 10, 11, 12, 13, 14, 15, 16, 17, 18, 19, 20 or more) amino acids located within any of the aforementioned domains of the TMPRSS6 protein molecule (e.g. a linear epitope in a domain). Alternatively, the epitope may consist of a plurality of non-contiguous amino acids (or amino acid sequences) located within either or both of the aforementioned domains of the protein molecule. In one embodiment, the epitope is a conformational epitope.

Various techniques known to persons of ordinary skill in the art can be used to determine whether an antibody "interacts with one or more amino acids" within a polypeptide or protein. Exemplary techniques include, for example, routine cross-blocking assays, such as that described in Antibodies, Harlow and Lane (Cold Spring Harbor Press, Cold Spring Harbor, NY). Other methods include alanine scanning mutational analysis, peptide blot analysis (Reineke (2004) Methods Mol. Biol. 248:443-63), peptide cleavage analysis crystallographic studies and NMR analysis. In addition, methods such as epitope excision, epitope extraction and chemical modification of antigens can be employed (Tomer (2000) Prot. Sci. 9:487-496).

Another method that can be used to identify the amino acids within a polypeptide with which an antibody interacts is hydrogen/deuterium exchange detected by mass spectrometry. For example, see Example 8 of the instant disclosure. In general terms, the hydrogen/deuterium exchange method involves deuterium-labeling the protein of interest, followed by binding the antibody to the deuterium-labeled protein. Next, the protein/antibody complex is transferred to water and exchangeable protons within amino acids that are protected by the antibody complex undergo deuterium-to-hydrogen back-exchange at a slower rate than exchangeable protons within amino acids that are not part of the interface. As a result, amino acids that form part of the protein/antibody interface may retain deuterium and therefore exhibit relatively higher mass compared to amino acids not included in the interface. After dissociation of the antibody, the target protein is subjected to protease cleavage and mass spectrometry analysis, thereby revealing the deuterium-labeled residues which correspond to the specific amino acids with which the antibody interacts. See, e.g., Ehring (1999) *Analytical Biochemistry* 267:252-259; Engen and Smith (2001) *Anal. Chem.* 73: 256A-265A.

Modification-Assisted Profiling (MAP), also known as Antigen Structure-based Antibody Profiling (ASAP) is a method that categorizes large numbers of monoclonal antibodies (mAbs) directed against the same antigen according to the similarities of the binding profile of each antibody to chemically or enzymatically modified antigen surfaces (see US 2004/0101920, herein specifically incorporated by reference in its entirety). Each category may reflect a unique epitope either distinctly different from or partially overlapping with epitope represented by another category. This technology allows rapid filtering of genetically identical antibodies, such that characterization can be focused on genetically distinct antibodies. When applied to hybridoma screening, MAP may facilitate identification of rare hybridoma clones that produce mAbs having the desired characteristics. MAP may be used to sort the antibodies disclosed herein into groups of antibodies binding different epitopes.

The present disclosure includes anti-TMPRSS6 antibodies that bind to the same epitope, or a portion of the epitope, as any of the specific exemplary antibodies listed in Table 1. Likewise, Also disclosed herein are anti-TMPRSS6 antibodies that compete for binding to TMPRSS6 protein or a fragment thereof with any of the specific exemplary antibodies listed in Table 1. For example, the present disclosure includes anti-TMPRSS6 antibodies that cross-compete for binding to TMPRSS6 protein with one or more antibodies listed in Table 1.

One can determine whether an antibody binds to the same epitope as, or competes for binding with, a reference anti-TMPRSS6 antibody by using routine methods known in the art. For example, to determine if a test antibody binds to the same epitope as a reference anti-TMPRSS6 antibody disclosed herein, the reference antibody is allowed to bind to a TMPRSS6 protein or peptide under saturating conditions. Next, the ability of a test antibody to bind to the TMPRSS6 protein molecule is assessed. If the test antibody is able to bind to TMPRSS6 following saturation binding with the reference anti-TMPRSS6 antibody, it can be concluded that the test antibody binds to a different epitope than the reference anti-TMPRSS6 antibody. On the other hand, if the test antibody is not able to bind to the TMPRSS6 protein following saturation binding with the reference anti-TMPRSS6 antibody, then the test antibody may bind to the same epitope as the epitope bound by the reference anti-TMPRSS6 antibody disclosed herein.

To determine if an antibody competes for binding with a reference anti-TMPRSS6 antibody, the above-described binding methodology is performed in two orientations: In a first orientation, the reference antibody is allowed to bind to a TMPRSS6 protein under saturating conditions followed by assessment of binding of the test antibody to the TMPRSS6 molecule. In a second orientation, the test antibody is allowed to bind to a TMPRSS6 molecule under saturating conditions followed by assessment of binding of the reference antibody to the TMPRSS6 molecule. If, in both orientations, only the first (saturating) antibody is capable of binding to the TMPRSS6 molecule, then it is concluded that the test antibody and the reference antibody compete for binding to TMPRSS6. As will be appreciated by a person of ordinary skill in the art, an antibody that competes for binding with a reference antibody may not necessarily bind to the identical epitope as the reference antibody, but may sterically block binding of the reference antibody by binding an overlapping or adjacent epitope.

Two antibodies bind to the same or overlapping epitope if each competitively inhibits (blocks) binding of the other to the antigen. That is, a 1-, 5-, 10-, 20- or 100-fold excess of one antibody inhibits binding of the other by at least 50% but preferably 75%, 90% or even 99% as measured in a competitive binding assay (see, e.g., Junghans et al., Cancer Res. 1990 50:1495-1502). Alternatively, two antibodies have the same epitope if essentially all amino acid mutations in the antigen that reduce or eliminate binding of one antibody reduce or eliminate binding of the other. Two antibodies have overlapping epitopes if some amino acid mutations that reduce or eliminate binding of one antibody reduce or eliminate binding of the other.

Additional routine experimentation (e.g., peptide mutation and binding analyses) can then be carried out to confirm whether the observed lack of binding of the test antibody is in fact due to binding to the same epitope as the reference antibody or if steric blocking (or another phenomenon) is responsible for the lack of observed binding. Experiments of this sort can be performed using ELISA, RIA, surface plasmon resonance, flow cytometry or any other quantitative or qualitative antibody-binding assay available in the art.

Immunoconjugates

The disclosure encompasses a human anti-TMPRSS6 monoclonal antibody conjugated to a therapeutic moiety ("immunoconjugate"), to treat a TMPRSS6-associated disease or disorder (e.g., an iron overload disorder). As used herein, the term "immunoconjugate" refers to an antibody which is chemically or biologically linked to a radioactive agent, a cytokine, an interferon, a target or reporter moiety, an enzyme, a peptide or protein or a therapeutic agent. The antibody may be linked to the radioactive agent, cytokine, interferon, target or reporter moiety, enzyme, peptide or therapeutic agent at any location along the molecule so long as it is able to bind its target. Examples of immunoconjugates include antibody drug conjugates and antibody-toxin fusion proteins. In one embodiment, the agent may be a second different antibody to TMPRSS6 protein. The type of therapeutic moiety that may be conjugated to the anti-TMPRSS6 antibody and will take into account the condition to be treated and the desired therapeutic effect to be achieved. Examples of suitable agents for forming immunoconjugates are known in the art; see for example, WO 05/103081.

Therapeutic Administration and Formulations

The disclosure provides therapeutic compositions comprising the anti-TMPRSS6 antibodies or antigen-binding fragments thereof disclosed herein. Therapeutic compositions in accordance with the disclosure will be administered with suitable carriers, excipients, and other agents that are incorporated into formulations to provide improved transfer, delivery, tolerance, and the like. A multitude of appropriate formulations can be found in the formulary known to all pharmaceutical chemists: Remington's Pharmaceutical Sciences, Mack Publishing Company, Easton, PA. These formulations include, for example, powders, pastes, ointments, jellies, waxes, oils, lipids, lipid (cationic or anionic) containing vesicles (such as LIPOFECTIN™), DNA conjugates, anhydrous absorption pastes, oil-in-water and water-in-oil emulsions, emulsions carbowax (polyethylene glycols of various molecular weights), semi-solid gels, and semi-solid mixtures containing carbowax. See also Powell et al. "Compendium of excipients for parenteral formulations" PDA (1998) J Pharm Sci Technol 52:238-311.

Various delivery systems are known and can be used to administer the pharmaceutical composition disclosed herein, e.g., encapsulation in liposomes, microparticles, microcapsules, recombinant cells capable of expressing the mutant viruses, receptor mediated endocytosis (see, e.g., Wu et al. (1987) J. Biol. Chem. 262:4429-4432). Methods of introduction include, but are not limited to, intradermal, transdermal, intramuscular, intraperitoneal, intravenous, subcutaneous, intranasal, epidural and oral routes. The composition may be administered by any convenient route, for example by infusion or bolus injection, by absorption through epithelial or mucocutaneous linings (e.g., oral mucosa, rectal and intestinal mucosa, etc.) and may be administered together with other biologically active agents. Administration can be systemic or local. The pharmaceutical composition can be also delivered in a vesicle, in particular a liposome (see, for example, Langer (1990) Science 249: 1527-1533).

The use of nanoparticles to deliver the antibodies disclosed herein is also contemplated herein. Antibody-conjugated nanoparticles may be used both for therapeutic and diagnostic applications. Antibody-conjugated nanoparticles and methods of preparation and use are described in detail by Arruebo, M., et al. 2009 ("Antibody-conjugated nanoparticles for biomedical applications" in J. Nanomat. Volume 2009, Article ID 439389, 24 pages, doi: 10.1155/2009/439389), incorporated herein by reference. Nanoparticles may be developed and conjugated to antibodies contained in pharmaceutical compositions to target cells. Nanoparticles for drug delivery have also been described in, for example, U.S. Pat. No. 8,257,740, or U.S. Pat. No. 8,246,995, each incorporated herein in its entirety.

In certain situations, the pharmaceutical composition can be delivered in a controlled release system. In one embodiment, a pump may be used. In another embodiment, polymeric materials can be used. In yet another embodiment, a controlled release system can be placed in proximity of the composition's target, thus requiring only a fraction of the systemic dose.

The injectable preparations may include dosage forms for intravenous, subcutaneous, intracranial, intraperitoneal and intramuscular injections, drip infusions, etc. These injectable preparations may be prepared by methods publicly known.

The disclosed pharmaceutical compositions can be delivered subcutaneously or intravenously with a standard needle and syringe. In addition, with respect to subcutaneous delivery, a pen delivery device readily has applications in delivering a pharmaceutical composition as disclosed herein. Such a pen delivery device can be reusable or disposable. A reusable pen delivery device generally utilizes a replaceable cartridge that contains a pharmaceutical composition. Once all of the pharmaceutical composition within the cartridge has been administered and the cartridge is empty, the empty cartridge can readily be discarded and replaced with a new cartridge that contains the pharmaceutical composition. The pen delivery device can then be reused. In a disposable pen delivery device, there is no replaceable cartridge. Rather, the disposable pen delivery device comes prefilled with the pharmaceutical composition held in a reservoir within the device. Once the reservoir is emptied of the pharmaceutical composition, the entire device is discarded.

Advantageously, the pharmaceutical compositions for oral or parenteral use described above are prepared into dosage forms in a unit dose suited to fit a dose of the active ingredients. Such dosage forms in a unit dose include, for example, tablets, pills, capsules, injections (ampoules), suppositories, etc.

Therapeutic Uses of the Antibodies

The disclosed anti-TMPRSS6 antibodies and antigen-binding fragments thereof are useful for the treatment, and/or prevention of a disease or disorder or condition associated with TMPRSS6 and/or for ameliorating at least one symptom associated with such disease, disorder or condition. In certain embodiments, the disclosed anti-TMPRSS6 antibody or antigen-binding fragment thereof may be administered at a therapeutic dose to a subject with a disease or disorder or condition associated with TMPRSS6.

In certain embodiments, the disclosed antibodies or antigen-binding fragments thereof are useful for treating or preventing at least one symptom or indication of a TMPRSS6-associated disease or disorder. In certain embodiments, the TMPRSS6-associated disease or disorder is an iron overload disorder. In certain embodiments, the antibodies or antigen-binding fragments thereof of the present disclosure are useful for treating or preventing at least one symptom of a congenital dyserythropoeitic anemia, Diamond-Blackfan anemia, alpha thalassemia, beta thalassemia, a transfusion-dependent hemolytic anemia, myelodysplastic syndrome, sickle cell disease, polycythemia vera, hereditary hemochromatosis, primary hemochromatosis, secondary hemochromatosis, severe juvenile hemochromatosis, or chronic liver disease.

In certain embodiments, the disclosed antibodies or antigen-binding fragments thereof are useful for treating or preventing at least one symptom, complication, or indication of beta thalassemia. In certain embodiments, the beta thalassemia is beta thalassemia major or beta thalassemia intermedia. Symptoms of beta thalassemia include fatigue, weakness, pale or yellowish skin, facial bone deformities, slow growth, abdominal swelling, dark urine, and other complications (e.g., complications due to therapy). Examples of complications of moderate to severe beta thalassemia include iron overload, which can be a result of either the disease or from frequent blood transfusions, and is associated with damage to organs such as the heart, the liver, and the endocrine system (e.g., hormone-producing glands that regulate processes throughout the body), and increased risk of infection. Complications of severe beta thalassemia can also include bone deformities, enlarged spleen, slowed growth rates, and heart problems.

In certain embodiments, the disclosed antibodies or antigen-binding fragments thereof are useful for treating or preventing at least one symptom, complication, or indication of hemochromatosis. Symptoms of hemochromatosis include, for example, joint pain, abdominal pain, weakness, fatigue, diabetes, loss of sex drive, impotence, heart failure, liver failure, bronze or gray skin color, and memory fog. Complications due to hemochromatosis include, for example, liver problems, pancreas problems, heart problems, reproductive problems, and skin color changes.

In certain embodiments, the disclosed antibodies or antigen-binding fragments thereof are useful for treating or preventing at least one symptom, complication, or indication associated with iron overload. Iron overload can be the result of a genetic disease or disorder, or the result of receiving frequent blood transfusions, consuming high levels of supplemental iron, and/or receiving injections comprising iron. Genetic disorders that result in iron overload include hereditary hemochromatosis, various anemias including sickle-cell disease and sideroblastic anemia, African iron overload (e.g., where affected individuals drink a beverage that contains a high amount of iron), enzyme deficiencies (e.g., deficiencies in pyruvate kinase, deficiencies in glucose-6-phosphate dehydrogenase), and protein transport disorders such as aceruloplasminemia and atransferrinemia.

Symptoms of iron overload include, for example, fatigue (e.g., chronic fatigue), joint pain, abdominal pain, liver disease (e.g., cirrhosis, liver cancer), diabetes mellitus, issues with the heart (e.g., irregular heart rhythm, heart attack, heart failure), skin color changes (e.g., bronze, ashen-gray green), loss of period, loss of interest in sex, impotence, infertility, hypogonadism, issues with bones (e.g., osteoarthritis, osteoporosis), hair loss, enlarged liver or spleen, hypothyroidism, hypopituitarism, depression, adrenal function problems, early onset neurodegenerative disease (e.g., Alzheimer's, early-onset Parkinson's, Huntington's, epilepsy, multiple sclerosis), and elevated markers such as blood sugar, liver enzymes, serum iron, serum transferrin, and serum ferritin.

In certain embodiments, the disclosed antibodies or antigen-binding fragments thereof are useful for treating or preventing at least one symptom or indication associated with receiving blood transfusions, e.g., receiving frequent and/or regular blood transfusions. In certain embodiments, the disclosed antibodies or antigen-binding fragments thereof are useful for treating or preventing at least one symptom or indication associated with a physical trauma that results in blood loss. In certain embodiments, the physical trauma that results in blood loss requires treatment with a blood transfusion. As such, a symptom or indication associated with a physical trauma that results in blood loss can be any symptom or indication (e.g., iron overload) that is associated with treatment of the physical trauma with a blood transfusion. For example, a physical trauma can be a traumatic accident (e.g., leading to a loss of limb, blunt force trauma, a gash) resulting in blood loss requiring a blood transfusion. In certain embodiments, the required blood transfusion(s) is a large volume blood transfusion.

In certain embodiments, the disclosed antibodies or antigen-binding fragments thereof are useful for treating or preventing at least one symptom or indication of myelodysplastic syndrome. In certain embodiments, the disclosed antibodies or antigen-binding fragments thereof are useful for treating or preventing at least one symptom or indication of myelodysplastic syndrome with ring sideroblasts. In certain embodiments, the disclosed antibodies or antigen-binding fragments thereof of the present disclosure are useful for treating or preventing at least one symptom or indication of a transfusion-dependent hemolytic anemia. In certain embodiments, the disclosed antibodies or antigen-binding fragments thereof are useful for treating or preventing at least one symptom or indication of a transfusion-dependent hemolytic anemia due to pyruvate kinase deficiency (i.e., hemolytic anemia), or a sideroblastic transfusion-dependent hemolytic anemia (i.e., sideroblastic anemia). In certain embodiments, the disclosed antibodies or antigen-binding fragments thereof are useful for treating or preventing at least one symptom or indication of sickle-cell anemia. In certain embodiments, the disclosed antibodies or antigen-binding fragments thereof are useful for treating or preventing at least one symptom or indication of dyserythropoietic anemia. In certain embodiments, the disclosed antibodies or antigen-binding fragments thereof are useful for treating or preventing at least one symptom or indication of erythropoietic *porphyria*. In certain embodiments, the disclosed antibodies or antigen-binding fragments thereof are useful for treating or preventing at least one symptom or indication of a chronic liver disease. In certain embodiments, the disclosed antibodies or antigen-binding fragments thereof are useful for treating or preventing at least one symptom or indication of an alcohol related chronic liver disease, hepatitis C, or autoimmune hepatitis.

Also disclosed is the use of the disclosed antibodies or antigen-binding fragments thereof prophylactically in subjects at risk for suffering from a TMPRSS6-associated disease or disorder.

In some embodiments, the disclosed antibodies or antigen-binding fragments thereof are used for the preparation of a pharmaceutical composition or medicament for treating subjects suffering from a disease, disorder, or condition disclosed herein. In another embodiment, the disclosed antibodies or antigen-binding fragments thereof are used as adjunct therapy with any other agent or any other therapy known to those skilled in the art useful for treating or ameliorating a disease, disorder or condition disclosed herein.

Combination Therapies

Combination therapies may include one or more of the disclosed antibodies or antigen-binding fragments thereof and any additional therapeutic agent that may be advantageously combined with the disclosed antibodies or antigen-binding fragments thereof. The disclosed antibodies or antigen-binding fragments may be combined synergistically with one or more drugs or therapy used to treat a TMPRSS6-associated disease or disorder. In some embodiments, the disclosed antibodies or antigen-binding fragments may be combined with a second therapeutic agent to ameliorate one or more symptoms of said disease or condition.

Depending upon the disease, disorder or condition, the antibodies or antigen-binding fragments disclosed herein may be used in combination with one or more additional therapeutic agents. For example, wherein the disease, disorder or condition is associated with iron overload, the antibodies or antigen-binding fragments disclosed herein may be used in combination with one or more iron reduction therapies and/or therapies that are currently employed for treating the iron overload.

In certain embodiments, iron chelation therapy may be employed for treating the iron overload. Iron chelation therapy is the pharmacological removal of iron with an iron-chelating agent. Examples of iron-chelating agents include, deferoxamine, deferasirox, and deferiprone. (see, e.g., Mobarra et al., *Int. J. Hematol. Oncol. Stem Cell Res.* (2016) 10 (4): 239-247). Other examples of iron-chelating agents are known to those of skill in the art, e.g., those reviewed in Hatcher et al., *Future Med. Chem.* (2009) 1 (9): 1643-70.

Other therapies that may be employed for treating the iron overload include the use of agents such as, without limitation, vitamin E, wheat germ oil, tocophersolan, indicaxanthin, folic acid, agents that increase fetal hemoglobin levels (e.g., hydroxyurea, histone deacetylase inhibitors and/or DNA methyl transferase inhibitors (e.g., butyrate derivatives, azacitidine, decitabine (5-aza 2-deoxycytidine) and trichostatin-A), hemin, pomalidomide, thalidomide, cytokines such as stem cell factor (SCF) and transforming growth factor beta (TGF beta)), agents to manage ulcers, agents to manage infection (e.g., antibiotics and antivirals), agents to treat thrombosis, or agents to treat anemia (e.g., luspatercept).

Iron overload can also be treated with stem cell or bone marrow transplantation, blood transfusions, or phlebotomy.

As used herein, the term "in combination with" means that additional therapeutically active component(s) may be administered prior to, concurrent with, or after the administration of the anti-TMPRSS6 antibodies or antigen-binding fragments disclosed herein. The term "in combination with" also includes sequential or concomitant administration of one or more of the disclosed anti-TMPRSS6 antibodies or antigen-binding fragments and a second therapeutic agent.

The additional therapeutically active component(s) may be administered to a subject prior to administration of one or more of the disclosed anti-TMPRSS6 antibodies or antigen-binding fragments thereof. For example, a first component may be deemed to be administered "prior to" a second component if the first component is administered 1 week before, 72 hours before, 60 hours before, 48 hours before, 36 hours before, 24 hours before, 12 hours before, 6 hours before, 5 hours before, 4 hours before, 3 hours before, 2 hours before, 1 hour before, 30 minutes before, or less than 30 minutes before administration of the second component.

In other embodiments, the additional therapeutically active component(s) may be administered to a subject after administration of one or more of the disclosed anti-TMPRSS6 antibodies or antigen-binding fragments thereof. For example, a first component may be deemed to be administered "after" a second component if the first component is administered 30 minutes after, 1 hour after, 2 hours after, 3 hours after, 4 hours after, 5 hours after, 6 hours after, 12 hours after, 24 hours after, 36 hours after, 48 hours after, 60 hours after, 72 hours after or more after administration of the second component.

In other embodiments, the additional therapeutically active component(s) may be administered to a subject concurrent with administration of one or more of the disclosed anti-TMPRSS6 antibodies or antigen-binding fragments thereof. "Concurrent" administration, for purposes of the present disclosure, includes, e.g., administration of one or more of the disclosed anti-TMPRSS6 antibodies or antigen-binding fragments thereof and an additional therapeutically active component to a subject in a single dosage form, or in separate dosage forms administered to the subject within about 30 minutes or less of each other. If administered in separate dosage forms, each dosage form may be administered via the same route (e.g., both the anti-TMPRSS6 antibody and the additional therapeutically active component may be administered intravenously, etc.); alternatively, each dosage form may be administered via a different route (e.g., the disclosed antibody or antigen-binding fragment may be administered intravenously, and the additional therapeutically active component may be administered orally). Administering the components in a single dosage from, in separate dosage forms by the same route, or in separate dosage forms by different routes are all considered "concurrent administration," for purposes of the present disclosure. For purposes of the present disclosure, administration of one or more of the disclosed anti-TMPRSS6 antibodies or antigen-binding fragments thereof "prior to", "concurrent with," or "after" (as those terms are defined herein above) administration of an additional therapeutically active component is considered administration of the disclosed anti-TMPRSS6 antibody or antigen-binding fragment thereof "in combination with" an additional therapeutically active component.

Also disclosed herein are pharmaceutical compositions in which an anti-TMPRSS6 antibody or antigen-binding fragment disclosed herein is co-formulated with one or more of the additional therapeutically active component(s) as described elsewhere herein.

Diagnostic Uses of the Antibodies

The disclosed antibodies and antigen-binding fragments thereof may be used to detect and/or measure TMPRSS6 in a sample, e.g., for diagnostic purposes. Disclosed herein are uses of the disclosed antibodies and antigen-binding fragments thereof in assays to detect a TMPRSS6-associated disease or disorder. Exemplary diagnostic assays for TMPRSS6 may comprise, e.g., contacting a sample, obtained from a patient, with an anti-TMPRSS6 antibody or antigen-binding fragment disclosed herein that is labeled with a detectable label or reporter molecule. The disclosed antibodies and antigen-binding fragments thereof may also be used as a capture ligand to selectively isolate TMPRSS6 from samples from a subject. Alternatively, an unlabeled anti-TMPRSS6 antibody or fragment can be used in diagnostic applications in combination with a secondary antibody which is itself detectably labeled. The detectable label or reporter molecule can be a radioisotope, such as $^3$H, $^{14}$C, $^{32}$P, $^{35}$S, or $^{125}$I; a fluorescent or chemiluminescent moiety such as fluorescein isothiocyanate, or rhodamine; or an enzyme such as alkaline phosphatase, β-galactosidase, horseradish peroxidase, or luciferase. Specific exemplary assays that can be used to detect or measure TMPRSS6 in a sample include enzyme-linked immunosorbent assay (ELISA), radioimmunoassay (RIA), and fluorescence-activated cell sorting (FACS).

Samples that can be used in TMPRSS6 diagnostic assays include any tissue or fluid sample obtainable from a patient, which contains detectable quantities of either TMPRSS6 protein, or fragments thereof, under normal or pathological conditions. Generally, levels of TMPRSS6 protein in a particular sample obtained from a healthy subject (e.g., a patient not afflicted with a disease associated with TMPRSS6) may be measured to initially establish a baseline, or standard, level of TMPRSS6. This baseline level of TMPRSS6 can then be compared against the levels of TMPRSS6 measured in samples obtained from individuals suspected of having a TMPRSS6-associated condition, or symptoms associated with such condition.

The anti-TMPRSS6 antibodies or antigen-binding fragments thereof may contain no additional labels or moieties, or they may contain an N-terminal or C-terminal label or moiety. In one embodiment, the label or moiety is biotin. In a binding assay, the location of a label (if any) may determine the orientation of the peptide relative to the surface upon which the peptide is bound. For example, if a surface is coated with avidin, a peptide containing an N-terminal biotin will be oriented such that the C-terminal portion of the peptide will be distal to the surface.

EXAMPLES

The following examples are put forth so as to provide those of ordinary skill in the art with a complete disclosure and description of how to make and use the methods and compositions disclosed herein, and are not intended to limit the scope of what the inventors regard as their invention. Efforts have been made to ensure accuracy with respect to numbers used (e.g., amounts, temperature, etc.) but some experimental errors and deviations should be accounted for. Unless indicated otherwise, parts are parts by weight, molecular weight is average molecular weight, temperature is in degrees Centigrade, room temperature is about 25° C., and pressure is at or near atmospheric.

Example 1: Generation of Human Antibodies to Transmembrane Serine Protease 6 (TMPRSS6)

Human antibodies to TMPRSS6 protein were generated in a VELOCIMMUNE® mouse comprising DNA encoding human immunoglobulin heavy and kappa light chain variable regions. The mice were immunized and boosted with human TMPRSS6 DNA by hydrodynamic DNA delivery.

Anti-TMPRSS6 antibodies were isolated directly from antigen-positive mouse B cells without fusion to myeloma cells, as described in U.S. Pat. No. 7,582,298, herein specifically incorporated by reference in its entirety. Using this method, several fully human anti-TMPRSS6 antibodies (i.e., antibodies possessing human variable domains and human constant domains) were obtained.

Exemplary antibodies generated as disclosed above were designated as mAb37746, mAb37763, mAb37777, mAb37699, mAb41422, mAb41465, and mAb41450, having HCVR, HCDR1, HCDR2, HCDR3, LCVR, LCDR1, LCDR2, and LCDR3 amino acid and nucleic acid sequences as identified in Table 1 and Table 2.

The biological properties of the exemplary antibodies generated in accordance with the methods of this Example are described in detail in the Examples set forth below.

Example 2: Heavy and Light Chain Variable Region Amino Acid and Nucleotide Sequences Table 1 sets forth the amino acid sequence identifiers of the heavy and light chain variable region sequences, CDR sequences, and heavy and light chain sequences of selected exemplary anti-TMPRSS6 antibodies.

TABLE 1

Amino Acid Sequence Identifiers

| | SEQ ID NOs: | | | | | | |
|---|---|---|---|---|---|---|---|
| Antibody ID | HCVR | H-CDR1 | H-CDR2 | H-CDR3 | LCVR | L-CDR1 | L-CDR2 | L-CDR3 |
| mAb37746 | 2 | 4 | 6 | 8 | 10 | 12 | 14 | 16 |
| mAb37763 | 22 | 24 | 26 | 28 | 10 | 12 | 14 | 16 |
| mAb37777 | 32 | 34 | 36 | 38 | 10 | 12 | 14 | 16 |
| mAb37699 | 42 | 44 | 46 | 48 | 50 | 52 | 54 | 56 |
| mAb41422 | 62 | 64 | 66 | 68 | 70 | 72 | 74 | 76 |
| mAb41465 | 82 | 84 | 86 | 88 | 90 | 92 | 14 | 94 |
| mAb41450 | 100 | 102 | 104 | 106 | 108 | 110 | 14 | 112 |

The corresponding nucleic acid sequence identifiers of the selected exemplary anti-TMPRSS6 antibodies are set forth in Table 2.

TABLE 2

Nucleic Acid Sequence Identifiers

| | SEQ ID NOs: | | | | | | |
|---|---|---|---|---|---|---|---|
| Antibody ID | HCVR | H-CDR1 | H-CDR2 | H-CDR3 | LCVR | L-CDR1 | L-CDR2 | L-CDR3 |
| mAb37746 | 1 | 3 | 5 | 7 | 9 | 11 | 13 | 15 |
| mAb37763 | 21 | 23 | 25 | 27 | 9 | 11 | 13 | 15 |
| mAb37777 | 31 | 33 | 35 | 37 | 9 | 11 | 13 | 15 |
| mAb37699 | 41 | 43 | 45 | 47 | 49 | 51 | 53 | 55 |
| mAb41422 | 61 | 63 | 65 | 67 | 69 | 71 | 73 | 75 |
| mAb41465 | 81 | 83 | 85 | 87 | 89 | 91 | 13 | 93 |
| mAb41450 | 99 | 101 | 103 | 105 | 107 | 109 | 13 | 111 |

The antibodies may have a human or mouse Fc isotype. As will be appreciated by a person of ordinary skill in the art, an antibody having a particular Fc isotype can be converted to an antibody with a different Fc isotype (e.g., an antibody with a mouse IgG1 Fc can be converted to an antibody with a human IgG1 or a human IgG4, etc.), but in any event, the variable domains (including the CDRs)—which are indicated by the numerical identifiers shown in Table 1—will remain the same, and the binding properties to antigen are expected to be identical or substantially similar regardless of the nature of the Fc domain.

Unless indicated otherwise, all antibodies used in the following Examples comprise a human IgG4 Fc comprising a serine to proline mutation in the hinge region (S108P). Exemplary antibodies of mAb37746, mAb37763, mAb37777, mAb37699, mAb41422, mAb41465, and mAb41450 comprising a human IgG4 Fc comprising a serine to proline mutation in the hinge region (S108P) were designated as REGN7969, REGN7971, REGN7973, REGN8023, REGN7974, REGN7977, and REGN7999, respectively. Table 3 sets forth the amino acid sequence identifiers of full-length heavy chain and light chain sequences of these antibodies.

TABLE 3

| | | SEQ ID NOs: | | | |
|---|---|---|---|---|---|
| Antibody | Antibody | HC | | LC | |
| ID | Name | DNA | PEP | DNA | PEP |
| mAb37746 | REGN7969 | 17 | 18 | 19 | 20 |
| mAb37763 | REGN7971 | 29 | 30 | 19 | 20 |
| mAb37777 | REGN7973 | 39 | 40 | 19 | 20 |

TABLE 3-continued

| | | SEQ ID NOs: | | | |
|---|---|---|---|---|---|
| Antibody | Antibody | HC | | LC | |
| ID | Name | DNA | PEP | DNA | PEP |
| mAb37699 | REGN8023 | 57 | 58 | 59 | 60 |
| mAb41422 | REGN7974 | 77 | 78 | 79 | 80 |
| mAb41465 | REGN7977 | 95 | 96 | 97 | 98 |
| mAb41450 | REGN7999 | 113 | 114 | 115 | 116 |

Example 3: Antibody Binding to TMPRSS6 as Determined by Surface Plasmon Resonance Experimental Procedure The equilibrium dissociation constant ($K_D$) for TMPRSS6 binding to different TMPRSS6 monoclonal antibodies (mAbs) was determined using a real-time surface plasmon resonance biosensor using a Biacore 4000 instrument. All binding studies were performed in 10 mM HEPES, 150 mM NaCl, 3 mM EDTA, and 0.05% v/v Surfactant Tween-20, pH 7.4 (HBS-ET) running buffer at 25° C. and 37° C. The Biacore CM5 sensor chip surface was first derivatized by amine coupling with a human Fc specific mouse mAb to capture different TMPRSS6 mAbs. Several TMPRSS6 reagent proteins were used for the experiment including human TMPRSS6 extracellular domain with a S762A mutation expressed with a C-terminal myc-myc-hexahistidine tag (referred to as hTMPRSS6_S762A-MMH; REGN5330; SEQ ID NO: 117), *Macaca fascicularis* TMPRSS6 extracellular domain with a S751A mutation expressed with a C-terminal myc-myc-hexahistidine tag (referred to as mfTMPRSS6_S751A-MMH; REGN5977; SEQ ID NO: 119), and mouse TMPRSS6 extracellular domain with a S762A mutation expressed with a C-terminal myc-myc-hexahistidine tag (referred to as mTMPRSS6_S762A-MMH; REGN6848; SEQ ID NO: 118). Different concentrations (100 nM to 3.7 nM, 3-fold serial dilution) of the TMPRSS6 reagent proteins prepared in HBS-EP running buffer were injected over the TMPRSS6 mAb captured surface for 150 seconds at a flow rate of 30 µL/min and their dissociation in HBS-ET running buffer was monitored for 10 minutes. At the end of each cycle, the TMPRSS6 mAb captured surface was regenerated using a 12 second injection of 20 mM phosphoric acid.

The association rate ($k_a$) and dissociation rate ($k_d$) were determined by fitting the real-time binding sensorgrams to a 1:1 binding model with mass transport limitation using Scrubber 2.0 (BioLogic Software) curve-fitting software. Binding dissociation equilibrium constant ($K_D$) and dissociative half-life (t½) were calculated from the kinetic rates as:

$$K_D(M) = \frac{kd}{ka}, \text{ and } t1/2(\min) = \frac{\ln(2)}{60 * kd}$$

Results

Binding kinetics parameters of the different selected TMPRSS6 mAbs to each TMPRSS6 reagent protein are shown in Tables 4 through 9.

TABLE 4

Binding kinetics parameters of different TMPRSS6 mAbs binding to hTMPRSS6_S762A-MMH at 25° C.

| mAb Captured | mAb Capture Level (RU) | 100 nM Ag Bound (RU) | $k_a$ (1/Ms) | $k_d$ (1/s) | $K_D$ (M) | t½ (min) |
|---|---|---|---|---|---|---|
| REGN7969 | 142 ± 0.6 | 89  | 4.04E+05 | 1.82E−04 | 4.50E−10 | 64  |
| REGN7971 | 164 ± 5   | 103 | 4.55E+05 | 1.47E−04 | 3.22E−10 | 79  |
| REGN7973 | 152 ± 2.8 | 134 | 2.52E+05 | 1.57E−04 | 6.26E−10 | 73  |
| REGN7974 | 156 ± 3   | 191 | 2.59E+05 | 6.80E−04 | 2.63E−09 | 17  |
| REGN7977 | 138 ± 0.4 | 159 | 2.18E+05 | 3.68E−04 | 1.69E−09 | 31  |
| REGN7999 | 131 ± 0.8 | 176 | 2.67E+05 | 6.49E−05 | 2.43E−10 | 178 |
| REGN8023 | 160 ± 1.1 | 205 | 6.71E+05 | 8.60E−05 | 1.28E−10 | 134 |

As shown in Table 4, the selected TMPRSS6 mAbs bound to hTMPRSS6_S762A-MMH at 25° C. with $K_D$ values ranging from about 128 pM to about 2.63 nM.

TABLE 5

Binding kinetics parameters of different TMPRSS6 mAbs binding to hTMPRSS6_S762A-MMH at 37° C.

| mAb Captured | mAb Capture Level (RU) | 100 nM Ag Bound (RU) | $k_a$ (1/Ms) | $k_d$ (1/s) | $K_D$ (M) | t½ (min) |
|---|---|---|---|---|---|---|
| REGN7969 | 145 ± 3.6 | 110 | 2.22E+05 | 9.75E−04 | 4.40E−09 | 12  |
| REGN7971 | 187 ± 4.6 | 169 | 2.61E+05 | 6.37E−04 | 2.44E−09 | 18  |
| REGN7973 | 176 ± 2.7 | 164 | 5.95E+04 | 1.26E−03 | 2.12E−08 | 9   |
| REGN7974 | 181 ± 3.2 | 206 | 1.11E+05 | 2.35E−03 | 2.12E−08 | 4.9 |
| REGN7977 | 131 ± 1.2 | 134 | 1.13E+05 | 1.24E−03 | 1.10E−08 | 9   |
| REGN7999 | 106 ± 1.5 | 129 | 1.54E+05 | 3.54E−04 | 2.30E−09 | 33  |
| REGN8023 | 147 ± 1.8 | 205 | 4.18E+05 | 9.35E−04 | 2.24E−09 | 12  |

As shown in Table 5, the selected TMPRSS6 mAbs bound to hTMPRSS6_S762A-MMH at 37° C. with $K_D$ values ranging from about 2.24 nM to about 21.2 nM.

TABLE 6

Binding kinetics parameters of different TMPRSS6 mAbs binding to mfTMPRSS6_S751A-MMH at 25° C.

| mAb Captured | mAb Capture Level (RU) | 100 nM Ag Bound (RU) | $k_a$ (1/Ms) | $k_d$ (1/s) | $K_D$ (M) | t½ (min) |
|---|---|---|---|---|---|---|
| REGN7969 | 142 ± 0.6 | 92 | 4.19E+05 | 1.82E−04 | 4.35E−10 | 63 |
| REGN7971 | 168 ± 2 | 109 | 4.87E+05 | 1.38E−04 | 2.83E−10 | 84 |
| REGN7973 | 157 ± 1.4 | 132 | 2.17E+05 | 5.14E−04 | 2.37E−09 | 22 |
| REGN7974 | 160 ± 1.6 | 188 | 2.68E+05 | 1.92E−03 | 7.18E−09 | 6 |
| REGN7977 | 137 ± 0.5 | 155 | 2.25E+05 | 6.97E−04 | 3.09E−09 | 17 |
| REGN7999 | 130 ± 0.5 | 185 | 6.60E+05 | 7.23E−05 | 1.10E−10 | 160 |
| REGN8023 | 161 ± 3.3 | 203 | 8.91E+05 | 5.79E−05 | 6.50E−11 | 199 |

As shown in Table 6, the selected TMPRSS6 mAbs bound to mfTMPRSS6_S751A-MMH at 25° C. with $K_D$ values ranging from about 65 pM to about 7.18 nM.

TABLE 7

Binding kinetics parameters of different TMPRSS6 mAbs binding to mfTMPRSS6_S751A-MMH at 37° C.

| mAb Captured | mAb Capture Level (RU) | 100 nM Ag Bound (RU) | $k_a$ (1/Ms) | $k_d$ (1/s) | $K_D$ (M) | t½ (min) |
|---|---|---|---|---|---|---|
| REGN7969 | 138 ± 1.3 | 105 | 2.83E+05 | 9.24E−04 | 3.27E−09 | 12 |
| REGN7971 | 178 ± 1.8 | 160 | 3.63E+05 | 6.10E−04 | 1.68E−09 | 19 |
| REGN7973 | 168 ± 1.2 | 145 | 1.32E+05 | 3.40E−03 | 2.57E−08 | 3.4 |
| REGN7974 | 173 ± 2 | 183 | 2.51E+05 | 4.05E−03 | 1.61E−08 | 2.9 |
| REGN7977 | 128 ± 0.9 | 133 | 2.07E+05 | 2.47E−03 | 1.19E−08 | 4.7 |
| REGN7999 | 104 ± 1 | 143 | 4.08E+05 | 3.06E−04 | 7.50E−10 | 38 |
| REGN8023 | 144 ± 1.6 | 206 | 6.32E+05 | 6.34E−04 | 1.00E−09 | 18 |

As shown in Table 7, the selected TMPRSS6 mAbs bound to mfTMPRSS6_S751A-MMH at 37° C. with $K_D$ values ranging from about 750 pM to about 25.7 nM.

TABLE 8

Binding kinetics parameters of different TMPRSS6 mAbs binding to mTMPRSS6_S762A-MMH at 25° C.

| mAb Captured | mAb Capture Level (RU) | 100 nM Ag Bound (RU) | $k_a$ (1/Ms) | $k_d$ (1/s) | $K_D$ (M) | t½ (min) |
|---|---|---|---|---|---|---|
| REGN7969 | 140 ± 0.4 | 4 | NB* | NB* | NB* | NB* |
| REGN7971 | 169 ± 1.2 | 5 | IC# | IC# | IC# | IC# |
| REGN7973 | 158 ± 0.9 | 7 | IC# | IC# | IC# | IC# |
| REGN7974 | 160 ± 0.5 | 3 | NB* | NB* | NB* | NB* |
| REGN7977 | 136 ± 0.9 | 20 | 2.88E+05 | 6.70E−02 | 2.33E−07 | 0.17 |
| REGN7999 | 128 ± 0.4 | 178 | 4.16E+05 | 3.45E−05 | 8.29E−11 | 334 |
| REGN8023 | 157 ± 1.5 | 209 | 5.99E+05 | 1.10E−03 | 1.84E−09 | 10 |

NB* indicates that no binding was observed under the particular experimental conditions of this Example.
IC# indicates that the observed binding data were inconclusive and binding kinetic parameters could not be determined under the particular experimental conditions of this Example.

As shown in Table 8, three out of seven selected TMPRSS6 mAbs bound to mTMPRSS6_S762A-MMH at 25° C. with $K_D$ values ranging from about 82.9 pM to about 233 nM.

TABLE 9

Binding kinetics parameters of different TMPRSS6 mAbs binding to mTMPRSS6_S762A-MMH at 37° C.

| mAb Captured | mAb Capture Level (RU) | 100 nM Ag Bound (RU) | $k_a$ (1/Ms) | $k_d$ (1/s) | $K_D$ (M) | $t\frac{1}{2}$ (min) |
|---|---|---|---|---|---|---|
| REGN7969 | 128 ± 0.8 | 2 | NB* | NB* | NB* | NB* |
| REGN7971 | 170 ± 2.2 | 15 | IC# | IC# | IC# | IC# |
| REGN7973 | 162 ± 4.1 | 12 | IC# | IC# | IC# | IC# |
| REGN7974 | 164 ± 0.9 | 3 | NB* | NB* | NB* | NB* |
| REGN7977 | 123 ± 0.7 | 9 | 3.23E+05 | 2.27E−01 | 7.03E−07 | 0.05 |
| REGN7999 | 99 ± 0.8 | 130 | 5.05E+05 | 1.60E−04 | 3.17E−10 | 72 |
| REGN8023 | 138 ± 1.4 | 189 | 2.69E+05 | 6.66E−03 | 2.47E−08 | 1.7 |

NB* indicates that no binding was observed under the particular experimental conditions of this Example.
IC# indicates that the observed binding data were inconclusive and binding kinetic parameters could not be determined under the particular experimental conditions of this Example.

As shown in Table 9, three out of seven selected TMPRSS6 mAbs bound to mTMPRSS6_S762A-MMH at 37° C. with $K_D$ values ranging from about 317 pM to about 703 nM.

Example 4: Cross-Competition Between Selected Anti-TMPRSS6 Monoclonal Antibodies Experimental Procedure Binding competition between TMPRSS6 monoclonal antibodies (mAbs) was determined using a real time, label-free bio-layer interferometry (BLI) assay on the Octet HTX biosensor platform (Pall ForteBio Corp.). The entire experiment was performed at 25° C. in 10 mM HEPES, 150 mM NaCl, 3 mM EDTA, 0.05% v/v Surfactant Tween-20, 1 mg/mL BSA, 0.02% $NaN_3$, pH7.4 (HBS-EBT) buffer with the plate shaking at a speed of 1000 rpm. To assess whether 2 mAbs are able to compete with one another for binding to their respective epitopes on TMPRSS6, a recombinant protein comprised of the extracellular domain of human TMPRSS6 expressed with a S762A mutation and a C-terminal myc-myc-hexahistidine tag (referred to as hTMPRSS6_S762A-MMH; REGN5330SEQ ID NO: 117) was first captured onto anti-penta-His antibody (HIS1K) coated Octet biosensor tips by submerging the biosensor tips for 1 minute in wells containing 10 μg/ml solution of hTMPRSS6_S762A-MMH. The hTMPRSS6_S762A-MMH captured biosensor tips were then saturated with the first TMPRSS6 mAb (referred to as mAb-1) by dipping into wells containing 50 μg/mL solution of mAb-1 for 4 minutes. The biosensor tips were then subsequently dipped into wells containing 50 μg/mL solution of the second TMPRSS6 mAb (referred to as mAb-2) for 3 minutes. The biosensor tips were washed in HBS-EBT buffer in between every step of the experiment. The real-time binding response was monitored during the entire course of the experiment and the binding response at the end of every step was recorded.

Results

The response of mAb-2 binding to hTMPRSS6_S762A-MMH pre-complexed with mAb-1 was compared and the competitive/non-competitive behavior of different selected TMPRSS6 mAbs was determined as shown in Table 10.

TABLE 10

Cross-competition between anti-TMPRSS6 monoclonal antibodies

| mAb-1 | mAb-2 shown to compete with mAb-1 |
|---|---|
| REGN7974 | REGN7974 |
|  | REGN7973 |
|  | REGN7977 |
|  | REGN7999 |
| REGN7973 | REGN7974 |
|  | REGN7973 |
|  | REGN7977 |
|  | REGN7999 |
| REGN7977 | REGN7974 |
|  | REGN7973 |
|  | REGN7977 |
|  | REGN7999 |
| REGN7999 | REGN7974 |
|  | REGN7973 |
|  | REGN7977 |
|  | REGN7999 |
| REGN7969 | REGN7969 |
|  | REGN7971 |
|  | REGN8023 |
| REGN7971 | REGN7969 |
|  | REGN7971 |
|  | REGN8023 |
| REGN8023 | REGN7969 |
|  | REGN7971 |
|  | REGN8023 |

Example 5: Antibody Binding to Cells Expressing TMPRSS6

Experimental Procedure

In order to assess cell binding by the disclosed anti-TMPRSS6 antibodies, HEK293 cells were engineered to stably overexpress full length TMPRSS6 from human (NCBI Reference Sequence NM_001289001), cynomolgous monkey/Macaca fascicularis (NCBI Reference Sequence XM_005567384), and mouse (NCBI Reference Sequence NM_027902.2), and these cell lines are referred to as HEK293/hTMPRSS6, HEK293/mfTMPRSS6, and HEK293/mTMPRSS6, respectively. In addition, HEK293 cells were engineered to stably overexpress a catalytically inactive full length human TMPRSS6, where the Serine at position 753 of NCBI Reference Sequence NM_001289001 was changed to an Alanine. This cell line is referred to as HEK293/hTMPRSS6 (S762A). All of the cell lines were unsorted, except for the mouse TMPRSS6 cell line (HEK293/mTMPRSS6), which was sorted for high expression of mouse TMPRSS6.

To assess the binding of anti-TMPRSS6 antibodies of the present disclosure to the receptor expressed on the cell surface, antibodies (including an IgG subclass control) were serially diluted in assay buffer (PBS without $Ca^{++}$ and $Mg^{++}$ containing 2% FBS) from 375 nM to 22.9 pM (plus a sample containing assay buffer alone without test molecule) and incubated with $0.5 \times 10^6$ cells/well at 4° C. for 30 minutes in assay buffer. After incubation with primary antibodies, the cells were stained with 4.0 μg/mL of Alexa Fluor®-647 conjugated secondary antibody (Jackson ImmunoResearch Laboratories Inc., anti-human #109-607-003) at 4° C. for 30 minutes. Cells were fixed using BD CytoFix™ (Becton Dickinson, #554655) and analyzed on either the IQue® or IQue®Plus Flow Cytometers (Intellicyt®). Unstained and secondary antibody alone controls were also tested for all cell lines. The results were analyzed using ForeCyt® (IntelliCyt®) software to determine the geometric means of fluorescence for viable cells and binding ratio was calculated by normalizing the geometric mean value of the test condition by the geometric mean value of the corresponding unstained cells.

Results

Table 11 shows binding of selected anti-TMPRSS6 antibodies to cells engineered to express hTMPRSS6, hTMPRSS6 (S762A), mfTMPRSS6, and mTMPRSS6.

cells, and about 50 to 91-fold and about 940 pM to 3.6 nM for mfTMPRSS6 expressing cells. For the four mAbs that bound to mTMPRSS6 expressing cells, the range of maximum fold binding ratios and $EC_{50}$ values were about 42 to 421-fold and about 840 pM to 35 nM. The selected anti-TMPRSS6 antibodies demonstrated binding to HEK293 parental cells, with binding ratios of about 3 to 5-fold. The IgG subclass control antibody (hIgG Subclass Control) and secondary antibody alone (Anti-Human 2" alone) samples demonstrated binding ratios ranging from about 1 to 3-fold.

Example 6: Detection of Human Hemojuvelin (HJV)

Experimental Procedure

In order to further characterize the ability of anti-TMPRSS6 monoclonal antibodies (mAbs) to inhibit TMPRSS6, a cell-based bioassay with two different readouts was utilized. TMPRSS6 acts as a negative regulator of hepcidin expression by cleaving cell surface hemojuvelin (HJV). See, e.g., Rausa et al. *J. Cell. Mol. Med.* (2015) 19:879-888; and Lee P., *Acta Haematol.* (2009) 122:87-96.

For the assay, flow cytometry was used to measure cell surface human hemojuvelin (hHJV), and an ELISA assay was performed to quantify the level of soluble hHJV in HEK293 cells expressing full length human HJV and either human or mouse TMPRSS6. The co-expression bioassay cell lines were engineered using hHJV-expressing HEK293 cells as a parental cell line (hHJV; amino acid 1-426, NCBI

TABLE 11

Binding of anti-TMPRSS6 antibodies to HEK293/TMPRSS6 cells

| TMPRSS6 expressed in HEK293 cells | MFI-Normalized to Unstained Control | | | | | | | | | |
|---|---|---|---|---|---|---|---|---|---|---|
| | No TMPRSS6 | | hTMPRSS6 | | hTMPRSS6 (S762A) | | mfTMPRSS6 | | mTMPRSS6 | |
| mAb | Max. Fold Binding | $EC_{50}$ (M) | Max. Fold Binding | $EC_{50}$ (M) | Max. Fold Binding | $EC_{50}$ (M) | Max. Fold Binding | $EC_{50}$ (M) | Max. Fold Binding | $EC_{50}$ (M) |
| REGN7969 | 3 | No Binding | 52 | 6.7E−10 | 170 | 2.0E−09 | 50 | 1.2E−09 | 1 | No Binding |
| REGN7971 | 3 | No Binding | 66 | 9.7E−10 | 209 | 1.7E−09 | 75 | 1.5E−09 | 1 | No Binding |
| REGN7973 | 4 | No Binding | 58 | 2.7E−09 | 145 | 2.0E−09 | 91 | 3.3E−09 | 42 | 3.5E−08 |
| REGN7974 | 3 | No Binding | 54 | 2.4E−09 | 234 | 2.3E−09 | 50 | 3.6E−09 | 1 | No Binding |
| REGN7977 | 5 | 3.1E−08 | 69 | 1.9E−09 | 156 | 1.6E−09 | 78 | 2.4E−09 | 125 | 9.1E−09 |
| REGN7999 | 4 | No Binding | 50 | 2.2E−09 | 420 | 2.2E−09 | 79 | 2.0E−09 | 421 | 4.5E−09 |
| REGN8023 | 3 | No Binding | 47 | 7.0E−10 | 300 | 2.0E−09 | 52 | 9.4E−10 | 296 | 8.4E−10 |
| hIgG Subclass Control | 2 | No Binding | 1 | No Binding | 3 | No Binding | 1 | No Binding | 1 | No Binding |
| Anti-Human 2" alone | 2 | No Binding | 1 | No Binding | 2 | No Binding | 1 | No Binding | 1 | No Binding |

As shown in Table 11, the selected anti-TMPRSS6 antibodies showed binding to human, cynomolgus monkey, and human S762A TMPRSS6 expressed on HEK293 cells. The range of maximum fold binding ratios and $EC_{50}$ values were about 47 to 69-fold and about 670 pM to 2.7 nM for hTMPRSS6 expressing cells, about 145 to 420-fold and about 1.6 to 2.3 nM for hTMPRSS6 (S762A) expressing Reference Sequence NP_998818.1). The parental cell line with stable expression of human HJV was selected with 500 μg/mL of G418 in Dulbecco's modified Eagle Media (DMEM) containing 10% (v/v) fetal bovine serum, 100 units of penicillin, 100 μg of streptomycin and 292 μg/ml of L-glutamine. These hHJV expressing HEK293 cells (HEK293.hHJV) were then enriched for high hHJV cell surface expression by FACS (Anti-hemojuvelin antibody; Abcam ab54431, Donkey anti-mouse IgG AF647; Invitrogen A-31571). To express TMPRSS6, HEK293.hHJV were transduced with lentiviral supernatants for either full length human TMPRSS6 (hTMPRSS6; amino acids 1-811, NCBI Reference Sequence NM_153609.3) or full-length mouse TMPRSS6 (mTMPRSS6; amino acids 1-811, NCBI Reference Sequence NM_027902.2) with a C-terminal triple myc tag. The resulting cell lines were referred to as HEK293.hHJV/3xMyc.hTMPRSS6 and HEK293.hHJV/3xMyc.mTMPRSS6, respectively). The lentivirus transduced cells were additionally selected with 500 µg/mL G418 and 100 µg/mL hygromycin B for 2 weeks, and sorted for high expressing TMPRSS6 populations using anti-Myc-AF647 antibody.

For the ELISA, assay cell lines were plated in flat bottom 96-well plates with $1\times10^4$ cells/well. The antibodies of the present disclosure as well as controls were serially diluted (from 0 nM to 200 nM), then were added to each well containing a final volume of 100 µL, and incubated overnight at 37° C. The following day, supernatants were harvested, and an ELISA was performed using Human RGM-C/Hemojuvelin DuoSet ELISA kit (R&D Systems, DY3720-05) according to the manufacturer's protocol. Optical density was obtained using SpectraMax i3 (Molecular Devices) and results analyzed with Prism software (GraphPad) to obtain IC50 values. The inhibition percentage was calculated with the following equation:

$$\text{Inhibition, [\%]} = \frac{\text{Soluble } HJV_{Baseline} - \text{Soluble } HJV_{Antibody}}{\text{Soluble } HJV_{Baseline} - \text{Soluble } HJV_{Protease\ Inhibitor}} \times 100$$

In this equation, "Soluble $HJV_{Baseline}$" indicates the amount of soluble HJV from the supernatant of HJV-TMPRSS6 over-expression cells in the absence of antibody or protease inhibitor treatment. "Soluble $HJV_{Antibody}$" indicates the amount of soluble HJV from the maximum concentration of antibody treated assay samples, and "Soluble $HJV_{Protease\ Inhibitor}$" indicates the amount of soluble HJV from the serine protease inhibitor, Aprotinin (Sigma, Cat: 10236624001), treated sample.

For the FACS analysis, HEK293.hHJV/3xMyc.hTMPRSS6 cells or HEK293.hHJV/3xMyc.mTMPRSS6 cells were treated with 50 nM of anti-TMPRSS6 antibodies overnight. The following day, cells were harvested for surface staining. To stain cell surface hHJV in assay cell lines, cells were blocked with FcR blocker (Miltenyi Biotech, 130-059-901) and stained with an anti-hemojuvelin antibody (Abcam ab54431, 1:400, on ice, 1 hour) followed by incubation with a donkey anti-mouse IgG AF647 antibody (Invitrogen A-31571, 1:2000, in ice, 40 minutes). The stained cells were measured using an Accuri C6 flow cytometer (BD).

In the ELISA assay, a serine protease inhibitor, Aprotinin (2 µg/mL), and protease inhibitor cocktail (Sigma, Cat: P-1860, 1:200) were included as controls to block protease activity in HEK293.hHJV/3xMyc.TMPRSS6 cells. For FACS, Aprotinin (2 µg/mL), was included as a control to block protease activity in HEK293.hHJV/3xMyc.TMPRSS6 cells.

Results

Table 12 shows inhibition of protease-dependent release of HJV from the cell surface by anti-TMPRSS6 antibodies.

TABLE 12

Blocking Efficacy of TMPRSS6 Antibodies in HEK293.hHJV/3xMyc.TMPRSS6 Over-expression Cell Lines as measured by ELISA

| Assay Cell Lines | HEK293.hHJV/3xMyc.hTMPRSS6 | | HEK293.hHJV/3xMyc.mTMPRSS6 | |
| --- | --- | --- | --- | --- |
| | Inhibition | $IC_{50}$ | Inhibition | $IC_{50}$ |
| mAb | (%) | [M] | (%) | [M] |
| REGN7969 | >99 | 7.12E−11 | <1 | N/A |
| REGN7971 | 89.9 | 7.74E−11 | 10.2 | N/A |
| REGN7973 | >99 | 1.99E−10 | 9.4 | N/A |
| REGN7974 | >99 | 1.54E−10 | 11.8 | N/A |
| REGN7977 | >99 | 1.27E−10 | 46.4 | N/A |
| REGN7999 | >99 | 1.02E−10 | 98.5 | 8.26E−11 |
| REGN8023 | >99 | 1.49E−10 | 42.0 | 2.74E−10 |
| Isotype Control | 15.7 | N/A | 5.2 | N/A |
| Untreated | 0.0 | N/A | <1 | N/A |
| Aprotinin | >99 | N/A | >99 | N/A |
| Protease inhibitor cocktail | >99 | N/A | >99 | N/A |

N/A—Not applicable.

As shown in Table 12, all selected TMPRSS6 antibodies demonstrated >90% inhibition of protease-dependent release of HJV from the cell surface in human TMPRSS6 expressing cells and IC50 values ranging from about 70 to about 200 pM. Two antibodies, REGN7999 and REGN8023, showed inhibitory effects in mouse TMPRSS6 expressing cells, demonstrating about 98.5% and about 42% inhibition of mouse TMPRSS6 protease activity and IC50 values of about 82.6 pM and about 274 pM, respectively.

Table 13 shows the inhibition of cell surface HJV expression by anti-TMPRSS6 antibodies.

TABLE 13

Hemojuvelin Cell Surface Expression Level in HEK293.hHJV/3xMyc.TMPRSS6 Over-expression Cell Lines as measured using flow cytometry

| Assay Cell Lines | HEK293.hHJV/3xMyc.hTMPRSS6 | | HEK293.hHJV/3xMyc.mTMPRSS6 | |
| --- | --- | --- | --- | --- |
| mAb | Geometric Mean Fluorescence Intensity | Median Fluorescence Intensity | Geometric Mean Fluorescence Intensity | Median Fluorescence Intensity |
| REGN7969 | 47932 | 67517 | 8394 | 7813 |
| REGN7971 | 61850 | 84416 | 8228 | 7472 |
| REGN7973 | 46109 | 63527 | 8190 | 7441 |
| REGN7974 | 40885 | 56698 | 6956 | 6224 |
| REGN7977 | 49022 | 63785 | 9128 | 7030 |
| REGN7999 | 30702 | 40146 | 23698 | 33576 |
| REGN8023 | 55465 | 77830 | 18957 | 19405 |
| Isotype Control | 11684 | 12981 | 7750 | 7233 |
| Untreated | 13342 | 15024 | 9605 | 8897 |
| Aprotinin | 42301 | 58097 | 26671 | 38081 |

As shown in Table 13, all selected TMPRSS6 antibodies prevented cleavage of HJV from the surface of HEK293.hHJV/3xMyc.hTMPRSS6 cells. REGN7999 and REGN8023 also prevented cleavage of HJV from the surface of HEK293.hHJV/3xMyc.mTMPRSS6 cells.

Example 7: Inhibition of TMPRSS6 Enzymatic Activity

Experimental Procedure

In order to assess anti-TMPRSS6 antibody inhibition of TMPRSS6 enzymatic activity, two bioassays were established. In both bioassays, anti-TMPRSS6 antibodies or an IgG subclass control were serially diluted in assay buffer (PBS+$Ca^{++}$ and $Mg^{++}$) from 500 nM to 122.1 pM (plus a sample containing assay buffer alone without test molecule).

The first bioassay ("CM bioassay") was run with the extracellular domain of TMPRSS6 produced as conditioned media (CM). CM was made by engineering CHO cells to produce and secrete the extracellular domain of Human TMPRSS6 (Amino Acids 68-802 of NCBI Reference Sequence NM_001289001) or cynomolgous monkey TMPRSS6 (Amino Acids 66-800, V673M, of NCBI Reference Sequence XM_005567384), both fused to an N-terminal 8×Histidine. For the CM bioassay, antibodies were incubated with either 0.2% hTMPRSS6 CM or 0.75% mfTMPRSS6 CM at 25° C. for 30 minutes, with all percent CM being expressed as % v/v.

The second bioassay ("HEK293 bioassay") was run with the HEK293/hTMPRSS6, HEK293/mfTMPRSS6, and HEK293/mTMPRSS6 cell lines, which stably express TMPRSS6 from human, cynomolgous monkey, and mouse, respectively. Details on the preparation of these cell lines can be found in Example 5. For the HEK293 bioassay, cells were plated at 10,000 cells/well (for 30 minute pre-incubation) and 20,000 cells/well (for overnight pre-incubation) in a 96-well plate in DMEM High Glucose+10% FBS+Pen/Strep/L-Glutamine (DMEM Complete) and incubated at 37° C. in 5% $CO_2$. For the HEK293 cell bioassay with 30 minute pre-incubation condition, on the day after cell plating, media was removed from cells, all cells were washed once in assay buffer, antibodies were added to cells, and incubated at 25° C. for 30 minutes. For the overnight pre-incubation condition, on the day after cell plating, antibodies were added to cells still in DMEM Complete without washing and incubated at 37° C. in 5% $CO_2$ overnight. The following day media (including antibodies) was removed from cells, and all cells were washed once in assay buffer.

At the conclusion of antibody/TMPRSS6 incubations and plate washing for all assays, 150 uM of a fluorescent TMPRSS6 peptide substrate (Boc-Gln-Ala-Arg-AMC, Enzo BML-P237) dissolved in assay buffer was added to the antibody treated cells or CM/antibody mixture, and incubated for 1 h at 37° C. in 5% $CO_2$. After the 1h incubation, fluorescence was measured on an Envision plate reader (Perkin Elmer) with an excitation wavelength of 380 nm and an emission wavelength of 460 nm. The results were analyzed using nonlinear regression (4-parameter logistics) with Prism software (GraphPad) to obtain IC50 values. The percentage of inhibition was calculated with the RFU (relative fluorescence units) values by using the following equation:

$$\% \text{ Inhibition} = 100 \times \frac{RFU_{Baseline} - RFU_{Inhibition}}{RFU_{Baseline} - RFU_{Background}}$$

In this equation "$RFU_{Baseline}$" is the fluorescence value from either a certain concentration of TMPRSS6 CM or a certain number of HEK293/TMPRSS6 cells without antibodies, "$RFU_{Inhibition}$" is the fluorescence value with maximum concentration of a particular antibody with the aforementioned concentration of TMPRSS6 CM or a certain number of HEK293/TMPRSS6 cells, and "$RLU_{Background}$" is the fluorescence value without any TMPRSS6 CM or HEK293/TMPRSS6 cells.

Results

Seven anti-TMPRSS6 antibodies were selected and tested for their ability to inhibit the enzymatic activity of TMPRSS6 CM and HEK293/TMPRSS6 cells. Tables 14 through 16 show the results of these experiments.

TABLE 14

Anti-TMPRSS6 antibody inhibition of TMPRSS6 CM

| Constant TMPRSS6 CM concentration | 0.2% hTMPRSS6 CM | | 0.75% mfMPRSS6 CM | |
|---|---|---|---|---|
| mAb | % inhibition | $IC_{50}$ [M] | % inhibition | $IC_{50}$ [M] |
| REGN7969 | 71 | >1.0E−08 | 66 | >5.0E−08 |
| REGN7971 | 65 | >1.0E−08 | 68 | >5.0E−08 |
| REGN7973 | 93 | 2.6E−08 | 81 | >5.0E−08 |
| REGN7974 | 85 | 4.0E−07 | 69 | >5.0E−08 |
| REGN7977 | 94 | 2.3E−08 | 89 | 5.0E−08 |
| REGN7999 | 98 | 3.0E−09 | 98 | 1.7E−09 |
| REGN8023 | 98 | 7.1E−10 | 98 | 7.4E−10 |
| hIgG Subclass control | No Inhibition | No Inhibition | No Inhibition | No Inhibition |

As shown in Table 14, all of the selected antibodies showed inhibition of about 0.2% hTMPRSS6 CM ranging from about 65% to about 98%, with $IC_{50}$ values for ranging from about 710 pM to greater than about 10 nM. All of the antibodies disclosed herein also showed inhibition of about 0.75% mfTMPRSS6 CM ranging from about 66% to about 98%, with $IC_{50}$ values ranging from about 740 pM to greater than about 50 nM.

TABLE 15

Anti-TMPRSS6 antibody inhibition of HEK293/TMPRSS6 cells with 30 minute pre-incubation at 25° C. 10,000 cells/well with 30 minute pre-incubation with antibodies at 25° C.

| HEK293/TMPRSS6 species | hTMPRSS6 | | mfTMPRSS6 | | mTMPRSS6 | |
|---|---|---|---|---|---|---|
| mAb | % inhibition | $IC_{50}$ [M] | % inhibition | $IC_{50}$ [M] | % inhibition | $IC_{50}$ [M] |
| REGN7969 | 87 | 1.9E−09 | 87 | 8.8E−09 | No inhibition | No inhibition |
| REGN7971 | 86 | 9.7E−10 | 87 | 3.1E−09 | No inhibition | No inhibition |
| REGN7973 | 89 | 5.8E−09 | 85 | 2.5E−08 | No inhibition | No inhibition |
| REGN7974 | 86 | 5.1E−09 | 81 | 3.0E−08 | No inhibition | No inhibition |
| REGN7977 | 86 | 3.6E−09 | 87 | 8.1E−09 | 58 | 3.5E−08 |
| REGN7999 | 86 | 3.0E−09 | 90 | 6.5E−09 | 88 | 3.6E−09 |
| REGN8023 | 90 | 3.6E−10 | 94 | 6.6E−10 | 82 | 1.5E−09 |
| hIgG Subclass control | No Inhibition | No Inhibition | No Inhibition | No Inhibition | No Inhibition | No Inhibition |

As shown in Table 15, when antibodies were pre-incubated for 30 minutes with 10,000 HEK293/TMPRSS6 cells, all of the selected antibodies showed inhibition of HEK293/hTMPRSS6 cells ranging from about 86% to about 90%, with IC50 values for ranging from about 360 pM to about 5.8 nM. All of the selected antibodies also showed inhibition of HEK293/mfTMPRSS6 cells ranging from about 81% to about 94%, with IC50 values ranging from about 660 pM to about 30 nM. Three of the selected antibodies (REGN7977, I REGN7999, REGN8023) showed inhibition of HEK293/mTMPRSS6 cells ranging from about 58% to about 88%, with IC50 values for the inhibiting antibodies ranging from about 1.5 nM to about 35 nM.

TABLE 16

Anti-TMPRSS6 antibody inhibition of HEK293/
TMPRSS6 cells with overnight pre-incubation at 37° C.
20,000 cells/well with overnight pre-incubation with antibodies at 37° C.

| HEK293/ TMPRSS6 species | hTMPRSS6 | | mfTMPRSS6 | | mTMPRSS6 | |
|---|---|---|---|---|---|---|
| mAb | % inhibition | $IC_{50}$ [M] | % inhibition | $IC_{50}$ [M] | % inhibition | $IC_{50}$ [M] |
| REGN7969 | 88 | 1.2E−09 | 89 | 1.3E−08 | No inhibition | No inhibition |
| REGN7971 | 90 | 1.4E−09 | 89 | 6.0E−09 | No inhibition | No inhibition |
| REGN7973 | 88 | 2.2E−09 | 42 | >1.0E−08 | No inhibition | No inhibition |
| REGN7974 | 86 | 2.6E−09 | 31 | >1.0E−08 | No inhibition | No inhibition |
| REGN7977 | 87 | 1.7E−09 | 81 | >1.0E−08 | 97 | 1.4E−08 |
| REGN7999 | 89 | 2.1E−09 | 91 | 2.1E−08 | 103 | 2.1E−09 |
| REGN8023 | 90 | 1.1E−09 | 91 | 2.8E−09 | 98 | 1.2E−09 |
| hIgG Subclass control | No Inhibition | No Inhibition | No Inhibition | No Inhibition | No Inhibition | No Inhibition |

As shown in Table 16, when antibodies were pre-incubated overnight with 20,000 HEK293/TMPRSS6 cells, all of the selected antibodies showed inhibition of HEK293/hTMPRSS6 cells ranging from about 86% to about 90%, with IC50 values ranging from about 1.1 nM to about 2.6 nM. All of the selected antibodies also showed inhibition of HEK293/mfTMPRSS6 cells ranging from about 31% to about 91%, with IC50 values ranging from about 2.8 nM to greater than about 10 nM. Three of the selected antibodies (REGN7977, REGN7999, REGN8023) showed inhibition of HEK293/mTMPRSS6 cells ranging from about 97% to about 103%, with IC50 values for the inhibiting antibodies ranging from about 1.2 nM to about 14 nM. An IgG subclass control antibody did not demonstrate any measurable inhibition of TMPRSS6 in any of the formats tested.

Example 8: Epitope Mapping on Human TMPRSS6 by HDX-MS

Experimental Procedure

Hydrogen-Deuterium Exchange Mass Spectrometry (HDX-MS) was performed to determine the amino acid residues of human TMPRSS6 that interact with a subset of TMPRSS6 monoclonal antibodies of the present disclosure, REGN7999 and REGN8023. A general description of the HDX-MS method is set forth in e.g., Ehring, *Analytical Biochemistry* (1999) 267 (2): 252-259; and Engen and Smith, *Anal. Chem.* (2001) 73: 256A-265A.

The HDX-MS experiments were performed on a customized platform, consisting of a custom HDX automation system for deuterium labeling and quenching, a Waters Acquity Binary Solvent Manager for sample digestion and loading, another Waters Acquity Binary Solvent Manager for analytical gradient, and a Thermo Q Exactive HF mass spectrometer for peptide identification and mass measurement.

The $D_2O$ labeling solution was prepared as PBS buffer in $D_2O$ at pD 7.0 (10 mM phosphate buffer, 140 mM NaCl, and 3 mM KCl, equivalent to pH 7.4 at 25° C.). For deuterium labeling, 10 μL of recombinant human TMPRSS6 extracellular domain expressed with a S762A mutation and a C-terminal myc-myc-Hexahistidine tag (referred to as hTMPRSS6_S762A-MMH; REGN5330; SEQ ID NO: 117) premixed with either REGN7999 or REGN8023 were incubated at 20° C. with 90 UL of D2O labeling solution for various time-points in duplicates (non-deuterated control as 0 min; deuterium-labeling for 5 min or 10 min). The deuteration reaction was quenched by adding 90 μL of quench buffer (0.5 M TCEP-HCl, 4 M urea, and 0.5% formic acid) to each sample for a 90-second incubation at 20° C. The quenched samples were then injected into the LC system for online pepsin/protease XIII digestion. The digested peptides were trapped by a C18 column (2.1 mm×5 mm, Waters) and separated by another C18 column (2.1 mm×50 mm, Waters) at −5° C. with a 20-minute gradient from 0%-90% B (mobile phase A: 0.5% formic acid and 4.5% acetonitrile in water, mobile phase B: 0.5% formic acid in acetonitrile). The eluted peptides were analyzed by a Thermo Q Exactive HF mass spectrometry in LC-MS/MS or LC-MS mode.

The LC-MS/MS data from the undeuterated hTMPRSS6_S762A-MMH samples were searched against a database including amino acid sequences of human TMPRSS6 protein, pepsin, protease XIII, and their reversed sequences using the Byonic search engine (Protein Metrics). The search parameters were set as default using non-specific enzymatic digestion and human glycosylation as common variable modification. The list of identified peptides was then imported into HDExaminer software 3.1 (Sierra Analytics) to calculate the deuterium uptake ($D_{uptake}$) and percentage of deuterium uptake (% D) for all deuterated samples. % D was calculated using the following formula:

$$\text{Percentage of deuterium uptake (\% } D\text{)} = \frac{D_{uptake} \text{ for peptide at each time point} \times 100\%}{\text{Maximum } D_{uptake} \text{ of the peptide}}$$

Results

A total of 294 peptides from human TMPRSS6 were identified from both hTMPRSS6_S762A-MMH alone and hTMPRSS6_S762A-MMH in complex with REGN7999 samples, representing about 79.2% sequence coverage of human TMPRSS6. Any peptide that exhibited a decrease of 5% or more in percentage of deuterium uptake was defined as significantly protected (Δ% D<−5%).

Table 17 shows the human TMPRSS6 peptides with significant protection upon formation of hTMPRSS6_S762A-MMH-REGN7999 complex as compared to hTMPRSS6_S762A-MMH alone. Peptides corresponding to amino acids 693-703 SHFFEPGLHCW (SEQ ID NO: 120) and 780-805 LVSWGLGCGRPNYFGVYTRITGVISW (SEQ ID NO: 121) on human TMPRSS6 were significantly protected by REGN7999.

TABLE 17

Human TMPRSS6 peptides with significant protection by REGN7999

| | 5 min | | | 10 min | | | |
|---|---|---|---|---|---|---|---|
| Human TMPRSS6 Residues* | hTMPRSS6-REGN7999 D-uptake | hTMPRSS6 D-uptake | ΔD | hTMPRSS6-REGN7999 D-uptake | hTMPRSS6 D-uptake | ΔD | Δ % D |
| 693-698 | 0.42 | 0.61 | −0.19 | 0.37 | 0.62 | −0.25 | −8.2 |
| 693-703 | 0.85 | 1.08 | −0.23 | 0.53 | 1.15 | −0.62 | −5.9 |
| 695-703 | 0.39 | 1.18 | −0.79 | 0.4 | 1.16 | −0.76 | −14.4 |
| 780-798 | 5.41 | 6.14 | −0.73 | 5.3 | 6.18 | −0.88 | −5.6 |
| 781-783 | 0.32 | 0.40 | −0.08 | 0.32 | 0.39 | −0.07 | −8.3 |
| 781-796 | 4.89 | 5.61 | −0.72 | 4.91 | 5.59 | −0.68 | −6.0 |
| 781-798 | 5.30 | 6.04 | −0.74 | 5.35 | 6.00 | −0.65 | −5.1 |
| 784-796 | 3.18 | 3.66 | −0.48 | 3.14 | 3.59 | −0.45 | −5.2 |
| 792-798 | 0.43 | 0.79 | −0.36 | 0.43 | 0.77 | −0.34 | −7.7 |
| 793-798 | 0.45 | 0.63 | −0.18 | 0.44 | 0.66 | −0.22 | −5.5 |
| 797-805 | 2.15 | 2.56 | −0.41 | 2.12 | 2.53 | −0.41 | −6.5 |

*Sequence numbering corresponds to NCBI accession number NP_705837.1

A total of 302 peptides from human TMPRSS6 were identified from both hTMPRSS6 S762A-MMH alone and hTMPRSS6 S762A-MMH in complex with REGN8023 samples, representing about 79.6% sequence coverage of human TMPRSS6. Any peptide that exhibited a decrease of 5% or more in percentage of deuterium uptake was defined as significantly protected (4% D<−5%).

Table 18 shows the human TMPRSS6 peptides with significant protection upon formation of hTMPRSS6 S762A-MMH-REGN8023 complex as compared to hTMPRSS6 S762A-MMH alone. Peptides corresponding to amino acids 125-133 LITSTRLGT (SEQ ID NO: 122), 586-594 GEWPWQASL (SEQ ID NO: 123), 626-650 STVLWTVFLGKVWQNSRWPGEVSFK (SEQ ID NO: 124), and 704-724 ITGWGALREGGPISNALQKVD (SEQ ID NO: 125) on human TMPRSS6 were significantly protected by REGN8023.

TABLE 18

Human TMPRSS6 peptides with significant protection by REGN8023

| | 5 min | | | 10 min | | | |
|---|---|---|---|---|---|---|---|
| Human TMPRSS6 Residues* | hTMPRSS6-REGN8023 D-uptake | hTMPRSS6 D-uptake | ΔD | hTMPRSS6-REGN8023 D-uptake | hTMPRSS6 D-uptake | ΔD | Δ % D |
| 125-131 | 1.73 | 2.02 | −0.29 | 1.73 | 1.98 | −0.25 | −6.0 |
| 125-133 | 2.59 | 3.03 | −0.44 | 2.61 | 2.99 | −0.38 | −6.5 |
| 126-133 | 2.51 | 2.92 | −0.41 | 2.56 | 2.90 | −0.34 | −6.9 |
| 586-589 | 0.07 | 0.15 | −0.08 | 0.08 | 0.14 | −0.06 | −7.7 |
| 586-594 | 0.60 | 0.93 | −0.33 | 0.60 | 0.93 | −0.33 | −6.2 |
| 626-630 | 1.51 | 1.66 | −0.15 | 1.53 | 1.65 | −0.12 | −5.2 |
| 628-630 | 0.03 | 0.18 | −0.15 | 0.03 | 0.16 | −0.13 | −15.4 |
| 628-631 | 0.04 | 0.15 | −0.11 | 0.06 | 0.14 | −0.08 | −5.2 |

TABLE 18-continued

Human TMPRSS6 peptides with significant protection by REGN8023

| | 5 min | | | 10 min | | | |
|---|---|---|---|---|---|---|---|
| Human TMPRSS6 Residues* | hTMPRSS6-REGN8023 D-uptake | hTMPRSS6 D-uptake | ΔD | hTMPRSS6-REGN8023 D-uptake | hTMPRSS6 D-uptake | ΔD | Δ % D |
| 628-633 | 0.08 | 0.28 | −0.20 | 0.10 | 0.29 | −0.19 | −5.4 |
| 634-639 | 1.93 | 2.45 | −0.52 | 1.92 | 2.45 | −0.53 | −14.6 |
| 634-642 | 3.46 | 4.04 | −0.58 | 3.47 | 4.00 | −0.53 | −8.9 |
| 634-644 | 3.84 | 4.44 | −0.60 | 3.87 | 4.41 | −0.54 | −7.9 |
| 634-646 | 4.81 | 5.38 | −0.57 | 4.84 | 5.35 | −0.51 | −6.0 |
| 634-649 | 5.99 | 6.63 | −0.64 | 6.02 | 6.59 | −0.57 | −5.2 |
| 634-650 | 6.15 | 6.94 | −0.79 | 6.24 | 6.92 | −0.68 | −5.9 |
| 704-710 | 1.50 | 1.83 | −0.33 | 1.51 | 1.84 | −0.33 | −7.2 |
| 704-711 | 2.32 | 2.69 | −0.37 | 2.34 | 2.68 | −0.34 | −6.6 |
| 704-713 | 3.22 | 3.61 | −0.39 | 3.20 | 3.57 | −0.37 | −5.3 |
| 704-718 | 3.88 | 5.37 | −1.49 | 3.94 | 5.31 | −1.37 | −13.2 |
| 704-719 | 4.56 | 5.99 | −1.43 | 4.50 | 6.02 | −1.52 | −12.6 |
| 704-720 | 4.89 | 6.87 | −1.98 | 4.79 | 6.91 | −2.12 | −16.3 |
| 711-720 | 2.28 | 3.72 | −1.44 | 2.32 | 3.67 | −1.35 | −22.2 |
| 711-724 | 3.52 | 5.68 | −2.16 | 3.64 | 5.60 | −1.96 | −20.8 |
| 714-724 | 2.86 | 4.70 | −1.84 | 2.88 | 4.62 | −1.74 | −22.1 |

*Sequence numbering corresponds to NCBI accession number NP_705837.1

Example 9: Epitope Mapping on Human TMPRSS6 by CryoEM

Experimental Procedure

Cryoelectron Microscopy (CryoEM) was used to further characterize the epitopes relevant to selected TMPRSS6 antibodies.

For the preparation of Fab fragments, REGN7999 and REGN8023 IgGs were cleaved into F (ab') 2 and Fc fragments using Fabricator enzyme (Genovis) following standard protocols from the manufacturer. F (ab') 2 was reduced into Fab using 2-mercaptoethylamine (2-MEA, ThermoFisher) followed by Fc fragment removal using CaptureSelect IgG-Fc (ms) affinity resin (ThermoFisher). Fab fragments were further purified by injection into a size exclusion chromatography (SEC) column (Superdex 200 Increase 15/300 GL, GE healthcare) connected to an AKTA Avant 25 chromatography system (GE healthcare). Running buffer contained 25 mM Tris-HCl PH 7.5, 150 mM NaCl. Peak fractions were pooled and concentrated in a 30 kDa cutoff centrifugal filter (Millipore Sigma) for subsequent use in complex preparation.

The human TMPRSS6 protein used in this experiment encompasses the extracellular domain residues G77-T811 of human TMPRSS6 fused to a C-terminal Myc-Myc-hexahistidine tag and contains a mutation in the catalytic domain (S762A) that renders the protein catalytically inactive (referred to as human TMPRSS6_S762A-MMH). For complex formation, 200 µg of purified human TMPRSS6_S762A-MMH was mixed with 250 µg each of REGN7999 Fab and REGN8023 Fab and then incubated on ice for approximately 30 minutes. The mixture was injected into an SEC column (Superdex 200 Increase 15/300 GL, GE) connected to an AKTA Avant 25 chromatography system (GE healthcare). SEC running buffer contained 25 mM Tris-HCl PH 7.5, 150 mM NaCl. Fractions from a single monodisperse peak corresponding to the human TMPRSS6 S762A-MMH—REGN7999 Fab-REGN8023 Fab complex were pooled and concentrated in a 30 kDa cutoff centrifugal filter (Millipore Sigma) to a concentration of 3.5 mg/mL measured using a Nanodrop instrument (ThermoFisher).

CryoEM sample preparation and data collection were performed as follows. Freshly purified human TMPRSS6_S762A-MMH—REGN7999 Fab-REGN8023 Fab complex was diluted two-fold to 1.75 mg/mL in buffer containing 25 mM Tris-HCl PH 7.5, 150 mM NaCl for cryoEM grid preparation. n-Dodecyl-b-D-maltopyranoside (Anatrace) was added to a final concentration of ~60 M immediately before pipetting 3.5 µL of the mixture onto a UltrAufoil R1.2/1.3, 300 mesh grid (Quantifoil). Excess liquid was blotted away using filter paper and the grid was plunge frozen into liquid ethane cooled by liquid nitrogen using a Vitrobot Mark IV (ThermoFisher) operated at 4° C. and 100% humidity. The grid was then inserted into a Titan Krios G3i microscope (ThermoFisher) equipped with a K3 camera (Gatan). 3,580 movies were collected in counted mode at a nominal magnification of 81,000×(0.85 Å pixel size). Each movie contained 46 dose fractions over a 2 second exposure, and the total acquired dose per $Å^2$ was ~40 electrons.

CryoEM data processing and map generation was performed as follows. CryoEM data were processed initially using Cryosparc v2.14.2. Movies were motion corrected by Patch motion correction and CTF parameters were estimated by Patch CTF estimation. Particles were initially picked using Blob picker to generate 2D class averages for template picking. 927,835 particles were picked using Template picker. After 2D classification, Ab initio reconstruction, and Heterogenous refinement, 94,036 particles corresponding to the REGN5330—REGN7999 Fab-REGN8023 Fab complex were identified. These particles were refined to 3.4 Å resolution reconstruction using non-uniform refinement. The resulting map was used as an initial reference model for 3D classification in Relion. The map used for model building was calculated using a Relion version 3.1 single particle processing pipeline. Movies were motion-corrected using MotionCor2 and CTF parameters were estimated using gctf. 3,411 aligned micrographs were selected for further processing on the basis of having a CTF resolution estimation of better than 4 Å. 1,445,534 particles were picked from the micrographs using 2D template-based autopicking and extracted as 3× binned particle images (2.55 Å per pixel). Three rounds of 2D classification were conducted to remove false positives and broken or incomplete complexes, resulting in 1,034,494 particles. These particles were subjected to 3D classification requesting 8 classes, using an initial reference model calculated in CryoSparc. 270,021 particles from the two best classes corresponding to human TMPRSS6 S762A-MMH—REGN7999 Fab-REGN8023 Fab complex were re-extracted as unbinned particle images and subjected to 3D refinement, which produced a 3.4 Å resolution map in which the Fabs and catalytic domains were well resolved, but the remaining N-terminal domains of the protein were poorly resolved. To better resolve the N-terminal domains, focused classification was carried out without alignment, applying a soft mask that excluded the Fabs and catalytic domain. A single class containing 146,035 particles was identified as having improved density for the N-terminal domains. Refinement of these particles resulted in a 3.6 Å resolution map. Two rounds of CtfRefine and Bayesian polishing were followed by three additional focused 3D classification runs without alignment in which soft masks surrounding the CUB and SEA domains were applied, resulting in a final set of 105,142 particles. These particles were then refined into a 3.3 Å resolution (FSC=0.143) map with improved features in N-terminal domains. For model building, the map was filtered to its local resolution values calculated in Relion and sharpened to a B factor of −76 Å$^2$.

Model building and refinement was performed as follows. Manual model building was carried out using Coot version 0.8.9 and real space refinements were done in Phenix version 1.17. A homology model of the human TMPRSS6 catalytic domain S762A mutant was generated from a published crystal structure of the human Matriptase-1 catalytic domain (PDB 4IS5) using the Sculptor program in Phenix. This model was docked into the cryoEM map of human TMPRSS6 S762A-MMH—REGN7999 Fab-REGN8023 Fab complex using Phenix AutoDock and manually adjusted. The LDLRa domains were built into the density manually using a published crystal structure of an LDLR domain (PDB 1AJJ) as a guide. Manual building of CUB domains 1 and 2 were guided by a published crystal structure of Cubilin (PDB 3KQ4). Correct sequence register was corroborated by density for side chains of bulky residues and N-linked glycosylations, as well as the positions of disulfide bridges. The N-terminal SEA domain was not built due to poor fragmented density. The current model encompasses human TMPRSS6 residues 212-811, excepting residues 573-581 and 662-664, which are located in disordered linkers. Homology models for Fab fragments of REGN7999 and REGN8023 were made from a previously determined REGN Fab structure. Unambiguous docking of Fab models into their respective densities was aided by clearly interpretable side chain densities corresponding to their distinct CDR sequences. After docking, the models were adjusted manually followed by real space refinement of the entire human TMPRSS6 S762A-MMH—REGN7999 Fab-REGN8023 Fab complex.

Results

CryoEM structure of human TMPRSS6 S762A-MMH—REGN7999 Fab-REGN8023 Fab complex: To better understand how anti-TMPRSS6 antibodies bind to and inhibit TMPRSS6, a protein complex consisting of a catalytically inactive human TMPRSS6 ectodomain (human TMPRSS6 S762A-MMH) bound to the Fab fragments of anti-TMPRSS6 antibodies REGN7999 and REGN8023 was isolated by SEC and its three-dimensional structure was determined by single particle CryoEM. At an overall resolution of 3.3 Å, the CryoEM reconstruction was sufficient for building an atomic model for ~80% of the human TMPRSS6 ectodomain, encompassing its two CUB domains, three LDLRa domains, and catalytic serine protease domain. The reconstruction also allowed unambiguous docking of REGN7999 and REGN8023 Fab fragments and manual re-fitting of their variable regions. The local resolution at the paratope-epitope interfaces of both Fabs ranges from 3.1-3.5 Å, allowing for accurate determination of residue-level interactions between the antibodies and TMPRSS6. The structure of the tertiary complex also confirms that REGN7999 and REGN8023 bind at non-overlapping epitopes.

REGN7999 epitope and structural mechanism of inhibition: Residues contributing to the REGN7999 epitope on TMPRSS6 are summarized in Table 18. These residues are defined as TMPRSS6 residues with non-hydrogen atoms that are within 4 Å of non-hydrogen atoms of REGN7999 and can involve hydrogen bonds, charge-charge interactions, or hydrophobic/van der Waals interactions. The REGN7999 epitope can be split into two patches on TMPRSS6. The first patch resides on the catalytic domain and consists of TMPRSS6 residues G699, H701, D724, Q726, L727, I728, P729, L732, E735, G749, Y750, R751, K752, and N791. Contacts at this patch are mediated by CDRs H3, L2, L3 and a single residue from framework region (FR) L3. The second patch resides on LDLRa repeat domain 2 and consists of residues V490, S501, T502, C503, I504, S505, and K508. The paratope for the second patch is comprised of a continuous stretch of light chain residues spanning portions of CDR-L2 and FR-L3. The CUB domains and SEA domain are far removed from the REGN7999 binding interface and do not contribute to its epitope on TMPRSS6. Data from hydrogen deuterium exchange (HDX) mass spectrometry experiments on REGN7999 (Example 8) generally agrees with the catalytic domain patch observed in the CryoEM structure, but did not highlight residues from LDLRa domain 2 as contributing to the epitope.

Although its epitope includes a patch on the catalytic domain, REGN7999 does not contact the catalytic site triad (H617, D668 and S672) where cleavage occurs, nor is it oriented such that it sterically occludes substrate access to the active site. The location of a substrate bound to TMPRSS6 has not been experimentally determined, but this location can be inferred from a homologous structure of matriptase serine protease domain in complex with peptide inhibitor, reported in Yuan et al, BMC Struct Biol. (2011) 11:30. These structural observations suggest that binding of soluble hemojuvelin to the TMPRSS6 ectodomain is not perturbed by the presence of REGN7999. Without being bound to any theory, it is possible that REGN7999 may inhibit TMPRSS6 by allosterically 'trapping' TMPRSS6 in an inactive conformation that is capable of binding but not cleaving substrate.

REGN8023 epitope and structural mechanism of inhibition: Residues contributing to the REGN8023 epitope on TMPRSS6 are summarized in Table 19. These residues are defined as TMPRSS6 residues with non-hydrogen atoms that are within 4 Å of non-hydrogen atoms of REGN8023 and can involve hydrogen bonds, charge-charge interactions, or hydrophobic/van der Waals interactions. The REGN8023 epitope resides exclusively on the catalytic domain and consist of TMPRSS6 residues R597, R599, I601, D622, L710, R711, E712, G713, G714, P715, and I716. The epitope observed in this structure generally agrees with data from HDX mass spectrometry experiments. The REGN8023 paratope is largely comprised within the heavy chain and includes CDRs H1, H2, H3, L1, L3 as well as FR-H3.

REGN8023 binds the TMPRSS6 catalytic domain such that the heavy chain does not directly contact the catalytic triad but appears to be in a position that would occlude substrate access to the active site, based on the model described above. Without being bound by any theory, it is possible that REGN8023 inhibits TMPRSS6 through steric hindrance of substrate binding to the active site. This is also suggested by binding data demonstrating that REGN8023 competes with soluble hemojuvelin for binding to TMPRSS6 ectodomain protein.

TABLE 19

Anti-TMPRSS6 antibody epitopes. Epitope residues are defined as amino acids with non-hydrogen atoms within 4 Å of non-hydrogen atoms of antibody

| Antibody | TMPRSS6 epitope residues* | |
|---|---|---|
| | LDLRa domain 2 | Catalytic domain |
| REGN7999 | V490, S501, T502, C503, I504, S505, K508 | G699, H701, D724, Q726, L727, I728, P729, L732, E735, G749, Y750, R751, K752, N791 |
| REGN8023 | N/A | R597, R599, I601, D622, L710, R711, E712, G713, G714, P715, I716 |

*Sequence numbering corresponds to NCBI accession number NP_705837.1

Example 10: Comparison of REGN7999 and REGN8023 in Female WT Mice

Experimental Procedure

Two in vivo experiments were performed to analyze the effects of selected TMPRSS6 antibodies on serum hepcidin and serum iron. For both studies, female wild-type mice with humanized HJV were utilized (Study 1: ages 11-13 weeks and Study 2: ages 6-9 weeks). In both studies, mice were pre-bled at Day 7. In the first study (Study 1), two selected TMPRSS6 antibodies, REGN7999 and REGN8023, as well as an isotype control antibody, were subcutaneously administered to mice at 10 mg/kg on days 0, 2 and 7 of the study. Mice were then taken down at day 9 and terminal bleeds were collected for analysis. In the second study (Study 2), the same two TMPRSS6 antibodies, REGN7999 and REGN8023, as well as an isotype control antibody, were subcutaneously administered to mice at 25 mg/kg on days 0, 2 and 7 of the study. Mice were then taken down at day 14 and terminal bleeds were collected for analysis.

From both studies, serum iron was measured from terminal bleeds using a Siemens ADVIA Chemistry XPT instrument. Serum hepcidin was measured from terminal bleeds using a Hepcidin-murine-compete ELISA kit (Intrinsic Lifesciences, Cat: HMC-001, Lot: 5142019) as per manufacturer's instructions.

Results

Serum iron (expressed as ng/ml) and serum hepcidin (expressed as µg/dL) measurements from Study 1 are shown in Table 20 and from Study 2 are shown in Table 21.

TABLE 20

Serum Iron and hepcidin levels in humanized HJV mice in response to TMPRSS6 antibody treatment in Study 1 (10 mg/kg)

| Measurement | Isotype Control Ab | REGN7999 | REGN8023 |
|---|---|---|---|
| Serum Hepcidin (ng/mL) Mean ± SD | 390.2 ± 175.4 | 652.0 ± 175.4* | 590 ± 160.9 |
| Serum Iron (µg/dL) Mean ± SD | 148.8 ± 37.78 | 79.63 ± 18.15* | 112 ± 51.41 |

As shown in Table 20, in Study 1, REGN7999 treatment increased serum hepcidin and reduced serum iron significantly in healthy REGN7999-treated mice as compared with isotype control treated mice. REGN8023 treatment also increased serum hepcidin and reduced serum iron in healthy REGN8023-treated mice, although this was not statistically significant as compared to isotype control treated mice. In Table 20, all values are mean±SD, n=6-8 per group. One Way ANOVA; * p<0.05 vs. Isotype control Ab.

TABLE 21

Serum Iron and hepcidin levels in humanized HJV mice in response to TMPRSS6 antibody treatment in Study 2 (25 mg/kg)

| Measurement | Isotype Control Ab | REGN7999 | REGN8023 |
|---|---|---|---|
| Serum Hepcidin (ng/mL) Mean ± SD | 220.4 ± 110.9 | 609.4 ± 289.6* | 363.4 ± 108.1 |
| Serum Iron (μg/dL) Mean ± SD | 156.8 ± 25.02 | 58.00 ± 11.14* | 86.00 ± 17.77* |

As shown in Table 21, in Study 2, REGN7999 treatment increased serum hepcidin and reduced serum iron significantly in healthy REGN7999-treated mice as compared with isotype control treated mice. REGN8023 treatment also increased serum hepcidin and reduced serum iron in healthy REGN8023-treated mice, although only the serum iron levels reached statistical significance as compared to isotype control treated mice. In Table 21, all values are mean±SD, n=4-5 per group. One Way ANOVA; * p<0.05 vs. Isotype control Ab.

The data from both studies suggests that the selected anti-TMPRSS6 antibodies are able to block TMPRSS6 function resulting in the observed effects on hepcidin and serum iron levels.

Example 11: Effect of Anti-TMPRSS6 on Liver Iron in a Mouse Model of Hemochromatosis To further investigate the efficacy of anti-TMPRSS6 antibody REGN7999 in a relevant disease model, a type 1 hereditary hemochromatosis study was performed. Hereditary hemochromatosis is an iron overload disease caused by a mutation in HFE protein, which leads to inappropriately low hepcidin levels (Finberg et al. Blood (2011) 117 (17): 4590-4599).

Experimental Procedure

Male mice homozygous for a deletion of the mouse HFE gene on a 100% C57BL/6 background (referred to as $HFE^{-/-}$), were used as a mouse model of type 1 hereditary hemochromatosis. $HFE^{-/-}$ mice (n=5-7) were subcutaneously injected weekly with 10 mg/kg of isotype control or REGN7999, except during week 1 when 2 injections were administered. A wild type mouse control group was included and administered isotype control. After 8 weeks, mice were euthanized using $CO_2$ asphyxiation. A terminal bleed was taken and serum hepcidin was measured using the Hepcidin Murine-Compete ELISA kit (Intrinsic Lifesciences, Cat: HMC-001, Lot: 02032020) as per the manufacturer's protocol. After the mice were sacrificed, their livers were flash frozen. Later these livers were processed to measure liver iron content, based on the method described by Torrance and Bothwell, S. Afr. J. Med. Sci. (1968) 33 (1): 9-11.

Results

Both serum hepcidin (reported in ng/ml) and liver iron content (reported in μg/g dry weight) values are shown in Table 22.

TABLE 22

REGN7999 Effects on Serum Hepcidin and Liver Iron Content in a Mouse Model of Hereditary Hemochromatosis

| | $HFE^{+/+}$ (wild type) mice Isotype Control treatment | $HFE^{-/-}$ mice Isotype Control treatment | $HFE^{-/-}$ mice REGN7999 treatment |
|---|---|---|---|
| Serum hepcidin (ng/mL) | 364.8 ± 96.89 | 339.3 ± 150.7 | 1631 ± 231.4* ** |
| Liver iron content (mg/g dry weight) | 338.4 ± 60.03 | 771.1 ± 68.37* | 618.7 ± 51.17* ** |

As shown in Table 22, after 8 weeks of treatment with REGN7999, $HFE^{-/-}$ mice had significantly increased serum hepcidin (about 1631 ng/mL) as compared to those treated with isotype control (about 339.3 ng/ml). Also shown in Table 22, after 8 weeks of treatment with REGN7999, $HFE^{-/-}$ mice had a significantly lower liver iron content (about 618.7 μg/g dry weight) as compared to those treated with isotype control (about 771.1 μg/g dry weight). In Table 22, all values are mean±SD, n=5-7 per group. One Way ANOVA; * p<0.05 vs. HFE+/+ isotype control; ** p<0.05 vs. HFE−/− isotype control.

Example 12: Effect of Anti-TMPRSS6 in a Mouse Model of Beta Thalassemia

In order to evaluate the efficacy of two anti-TMPRSS6 antibodies disclosed herein, studies were performed in a murine model of beta thalassemia intermedia, an iron overload disorder associated with ineffective erythropoiesis and iron dysregulation.

Mice were generated with a heterozygous deletion of β1 and β2 genes, which recapitulate beta thalassemia intermedia in humans (Ginzburg, Blood (2011) 118 (16): 4321-4330), and homozygous expression of human hemojuvelin (HJV) in place of mouse HJV (referred to as $Hbb^{th3/+}$x $HJV^{Humln}$) in a C57BL/6/129S6 background. $Hbb^{th3/+}$x $HJV^{Humln}$ mice (n=10-19) were subcutaneously injected weekly with 10 mg/kg of either REGN7999, REGN8023, or isotype control (except in week 1 when 2 injections were administered). A wild type (WT) mouse control group was included and administered isotype control in a similar manner. After 8 weeks, mice were euthanized using $CO_2$ asphyxiation, and whole blood was collected via cardiac puncture and placed in serological blood collection tubes either with or without EDTA. Serum hepcidin was measured using the commercially available Hepcidin Murine-Compete ELISA kit (Intrinsic Lifesciences, Cat: HMC-001, Lot: 08232019) according to the manufacturers' instructions. Serum iron and a full hematology panel, including reticulocytes and mature red blood cells (RBC), was measured using a Siemens ADVIA Chemistry XPT instrument and the Oxford Science GENESIS Hematology System.

Additionally, after the mice were sacrificed, their livers and spleens were flash frozen until further processing. Livers samples were later processed to measure liver iron content, based on the method described by Torrance and Bothwell, *S. Afr. J. Med. Sci.* (1968) 33 (1): 9-11. Spleens were minced and filtered through a 70 mm strainer into a tube containing 10 mL autoMACS® buffer (Miltenyi Biotec, Cat: 130-091-221). To harvest bone marrow from femurs, hip-ends were excised from mice and placed in a tube containing 100 mL of autoMACS® buffer supplemented with bovine serum albumin (BSA) (Miltenyi Biotec, Cat: 130-091-376). Tubes were quickly spun (10 s, 400×g) to release bone marrow into solution.

Bone marrow and spleen cells were spun at 400×g for 10 minutes at 4° C. followed by incubation with anti-mouse CD45 magnetic beads (Miltenyi Biotec, Cat: 130-052-301) for 20 minutes on ice. This was followed by magnetic separation on multi-24 columns (Miltenyi Biotec, Cat: 130-095-691). The flow-through, enriched in both mature and precursor RBCs, was collected and incubated with anti-mouse CD16/CD32 Fc block (BD Biosciences, clone 2.4G2, Cat: 553142) for 10 minutes. This was followed by a 30-minute incubation with the following commercial antibodies (all rat anti-mouse): FITC anti-Ter119, Clone TER-119, Cat: 557915; APC anti-CD44, Clone IM7, Cat: 561862; APC-Cy7 anti-CD45, Clone 30-F11, Cat: 557659; APC-Cy7 anti-CD11b, Clone M1/70, Cat: 557657; and APC-Cy7 anti-Ly6G, Clone 1A8, Cat: 560600; all from BD Biosciences.

AADvanced (Thermofisher, S10349) was added for 30 minutes to exclude dead cells from the analysis. All staining procedures were performed on ice and compensation controls were included using OneComp eBeads™ (Invitrogen, Cat: 01-1111-42). A *minus*-One control panel was prepared for correct gating of target populations. Samples were measured on a CytoFLEX LX Flow Cytometer (Beckman-Coulter) using fluorescence minus-one-controls to gate target populations.

As shown in Table 23, after 8 weeks treatment with REGN7999 or REGN8023, Hbb$^{th3/+}$x HJV$^{Humln}$ mice had significantly increased serum hepcidin levels (about 1510 ng/mL and about 1454 ng/ml, respectively) compared to both WT and Hbb$^{th3/+}$x HJV$^{Humln}$ mice treated with isotype control (about 225 ng/ml and about 511 ng/ml, respectively).

Additionally, after 8 weeks of treatment with REGN7999 or REGN8023, Hbb$^{th3/+}$x HJV$^{Humln}$ had a significant reduction (about 50 µg/dL) in serum iron compared to isotype control (about 128 µg/dL, Table 23). In isotype control treatment groups, Hbb$^{th3/+}$x HJV$^{Humln}$ mice accumulated more liver iron than WT mice. This increase was more pronounced in female mice (about 466 µg/g to about 985 µg/g dry weight) compared to male mice (about 215 µg/g to about 364 µg/g dry weight) (Table 23). The reduction of liver iron content in response to REGN7999 and REGN8023 also had greater effects in female mice after 8 weeks of treatment. In Table 23, all values are mean±SD, n=10-19 per group. One Way ANOVA; * p<0.01 vs. WT isotype control; ** p<0.05 vs. Hbb$^{th3/+}$ isotype control.

TABLE 23

Effect of REGN7999 and REGN8023 on Serum Hepcidin, Serum Iron, and Liver Iron Content in a Mouse Model of beta-thalassemia

| Treatment Group | Serum Hepcidin (ng/mL) | Serum Iron (mg/dL) | Liver Iron (mg/g dry weight) Female Cohort | Liver Iron (mg/g dry weight) Male Cohort |
|---|---|---|---|---|
| Wild type mice Isotype Control Treatment | 225 ± 107 | 167 ± 27 | 466 ± 64 | 215 ± 49 |
| Hbb$^{th3/+}$ × HJV$^{Humln}$ mice Isotype Control Treatment | 511 ± 232 | 128 ± 31* | 985 ± 190* | 364 ± 123* |
| Hbb$^{th3/+}$ × HJV$^{Humln}$ mice REGN7999 Treatment | 1510 ± 911*** | 51 ± 23* ** | 718 ± 177** | 293 ± 119 |
| Hbb$^{th3/+}$ × HJV$^{Humln}$ mice REGN8023 Treatment | 1454 ± 624* ** | 56 ± 34 * ** | 732 ± 182** | 264 ± 79 |

REGN7999 or REGN8023 administration in Hbb$^{th3/+}$x HJV$^{Humln}$ mice led to an increase in red blood cells (about 10.51 M/µL and about 10.18 M/µL, respectively) compared to those mice treated with isotype control (about 8.72 M/µL; Table 24). Eight weeks of treatment with REGN7999 or REGN8023 in Hbb$^{th3/+}$x HJV$^{Humln}$ mice led to a reduction in splenic reticulocytes (from about 38% in isotype control to about 18%; Ter-119$^+$/CD44$^{high}$) and increased levels of mature RBCs (Ter-119$^+$/CD44$^{low}$) in both spleen and bone marrow, indicating improved erythropoiesis and less need of secondary erythropoiesis in the spleen (Table 25). Also observed was a more significant reduction in spleen weight in Hbb$^{th3/+}$x HJV$^{Humln}$ mice treated with anti-TMPRSS6 REGN7999 (about 0.142 g) or REGN8023 (about 0.130 g) compared to isotype control (about 0.301 g) (Table 24). In Table 24, all values are mean±SD, n=10-19 per group. One Way ANOVA; * p<0.05 vs. WT isotype control; ** p<0.05 vs. Hbb$^{th3/+}$ isotype control. In Table 25, all values are mean±SD, n=10-19 per group. One Way ANOVA; * p<0.001 vs. WT isotype control; ** p<0.0001 vs. Hbb$^{th3/+}$ isotype control.

TABLE 24

Effect of REGN7999 and REGN8023 on Red Blood Cells and Spleen Weight in a Mouse Model of Beta-thalassemia

| Treatment Group | Number of Animals (n) | Red Blood Cells (M/mL) | Spleen Weight (g) |
|---|---|---|---|
| Wild type mice Isotype Control Treatment | 16-19 | 10.05 ± 0.87 | 0.076 ± 0.014 |
| Hbb$^{th3/+}$ × HJV$^{Humln}$ mice Isotype Control Treatment | 15-16 | 8.72 ± 0.27* | 0.301 ± 0.112* |

TABLE 24-continued

Effect of REGN7999 and REGN8023 on Red Blood Cells and Spleen
Weight in a Mouse Model of Beta-thalassemia

| Treatment Group | Number of Animals (n) | Red Blood Cells (M/mL) | Spleen Weight (g) |
|---|---|---|---|
| Hbb$^{th3/+}$ × HJV$^{Humin}$ mice REGN7999 Treatment | 11-14 | 10.51 ± 0.87** | 0.142 ± 0.053* ** |
| Hbb$^{th3/+}$ × HJV$^{Humin}$ mice REGN8023 Treatment | 10-13 | 10.18 ± 0.47** | 0.130 ± 0.046** |

TABLE 25

Effect of REGN7999 and REGN8023 on Bone Marrow and Splenic
Reticulocytes and Red Blood Cells in a Mouse Model of Beta-thalassemia

| Treatment Group | Bone Marrow Reticulocytes (% CD44$^{high}$ Ter119$^+$) | Bone Marrow Mature Red Blood Cells (% CD44$^{low}$ Ter119$^+$) | Spleen Reticulocytes (% CD44$^{high}$ Ter119$^+$) | Spleen Mature Red Blood Cells (% CD44$^{low}$ Ter119$^+$) |
|---|---|---|---|---|
| Wild type mice Isotype Control Treatment | 45.6 ± 5.4 | 42.0 ± 5.4 | 17.0 ± 5.4 | 80.5 ± 5.4 |
| Hbb$^{th3/+}$ × HJV$^{Humin}$ mice Isotype Control Treatment | 48.1 ± 10.5 | 25.8 ± 11.6* | 38.0 ± 8.2* | 51.0 ± 13.5* |
| Hbb$^{th3/+}$ × HJV$^{Humin}$ mice REGN7999 Treatment | 40.4 ± 6.8 | 46.2 ± 7.8** | 18.1 ± 3.2** | 80.1 ± 4.3** |
| Hbb$^{th3/+}$ × HJV$^{Humin}$ mice REGN8023 Treatment | 41.5 ± 9.4 | 45.7 ± 10.1** | 18.5 ± 5.6** | 78.2 ± 7.9** |

Example 13: Effect of REGN7999 in a Mouse Model of Beta-Thalassemia

In order to further evaluate the efficacy of REGN7999 disclosed herein, studies were performed in a murine model of beta-thalassemia intermedia, as described in Example 12.

Mice were generated with a heterozygous deletion of β1 and β2 genes, which recapitulate beta thalassemia intermedia in humans (Ginzburg, Blood (2011) 118 (16): 4321-4330), and homozygous expression of human hemojuvelin (HJV) in place of mouse HJV (referred to as Hbb$^{th3/+}$x HJV$^{Humln}$) in a C57BL/6/129S6 background. Hbb$^{th3/+}$x HJV$^{Humln}$ mice (n=7-9; see, Example 12 for details on the generation of these mice) were subcutaneously injected weekly with 5 mg/kg of REGN7999 or isotype control (except 2 injections were administered in week 1). A wild type (WT) mouse control group was included and administered isotype control in a similar manner. After 8 weeks, mice were processed and samples were collected as described in Example 12. Serum hepcidin, serum iron and a full hematology panel, including reticulocytes and mature red blood cells were measured as described in Example 12.

Additionally, after the mice were sacrificed, their livers were flash frozen and later processed as described in Example 12. Both serum Hepcidin (reported in ng/ml) and liver iron content (reported in μg/g dry weight) values are shown in Table 26.

TABLE 26

Effect of REGN7999 on Serum Hepcidin, Serum Iron, and Liver
Iron Content in a Mouse Model of Beta-thalassemia

| | Wild type mice Isotype Control Treatment | Hbb$^{th3/+}$ × HJV$^{Humin}$ mice Isotype Control Treatment | Hbb$^{th3/+}$ × HJV$^{Humin}$ mice REGN7999 Treatment |
|---|---|---|---|
| Serum Hepcidin (ng/mL) | 376.8 ± 217.6 | 713.1 ± 435.8 | 1781 ± 1053* ** |
| Serum Iron (mg/dL) | 138.6 ± 60.92 | 102.3 ± 40.69 | 66.71 ± 25.53* |
| Liver Iron Content (μg/g dry weight) | 372.1 ± 83.96 | 547.2 ± 162.7* | 513.9 ± 95.83 |

As illustrated in Table 26, after 8 weeks of treatment with 5 mg/kg REGN7999, Hbb$^{th3/+}$x HJV$^{Humln}$ mice had significantly increased (about 1781 ng/ml) serum hepcidin levels compared to both WT and Hbb$^{th3/+}$x HJV$^{Humln}$ mice treated with isotype control (about 376.8 ng/ml and about 713.1 ng/ml, respectively). Also shown in Table 26, treatment with REGN7999 led to a significant reduction (about 66 μg/dL) in serum iron compared to Hbb$^{th3/+}$x HJV$^{Humln}$ mice treated with isotype control (about 138 μg/dL). In isotype treated control study groups, an increase in liver iron content from about 372 μg/g dry weight in wild type mice to about 547 μg/g dry weight in Hbb$^{th3/+}$x HJV$^{Humln}$ mice was observed. While treatment with REGN7999 did not significantly reduce liver iron content compared to isotype control in Hbb$^{th3/+}$x HJV$^{Humln}$ mice (about 513.9 and about 547.2 μg/g dry weight, respectively), a significant reduction was seen compared to wild type mice treated with isotype control (Table 26). In Table 26, all values are mean±SD, n=7-9 per group; One Way ANOVA *p<0.05 vs. WT isotype control; ** p<0.05 vs. Hbb$^{th3/+}$x HJV$^{Humln}$ isotype control.

TABLE 27

Effect of REGN7999 on Hematocrit, Red Blood Cells, and
Hemoglobin in a Mouse Model of Beta-thalassemia

| | Wild type mice Isotype Control Treatment | Hbb$^{th3/+}$ × HJV$^{Humin}$ mice Isotype Control Treatment | Hbb$^{th3/+}$ × HJV$^{Humin}$ mice REGN7999 Treatment |
|---|---|---|---|
| Hematocrit (%) | 36.92 ± 1.924 | 28.31 ± 1.969* | 30.57 ± 3.216** |
| Red Blood Cells (M/mL) | 9.52 ± 0.81 | 8.93 ± 0.68 | 11.2 ± 0.51*** |
| Hemoglobin (g/dL) | 13.02 ± 0.73 | 9.22 ± 0.54* | 10.1 ± 0.65* ** |

As shown in Table 27, hematocrit, red blood cell count, and hemoglobin levels were lower in Hbb$^{th3/+}$x HJV$^{Humln}$ mice treated with isotype control as compared to wild type mice, as expected. Hematocrit was reduced from about 37% in wild type mice to about 28% in Hbb$^{th3/+}$x HJV$^{Humln}$ mice treated with 5 mg/kg isotype control. Treatment with REGN7999 did not show any effect compared to isotype control on hematocrit in Hbb$^{th3/+}$x HJV$^{Humln}$ (Table 27). Red blood cells, (reported in M/μL) went from about 9.52 in wild type mice to about 8.93 in Hbb$^{th3/+}$x HJV$^{Humln}$ mice treated with isotype control. After 8 weeks of treatment with REGN7999 in Hbb$^{th3/+}$x HJV$^{Humln}$ mice significantly increased red blood cells to about 11.2 M μL (Table 27). In wild type isotype control treated mice, hemoglobin levels were about 13 g/dL, and, as shown in Table 27, treatment with isotype control in Hbb$^{th3/+}$x HJV$^{Humln}$ mice significantly reduced hemoglobin to about 9.22 g/dL. Treatment with REGN7999 increased hemoglobin levels to about 10.1 g/dL after 8 weeks of treatment in Hbb$^{th3/+}$x HJV$^{Humln}$ mice. Without being bound by theory, these data support the idea that restricting iron by modulating the hepcidin pathway has a beneficial effect on red blood cells. In Table 27, all values are mean±SD, n=6-9 per group; One Way ANOVA *p<0.05 vs. WT isotype control; ** p<0.05 vs. Hbb$^{th3/+}$x HJV$^{Humln}$ isotype control.

Example 14: Pharmacokinetics (PK) and Pharmacodynamics (PD) in Cynomolgus Monkey The objective of this study was to determine the pharmacokinetic (PK) characteristics and pharmacokinetic/pharmacodynamic (PK/PD) relationship of two anti-TMPRSS6 human monoclonal antibodies (mAbs). For this study, REGN7999 and REGN8023 were administered as a single intravenous (IV) infusion to female cynomolgus monkeys.

As summarized in Table 28, 21 female cynomolgus monkeys were assigned to one of 6 groups (n=3 or 4 animals per group; 5 mg/kg or 15 mg/kg dose groups). Animals received a single IV infusion of 5 mg/kg REGN7999, 5 mg/kgREGN8023, 15 mg/kg REGN7999, 15 mg/kg REGN8023, or 15 mg/kg isotype control antibody (Table 28). Blood samples for the determination of total drug concentrations were collected from all animals at pre-dose and at various times throughout the 56 day in-life period. Concentrations of total human mAb in serum were determined using a qualified anti-human Fc enzyme-linked immunosorbent assay (ELISA). The PK parameters were estimated using noncompartmental analysis (NCA). Blood samples for pharmacodynamics were collected at various time points throughout the course of the study and analyzed using standard clinical chemistry (Beckman Coulter AU680 analyzer) and hematology (Avida 120 analyzer) analyses. Serum hepcidin was measured using the commercially available Hepcidin Murine-Compete ELISA kit (Intrinsic Lifesciences, Cat: HMC-001, Lot: 08232019) according to the manufacturers' instructions.

TABLE 28

Summary of Doses and Dose Groups

| Group No. | Test or Control Article | Dose Level (mg/kg) | Dose Volume (mL/kg) | Number of Animals |
|---|---|---|---|---|
| 1 | Isotype control antibody | 15 | 7.5 | 3 |
| 2 | REGN7999 | 5 | 2.5 | 3 |
| 3 | REGN7999 | 15 | 7.5 | 4 |
| 4 | REGN8023 | 5 | 2.5 | 3 |
| 5 | REGN8023 | 15 | 7.5 | 4 |

Note:
Results and discussion focus on PK/PD of REGN7999 and REGN8023 test articles (Groups 2 through 5) only.

The PK profile of anti-TMPRSS6 monoclonal antibodies (mAbs) REGN7999 or REGN8023 are described by non-linear kinetics, with target-mediated clearance (TMC) at low concentrations and linear, dose-proportional kinetics consistent with saturation of the target-mediated elimination pathway at high mAb concentrations. Following a single-dose IV administration, the concentration time profiles of total REGN7999 and REGN8023 were characterized by initial brief distribution phase, followed by a brief linear beta elimination phase, and at low concentrations, a terminal nonlinear target-mediated elimination phase and a post target-mediated elimination phase. No definitive evidence of anti-drug antibody-(ADA)-like impact on the profiles and no apparent impact on exposure were observed; thus, no concentration values were excluded from analysis.

Pharmacokinetic parameters are listed in Table 29. Following a single IV dose of 5 and 15 mg/kg of antibody, maximum serum concentration ($C_{max}$) values of about 120 and about 410 μg/mL, respectively, were observed for REGN7999, and $C_{max}$ values of about 162 and about 508, respectively, were observed for REGN8023. Corresponding dose-normalized $C_{max}$ ($C_{max}$/Dose) values were within about 1.4-fold, indicating a dose-proportional increase in $C_{max}$ with increasing IV dose for anti-TMPRSS6 mAbs REGN7999 and REGN8023. A mean $t_{max}$ (time required to reach $C_{max}$) of about 0.5 h, the first measured time point, was observed for all dose groups.

Exposure ($AUC_{inf}$) to REGN7999 increased greater than dose-proportionally, with $AUC_{inf}$/Dose following administration of 15 mg/kg REGN7999 about 1.6-fold greater than following the 5 mg/kg dose. Consistent with this, a greater total body clearance (CL) was observed at the 5 mg/kg dose due to a greater impact of TMC at lower concentrations. Exposure to REGN8023 increased proportionally with increasing dose, suggesting a more modest effect of TMC at the doses examined. The terminal half-life ($t_{1/2}$) representing TMC in all dose groups ranged between about 7-8 days.

TABLE 29

Mean Pharmacokinetic Parameters of Total REGN7999 and Total REGN8023
Following a Single Intravenous Bolus Administration to Female Cynomolgus Monkeys

|  |  | REGN7999 | | | | REGN8023 | | | |
|---|---|---|---|---|---|---|---|---|---|
|  |  | 5 mg/kg (n = 3) | | 15 mg/kg (n = 4) | | 5 mg/kg (n = 3) | | 15 mg/kg (n = 4) | |
| Parameter | Unit | Mean | SD | Mean | SD | Mean | SD | Mean | SD |
| $C_{max}$ | µg/mL | 120 | 7.57 | 410 | 47.2 | 162 | 16.2 | 508 | 55.0 |
| $C_{max}$/Dose | (µg/mL)/(mg/kg) | 23.9 | 1.51 | 27.3 | 3.15 | 32.5 | 3.24 | 33.9 | 3.66 |
| $t_{max}$ | h | 0.500 | 0 | 0.500 | 0 | 0.500 | 0 | 0.500 | 0 |
| $AUC_{inf}$ | day · (µg/mL) | 831 | 153 | 3950 | 617 | 1440 | 182 | 4500 | 951 |
| $AUC_{inf}$/Dose | day · (µg/mL)/(mg/kg) | 166 | 30.7 | 263 | 41.2 | 289 | 36.4 | 300 | 63.4 |
| CL | mL/day/kg | 6.17 | 1.25 | 3.88 | 0.680 | 3.50 | 0.446 | 3.46 | 0.792 |
| $V_{ss}$ | mL/kg | 57.2 | 1.31 | 57.6 | 6.65 | 37.7 | 2.41 | 42.8 | 7.02 |
| Terminal $t_{1/2}$ | day | 8.10 | 0.592 | 7.74 | 0.949 | 7.49 | 0.577 | 7.39 | 2.09 |

As shown in Table 30, the pharmacodynamic effects of REGN7999 and REGN8023 on serum hepcidin, serum iron, and transferrin saturation were followed over the course of the 57 day study. In groups treated with 5 mg/kg or 15 mg/kg REGN7999 or REGN8023, mean serum iron was reduced about 60% from baseline serum iron concentrations by Day 1 after dosing.

As shown in Table 31, transferrin saturation decreased to about 12% on Day 1 from about 35% at baseline, representing improvement in serum iron carrying capacity. The PD effect on Day 1 was independent of dose, suggesting saturation of TMPRSS6 binding at concentrations achieved on Day 1 at both low and high doses of REGN7999 and REGN8023. The reduction in serum iron and transferrin saturation was maintained through at least 6 weeks after REGN7999 dosing in both the 5 mg/kg and 15 mg/kg dose groups. In the 5 mg/kg REGN8023 dose group, the pharmacodynamic effect on serum iron began to return to baseline at approximately 1 week following IV administration and was not statistically different from isotype control treatment by week 4. In the 15 mg/kg REGN8023 dose group, the pharmacodynamic effects had a longer duration than in the 5 mg/kg REGN8023 group due to sustained higher drug concentrations. Both serum iron and transferrin saturation returned to approximately baseline values in most animals by Day 57.

As shown in Table 32, serum hepcidin concentrations increased slightly following dosing of REGN7999 or REGN8023, though large inter-animal variability was observed.

TABLE 30

Pharmacodynamics, mean (+/− SD) values for serum iron

| | % Change in Serum Iron vs. Baseline | | |
|---|---|---|---|
| Dose Group: | Day 1 | Day 29 | Day 57 |
| Isotype Control Antibody (15 mg/kg) | −17.1 ± 18.0 | −22.9 ± 6.8 | −13.0 ± 9.6 |
| REGN7999 (5 mg/kg) | −62.7 ± 4.8 **** | −62.5 ± 2.9 *** | −31.6 ± 11.3 |
| REGN7999 (15 mg/kg) | −65.0 ± 9.6 **** | −67.2 ± 4.9 **** | −30.9 ± 20.6 |
| REGN8023 (5 mg/kg) | −59.9 ± 7.3 *** | −41.4 ± 14.7 | −16.4 ± 15.7 |
| REGN8023 (15 mg/kg) | −62.7 ± 8.4 **** | −69.9 ± 11.5 **** | −39.0 ± 19.3* |

TABLE 31

Pharmacodynamics, mean (+/− SD) values transferrin saturation

| | Transferrin Saturation (%) | | | |
|---|---|---|---|---|
| Dose Group: | Baseline (Day 0) | Day 1 | Day 29 | Day 57 |
| Isotype Control Antibody (15 mg/kg) | 34.6 ± 8.7 | 27.3 ± 9.2 | 24.5 ± 3.6 | 20.1 ± 0.4 |
| REGN7999 (5 mg/kg) | 34.9 ± 9.8 | 12.5 ± 4.8 *** | 11.3 ± 2.4 ** | 18.8 ± 0.4 |
| REGN7999 (15 mg/kg) | 34.1 ± 1.8 | 12.3 ± 4.8 *** | 10.4 ± 2.8 *** | 17.3 ± 0.5 |
| REGN8023 (5 mg/kg) | 32.0 ± 3.4 | 12.9 ± 4.2 ** | 16.9 ± 3.8 | 15.8 ± 0.4 |
| REGN8023 (15 mg/kg) | 29.3 ± 7.7 | 11.7 ± 3.2 *** | 9.1 ± 4.4 *** | 14.3 ± 0.5 |

TABLE 32

Pharmacodynamics, mean (+/− SD) values for serum hepcidin

| Dose Group: | % Change in Serum Hepcidin vs. Baseline | | |
|---|---|---|---|
| | Day 1 | Day 29 | Day 57 |
| Isotype Control Antibody (15 mg/kg) | −19.5 | −36.4 | −37.2 |
| REGN7999 (5 mg/kg) | 261.1 | −32.1 | −10.7 |
| REGN7999 (15 mg/kg) | 162.7** | 50.4 | 4 |
| REGN8023 (5 mg/kg) | 52.2 | −42.5 | −18.8 |
| REGN8023 (15 mg/kg) | 132.2 | 7.9 | −34.0 |

All values are mean ± SD, n = 3-4 per group.
Statistics-two way ANOVA with Dunnett's;
*p < .05 vs. isotype
**p < .01 vs. isotype control;
***p < .001 vs. isotype control;
****p < .0001 vs. isotype control Example 15: Effect of REGN7999 on Anaerobic Capacity in Mouse Model of Beta Thalassemia The effect of REGN7999 treatment on anaerobic capacity in a murine model of beta thalassemia was evaluated.

Mice were generated with a heterozygous deletion of β1 and β2 genes, which recapitulate beta thalassemia intermedia in humans (Ginzburg, *Blood* (2011) 118 (16): 4321-4330), and homozygous expression of human hemojuvelin (HJV) in place of mouse HJV (referred to as $Hbb^{th3/+}$ x $HJV^{HumIn}$) in a C57BL/6/129S6 background. $Hbb^{th3/+}$ x $HJV^{HumIn}$ mice (Example 12 for further details on the generation of these mice).

REGN7999 treatment in $Hbb^{th3/+}$ mice appears to lead to an increase in red blood cells that appear smaller, healthier, and have a slower turnover (see, e.g. Example 13). However, it was not known whether this would translate to a functional improvement of red blood cells after REGN7999 treatment. For example, it was not known whether these smaller but healthier red blood cells are able deliver sufficient oxygen under anaerobic conditions, such as during exhaustion running.

To test this, $Hbb^{th3/+}$ mice were subjected to forced running studies (see study plan depicted in FIG. 1). Prior to all experiments, mice were trained for 2 weeks on the belt of a six-lane motorized treadmill (Series 8 Treadmill, IITC Life Science) supplied with shocker plates. For the exhaustion run, base speed (10 m/min) was increased every 5 min by 5 m/min. The maximum amount of distance was determined at 60 min. Mice that either remained inactive on the shocker unit or received 500 shocks were removed from the treadmill.

Figure 2A:
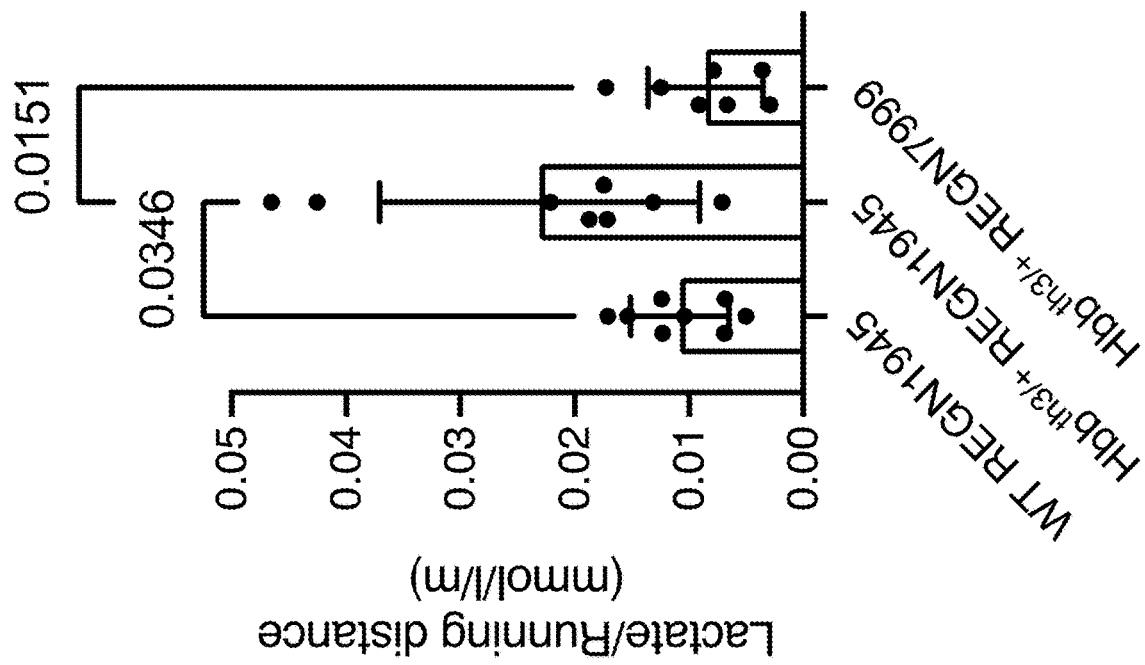
FIGS. 2A-2B show the effect of REGN7999 treatment on running distance (FIG. 2A) and lactate production over running distance (FIG. 2B) in $Hbb^{th3/+}$ mice. Control animals are wild-type (WT) C57BL/6 mice or $Hbb^{th3/+}$ mice treated with isotype control antibody (REGN1945). Note: All figure data presented as Mean±Standard Deviation (SD); P<0.05 indicate statistically significant differences under One-Way ANOVA and Tukey post-hoc multiple comparison test.
Figure 3:
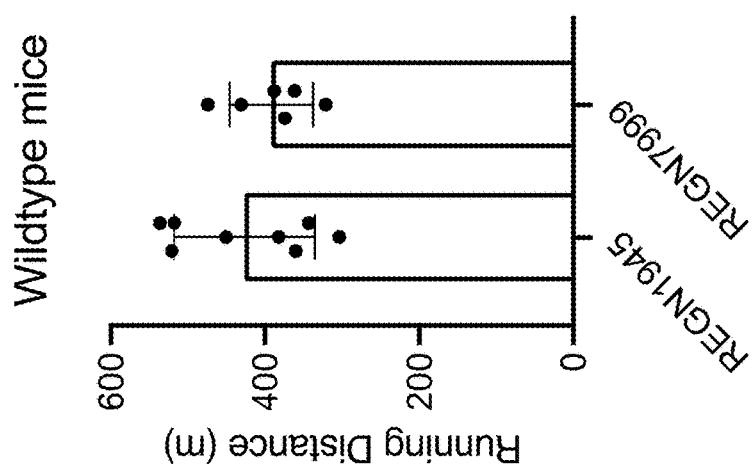
FIG. 3 shows the running distance of wild-type (WT) C57BL/6 mice treated with either REGN7999 or isotype control antibody (REGN1945).

$Hbb^{th3/+}$ mice were observed to run significantly less distance than wild-type C57BL/6 mice treated with isotype control antibody (REGN1945), suggesting these mice were faster exhausted (FIG. 2A). $Hbb^{th3/+}$ mice treated with 10 mg/kg REGN7999 were able to run a similar distance as wild-type animals (FIG. 2A), indicating that the improvement of red blood cell health observed with REGN7999 treatment is reflected in improved anaerobic capacity. Wild-type C57BL/6 mice injected with REGN7999 showed no difference in running distance compared to isotype treated mice, indicating that REGN7999 does not improve running capacity in non-$Hbb^{th3/+}$ mice (FIG. 3).

Figure 2B:
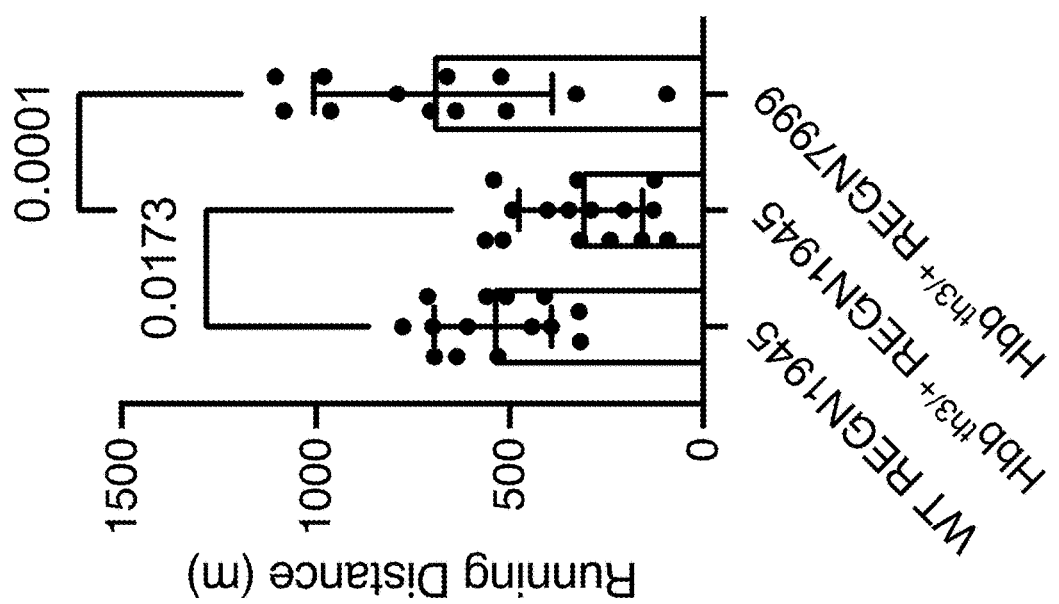

Lactate measurements were also collected. To determine lactate production, 15 mL blood was collected from the tail-vein after the exhaustion run. Lactate levels were determined by using a lactometer (Nova Biomedical) as described in Summermatter et al. *Proc Natl Acad Sci USA*. 2013; 110 (21): 8738-43. Control $Hbb^{th3/+}$ mice produced more blood lactate despite running less distance than $Hbb^{th3/+}$ mice treated with REGN7999, further suggesting improved red blood cell health (FIG. 2B).

Example 16: Effects of REGN7999 and Acvr2b (L79D)-Fc on Hepatic Iron and Erythropoiesis Effectiveness Acvr2b (L79D)-Fc has been shown to improve ineffective erythropoiesis and increase hemoglobin in mice and humans (see, e.g., Cappellini et al. *N Engl J Med*. 2020; 382 (13): 1219-31; Suragani et al. *Blood*. 2014; 123 (25): 3864-72). As shown herein, blockade of TMPRSS6 with REGN7999 appears to improve ineffective erythropoiesis and leads to more and healthier red blood cells. The effect of REGN7999 treatment on hepatic iron and erythropoiesis effectiveness was evaluated and compared to treatment with Acvr2b (L79D)-Fc in a mouse model of of beta thalassemia.

Figure 4:
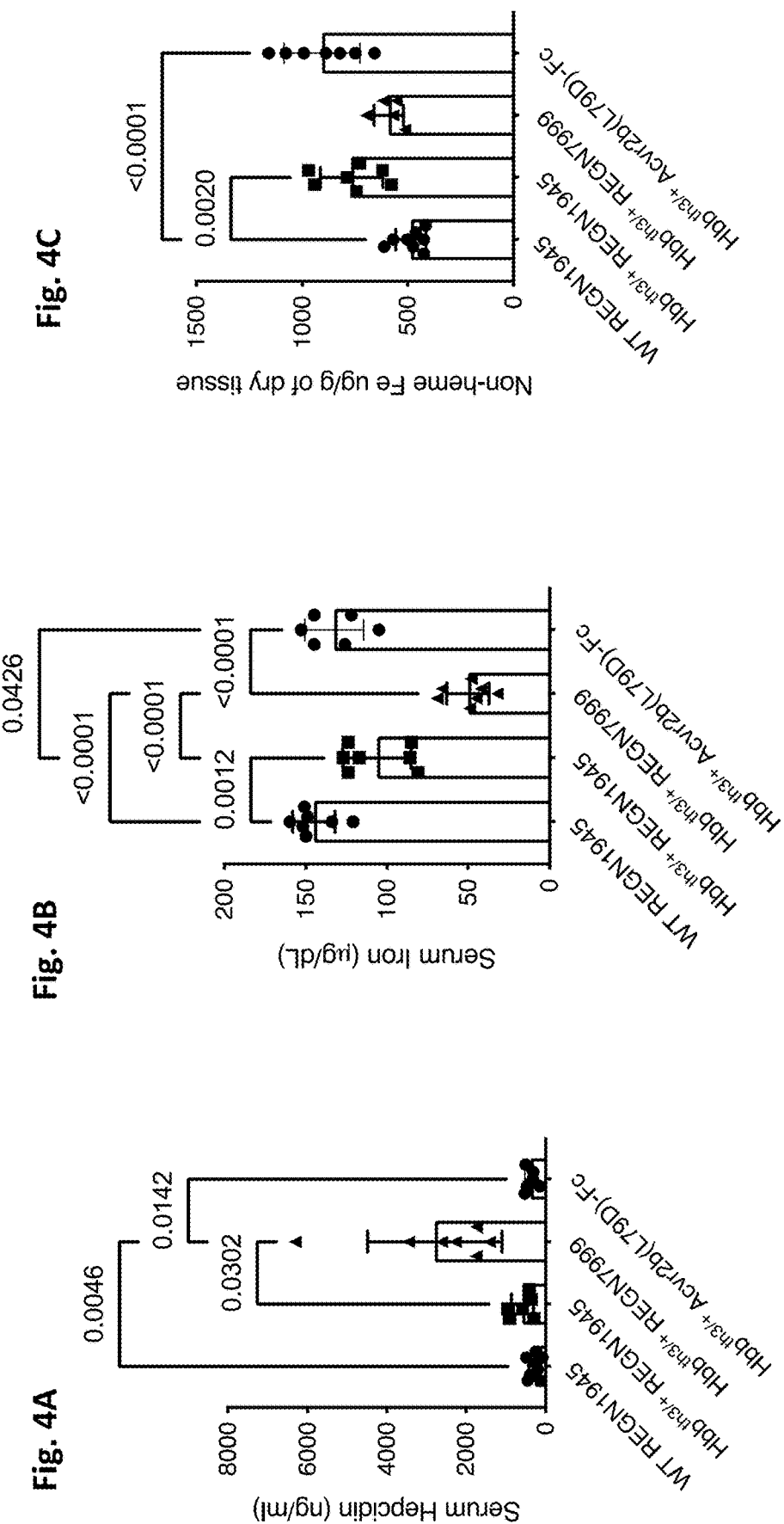
FIGS. 4A-4C show the levels of serum hepcidin (FIG. 4A), serum iron (FIG. 4B), and liver iron content (FIG. 4C) in $Hbb^{th3/+}$ mice treated for 8 weeks with either REGN7999 or Acvr2b (L79D)-Fc. Control animals are wild-type (WT) C57BL/6 mice or $Hbb^{th3/+}$ mice treated with isotype control antibody (REGN1945).
Figure 5:
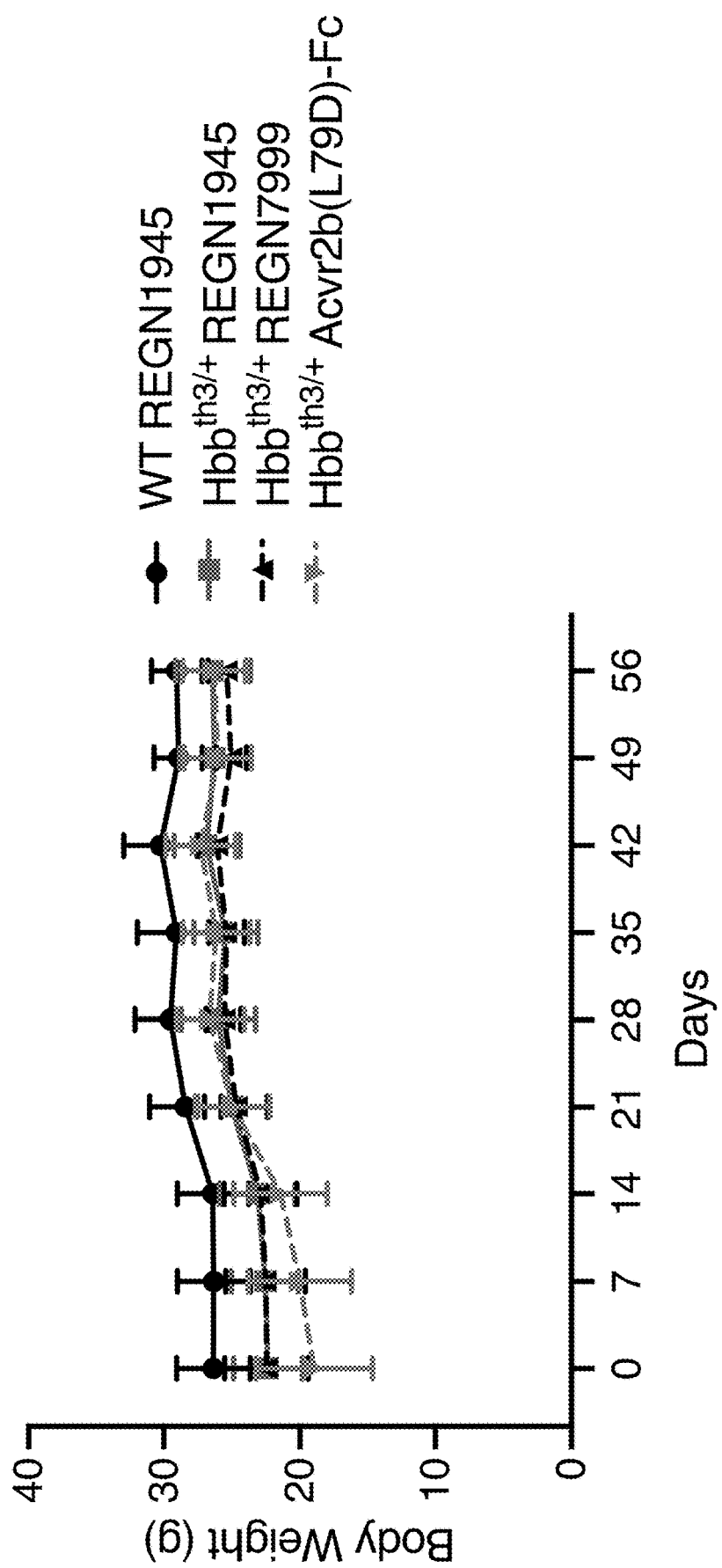
FIG. 5 shows the mean body weight (g) of WT or $Hbb^{th3/+}$ mice after 8 weeks of treatment with REGN7999, Acvr2b (L79D)-Fc, or isotype control antibody (REGN1945). WT mice treated with isotype control: circles, black solid line. $Hbb^{th3/+}$ mice treated with isotype control: squares, gray solid line. $Hbb^{th3/+}$ mice treated with REGN7999: triangles (up), black dotted line. $Hbb^{th3/+}$ mice treated with Acvr2b (L79D)-Fc: triangles (down), gray dotted line.
Figure 6:
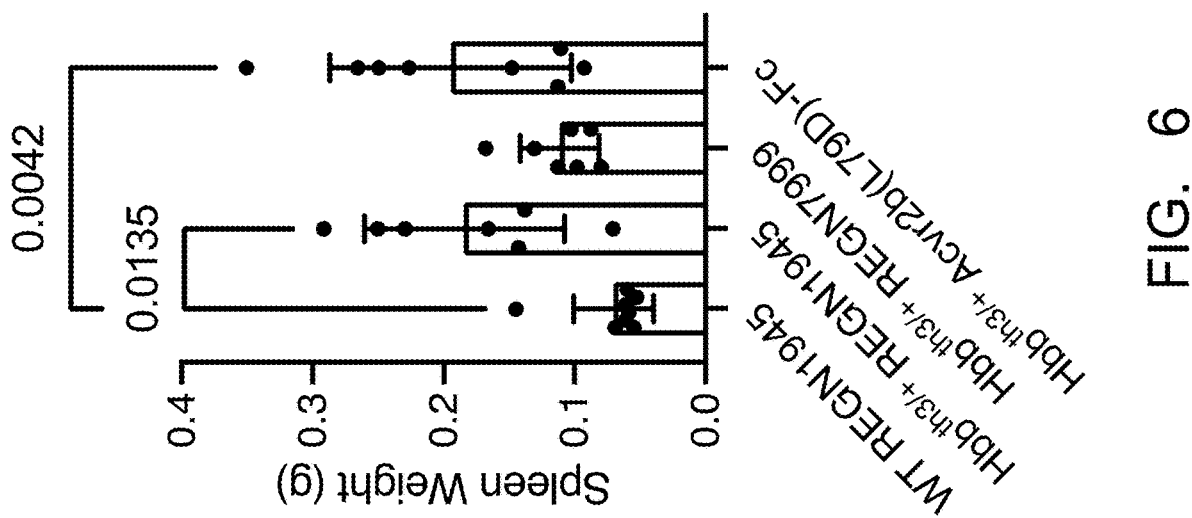
FIG. 6 shows the mean spleen weight (g) of WT or $Hbb^{th3/+}$ mice after 8 weeks of treatment with REGN7999, Acvr2b (L79D)-Fc, or isotype control antibody (REGN1945).

To compare the effects of REGN7999 treatment (10 mg/kg) and Acvr2b (L79D)-Fc treatment (10 mg/kg), $Hbb^{th3/+}$ mice were administered one of the two molecules for 8 weeks. Serum hepcidin, serum iron, and liver iron content were measured as described in Example 10. After 8 weeks of treatment with either molecule, it was observed that REGN7999 treatment increased serum hepcidin, reduced serum iron, and liver iron content, but Acvr2b (L79D)-Fc treatment had no effect on these parameters (FIGS. 4A-C). Acvr2b (L79D)-Fc elevated body weights but had no effect on liver weight (FIG. 5). REGN7999 treatment was shown to reduce spleen weight, but Acvr2b (L79D)-Fc treatment did not (FIG. 6). $Hbb^{th3/+}$ control mice have significant splenomegaly, which was reversed in part by treatment with REGN7999. Acvr2b (L79D)-Fc treatment did not provide any change in the $Hbb^{th3/+}$ mice splenomegaly.

A blood count panel was also collected from the treated animals. As seen in the previous examples, the blood count panel shows that REGN7999 treatment increases red blood cell count significantly in $Hbb^{th3/+}$ mice (Table 33). Acvr2b (L79D)-Fc treatment increased hemoglobin significantly, but not red blood cell count compared to $Hbb^{th3/+}$ controls. REGN7999 treatment however showed a significant increase of RBC count (Table 33).

Flow cytometry was used to confirm this finding. Isolated red blood cells from spleens or bone marrow were incubated with murine Fc-blocker (anti-CD16/32, BD Biosciences) for 10 minutes followed by incubation with fluorescein isothiocyanate (FITC) anti-Ter119, phycoerythrin (PE) anti-CD71, allophyocyanine (APC) anti-CD44 and an APC-cyanine7 (APC-Cy7) anti-CD45/CD11b/Ly6G cocktail for 30 minutes (all antibodies BD Biosciences). To exclude dead cells from the analysis, the cells were stained with Sytox AADvanced for 30 minutes (Thermofisher). All staining procedures were performed on ice. Compensation controls were performed using OneComp Beads (Invitrogen) and prepared at the time of cell staining. A minus-One control panel was prepared for correct gating of target populations. All samples were measured on a CytoFLEX Flow Cytometer (Beckman-Coulter).

Figure 7:
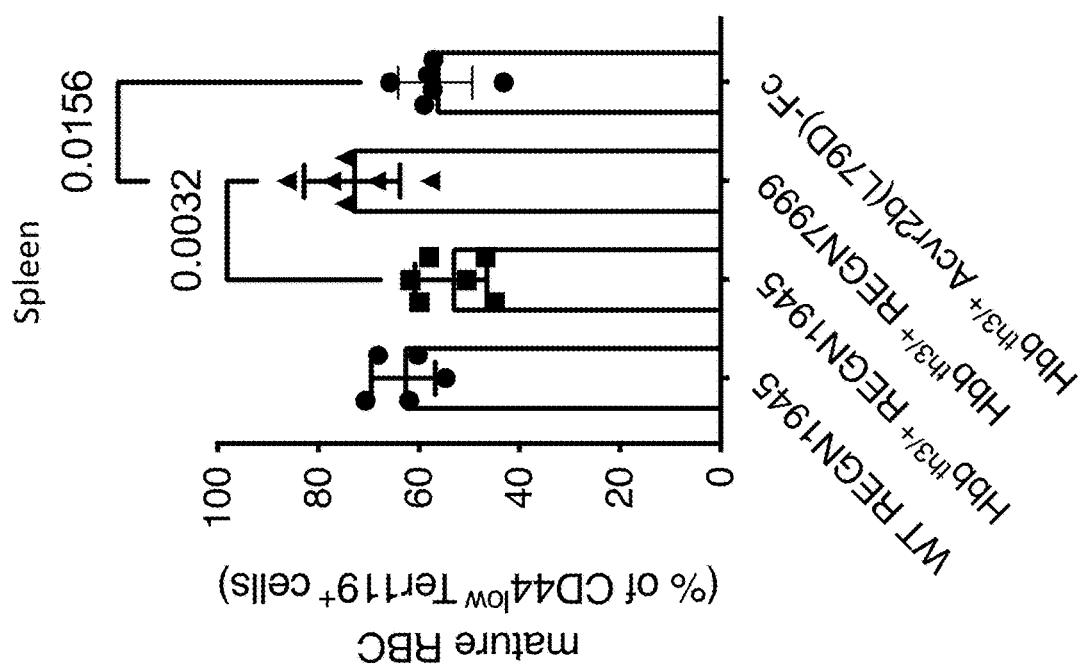
FIG. 7 shows the amount of splenic mature RBC (% $CD44^{low}Ter119^+$ cells) from WT or $Hbb^{th3/+}$ mice after 8 weeks of treatment with REGN7999, Acvr2b (L79D)-Fc, or isotype control antibody (REGN1945).
Figure 8:
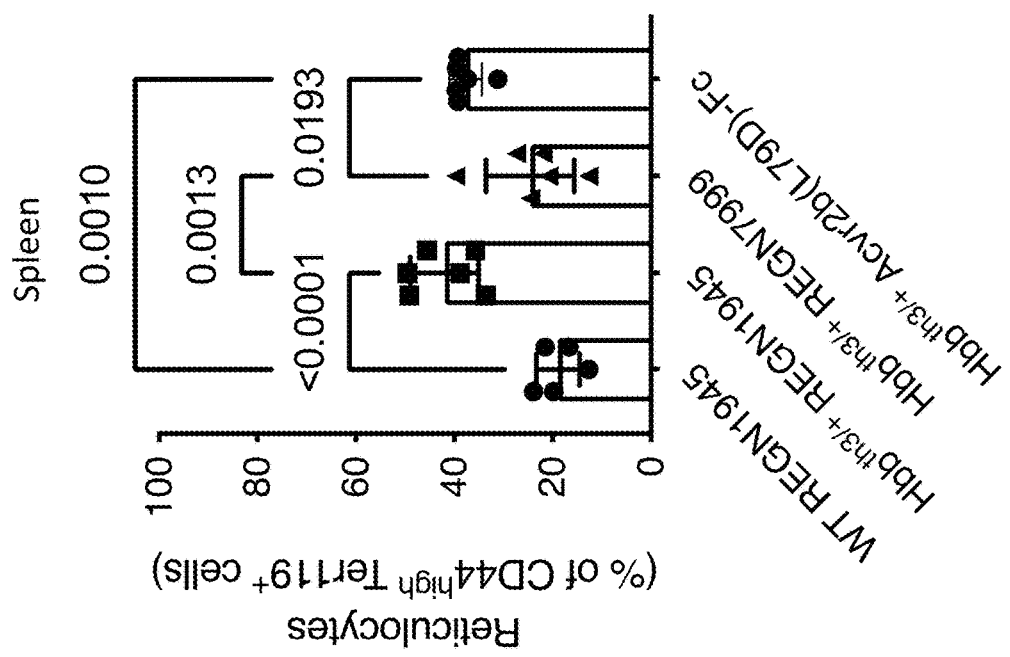
FIG. 8 shows the amount of reticulocytes (% $CD44^{high}Ter119^+$ cells) from WT or $Hbb^{th3/+}$ mice after 8 weeks of treatment with REGN7999, Acvr2b (L79D)-Fc, or isotype control antibody (REGN1945).

The flow cytometry data showed increased splenic mature red blood cells only in REGN7999 treated mice, but not in Acvr2b (L79D)-Fc treated mice (FIG. 7). REGN7999 treatment also showed a reduction in reticulocytes, which was not observed with Acvr2b (L79D)-Fc treatment (FIG. 8).

TABLE 33

Blood count panel of Hbb$^{th3/+}$ mice treated with REGN7999 or Acvr2b L79D)-Fc

| Group<br>n | WT<br>REGN1945<br>7 | Hbb$^{th3/+}$<br>REGN1945<br>7 | Hbb$^{th3/+}$<br>REGN7999<br>6 | Hbb$^{th3/+}$<br>Acvr2b(L79D)-Fc<br>6 |
|---|---|---|---|---|
| Red blood cells (M/μL) | 10.25 ± 0.52 | 9.82 ± 1.47 | 11.65 ± 0.44** | 11.08 ± 1.19 |
| Reticulocytes (% of RBC) | 0.001 ± 0.004 | 0.26 ± 0.41 | 0.00 ± 0.00 | 0.09 ± 0.21 |
| Hematocrit (%) | 42.64 ± 3.65 | 30.90 ± 3.95* | 30.58 ± 1.76 | 31.82 ± 4.29 |
| Hemoglobin (g/dL) | 14.26 ± 0.63 | 10.11 ± 1.23* | 10.37 ± 0.39 | 11.82 ± 1.24** |
| Mean Corpuscular Volume (fL) | 41.7 ± 1.27 | 31.63 ± 2.55* | 26.25 ± 0.83** | 31.35 ± 2.09*** |

SEQUENCES

TABLE 34

Exemplary DNA and protein (PRT) sequences of the disclosure

| SEQ ID NO: | DNA/PRT sequence | Sequence |
|---|---|---|
| 1 | DNA | CAGGTGCAGCTGGTGGAGTCTGGGGGAGGCGTGGTCCAGCCTGGGAGGTCCCTGAGACTCTCCTGTGCAGCCTCTGGATTCACCTTCAATAACTATGGCATGCACTGGGTCCGCCAGGCTCCAGGCAAGGGGCTGGAGTGGGTGGCAATTATATCATATGATGGAAGTAATGAATATTATTCAGACTCCGTGAAGGGCCGATTCACCATCTCCAGAGACAATTCCAAGAACACGCTGTATCTTCAAATGAACAGCCTGAGAGCTGAGGACACGGCTGTATATTACTGTGCGAGAGATCAGGACTACGGTGGTAACCTCTTTCATTACTGGGGCCAGGGAACCCTGGTCACTGTCTCCTCA |
| 2 | PRT | QVQLVESGGGVVQPGRSLRLSCAASGFTFNNYGMHWVRQAPGKGLEWVAIISYDGSNEYYSDSVKGRFTISRDNSKNTLYLQMNSLRAEDTAVYYCARDQDYGGNLFHYWGQGTLVTVSS |
| 3 | DNA | GGATTCACCTTCAATAACTATGGC |
| 4 | PRT | GFTFNNYG |
| 5 | DNA | ATATCATATGATGGAAGTAATGAA |
| 6 | PRT | ISYDGSNE |
| 7 | DNA | GCGAGAGATCAGGACTACGGTGGTAACCTCTTTCATTAC |
| 8 | PRT | ARDQDYGGNLFHY |
| 9 | DNA | GACATCCAGATGACCCAGTCTCCATCCTCCCTGTCTGCATCTGTAGGAGACAGAGTCACCATCACTTGCCGGGCAAGTCAGAGCATTAGCAGCTATTTAAATTGGTATCAGCAGAAACCAGGGAAAGCCCCTAAGCTCCTGATCTATGCTGCATCCAGTTTGCAAAGTGGGGTCCCGTCAAGGTTCAGTGGCAGTGGATCTGGGACAGATTTCACTCTCACCATCAGCAGTCTGCAACCTGAAGATTTTGCAACTTACTACTGTCAACAGAGTTACAGTACCCCTCCGATCACCTTCGGCCAAGGGACACGACTGGAGATTAAA |
| 10 | PRT | DIQMTQSPSSLSASVGDRVTTTCRASQSTSSYLNWYQQKPGKAPKLLTYAASSLQSGVPSRFSGSGSGTDFTLTTSSLQPEDFATYYCQQSYSTPPTTFGQGTRLETK |
| 11 | DNA | CAGAGCATTAGCAGCTAT |
| 12 | PRT | QSISSY |
| 13 | DNA | GCTGCATCC |
| 14 | PRT | AAS |
| 15 | DNA | CAACAGAGTTACAGTACCCCTCCGATCACC |
| 16 | PRT | QQSYSTPPIT |
| 17 | DNA | CAGGTGCAGCTGGTGGAGTCTGGGGGAGGCGTGGTCCAGCCTGGGAGGTCCCTGAGACTCTCCTGTGCAGCCTCTGGATTCACCTTCAATAACTATGGCATGCACTGGGTCCGCCAGGCTCCAGGCAAGGGGCTGGAGTGGGTGGCAATTATATCATATGATGGAAGTAATGAATATTATTCAGACTCCGTGAAGGGCCGATTCACCATCTCCAGAGACAATTCCAAGAACACGCTGTATCTTCAAATGAACAGCCTGAGAGCTGAGGACACGGCTGTATATTACTGTGCGAGAGATCAGGACTACGGTGGTAACCTCTTTCATTACTGGGGCCAGGGAACCCTGGTCACTGTCTCCTCAGCCTCCACCAAGGGCCCATCGGTCTTCCCCCTGGCGCCCTGCTCCAGGAGCACCTCCGAGAGCACAGCCGCCCTGGGCTGCCTGGTCAAGGACTACTTCCCCGAACCGGTGACGGTGTCGTGGAACTCAGGCGCCCTGACCAGCGGCGTGCACACCTTCCCGGCTGTCCTACAGTCCTCAGGACTCTACTCCCTCAGCAGCGTGGTGACCGTGCCCTCCAGCAGCTTGGGCACGAAGACCTACACCTGCAACGTAGATCACAAGCCCAGCAACACCAAGGTGGACAAGAGAGTTGAGTCCAAATATGGTCCCCCATGCCCACCCTGCCCAGCACCTGAGTTCCTGGGGGGACCATCAGTCTTCCTGTTCCCCCCAAAACCCAAGGACACTCTCATGATCTCCCGGACCCCTGAGGTCACGTGCGTGGTGGTGGACGTGAGCCAGGAAGACCCCGAGGTCCAGTTCAACTGGTACGTGGATGGCGTGGAGGTGCATAATGCCAAGACAAAGCCGCGGGAGGAGCAGTTCAACAGCACGTACCGTGTGGTCAGCGTCCTCACCGTCCTGCACCAGGACTGGCTGAACGGCAAGGAGTACAAGTGCAAGGTCTCCAAC |

TABLE 34-continued

Exemplary DNA and protein (PRT) sequences of the disclosure

| SEQ ID NO: | DNA/PRT sequence | Sequence |
|---|---|---|
| | | AAAGGCCTCCCGTCCTCCATCGAGA AAACCATCTCCAAAGCCAAAGGGCA GCCCCGAGAGCCACAGGTGTACACC CTGCCCCCATCCCAGGAGGAGATGA CCAAGAACCAGGTCAGCCTGACCTG CCTGGTCAAAGGCTTCTACCCCAGC GACATCGCCGTGGAGTGGGAGAGCA ATGGGCAGCCGGAGAACAACTACAA GACCACGCCTCCCGTGCTGGACTCC GACGGCTCCTTCTTCCTCTACAGCA GGCTCACCGTGGACAAGAGCAGGTG GCAGGAGGGGAATGTCTTCTCATGC TCCGTGATGCATGAGGCTCTGCACA ACCACTACACACAGAAGTCCCTCTC CCTGTCTCTGGGTAAATGA |
| 18 | PRT | QVQLVESGGGVVQPGRSLRLSCAAS GFTFNNYGMHWVRQAPGKGLEWVAI ISYDGSNEYYSDVKGRFTISRDNS KNTLYLQMNSLRAEDTAVYYCARDQ DYGGNLFHYWGQGTLVTVSSASTKG PSVFPLAPCSRSTSESTAALGCLVK DYFPEPVTVSWNSGALTSGVHTFPA VLQSSGLYSLSSVVTVPSSSLGTKT YTCNVDHKPSNTKVDKRVESKYGPP CPPCPAPEFLGGPSVFLFPPKPKDT LMISRTPEVTCVVVDVSQEDPEVQF NWYVDGVEVHNAKTKPREEQFNSTY RVVSVLTVLHQDWLNGKEYKCKVSN KGLPSSIEKTISKAKGQPREPQVYT LPPSQEEMTKNQVSLTCLVKGFYPS DIAVEWESNGQPENNYKTTPPVLDS DGSFFLYSRLTVDKSRWQEGNVFSC SVMHEALHNHYTQKSLSLSLGK* |
| 19 | DNA | GACATCCAGATGACCCAGTCTCCAT CCTCCCTGTCTGCATCTGTAGGAGA CAGAGTCACCATCACTTGCCGGGCA AGTCAGAGCATTAGCAGCTATTTAA ATTGGTATCAGCAGAAACCAGGGAA AGCCCCTAAGCTCCTGATCTATGCT GCATCCAGTTTGCAAAGTGGGGTCC CGTCAAGGTTCAGTGGCAGTGGATC TGGGACAGATTTCACTCTCACCATC AGCAGTCTGCAACCTGAAGATTTTG CAACTTACTACTGTCAACAGAGTTA CAGTACCCCTCCGATCACCTTCGGC CAAGGGACACGACTGGAGATTAAAC GAACTGTGGCTGCACCATCTGTCTT CATCTTCCCGCCATCTGATGAGCAG TTGAAATCTGGAACTGCCTCTGTTG TGTGCCTGCTGAATAACTTCTATCC CAGAGAGGCCAAAGTACAGTGGAAG GTGGATAACGCCCTCCAATCGGGTA ACTCCCAGGAGAGTGTCACAGAGCA GGACAGCAAGGACAGCACCTACAGC CTCAGCAGCACCCTGACGCTGAGCA AAGCAGACTACGAGAAACACAAAGT CTACGCCTGCGAAGTCACCCATCAG GGCCTGAGCTCGCCCGTCACAAAGA GCTTCAACAGGGGAGAGTGTTAG |
| 20 | PRT | DIQMTQSPSSLSASVGDRVTITCRA SQSISSYLNWYQQKPGKAPKLLIYA ASSLQSGVPSRFSGSGSGTDFTLTI SSLQPEDFATYYCQQSYSTPPITFG QGTRLEIKRTVAAPSVFIFPPSDEQ LKSGTASVVCLLNNFYPREAKVQWK VDNALQSGNSQESVTEQDSKDSTYS LSSTLTLSKADYEKHKVYACEVTHQ GLSSPVTKSFNRGEC* |
| 21 | DNA | CAGGTGCAGCTGGTGGAGTCTGGGG GAGGCGTGGTCCAGCCTGGGAGGTC CCTGAGACTCTCCTGTGCAGCCTCT GGATTCACCTTCAGTACCTATGGCA TGCACTGGGTCCGCCAGGCTCCAGG CAAGGGGCTGGAGTGGGTGGCAATT ATATCATATGATGGAAGTAATGACT ACTATTTAGACTCCGTGAAGGGCCG ATTCACCATCTCCAGAGACAATTCC AAGAACACGCTGTATCTGCAAATGA ACAACCTGAGAGCTGAGGACACGGC TGTGTATTACTGTGCGAAAGATCAG GGCTACGGTGGTAACCTCTTTGCCT CCTGGGGCCAGGGAACCCTGGTCAC CGTCTCCTCA |
| 22 | PRT | QVQLVESGGGVVQPGRSLRLSCAAS GFTFSTYGMHWVRQAPGKGLEWVAI ISYDGSNDYYLDSVKGRFTISRDNS KNTLYLQMNNLRAEDTAVYYCAKDQ GYGGNLFASWGQGTLVTVSS |
| 23 | DNA | GGATTCACCTTCAGTACCTATGGC |
| 24 | PRT | GFTFSTYG |
| 25 | DNA | ATATCATATGATGGAAGTAATGAC |
| 26 | PRT | ISYDGSND |
| 27 | DNA | GCGAAAGATCAGGGCTACGGTGGTA ACCTCTTTGCCTCC |
| 28 | PRT | AKDQGYGGNLFAS |
| 29 | DNA | CAGGTGCAGCTGGTGGAGTCTGGGG GAGGCGTGGTCCAGCCTGGGAGGTC CCTGAGACTCTCCTGTGCAGCCTCT GGATTCACCTTCAGTACCTATGGCA TGCACTGGGTCCGCCAGGCTCCAGG CAAGGGGCTGGAGTGGGTGGCAATT ATATCATATGATGGAAGTAATGACT ACTATTTAGACTCCGTGAAGGGCCG ATTCACCATCTCCAGAGACAATTCC AAGAACACGCTGTATCTGCAAATGA ACAACCTGAGAGCTGAGGACACGGC TGTGTATTACTGTGCGAAAGATCAG GGCTACGGTGGTAACCTCTTTGCCT CCTGGGGCCAGGGAACCCTGGTCAC CGTCTCCTCAGCCTCCACCAAGGGC CCATCGGTCTTCCCCCTGGCGCCCT GCTCCAGGAGCACCTCCGAGAGCAC AGCCGCCCTGGGCTGCCTGGTCAAG GACTACTTCCCCGAACCGGTGACGG TGTCGTGGAACTCAGGCGCCCTGAC CAGCGGCGTGCACACCTTCCCGGCT GTCCTACAGTCCTCAGGACTCTACT CCCTCAGCAGCGTGGTGACCGTGCC CTCCAGCAGCTTGGGCACGAAGACC TACACCTGCAACGTAGATCACAAGC CCAGCAACACCAAGGTGGACAAGAG AGTTGAGTCCAAATATGGTCCCCCA TGCCCACCCTGCCCAGCACCTGAGT TCCTGGGGGGACCATCAGTCTTCCT GTTCCCCCCAAAACCCAAGGACACT CTCATGATCTCCCGGACCCCTGAGG TCACGTGCGTGGTGGTGGACGTGAG CCAGGAAGACCCCGAGGTCCAGTTC AACTGGTACGTGGATGGCGTGGAGG TGCATAATGCCAAGACAAAGCCGCG GGAGGAGCAGTTCAACAGCACGTAC CGTGTGGTCAGCGTCCTCACCGTCC TGCACCAGGACTGGCTGAACGGCAA GGAGTACAAGTGCAAGGTCTCCAAC AAAGGCCTCCCGTCCTCCATCGAGA AAACCATCTCCAAAGCCAAAGGGCA |

TABLE 34-continued

Exemplary DNA and protein (PRT) sequences of the disclosure

| SEQ ID NO: | DNA/PRT sequence | Sequence |
|---|---|---|
|  |  | GCCCCGAGAGCCACAGGTGTACACC CTGCCCCCATCCCAGGAGGAGATGA CCAAGAACCAGGTCAGCCTGACCTG CCTGGTCAAAGGCTTCTACCCCAGC GACATCGCCGTGGAGTGGGAGAGCA ATGGGCAGCCGGAGAACAACTACAA GACCACGCCTCCCGTGCTGGACTCC GACGGCTCCTTCTTCCTCTACAGCA GGCTCACCGTGGACAAGAGCAGGTG GCAGGAGGGGAATGTCTTCTCATGC TCCGTGATGCATGAGGCTCTGCACA ACCACTACACACAGAAGTCCCTCTC CCTGTCTCTGGGTAAATGA |
| 30 | PRT | QVQLVESGGGVVQPGRSLRLSCAAS GFTFSTYGMHWVRQAPGKGLEWVAI ISYDGSNDYYLDSVKGRFTISRDNS KNTLYLQMNNLRAEDTAVYYCAKDQ GYGGNLFASWGQGTLVTVSSASTKG PSVFPLAPCSRSTSESTAALGCLVK DYFPEPVTVSWNSGALTSGVHTFPA VLQSSGLYSLSSVVTVPSSSLGTKT YTCNVDHKPSNTKVDKRVESKYGPP CPPCPAPEFLGGPSVFLFPPKPKDT LMISRTPEVTCVVVDVSQEDPEVQF NWYVDGVEVHNAKTKPREEQFNSTY RVVSVLTVLHQDWLNGKEYKCKVSN KGLPSSIEKTISKAKGQPREPQVYT LPPSQEEMTKNQVSLTCLVKGFYPS DIAVEWESNGQPENNYKTTPPVLDS DGSFFLYSRLTVDKSRWQEGNVFSC SVMHEALHNHYTQKSLSLSLGK* |
| 31 | DNA | GAGGTGCAGCTGGTGGAGTCTGGGG GAGGCTTGGTAAAGCCGGGGGGGTC CCTTAGACTCTCCTGTGCAGCCTCT GGATTCACTTTCAGTAACGCCTGGA TGAGCTGGGTCCGCCAGGCTCCAGG GAAGGGGCTGGAGTGGGTTGGCCGT ATTAAAAGCAAAACTGATAGTGGGA CAACAGACTACGCTGCACCCGTGAA AGGCAGATTCACCATCTCAAGAGAT GATTCAAAAAACACGCTGTATCTGC AAATGAACAGCCTGAAAACCGAGGA CACAGCCGTGTATTACTGTACCACA GTGGATAACGATTTTTGGAGTGGTT ATTATAACTGGTTCGACCCCTGGGG CCAGGGAACCCTGGTCACTGTCTCC TCA |
| 32 | PRT | EVQLVESGGGLVKPGGSLRLSCAAS GFTFSNAWMSWVRQAPGKGLEWVGR IKSKTDSGTTDYAAPVKGRFTISRD DSKNTLYLQMNSLKTEDTAVYYCTT VDNDFWSGYYNWFDPWGQGTLVTVS S |
| 33 | DNA | GGATTCACTTTCAGTAACGCCTGG |
| 34 | PRT | GFTFSNAW |
| 35 | DNA | ATTAAAAGCAAAACTGATAGTGGGA CAACA |
| 36 | PRT | IKSKTDSGTT |
| 37 | DNA | ACCACAGTGGATAACGATTTTTGGA GTGGTTATTATAACTGGTTCGACCC C |
| 38 | PRT | TTVDNDFWSGYYNWFDP |
| 39 | DNA | GAGGTGCAGCTGGTGGAGTCTGGGG GAGGCTTGGTAAAGCCGGGGGGGTC CCTTAGACTCTCCTGTGCAGCCTCT GGATTCACTTTCAGTAACGCCTGGA TGAGCTGGGTCCGCCAGGCTCCAGG GAAGGGGCTGGAGTGGGTTGGCCGT ATTAAAAGCAAAACTGATAGTGGGA CAACAGACTACGCTGCACCCGTGAA AGGCAGATTCACCATCTCAAGAGAT GATTCAAAAAACACGCTGTATCTGC AAATGAACAGCCTGAAAACCGAGGA CACAGCCGTGTATTACTGTACCACA GTGGATAACGATTTTTGGAGTGGTT ATTATAACTGGTTCGACCCCTGGGG CCAGGGAACCCTGGTCACTGTCTCC TCAGCCTCCACCAAGGGCCCATCGG TCTTCCCCCTGGCGCCCTGCTCCAG GAGCACCTCCGAGAGCACAGCCGCC CTGGGCTGCCTGGTCAAGGACTACT TCCCCGAACCGGTGACGGTGTCGTG GAACTCAGGCGCCCTGACCAGCGGC GTGCACACCTTCCCGGCTGTCCTAC AGTCCTCAGGACTCTACTCCCTCAG CAGCGTGGTGACCGTGCCCTCCAGC AGCTTGGGCACGAAGACCTACACCT GCAACGTAGATCACAAGCCCAGCAA CACCAAGGTGGACAAGAGAGTTGAG TCCAAATATGGTCCCCCATGCCCAC CCTGCCCAGCACCTGAGTTCCTGGG GGGACCATCAGTCTTCCTGTTCCCC CCAAAACCCAAGGACACTCTCATGA TCTCCCGGACCCCTGAGGTCACGTG CGTGGTGGTGGACGTGAGCCAGGAA GACCCCGAGGTCCAGTTCAACTGGT ACGTGGATGGCGTGGAGGTGCATAA TGCCAAGACAAAGCCGCGGGAGGAG CAGTTCAACAGCACGTACCGTGTGG TCAGCGTCCTCACCGTCCTGCACCA GGACTGGCTGAACGGCAAGGAGTAC AAGTGCAAGGTCTCCAACAAAGGCC TCCCGTCCTCCATCGAGAAAACCAT CTCCAAAGCCAAAGGGCAGCCCCGA GAGCCACAGGTGTACACCCTGCCCC CATCCCAGGAGGAGATGACCAAGAA CCAGGTCAGCCTGACCTGCCTGGTC AAAGGCTTCTACCCCAGCGACATCG CCGTGGAGTGGGAGAGCAATGGGCA GCCGGAGAACAACTACAAGACCACG CCTCCCGTGCTGGACTCCGACGGCT CCTTCTTCCTCTACAGCAGGCTCAC CGTGGACAAGAGCAGGTGGCAGGAG GGGAATGTCTTCTCATGCTCCGTGA TGCATGAGGCTCTGCACAACCACTA CACACAGAAGTCCCTCTCCCTGTCT CTGGGTAAATGA |
| 40 | PRT | EVQLVESGGGLVKPGGSLRLSCAAS GFTFSNAWMSWVRQAPGKGLEWVGR IKSKTDSGTTDYAAPVKGRFTISRD DSKNTLYLQMNSLKTEDTAVYYCTT VDNDFWSGYYNWFDPWGQGTLVTVS SASTKGPSVFPLAPCSRSTSESTAA LGCLVKDYFPEPVTVSWNSGALTSG VHTFPAVLQSSGLYSLSSWTVPSSS LGTKTYTCNVDHKPSNTKVDKRVES KYGPPCPPCPAPEFLGGPSVFLFPP KPKDTLMISRTPEVTCVVVDVSQED PEVQFNWYVDGVEVHNAKTKPREEQ FNSTYRVVSVLTVLHQDWLNGKEYK CKVSNKGLPSSIEKTISKAKGQPRE PQVYTLPPSQEEMTKNQVSLTCLVK GFYPSDIAVEWESNGQPENNYKTTP PVLDSDGSFFLYSRLTVDKSRWQEG NVFSCSVMHEALHNHYTQKSLSLSL GK* |

TABLE 34-continued

Exemplary DNA and protein (PRT) sequences of the disclosure

| SEQ ID NO: | DNA/PRT sequence | Sequence |
|---|---|---|
| 41 | DNA | GAAGTGCAGCTGGTGGAGTCTGGGG GAGGGCTTGGTTAAGCCTGGGGGGTC CCTGAGAATTTCCTGTGCAGCCTCT GGATTTATTTTTGTTGATTATGCCA TGCACTGGGTCCGGCAAGCTCCAGG GAAGGGCCTGGAGTGGGTCTCAGGT ATTAGTTGGAATAGTGGTAGTATAG GCTATGCGGACTCTGTGAAGGGCCG ATTCACCATCTCCAGAGACAACGCC AAGAAGTCCCTGTATCTGCAAATGA GTGGTCTGAGACCTGAGGACACGGC CTTGTATTATTGTGTAAAAAGTGGG TTCTATTACGTTAGGTCTTACTTTG ACAACTGGGGCCAGGGAACCCTGGT CACCGTCTCCTCA |
| 42 | PRT | EVQLVESGGGLVKPGGSLRISCAAS GFIFVDYAMHWVRQAPGKGLEWVSG ISWNSGSIGYADSVKGRFTISRDNA KKSLYLQMSGLRPEDTALYYCVKSG FYYVRSYFDNWGQGTLVTVSS |
| 43 | DNA | GGATTTATTTTTGTTGATTATGCC |
| 44 | PRT | GFIFVDYA |
| 45 | DNA | ATTAGTTGGAATAGTGGTAGTATA |
| 46 | PRT | ISWNSGSI |
| 47 | DNA | GTAAAAAGTGGGTTCTATTACGTTA GGTCTTACTTTGACAAC |
| 48 | PRT | VKSGFYYVRSYFDN |
| 49 | DNA | GATATTGTGATGACCCAGTCTCCAC TCTCCCTGCCCGTCACCCCTGGAGA GCCGGCCTCCATCTCCTGCAGGTCT AGTCAGAGCCTCTTGGATAGTGATG ATGGAAACACCTATTTGGACTGGTA CCTGCGGAAGCCAGGGCAGTCTCCA CAACTCCTGATCTATACGCTTTCCT ATCGGGCCTCTGGAGTCCCAGACAG GTTCAGTGGCAGTGGGTCAGGCACT GATTTCACACTGAAAATCAGTAGGG TGGAGGCTGACGATGTTGGAGTTTA TTACTGCATGCAACGTATAGAGTTT CCGCTCACTTTCGGCGGAGGGACCA AGGTGGAGATCAAA |
| 50 | PRT | DIVMTQSPLSLPVTPGEPASISCRS SQSLLDSDDGNTYLDWYLRKPGQSP QLLIYTLSYRASGVPDRFSGSGSGT DFTLKISRVEADDVGVYYCMQRIEF PLTFGGGTKVEIK |
| 51 | DNA | CAGAGCCTCTTGGATAGTGATGATG GAAACACCTAT |
| 52 | PRT | QSLLDSDDGNTY |
| 53 | DNA | ACGCTTTCC |
| 54 | PRT | TLS |
| 55 | DNA | ATGCAACGTATAGAGTTTCCGCTCA CT |
| 56 | PRT | MQRIEFPLT |
| 57 | DNA | GAAGTGCAGCTGGTGGAGTCTGGGG GAGGGCTTGGTTAAGCCTGGGGGGTC CCTGAGAATTTCCTGTGCAGCCTCT GGATTTATTTTTGTTGATTATGCCA TGCACTGGGTCCGGCAAGCTCCAGG GAAGGGCCTGGAGTGGGTCTCAGGT ATTAGTTGGAATAGTGGTAGTATAG GCTATGCGGACTCTGTGAAGGGCCG ATTCACCATCTCCAGAGACAACGCC AAGAAGTCCCTGTATCTGCAAATGA GTGGTCTGAGACCTGAGGACACGGC CTTGTATTATTGTGTAAAAAGTGGG TTCTATTACGTTAGGTCTTACTTTG ACAACTGGGGCCAGGGAACCCTGGT CACCGTCTCCTCAGCCTCCACCAAG GGCCCATCGGTCTTCCCCCTGGCGC CCTGCTCCAGGAGCACCTCCGAGAG CACAGCCGCCCTGGGCTGCCTGGTC AAGGACTACTTCCCCGAACCGGTGA CGGTGTCGTGGAACTCAGGCGCCCT GACCAGCGGCGTGCACACCTTCCCG GCTGTCCTACAGTCCTCAGGACTCT ACTCCCTCAGCAGCGTGGTGACCGT GCCCTCCAGCAGCTTGGGCACGAAG ACCTACACCTGCAACGTAGATCACA AGCCCAGCAACACCAAGGTGGACAA GAGAGTTGAGTCCAAATATGGTCCC CCATGCCCACCCTGCCCAGCACCTG AGTTCCTGGGGGGACCATCAGTCTT CCTGTTCCCCCCAAAACCCAAGGAC ACTCTCATGATCTCCCGGACCCCTG AGGTCACGTGCGTGGTGGTGGACGT GAGCCAGGAAGACCCCGAGGTCCAG TTCAACTGGTACGTGGATGGCGTGG AGGTGCATAATGCCAAGACAAAGCC GCGGGAGGAGCAGTTCAACAGCACG TACCGTGTGGTCAGCGTCCTCACCG TCCTGCACCAGGACTGGCTGAACGG CAAGGAGTACAAGTGCAAGGTCTCC AACAAAGGCCTCCCGTCCTCCATCG AGAAAACCATCTCCAAAGCCAAAGG GCAGCCCCGAGAGCCACAGGTGTAC ACCCTGCCCCCATCCCAGGAGGAGA TGACCAAGAACCAGGTCAGCCTGAC CTGCCTGGTCAAAGGCTTCTACCCC AGCGACATCGCCGTGGAGTGGGAGA GCAATGGGCAGCCGGAGAACAACTA CAAGACCACGCCTCCCGTGCTGGAC TCCGACGGCTCCTTCTTCCTCTACA GCAGGCTCACCGTGGACAAGAGCAG GTGGCAGGAGGGGAATGTCTTCTCA TGCTCCGTGATGCATGAGGCTCTGC ACAACCACTACACACAGAAGTCCCT CTCCCTGTCTCTGGGTAAATGA |
| 58 | PRT | EVQLVESGGGLVKPGGSLRISCAAS GFIFVDYAMHWVRQAPGKGLEWVSG ISWNSGSIGYADSVKGRFTISRDNA KKSLYLQMSGLRPEDTALYYCVKSG FYYVRSYFDNWGQGTLVTVSSASTK GPSVFPLAPCSRSTSESTAALGCLV KDYFPEPVTVSWNSGALTSGVHTFP AVLQSSGLYSLSSVVTVPSSSLGTK TYTCNVDHKPSNTKVDKRVESKYGP PCPPCPAPEFLGGPSVFLFPPKPKD TLMISRTPEVTCVVVDVSQEDPEVQ FNWYVDGVEVHNAKTKPREEQFNST YRVVSVLTVLHQDWLNGKEYKCKVS NKGLPSSIEKTISKAKGQPREPQVY TLPPSQEEMTKNQVSLTCLVKGFYP SDIAVEWESNGQPENNYKTTPPVLD SDGSFFLYSRLTVDKSRWQEGNVFS CSVMHEALHNHYTQKSLSLSLGK* |
| 59 | DNA | GATATTGTGATGACCCAGTCTCCAC TCTCCCTGCCCGTCACCCCTGGAGA GCCGGCCTCCATCTCCTGCAGGTCT AGTCAGAGCCTCTTGGATAGTGATG |

TABLE 34-continued

Exemplary DNA and protein (PRT) sequences of the disclosure

| SEQ ID NO: | DNA/PRT sequence | Sequence |
|---|---|---|
| | | ATGGAAACACCTATTTGGACTGGTA<br>CCTGCGGAAGCCAGGGCAGTCTCCA<br>CAACTCCTGATCTATACGCTTTCCT<br>ATCGGGCCTCTGGAGTCCCAGACAG<br>GTTCAGTGGCAGTGGGTCAGGCACT<br>GATTTCACACTGAAATCAGTAGGG<br>TGGAGGCTGACGATGTTGGAGTTTA<br>TTACTGCATGCAACGTATAGAGTTT<br>CCGCTCACTTTCGGCGGAGGGACCA<br>AGGTGGAGATCAAACGAACTGTGGC<br>TGCCACCATCTGTCTTCATCTTCCCG<br>CCATCTGATGAGCAGTTGAAATCTG<br>GAACTGCCTCTGTTGTGTGCCTGCT<br>GAATAACTTCTATCCCAGAGAGGCC<br>AAAGTACAGTGGAAGGTGGATAACG<br>CCCTCCAATCGGGTAACTCCCAGGA<br>GAGTGTCACAGAGCAGGACAGCAAG<br>GACAGCACCTACAGCCTCAGCAGCA<br>CCCTGACGCTGAGCAAAGCAGACTA<br>CGAGAAACACAAAGTCTACGCCTGC<br>GAAGTCACCCATCAGGGCCTGAGCT<br>CGCCCGTCACAAAGAGCTTCAACAG<br>GGGAGAGTGTTAG |
| 60 | PRT | DIVMTQSPLSLPVTPGEPASISCRS<br>SQSLLDSDDGNTYLDWYLRKPGQSP<br>QLLIYTLSYRASGVPDRFSGSGSGT<br>DFTLKISRVEADDVGVYYCMQRIEF<br>PLTFGGGTKVEIKRTVAAPSVFIFP<br>PSDEQLKSGTASVVCLLNNFYPREA<br>KVQWKVDNALQSGNSQESVTEQDSK<br>DSTYSLSSTLTLSKADYEKHKVYAC<br>EVTHQGLSSPVTKSFNRGEC* |
| 61 | DNA | GAGGTGCAGCTGGTGGAGTCTGGGG<br>GAGGCTTGGTACAGCCAGGGCGGTC<br>CCTGAGACTCTCCTGTATAGCTTCT<br>GGATTCAACTTTGGTGATTATGGTA<br>TGAGCTGGGTCCGCCAGGCTCCAGG<br>GAAGGGGCTGGAGTGGGTAGGTTTC<br>ATTAGAAGCAAAGCTTATGGTGGGA<br>CAACAGAATACGCCCGCGTCTGTGAA<br>AGGCAGATTCACCATCTCAAGAGAT<br>GATTCCAAAAGCATCGCCTATCTGC<br>AAATGAACAGCCTGAAAACCGAGGA<br>CGCAGCCATGTATTACTGTTCTAGA<br>GATTATTACGATATTTTGACTGGTT<br>ATTATGGCGACTACTGGGGCCAGGG<br>AACCCTGGTCACCGTCTCCTCA |
| 62 | PRT | EVQLVESGGGLVQPGRSLRLSCTAS<br>GFNFGDYGMSWVRQAPGKGLEWVGF<br>TRSKAYGGTTEYAASVKGRFTTSRD<br>DSKSTAYLQMNSLKTEDAAMYYCSR<br>DYYDTLTGYYGDYWGQGTLVTVSS |
| 63 | DNA | GGATTCAACTTTGGTGATTATGGT |
| 64 | PRT | GFNFGDYG |
| 65 | DNA | ATTAGAAGCAAAGCTTATGGTGGGA<br>CAACA |
| 66 | PRT | TRSKAYGGTT |
| 67 | DNA | TCTAGAGATTATTACGATATTTTGA<br>CTGGTTATTATGGCGACTAC |
| 68 | PRT | SRDYYDTLTGYYGDY |
| 69 | DNA | GACATCCAGATGACCCAGTCTCCTT<br>CCACCCTGTCTGCATCTGTAGGAGA<br>CAGAGTCACCATCACTTGCCGGGCC<br>AGTCAGAGTATTAGTAGCTGGTTGG |

TABLE 34-continued

Exemplary DNA and protein (PRT) sequences of the disclosure

| SEQ ID NO: | DNA/PRT sequence | Sequence |
|---|---|---|
| | | CCTGGTATCAGCAGAAACCAGGGAA<br>AGCCCCTAAGCTCCTGATCTATCAG<br>GCGTCTAGTTTAGAAAGTGGGGTCC<br>CATCAAGGTTCAGCGGCAGTGGATC<br>TGGGACAGAATTCACTCTCACCATC<br>AGCAGCCTGCAGCCTGAAGATTTTG<br>CAACTTATTACTGCCAACAATATAA<br>TAGTTATTCTCGGACGTTCGGCCAA<br>GGGACCAAGGTGGAAATCAAA |
| 70 | PRT | DTQMTQSPSTLSASVGDRVTTTCRA<br>SQSTSSWLAWYQQKPGKAPKLLTYQ<br>ASSLESGVPSRFSGSGSGTEFTLTT<br>SSLQPEDFATYYCQQYNSYSRTFGQ<br>GTKVETK |
| 71 | DNA | CAGAGTATTAGTAGCTGG |
| 72 | PRT | QSTSSW |
| 73 | DNA | CAGGCGTCT |
| 74 | PRT | QAS |
| 75 | DNA | CAACAATATAATAGTTATTCTCGGA<br>CG |
| 76 | PRT | QQYNSYSRT |
| 77 | DNA | GAGGTGCAGCTGGTGGAGTCTGGGG<br>GAGGCTTGGTACAGCCAGGGCGGTC<br>CCTGAGACTCTCCTGTATAGCTTCT<br>GGATTCAACTTTGGTGATTATGGTA<br>TGAGCTGGGTCCGCCAGGCTCCAGG<br>GAAGGGGCTGGAGTGGGTAGGTTTC<br>ATTAGAAGCAAAGCTTATGGTGGGA<br>CAACAGAATACGCCGCGTCTGTGAA<br>AGGCAGATTCACCATCTCAAGAGAT<br>GATTCCAAAAGCATCGCCTATCTGC<br>AAATGAACAGCCTGAAAACCGAGGA<br>CGCAGCCATGTATTACTGTTCTAGA<br>GATTATTACGATATTTTGACTGGTT<br>ATTATGGCGACTACTGGGGCCAGGG<br>AACCCTGGTCACCGTCTCCTCAGCC<br>TCCACCAAGGGCCCATCGGTCTTCC<br>CCCTGGCGCCCTGCTCCAGGAGCAC<br>CTCCGAGAGCACAGCCGCCCTGGGC<br>TGCCTGGTCAAGGACTACTTCCCCG<br>AACCGGTGACGGTGTCGTGGAACTC<br>AGGCGCCCTGACCAGCGGCGTGCAC<br>ACCTTCCCGGCTGTCCTACAGTCCT<br>CAGGACTCTACTCCCTCAGCAGCGT<br>GGTGACCGTGCCCTCCAGCAGCTTG<br>GGCACGAAGACCTACACCTGCAACG<br>TAGATCACAAGCCCAGCAACACCAA<br>GGTGGACAAGAGAGTTGAGTCCAAA<br>TATGGTCCCCCATGCCCACCCTGCC<br>CAGCACCTGAGTTCCTGGGGGGACC<br>ATCAGTCTTCCTGTTCCCCCCAAAA<br>CCCAAGGACACTCTCATGATCTCCC<br>GGACCCCTGAGGTCACGTGCGTGGT<br>GGTGGACGTGAGCCAGGAAGACCCC<br>GAGGTCCAGTTCAACTGGTACGTGG<br>ATGGCGTGGAGGTGCATAATGCCAA<br>GACAAAGCCGCGGGAGGAGCAGTTC<br>AACAGCACGTACCGTGTGGTCAGCG<br>TCCTCACCGTCCTGCACCAGGACTG<br>GCTGAACGGCAAGGAGTACAAGTGC<br>AAGGTCTCCAACAAAGGCCTCCCGG<br>CCTCCATCGAGAAAACCATCTCCAA<br>AGCCAAAGGGCAGCCCCGAGAGCCA<br>CAGGTGTACACCCTGCCCCCATCCC<br>AGGAGGAGATGACCAAGAACCAGGT<br>CAGCCTGACCTGCCTGGTCAAAGGC |

TABLE 34-continued

Exemplary DNA and protein (PRT) sequences of the disclosure

| SEQ ID NO: | DNA/PRT sequence | Sequence |
|---|---|---|
|  |  | TTCTACCCCAGCGACATCGCCGTGG AGTGGGAGAGCAATGGGCAGCCGGA GAACAACTACAAGACCACGCCTCCC GTGCTGGACTCCGACGGCTCCTTCT TCCTCTACAGCAGGCTCACCGTGGA CAAGAGCAGGTGGCAGGAGGGGAAT GTCTTCTCATGCTCCGTGATGCATG AGGCTCTGCACAACCACTACACACA GAAGTCCCTCTCCCTGTCTCTGGGT AAATGA |
| 78 | PRT | EVQLVESGGGLVQPGRSLRLSCTAS GFNFGDYGMSWVRQAPGKGLEWVGF TRSKAYGGTTEYAASVKGRFTTSRD DSKSTAYLQMNSLKTEDAAMYYCSR DYYDTLTGYYGDYWGQGTLVTVSSA STKGPSVFPLAPCSRSTSESTAALG CLVKDYFPEPVTVSWNSGALTSGVH TFPAVLQSSGLYSLSSVVTVPSSSL GTKTYTCNVDHKPSNTKVDKRVESK YGPPCPPCPAPEFLGGPSVFLFPPK PKDTLMTSRTPEVTCVVVDVSQEDP EVQFNWYVDGVEVHNAKTKPREEQF NSTYRVVSVLTVLHQDWLNGKEYKC KVSNKGLPSSTEKTTSKAKGQPREP QVYTLPPSQEEMTKNQVSLTCLVKG FYPSDTAVEWESNGQPENNYKTTPP VLDSDGSFFLYSRLTVDKSRWQEGN VFSCSVMHEALHNHYTQKSLSLSLG K* |
| 79 | DNA | GACATCCAGATGACCCAGTCTCCTT CCACCCTGTCTGCATCTGTAGGAGA CAGAGTCACCATCACTTGCCGGGCC AGTCAGAGTATTAGTAGCTGGTTGG CCTGGTATCAGCAGAAACCAGGGAA AGCCCCTAAGCTCCTGATCTATCAG GCGTCTAGTTTAGAAAGTGGGGTCC CATCAAGGTTCAGCGGCAGTGGATC TGGGACAGAATTCACTCTCACCATC AGCAGCCTGCAGCCTGAAGATTTTG CAACTTATTACTGCCAACAATATAA TAGTTATTCTCGGACGTTCGGCCAA GGGACCAAGGTGGAAATCAAACGAA CTGTGGCTGCACCATCTGTCTTCAT CTTCCCGCCATCTGATGAGCAGTTG AAATCTGGAACTGCCTCTGTTGTGT GCCTGCTGAATAACTTCTATCCCAG AGAGGCCAAAGTACAGTGGAAGGTG GATAACGCCCTCCAATCGGGTAACT CCCAGGAGAGTGTCACAGAGCAGGA CAGCAAGGACAGCACCTACAGCCTC AGCAGCACCCTGACGCTGAGCAAAG CAGACTACGAGAAACACAAAGTCTA CGCCTGCGAAGTCACCCATCAGGGC CTGAGCTCGCCCGTCACAAAGAGCT TCAACAGGGGAGAGTGTTAG |
| 80 | PRT | DTQMTQSPSTLSASVGDRVTTTCRA SQSTSSWLAWYQQKPGKAPKLLTYQ ASSLESGVPSRFSGSGSGTEFTLTT SSLQPEDFATYYCQQYNSYSRTFGQ GTKVETKRTVAAPSVFTFPPSDEQL KSGTASVVCLLNNFYPREAKVQWKV DNALQSGNSQESVTEQDSKDSTYSL SSTLTLSKADYEKHKVYACEVTHQG LSSPVTKSFNRGEC* |
| 81 | DNA | GAGGTGCAGCTGGTGGAGTCTGGGG GAGGCTTGGTAAAGCCTGGGGGGTC CCTGAGAGTCTCCTGTGCAGCCTCT GGAGTCACTTTCAGTAACGTCTGGA TGAGTTGGGTCCGCCAGGTTCCAGG GAAGGGGCTGGAATGGGTTGGCCGT ATTAAAAGCAAAACTGATGGTGGGA CAACAGACTACGCTGCACCCGTGAA AGGCAGATTTACCATCTCAAAAGAT GATTCAAAAAATACGTTGTTCCTGC AAATGAACAGCCTGAAAACCGAAGA CACAGCCGTGTATTACTGTACCACA GAGACCGGCGATTTTTGGAGTGGTT ATTATCCTCGCTTCCAGCACTGGGG CCAGGGCACCCTGGTCACCGTCTCC TCA |
| 82 | PRT | EVQLVESGGGLVKPGGSLRVSCAAS GVTFSNVWMSWVRQVPGKGLEWVGR TKSKTDGGTTDYAAPVKGRFTTSKD DSKNTLFLQMNSLKTEDTAVYYCTT ETGDFWSGYYPRFQHWGQGTLVTVS S |
| 83 | DNA | GGAGTCACTTTCAGTAACGTCTGG |
| 84 | PRT | GVTFSNVW |
| 85 | DNA | ATTAAAAGCAAAACTGATGGTGGGA CAACA |
| 86 | PRT | TKSKTDGGTT |
| 87 | DNA | ACCACAGAGACCGGCGATTTTTGGA GTGGTTATTATCCTCGCTTCCAGCA C |
| 88 | PRT | TTETGDFWSGYYPRFQH |
| 89 | DNA | GACATCCAGATGACCCAGTCTCCAT CCTCCCTGTCTGCATCTGTAGGAGA CAGAGTCACCATCACTTGCCGGGCA AGTCAGTATATTAGCACCTATTTAA ATTGGTATCAGCAGAAACCAGGGAA AGCCCCTAGCCTCCTGATCTATGCT GCATCCAGTTTGCAAAGTGGGGTCC CATCAAGGTTCAGTGGCAGTGGATC TGGGACAGATTTCACTCTCACCATC AGCAGTCTGCAACCTGAAGATTTTG CATCTTACTCCTGTCAACAGAGTTA CAGTACCCCTCCGTACACTTTTGGC CAGGGGACCAAGCTGGAGATCAAA |
| 90 | PRT | DTQMTQSPSSLSASVGDRVTTTCRA SQYTSTYLNWYQQKPGKAPSLLTYA ASSLQSGVPSRFSGSGSGTDFTLTT SSLQPEDFASYSCQQSYSTPPYTFG QGTKLETK |
| 91 | DNA | CAGTATATTAGCACCTAT |
| 92 | PRT | QYTSTY |
| 93 | DNA | CAACAGAGTTACAGTACCCCTCCGT ACACT |
| 94 | PRT | QQSYSTPPYT |
| 95 | DNA | GAGGTGCAGCTGGTGGAGTCTGGGG GAGGCTTGGTAAAGCCTGGGGGGTC CCTGAGAGTCTCCTGTGCAGCCTCT GGAGTCACTTTCAGTAACGTCTGGA TGAGTTGGGTCCGCCAGGTTCCAGG GAAGGGGCTGGAATGGGTTGGCCGT ATTAAAAGCAAAACTGATGGTGGGA CAACAGACTACGCTGCACCCGTGAA AGGCAGATTTACCATCTCAAAAGAT GATTCAAAAAATACGTTGTTCCTGC AAATGAACAGCCTGAAAACCGAAGA CACAGCCGTGTATTACTGTACCACA |

TABLE 34-continued

Exemplary DNA and protein (PRT) sequences of the disclosure

| SEQ ID NO: | DNA/PRT sequence | Sequence |
|---|---|---|
| | | GAGACCGGCGATTTTTGGAGTGGTT
ATTATCCTCGCTTCCAGCACTGGGG
CCAGGGCACCCTGGTCACCGTCTCC
TCAGCCTCCACCAAGGGCCCATCGG
TCTTCCCCCTGGCGCCCTGCTCCAG
GAGCACCTCCGAGAGCACAGCCGCC
CTGGGCTGCCTGGTCAAGGACTACT
TCCCCGAACCGGTGACGGTGTCGTG
GAACTCAGGCGCCCTGACCAGCGGC
GTGCACACCTTCCCGGCTGTCCTAC
AGTCCTCAGGACTCTACTCCCTCAG
CAGCGTGGTGACCGTGCCCTCCAGC
AGCTTGGGCACGAAGACCTACACCT
GCAACGTAGATCACAAGCCCAGCAA
CACCAAGGTGGACAAGAGAGTTGAG
TCCAAATATGGTCCCCCATGCCCAC
CCTGCCCAGCACCTGAGTTCCTGGG
GGGACCATCAGTCTTCCTGTTCCCC
CCAAAACCCAAGGACACTCTCATGA
TCTCCCGGACCCCTGAGGTCACGTG
CGTGGTGGTGGACGTGAGCCAGGAA
GACCCCGAGGTCCAGTTCAACTGGT
ACGTGGATGGCGTGGAGGTGCATAA
TGCCAAGACAAAGCCGCGGGAGGAG
CAGTTCAACAGCACGTACCGTGTGG
TCAGCGTCCTCACCGTCCTGCACCA
GGACTGGCTGAACGGCAAGGAGTAC
AAGTGCAAGGTCTCCAACAAAGGCC
TCCCGTCCTCCATCGAGAAAACCAT
CTCCAAAGCCAAAGGGCAGCCCCGA
GAGCCACAGGTGTACACCCTGCCCC
CATCCCAGGAGGAGATGACCAAGAA
CCAGGTCAGCCTGACCTGCCTGGTC
AAAGGCTTCTACCCCAGCGACATCG
CCGTGGAGTGGGAGAGCAATGGGCA
GCCGGAGAACAACTACAAGACCACG
CCTCCCGTGCTGGACTCCGACGGCT
CCTTCTTCCTCTACAGCAGGCTCAC
CGTGGACAAGAGCAGGTGGCAGGAG
GGGAATGTCTTCTCATGCTCCGTGA
TGCATGAGGCTCTGCACAACCACTA
CACACAGAAGTCCCTCTCCCTGTCT
CTGGGTAAATGA |
| 96 | PRT | EVQLVESGGGLVKPGGSLRVSCAAS
GVTFSNVWMSWVRQVPGKGLEWVGR
TKSKTDGGTTDYAAPVKGRFTTSKD
DSKNTLFLQMNSLKTEDTAVYYCTT
ETGDFWSGYYPRFQHWGQGTLVTVS
SASTKGPSVFPLAPCSRSTSESTAA
LGCLVKDYFPEPVTVSWNSGALTSG
VHTFPAVLQSSGLYSLSSVVTVPSS
SLGTKTYTCNVDHKPSNTKVDKRVE
SKYGPPCPPCPAPEFLGGPSVFLFP
PKPKDTLMTSRTPEVTCVVVDVSQE
DPEVQFNWYVDGVEVHNAKTKPREE
QFNSTYRVVSVLTVLHQDWLNGKEY
KCKVSNKGLPSSTEKTTSKAKGQPR
EPQVYTLPPSQEEMTKNQVSLTCLV
KGFYPSDIAVEWESNGQPENNYKTT
PPVLDSDGSFFLYSRLTVDKSRWQE
GNVFSCSVMHEALHNHYTQKSLSLS
LGK* |
| 97 | DNA | GACATCCAGATGACCCAGTCTCCAT
CCTCCCTGTCTGCATCTGTAGGAGA
CAGAGTCACCATCACTTGCCGGGCA
AGTCAGTATATTAGCACCTATTTAA
ATTGGTATCAGCAGAAACCAGGGAA
AGCCCCTAGCCTCCTGATCTATGCT
GCATCCAGTTTGCAAAGTGGGGTCC
CATCAAGGTTCAGTGGCAGTGGATC
TGGGACAGATTTCACTCTCACCATC
AGCAGTCTGCAACCTGAAGATTTTG |
| | | CATCTTACTCCTGTCAACAGAGTTA
CAGTACCCCTCCGTACACTTTTGGC
CAGGGGACCAAGCTGGAGATCAAAC
GAACTGTGGCTGCACCATCTGTCTT
CATCTTCCCGCCATCTGATGAGCAG
TTGAAATCTGGAACTGCCTCTGTTG
TGTGCCTGCTGAATAACTTCTATCC
CAGAGAGGCCAAAGTACAGTGGAAG
GTGGATAACGCCCTCCAATCGGGTA
ACTCCCAGGAGAGTGTCACAGAGCA
GGACAGCAAGGACAGCACCTACAGC
CTCAGCAGCACCCTGACGCTGAGCA
AAGCAGACTACGAGAAACACAAAGT
CTACGCCTGCGAAGTCACCCATCAG
GGCCTGAGCTCGCCCGTCACAAGA
GCTTCAACAGGGGAGAGTGTTAG |
| 98 | PRT | DTQMTQSPSSLSASVGDRVTTTCRA
SQYTSTYLNWYQQKPGKAPSLLTYA
ASSLQSGVPSRFSGSGSGTDFTLTT
SSLQPEDFASYSCQQSYSTPPYTFG
QGTKLETKRTVAAPSVFIFPPSDEQ
LKSGTASVVCLLNNFYPREAKVQWK
VDNALQSGNSQESVTEQDSKDSTYS
LSSTLTLSKADYEKHKVYACEVTHQ
GLSSPVTKSFNRGEC* |
| 99 | DNA | GAGGTGCAGCTGGTGGAGTCTGGGG
GAGGCTTGGTACAGCCTGGGGGGTC
CCTGAGACTCTCCTGTGCAGCCTCT
GGATTCACCTTTAGTAGCTATGCCA
TGACCTGGGTCCGCCAGGCTCCAGG
GAAGGGGCTGGAGTGGGTCTCAGCT
ATTAGTGGTAGTGATACTAGCACAT
ACTACGCAGACTCCGTGAAGGGCCG
GTTCACCATCTCCAGAGACAATTCC
AAGAACACGCTGTTTCTGCAAATGA
ACAGCCTGAGAGCCGAGGACACGGC
CGTATATTACTGTGCGAAACATCAA
GATTACGATTTTTCCTACTACTACT
CCGCTATGGACGTCTGGGGCCAAGG
GACCACGGTCACCGTCTCCTCA |
| 100 | PRT | EVQLVESGGGLVQPGGSLRLSCAAS
GFTFSSYAMTWVRQAPGKGLEWVSA
ISGSDTSTYYADSVKGRFTTSRDNS
KNTLFLQMNSLRAEDTAVYYCAKHQ
DYDFSYYSAMDVWGQGTTVTVSS |
| 101 | DNA | GGATTCACCTTTAGTAGCTATGCC |
| 102 | PRT | GFTFSSYA |
| 103 | DNA | ATTAGTGGTAGTGATACTAGCACA |
| 104 | PRT | ISGSDTST |
| 105 | DNA | GCGAAACATCAAGATTACGATTTTT
CCTACTACTACTCCGCTATGGACGT
C |
| 106 | PRT | AKHQDYDFSYYSAMDV |
| 107 | DNA | GACATCCAGATGACCCAGTCTCCAT
CCTCCCTGTCTGCATCTGTAGGAGA
CAGAGTCATCATCACTTGTCGGGCG
AGTCAGGATTCAACAGCTGGTTAG
CCTGGTATCAGCAGAAACCAGGGAA
AGCCCCTAAACTCCTGATCTATGCT
GCATCCAGTTTGCAAAGTGGGGTCC
CATCAAGGTTCAGCGGCAGTGGATC
TGGGACAGATTTCACTCTCACCATC
AGCAGCCTGCAGCCTGAAGATTTTG
CGACTTACTATTGTCAGCAGACTGA |

TABLE 34-continued

Exemplary DNA and protein (PRT) sequences of the disclosure

| SEQ ID NO: | DNA/PRT sequence | Sequence |
|---|---|---|
| | | CAGTTTCCCATTCACTTTTGGCCCTGGGACCAAAGTGGATATCAAA |
| 108 | PRT | DTQMTQSPSSLSASVGDRVTTTCRASQDFNSWLAWYQQKPGKAPKLLTYAASSLQSGVPSRFSGSGSGTDFTLTTSSLQPEDFATYYCQQTDSFPFTFGPGTKVDTK |
| 109 | DNA | CAGGATTTCAACAGCTGG |
| 110 | PRT | QDFNSW |
| 111 | DNA | CAGCAGACTGACAGTTTCCCATTCACT |
| 112 | PRT | QQTDSFPFT |
| 113 | DNA | GAGGTGCAGCTGGTGGAGTCTGGGGGAGGCTTGGTACAGCCTGGGGGGTCCCTGAGACTCTCCTGTGCAGCCTCTGGATTCACCTTTAGTAGCTATGCCATGACCTGGGTCCGCCAGGCTCCAGGGAAGGGGCTGGAGTGGGTCTCAGCTATTAGTGGTAGTGATACTAGCACATACTACGCAGACTCCGTGAAGGGCCGGTTCACCATCTCCAGAGACAATTCCAAGAACACGCTGTTTCTGCAAATGAACAGCCTGAGAGCCGAGGACACGGCCGTATATTACTGTGCGAAACATCAAGATTACGATTTTTCCTACTACTACTCCGCTATGGACGTCTGGGGCCAAGGGACCACGGTCACCGTCTCCTCAGCCTCCACCAAGGGCCCATCGGTCTTCCCCCTGGCGCCCTGCTCCAGGAGCACCTCCGAGAGCACAGCCGCCCTGGGCTGCCTGGTCAAGGACTACTTCCCCGAACCGGTGACGGTGTCGTGGAACTCAGGCGCCCTGACCAGCGGCGTGCACACCTTCCCGGCTGTCCTACAGTCCTCAGGACTCTACTCCCTCAGCAGCGTGGTGACCGTGCCCTCCAGCAGCTTGGGCACGAAGACCTACACCTGCAACGTAGATCACAAGCCCAGCAACACCAAGGTGGACAAGAGAGTTGAGTCCAAATATGGTCCCCCATGCCCACCCTGCCCAGCACCTGAGTTCCTGGGGGGACCATCAGTCTTCCTGTTCCCCCCAAAACCCAAGGACACTCTCATGATCTCCCGGACCCCTGAGGTCACGTGCGTGGTGGTGGACGTGAGCCAGGAAGACCCCGAGGTCCAGTTCAACTGGTACGTGGATGGCGTGGAGGTGCATAATGCCAAGACAAAGCCGCGGGAGGAGCAGTTCAACAGCACGTACCGTGTGGTCAGCGTCCTCACCGTCCTGCACCAGGACTGGCTGAACGGCAAGGAGTACAAGTGCAAGGTCTCCAACAAAGGCCTCCCGTCCTCCATCGAGAAAACCATCTCCAAAGCCAAAGGGCAGCCCCGAGAGCCACAGGTGTACACCCTGCCCCCATCCCAGGAGGAGATGACCAAGAACCAGGTCAGCCTGACCTGCCTGGTCAAAGGCTTCTACCCCAGCGACATCGCCGTGGAGTGGGAGAGCAATGGGCAGCCGGAGAACAACTACAAGACCACGCCTCCCGTGCTGGACTCCGACGGCTCCTTCTTCCTCTACAGCAGGCTCACCGTGGACAAGAGCAGGTGGCAGGAGGGGAATGTCTTCTCATGCTCCGTGATGCATGAGGCTCTGCACAACCACTACACACAGAAGTCCCTCTCCCTGTCTCTGGGTAAATGA |
| 114 | PRT | EVQLVESGGGLVQPGGSLRLSCAASGFTFSSYAMTWVRQAPGKGLEWVSAISGSDTSYYADSVKGRFTISRDNSKNTLFLQMNSLRAEDTAVYYCAKHQDYDFSYYYSAMDVWGQGTTVTVSSASTKGPSVFPLAPCSRSTSESTAALGCLVKDYFPEPVTVSWNSGALTSGVHTFPAVLQSSGLYSLSSVVTVPSSSLGTKTYTCNVDHKPSNTKVDKRVESKYGPPCPPCPAPEFLGGPSVFLFPPKPKDTLMISRTPEVTCVVVDVSQEDPEVQFNWYVDGVEVHNAKTKPREEQFNSTYRVVSVLTVLHQDWLNGKEYKCKVSNKGLPSSIEKTISKAKGQPREPQVYTLPPSQEEMTKNQVSLTCLVKGFYPSDIAVEWESNGQPENNYKTTPPVLDSDGSFFLYSRLTVDKSRWQEGNVFSCSVMHEALHNHYTQKSLSLSLGK* |
| 115 | DNA | GACATCCAGATGACCCAGTCTCCATCCTCCCTGTCTGCATCTGTAGGAGACAGAGTCATCATCACTTGTCGGGCAAGTCAGGATTTCAACAGCTGGTTAGCCTGGTATCAGCAGAAACCAGGGAAAGCCCCTAAACTCCTGATCTATGCTGCATCCAGTTTGCAAAGTGGGGGTCCATCAAGGTTCAGCGGCAGTGGATCTGGGACAGATTTCACTCTCACCATCAGCAGCCTGCAGCCTGAAGATTTTGCGACTTACTATTGTCAGCAGACTGACAGTTTCCCATTCACTTTTGGCCCTGGGACCAAAGTGGATATCAAACGAACTGTGGCTGCACCATCTGTCTTCATCTTCCCGCCATCTGATGAGCAGTTGAAATCTGGAACTGCCTCTGTTGTGTGCCTGCTGAATAACTTCTATCCCAGAGAGGCCAAAGTACAGTGGAAGGTGGATAACGCCCTCCAATCGGGTAACTCCCAGGAGAGTGTCACAGAGCAGGACAGCAAGGACAGCACCTACAGCCTCAGCAGCACCCTGACGCTGAGCAAAGCAGACTACGAGAAACACAAAGTCTACGCCTGCGAAGTCACCCATCAGGGCCTGAGCTCGCCCGTCACAAAGAGCTTCAACAGGGGAGAGTGTTAG |
| 116 | PRT | DTQMTQSPSSLSASVGDRVTTTCRASQDFNSWLAWYQQKPGKAPKLLTYAASSLQSGVPSRFSGSGSGTDFTLTTSSLQPEDFATYYCQQTDSFPFTFGPGTKVDTKRTVAAPSVFIFPPSDEQLKSGTASVVCLLNNFYPREAKVQWKVDNALQSGNSQESVTEQDSKDSTYSLSSTLTLSKADYEKHKVYACEVTHQGLSSPVTKSFNRGEC* |
| 117 | PRT | GYKAEVMVSQVYSGSLRVLNRHFSQDLTRRESSAFRSETAKAQKMLKELTTSTRLGTYYNSSSVYSFGEGPLTCFFWFTLQTPEHRRLMLSPEVVQALLVEELLSTVNSSAAVPYRAEYEVDPEGLVTLEASVKDTAALNSTLGCYRYSYVGQGQVLRLKGPDHLASSCLWHLQGPKDLMLKLRLEWTLAECRDRLAMYDVAGPLEKRLTTSVYGCSRQEPVVEVLASGATMAVVWKKGLHSYYDPFVLSVQPWFQACEVNLTLDNRLDSQGVLSTPYFPSYYSPQTHCSWHLTVPSLDYGLALWFDAYALRRQKYDLPCTQGWTTQNRRLCGLRTLQPYAERTPVVATAGTTTNFTSQTSLTGPGVRVHYGLYNQSDPCPGEFLCSVNGLCVPACDGVKDCPNGLDERNCVCRATFQCKEDST |

TABLE 34-continued

Exemplary DNA and protein (PRT) sequences of the disclosure

| SEQ ID NO: | DNA/PRT sequence | Sequence |
|---|---|---|
| | | CTSLPKVCDGQPDCLNGSDEEQCQE GVPCGTFTFQCEDRSCVKKPNPQCD GRPDCRDGSDEEHCDCGLQGPSSRT VGGAVSSEGEWPWQASLQVRGRHTC GGALTADRWVTTAAHCFQEDSMAST VLWTVFLGKVWQNSRWPGEVSFKVS RLLLHPYHEEDSHDYDVALLQLDHP VVRSAAVRPVCLPARSHFFEPGLHC WTTGWGALREGGPTSNALQKVDVQL TPQDLCSEVYRYQVTPRMLCAGYRK GKKDACQGDAGGPLVCKALSGRWFL AGLVSWGLGCGRPNYFGVYTRTTGV TSWTQQVVTEQKLTSEEDLGGEQKL TSEEDLHHHHHH |
| 118 | PRT | KAEVTSQVYSGSLRVLNRHFSQDL GRRESTAFRSESAKAQKMLQELVAS TRLGTYYNSSSVYSFGEGPLTCFFW FTLDTPEYQRLTLSPEVVRELLVDE LLSNSSTLASYKTEYEVDPEGLVTL EASVNDTWLNSTLGCYRYSVNPGQ VLPLKGPDQQTTSCLWHLQGPEDLM TKVRLEWTRVDCRDRVAMYDAAGPL EKRLTTSVYGCSRQEPVMEVLASGS VMAVVWKKGMHSYYDPFLLSVKSVA FQDCQVNLTLEGRLDTQGFLRTPYY PSYYSPSTHCSWHLTVPSLDYGLAL WFDAYALRRQKYNRLCTQGQWMTQN RRLCGFRTLQPYAERTPMVASDGVT TNFTSQTSLTGPGVQVYYSLYNQSD PCPGEFLCSVNGLCVPACDGTKDCP NGLDERNCVCRAMFQCQEDSTCTSL PRVCDRQPDCLNGSDEEQCQEGVPC GTFTFQCEDRSCVKKPNPECDGQSD CRDGSDEQHCDCGLQGLSSRTVGGT VSSEGEWPWQASLQTRGRHTCGGAL TADRWVTTAAHCFQEDSMASPKLWT VFLGKMRQNSRWPGEVSFKVSRLFL HPYHEEDSHDYDVALLQLDHPVVYS ATVRPVCLPARSHFFEPGQHCWTTG WGAQREGGPVSNTLQKVDVQLVPQD LCSEAYRYQVSPRMLCAGYRKGKKD ACQGDAGGPLVCREPSGRWFLAGLV SWGLGCGRPNFFGVYTRVTRVTNWT QQVLTEQKLTSEEDLGGEQKLTSEE DLHHHHHH |
| 119 | PRT | GYKAEVTSQVYSGSLRVLNRHFSQ DLTRRESSAFRSETAKAQKMLKELT ASTRLGTYYNSSSVYSFGEGPLTCF FWFTLQTPEHRRLMLSPEVVQALLV EELLSTVNSSAAVPYRAEYEVDPEG LVTLEASVKDTAALNSTLGCYRYSY VGQGQVLRLKGPDHLASSCLWHLQG PEDLMLKLRLEWTLAECRDRLAMYD VAGPLEKRLTTSVYGCSRQEPVVEV LASGATMAVVWKKGLHSYYDPFMLS VQSWFQACEVNLTLDDRLDSQGVLS TPYFPSYYSPRTHCSWHLTVPSLDY GLALWFDAYALRRQKYDLPCTQGQW TTQNRRLCGLRTLQPYAERTPVVAT AGTTTNFTSQTSLTGPGVRVHYGLY NQSDPCPGEFLCSVNGLCVPACDGV KDCPNGLDERNCVCRATFQCQEDST CTSLLKVCDGQPDCLNGSDEERCQE GVPCGTFTFQCEDQSCVKKPNPQCD GRPDCRDGSDEQHCDCGLQGPSSRT VGGAVSSEGEWPWQASLQVRGRHTC GGALTADRWVTTAAHCFQEDSMASP ALWTVFLGKVWQNSRWPGEVSFKVS RLLLHPYHEEDSHDYDVALLQLDHP VVRSAAVRPVCLPARSHFFEPGLHC WTTGWGALREGGPTSNALQKVDVQL TPQDLCSEAYRYQVTPRMLCAGYRK GKKDACQGDAGGPLVCKALSGRWFL AGLVSWGLGCGRPNYFGVYTRTTGV TGWTQQVVTEQKLTSEEDLGGEQKL TSEEDLHHHHHH |
| 120 | PRT | SHFFEPGLHCW |
| 121 | PRT | LVSWGLGCGRPNYFGVYTRTTGVTS W |
| 122 | PRT | LTTSTRLGT |
| 123 | PRT | GEWPWQASL |
| 124 | PRT | STVLWTVFLGKVWQNSRWPGEVSFK |
| 125 | PRT | TTGWGALREGGPTSNALQKVD |
| 126 | PRT | MLLLFHSKRMPVAEAPQVAGGQGDG GDGEEAEPEGMFKACEDSKRKARGY LRLVPLFVLLALLVLASAGVLLWYF LGYKAEVMVSQVYSGSLRVLNRHFS QDLTRRESSAFRSETAKAQKMLKEL TTSTRLGTYYNSSSVYSFGEGPLTC FFWFTLQTPEHRRLMLSPEVVQALL VEELLSTVNSSAAVPYRAEYEVDPE GLVTLEASVKDTAALNSTLGCYRYS YVGQGQVLRLKGPDHLASSCLWHLQ GPKDLMLKLRLEWTLAECRDRLAMY DVAGPLEKRLTTSVYGCSRQEPVVE VLASGATMAVVWKKGLHSYYDPFVL SVQPVVFQACEVNLTLDNRLDSQGV LSTPYFPSYYSPQTHCSWHLTVPSL DYGLALWFDAYALRRQKYDLPCTQG QWTTQNRRLCGLRTLQPYAERTPWA TAGTTTNFTSQTSLTGPGVRVHYGL YNQSDPCPGEFLCSVNGLCVPACDG VKDCPNGLDERNCVCRATFQCKEDS TCTSLPKVCDGQPDCLNGSDEEQCQ EGVPCGTFTFQCEDRSCVKKPNPQC DGRPDCRDGSDEEHCDCGLQGPSSR TVGGAVSSEGEWPWQASLQVRGRHT CGGALTADRWVTTAAHCFQEDSMAS TVLWTVFLGKVWQNSRWPGEVSFKV SRLLLHPYHEEDSHDYDVALLQLDH PWRSAAVRPVCLPARSHFFEPGLHC WTTGWGALREGGPTSNALQKVDVQL TPQDLCSEVYRYQVTPRMLCAGYRK GKKDACQGDSGGPLVCKALSGRWFL AGLVSWGLGCGRPNYFGVYTRTTGV TSWTQQVVT |
| 127 | DNA | CTTGAGCCAGACCCAGTCCAGCTCT GGTGCCTGCCCTCTGGTGCGAGCTG ACCTGAGATGCACTTCCCTCCTCTG TGAGCTGTCTCGGCACCCACTTGCA GTCACTGCCGCCTGATGTTGTTACT CTTCCACTCCAAAAGGATGCCCGTG GCCGAGGCCCCCCAGGTGGCTGGCG GGCAGGGGGACGGAGGTGATGGCGA GGAAGGGAGCCGGAGGGGATGTTC AAGGCCTGTGAGGACTCCAAGAGAA AAGCCCGGGGCTACCTCCGCCTGGT GCCCCTGTTTGTGCTGCTGGCCCTG CTCGTGCTGGCTTCGGCGGGGGTGC TACTCTGGTATTTCCTAGGGTACAA GGCGGAGGTGATGGTCAGCCAGGTG TACTCAGGCAGTCTGCGTGTACTA ATCGCCACTTCTCCCAGGATCTTAC CCGCCGGGAATCTAGTGCCTTCCGC AGTGAAACCGCCAAAGCCCAGAAGA TGCTCAAGGAGCTCATCACCAGCAC CCGCCTGGGAACTTACTACAACTCC |

TABLE 34-continued

Exemplary DNA and protein (PRT) sequences of the disclosure

| SEQ ID NO: | DNA/PRT sequence | Sequence |
|---|---|---|
| | | AGCTCCGTCTATTCCTTTGGGGAGG |
| | | GACCCCTCACCTGCTTCTTCTGGTT |
| | | CATTCTCCAAATCCCCGAGCACCGC |
| | | CGGCTGATGCTGAGCCCCGAGGTGG |
| | | TGCAGGCACTGCTGGTGGAGGAGCT |
| | | GCTGTCCACAGTCAACAGCTCGGCT |
| | | GCCGTCCCCTACAGGGCCGAGTACG |
| | | AAGTGGACCCCGAGGGCCTAGTGAT |
| | | CCTGGAAGCCAGTGTGAAAGACATA |
| | | GCTGCATTGAATTCCACGCTGGGTT |
| | | GTTACCGCTACAGCTACGTGGGCCA |
| | | GGGCCAGGTCCTCCGGCTGAAGGGG |
| | | CCTGACCACCTGGCCTCCAGCTGCC |
| | | TGTGGCACCTGCAGGGCCCCAAGGA |
| | | CCTCATGCTCAAACTCCGGCTGGAG |
| | | TGGACGCTGGCAGAGTGCCGGGACC |
| | | GACTGGCCATGTATGACGTGGCCGG |
| | | GCCCCTGGAGAAGAGGCTCATCACC |
| | | TCGGTGTACGGCTGCAGCCGCCAGG |
| | | AGCCCGTGGTGGAGGTTCTGGCGTC |
| | | GGGGGCCATCATGGCGGTCGTCTGG |
| | | AAGAAGGGCCTGCACAGCTACTACG |
| | | ACCCCTTCGTGCTCTCCGTGCAGCC |
| | | GGTGGTCTTCCAGGCCTGTGAAGTG |
| | | AACCTGACGCTGGACAACAGGCTCG |
| | | ACTCCCAGGGCGTCCTCAGCACCCC |
| | | GTACTTCCCCAGCTACTACTCGCCC |
| | | CAAACCCACTGCTCCTGGCACCTCA |
| | | CGGTGCCCTCTCTGGACTACGGCTT |
| | | GGCCCTCTGGTTTGATGCCTATGCA |
| | | CTGAGGAGGCAGAAGTATGATTTGC |
| | | CGTGCACCCAGGGCCAGTGGACGAT |
| | | CCAGAACAGGAGGCTGTGTGGCTTG |
| | | CGCATCCTGCAGCCCTACGCCGAGA |
| | | GGATCCCCGTGGTGGCCACGGCCGG |
| | | GATCACCATCAACTTCACCTCCCAG |
| | | ATCTCCCTCACCGGGCCCGGTGTGC |
| | | GGGTGCACTATGGCTTGTACAACCA |
| | | GTCGGACCCCTGCCCTGGAGAGTTC |
| | | CTCTGTTCTGTGAATGGACTCTGTG |
| | | TCCCTGCCTGTGATGGGGTCAAGGA |
| | | CTGCCCCAACGGCCTGGATGAGAGA |
| | | AACTGCGTTTGCAGAGCCACATTCC |
| | | AGTGCAAAGAGGACAGCACATGCAT |
| | | CTCACTGCCCAAGGTCTGTGATGGG |
| | | CAGCCTGATTGTCTCAACGGCAGCG |
| | | ACGAAGAGCAGTGCCAGGAAGGGGT |
| | | GCCATGTGGGACATTCACCTTCCAG |
| | | TGTGAGGACCGGAGCTGCGTGAAGA |
| | | AGCCCAACCCGCAGTGTGATGGGCG |
| | | GCCCGACTGCAGGGACGGCTCGGAT |
| | | GAGGAGCACTGTGACTGTGGCCTCC |
| | | AGGGCCCCTCCAGCCGCATTGTTGG |
| | | TGGAGCTGTGTCCTCCGAGGGTGAG |
| | | TGGCCATGGCAGGCCAGCCTCCAGG |
| | | TTCGGGGTCGACACATCTGTGGGGG |
| | | GGCCCTCATCGCTGACCGCTGGGTG |
| | | ATAACAGCTGCCCACTGCTTCCAGG |
| | | AGGACAGCATGGCCTCCACGGTGCT |
| | | GTGGACCGTGTTCCTGGGCAAGGTG |
| | | TGGCAGAACTCGCGCTGGCCTGGAG |
| | | AGGTGTCCTTCAAGGTGAGCCGCCT |
| | | GCTCCTGCACCCGTACCACGAAGAG |
| | | GACAGCCATGACTACGACGTGGCGC |
| | | TGCTGCAGCTGGACCACCCGGTGGT |
| | | GCGCTCGGCCGCCGTGCGCCCCGTC |
| | | TGCCTGCCCGCGCGCTCCCACTTCT |
| | | TCGAGCCCGGCCTGCACTGCTGGAT |
| | | TACGGGCTGGGGCGCCTTGCGCGAG |
| | | GGCGGCCCCATCAGCAACGCTCTGC |
| | | AGAAAGTGGATGTGCAGTTGATCCC |
| | | ACAGGACCTGTGCAGCGAGGTCTAT |
| | | CGCTACCAGGTGACGCCACGCATGC |
| | | TGTGTGCCGGCTACCGCAAGGGCAA |
| | | GAAGGATGCCTGTCAGGGTGACTCA |
| | | GGTGGTCCGCTGGTGTGCAAGGCAC |
| | | TCAGTGGCCGCTGGTTCCTGGCCGG |
| | | GCTGGTCAGCTGGGGCCTGGGCTGT |
| | | GGCCGGCCTAACTACTTCGGCGTCT |
| | | ACACCCGCATCACAGGTGTGATCAG |
| | | CTGGATCCAGCAAGTGGTGACCTGA |
| | | GGAACTGCCCCCCTGCAAAGCAGGG |
| | | CCCACCTCCTGGACTCAGAGAGCCC |
| | | AGGGCAACTGCCAAGCAGGGGGACA |
| | | AGTATTCTGGCGGGGGGTGGGGGAG |
| | | AGAGCAGGCCCTGTGGTGGCAGGAG |
| | | GTGGCATCTTGTCTCGTCCCTGATG |
| | | TCTGCTCCAGTGATGGCAGGAGGAT |
| | | GGAGAAGTGCCAGCAGCTGGGGGTC |
| | | AAGACGTCCCCTGAGGACCCAGGCC |
| | | CACACCCAGCCCTTCTGCCTCCCAA |
| | | TTCTCTCTCCTCCGTCCCCTTCCTC |
| | | CACTGCTGCCTAATGCAAGGCAGTG |
| | | GCTCAGCAGCAAGAATGCTGGTTCT |
| | | ACATCCCGAGGAGTGTCTGAGGTGC |
| | | GCCCCACTCTGTACAGAGGCTGTTT |
| | | GGGCAGCCTTGCCTCCAGAGAGCAG |
| | | ATTCCAGCTTCGGAAGCCCCTGGTC |
| | | TAACTTGGGATCTGGGAATGGAAGG |
| | | TGCTCCCATCGGAGGGGACCCTCAG |
| | | AGCCCTGGAGACTGCCAGGTGGGCC |
| | | TGCTGCCACTGTAAGCCAAAAGGTG |
| | | GGGAAGTCCTGACTCAGGGTCCTT |
| | | GCCCCACCCCTGCCTGCCACCTGGG |
| | | CCCTCACAGCCCAGACCCTCACTGG |
| | | GAGGTGAGCTCAGCTGCCCTTTGGA |
| | | ATAAAGCTGCCTGATCCAAAAAAAA |
| | | AAAAAAAAA |
| 128 | PRT | MPVAKAPQVAGGQGDGGDGEEAEPE |
| | | GMFEACEDSKRKARGYLRLAPLWLT |
| | | LVVLTSVGVLLWYFLGYKAEVTVSQ |
| | | VYSGSLRVLNRHFSQDLTRRESSAF |
| | | RSETAKAQKMLKELTASTRLGTYYN |
| | | SSSVYSFGEGPLTCFFWFTLQTPEH |
| | | RRLMLSPEWQALLVEELLSTVNSSA |
| | | AVPYRAEYEVDPEGLVTLEASVKDT |
| | | AALNSTLGCYRYSYVGGQVLRLKG |
| | | PDHLASSCLWHLQGPEDLMLKLRLE |
| | | WTLAECRDRLAMYDVAGPLEKRLTT |
| | | SVYGCSRQEPVVEVLASGATMAVVW |
| | | KKGLHSYYDPFMLSVQSVVFQACEV |
| | | NLTLDDRLDSQGVLSTPYFPSYYSP |
| | | RTHCSWHLTVPSLDYGLALWFDAYA |
| | | LRRQKYDLPCTQGQWTTQNRRLCGL |
| | | RTLQPYAERTPVVATAGTTTNFTSQ |
| | | TSLTGPGVRVHYGLYNQSDPCPGEF |
| | | LCSVNGLCVPACDGVKDCPNGLDER |
| | | NCVCRATFQCQEDSTCTSLLKVCDG |
| | | QPDCLNGSDEERCQEGVPCGTFTFQ |
| | | CEDQSCVKKPNPQCDGRPDCRDGSD |
| | | EQHCDCGLQGPSSRTVGGAVSSEGE |
| | | WPWQASLQVRGRHTCGGALTADRWV |
| | | TTAAHCFQEDSMASPALWTVFLGKV |
| | | WQNSRWPGEVSFKVSRLLLHPYHEE |
| | | DSHDYDVALLQLDHPVVRSAAVRPV |
| | | CLPARSHFFEPGLHCWTTGWGALRE |
| | | GGPTSNALQKVDVQLTPQDLCSEAY |
| | | RYQVTPRMLCAGYRKGKKDACQGDS |
| | | GGPLVCKALSGRWFLAGLVSWGLGC |
| | | GRPNYFGVYTRTTGVTGWTQQWT |
| 129 | DNA | CTCAGTCACAGTGCCGTCCTGGGCC |
| | | CAGCAGGAGGAGCCCCATGGAGCCT |
| | | GGGGCCACAGGCCACAGGGGACAAG |
| | | GGCCAGACACCCTGGCCATGGCTCT |
| | | AGGCCATTGATCCAGGCCGGGCTGG |
| | | CACGGTGGGGGTAGGGAGGCCTTGG |

TABLE 34-continued

Exemplary DNA and protein (PRT) sequences of the disclosure

| SEQ ID NO: | DNA/PRT sequence | Sequence |
|---|---|---|
| | | CCTGGACAAACAAAGGCTTCTGAGG |
| | | CCTGCGTGCAGGCCCAGCACCTATC |
| | | CGCCACTCCCAAAGGATGCCTGTGG |
| | | CCAAGGCCCCCCAGGTGGCTGGTGG |
| | | GCAGGGGACGGAGGTGATGGCGAG |
| | | GAAGCGGAGCCAGAGGGGATGTTCG |
| | | AGGCCTGTGAGGACTCCAAGAGAAA |
| | | AGCCCGGGGCTACCTCCGCCTGGCG |
| | | CCCCTGTGGCTGACCCTGGTTGTGC |
| | | TGACTTCAGTGGGGGTGCTACTCTG |
| | | GTATTTCCTAGGGTACAAGGCGGAG |
| | | GTGACGGTCAGCCAGGTGTACTCAG |
| | | GCAGCCTTCGCGTGCTCAATCGCCA |
| | | CTTCTCCCAGGATCTTACCCGCCGG |
| | | GAATCCAGTGCCTTCCGCAGTGAAA |
| | | CCGCCAAAGCCCAGAAGATGCTCAA |
| | | GGAGCTCATCGCCAGCACCCGCCTG |
| | | GGAACTTATTACAACTCCAGCTCCG |
| | | TCTATTCCTTTGGGGAGGGACCGCT |
| | | CACCTGCTTCTTCTGGTTCATTCTC |
| | | CAAATCCCCGAGCACCGCCGGCTGA |
| | | TGCTGAGCCCCGAGGTGGTGCAGGC |
| | | ACTGCTGGTGGAGGAGCTGCTGTCC |
| | | ACAGTCAACAGCTCGGCGGCCGTCC |
| | | CCTACAGGGCCGAGTACGAAGTGGA |
| | | CCCCGAGGGCCTAGTGATCCTAGAA |
| | | GCCAGTGTGAAAGACATAGCTGCAC |
| | | TGAATTCCACGCTGGGTTGTTACCG |
| | | CTACAGCTACGTGGGCCAGGGTCAG |
| | | GTCCTCCGGCTGAAGGGACCCGACC |
| | | ACCTGGCCTCCAGCTGCCTGTGGCA |
| | | CCTGCAGGGCCCCGAAGACCTCATG |
| | | CTGAAACTCCGGCTGGAGTGGACGC |
| | | TGGCCGAGTGCCGGGACCGACTGGC |
| | | CATGTATGACGTGGCTGGGCCCCTG |
| | | GAGAAGAGGCTCATCACCTCGGTGT |
| | | ATGGCTGCAGCCGCCAGGAGCCTGT |
| | | GGTGGAAGTCCTGGCATCGGGGGCC |
| | | ATCATGGCGGTGGTCTGGAAGAAGG |
| | | GCCTGCACAGCTACTACGACCCCTT |
| | | TATGCTCTCCGTGCAGTCGGTGGTC |
| | | TTCCAGGCCTGCGAGGTAAACCTGA |
| | | CGCTGGATGACAGGCTGGACTCCCA |
| | | GGGCGTCCTCAGCACCCCGTACTTC |
| | | CCCAGCTACTACTCGCCCCGAACCC |
| | | ACTGCTCCTGGCACCTCACGGTGCC |
| | | TTCTCTGGACTACGGCTTGGCCCTC |
| | | TGGTTTGACGCCTACGCACTGCGGA |
| | | GGCAGAAGTATGATTTGCCGTGCAC |
| | | CCAGGGCCAGTGGACGATCCAGAAC |
| | | AGGAGGCTGTGTGGCCTGCGCATCC |
| | | TGCGCCTTACGCTGAGAGGATCCC |
| | | CGTGGTGGCCACGGCCGGCATCACC |
| | | ATCAATTTCACCTCCCAGATCTCCC |
| | | TCACAGGGCCTGGTGTGCGGGTGCA |
| | | CTATGGCTTGTACAACCAGTCGGAC |
| | | CCCTGCCCTGGAGAGTTCCTCTGCT |
| | | CTGTGAACGGACTCTGCGTCCCTGC |
| | | CTGTGATGGGTCAAGGACTGCCCC |
| | | AACGGCCTGGATGAGAGAAACTGCG |
| | | TTTGCAGGGCCACATTCCAGTGCCA |
| | | AGAGGACAGCACGTGCATCTCACTG |
| | | CTTAAGGTCTGTGACGGGCAGCCTG |
| | | ACTGTCTCAACGGCAGCGATGAAGA |
| | | GCGGTGCCAGGAAGGGGTGCCCTGC |
| | | GGGACATTCACCTTCCAGTGTGAGG |
| | | ACCAGAGCTGCGTGAAGAAGCCCAA |
| | | CCCACAGTGTGATGGGCGGCCCGAC |
| | | TGCAGGGACGGTCAGACGAGCAGC |
| | | ACTGTGACTGTGGCCTCCAGGGCCC |
| | | CTCCAGTCGCATTGTTGGTGGGCC |
| | | GTGTCCTCCGAGGGTGAGTGGCCAT |
| | | GGCAGGCCAGCCTCCAGGTTCGGGG |
| | | TCGACACATCTGTGGGGGCGCCCTC |

TABLE 34-continued

Exemplary DNA and protein (PRT) sequences of the disclosure

| SEQ ID NO: | DNA/PRT sequence | Sequence |
|---|---|---|
| | | ATCGCTGACCGCTGGGTGATAACAG |
| | | CTGCCCATTGCTTCCAGGAGGACAG |
| | | CATGGCCTCCCCGGCGCTGTGGACG |
| | | GTGTTCCTGGGCAAGGTGTGGCAGA |
| | | ACTCGCGCTGGCCTGGAGAGGTGTC |
| | | CTTCAAGGTGAGCCGCCTACTCCTG |
| | | CATCCGTATCACGAAGAGGACAGCC |
| | | ACGACTACGACGTGGCGCTGTTGCA |
| | | GCTCGACCACCCGGTGGTGCGCTCG |
| | | GCCGCCGTGCGTCCAGTCTGCCTGC |
| | | CCGCGCGCTCCCACTTCTTCGAACC |
| | | CGGCCTGCACTGCTGGATCACTGGC |
| | | TGGGGCGCCCTGCGCGAAGGCGGCC |
| | | CCACCAGCAATGCTCTGCAGAAAGT |
| | | GGACGTGCAGTTGATCCCACAGGAC |
| | | CTGTGCAGCGAGGCCTATCGCTACC |
| | | AGGTGACGCCACGCATGCTGTGTGC |
| | | CGGCTACCGCAAGGGCAAGAAGGAT |
| | | GCCTGCCAGGGTGACTCGGGTGGTC |
| | | CGCTGGTATGCAAGGCACTCAGTGG |
| | | CCGCTGGTTCCTGGCAGGGCTGGTC |
| | | AGCTGGGGCCTGGGCTGTGGCCGAC |
| | | CTAACTACTTCGGCGTCTACACCCG |
| | | CATCACAGGTGTGATCGGCTGGATC |
| | | CAGCAAGTGGTGACCTGAGGAACTG |
| | | CCCCCCTGCAGAGCAGGTCCCACCT |
| | | CTTGGACTCAGAGAGCCCAGGGCAA |
| | | TTGCCAAGCAGGGGACAAGTATTC |
| | | TGGGGGGAGGGGGCGCGAGCAGGC |
| | | CCTGTGGTGGCAGGAGGTGGCATCT |
| | | TGTCTTGTCCCTGATGTCTGCTCCA |
| | | GTGATGGCAGGAGGATGGAGGAGTG |
| | | CCAGCAGCTGGGGGTCAAGACGTCC |
| | | CCTGGGGACCCAGGCCCACACCCAG |
| | | CCCTTCTGCCTCCCGATTCTCTCTC |
| | | CTCCGTCCCCTTCCTCCACTGCTGC |
| | | CTATTGCAAGGAAGTGGCTCAGCAG |
| | | CAAGAATGCTGGCTACGTCCCCA |
| | | GGAGTGTCTGAGCTGTGCCCCGCTC |
| | | TGTACAGAGGCTGCTTGGGCAGCCT |
| | | TGCCTCTAGAGAGCAGATGCCAGCT |
| | | TCGGAAGCCCCTGGTCTAACTTGGG |
| | | ATCTGGGAATGGAAGGTGCCCCCAT |
| | | AGGAGGGGACCCTCACAGCCCTGGG |
| | | GACTGCCAGGTGGGCCGGCTGCCAC |
| | | CGTAAGCCAAAAAGGTGGGGAAGC |
| | | CCTGACTCCAAGGTCCTTGCCCCAC |
| | | CCCTGCCTGCCACCTGGCCCCTCAC |
| | | AGCCCAGACCCTCACCGGCAGGTGA |
| | | GCTCAGCTGCCCTTTGGAATAAAGC |
| | | TGCCTGATCCAA |
| 130 | PRT | MPRCFQLPCSTRMPTTEVPQAADGQ |
| | | GDAGDGEEAAEPEGKFKPPKNTKRK |
| | | NRDYVRFTPLLLVLAALVSAGVMLW |
| | | YFLGYKAEVTVSQVYSGSLRVLNRH |
| | | FSQDLGRRESTAFRSESAKAQKMLQ |
| | | ELVASTRLGTYYNSSSVYSFGEGPL |
| | | TCFFWFTLDTPEYQRLTLSPEVVRE |
| | | LLVDELLSNSSTLASYKTEYEVDPE |
| | | GLVTLEASVNDTVVLNSTLGCYRYS |
| | | YVNPGQVLPLKGPDQQTTSCLWHLQ |
| | | GPEDLMTKVRLEWTRVDCRDRVAMY |
| | | DAAGPLEKRLTTSVYGCSRQEPVME |
| | | VLASGSVMAWWKKGMHSYYDPFLLS |
| | | VKSVAFQDCQVNLTLEGRLDTQGFL |
| | | RTPYYPSYYSPSTHCSWHLTVPSLD |
| | | YGLALWFDAYALRRQKYNRLCTQGQ |
| | | WMTQNRRLCGFRTLQPYAERTPMVA |
| | | SDGVTTNFTSQTSLTGPGVQVYYSL |
| | | YNQSDPCPGEFLCSVNGLCVPACDG |
| | | TKDCPNGLDERNCVCRAMFQCQEDS |
| | | TCTSLPRVCDRQPDCLNGSDEEQCQ |
| | | EGVPCGTFTFQCEDRSCVKKPNPEC |

TABLE 34-continued

Exemplary DNA and protein (PRT) sequences of the disclosure

| SEQ ID NO: | DNA/PRT sequence | Sequence |
|---|---|---|
| | | DGQSDCRDGSDEQHCDCGLQGLSSR TVGGTVSSEGEWPWQASLQTRGRHT CGGALTADRWVTTAAHCFQEDSMAS PKLWTVFLGKMRQNSRWPGEVSFKV SRLFLHPYHEEDSHDYDVALLQLDH PVVYSATVRPVCLPARSHFFEPGQH CWTTGWGAQREGGPVSNTLQKVDVQ LVPQDLCSEAYRYQVSPRMLCAGYR KGKKDACQGDSGGPLVCREPSGRWF LAGLVSWGLGCGRPNFFGVYTRVTR VTNWTQQVLT |
| 131 | DNA | AGTTTCATTGTCGCCCTGGACCTGA CAGGAGAGGCCCATGGAACTTGGGG CCACAGGCCACAAGGGACAAGGGCC AGACACCCCAGCCATGGCTCCAGGC CATTGATCCAACCTAAGCTGGCCAG TTGGGGGTGGAAAGACCTTGGCCTG GATAAACAGAGGCCTCCAGGCCTGT GTGCAGGCCCGGCACCTACCTTCCA CTCTTGAAGATGCCGAGATGTTTCC AGCTCCCCTGTTCTACCAGGATGCC CACCACCGAGGTCCCCCAAGCGGCT GATGGTCAGGGCGATGCGGGTGATG GAGAGGAAGCTGCTGAGCCAGAGGG GAAGTTCAAGCCCCCAAAAAACACC AAGAGAAAAAACCGGGACTACGTCC GCTTCACGCCACTGTTGCTGGTCTT GGCTGCGCTGGTCTCAGCAGGGGTC ATGCTTTGGTATTTCCTAGGGTACA AAGCGGAAGTGACCGTAAGCCAGGT GTACTCTGGCAGCCTCCGGGTGCTC AACCGTCATTTCTCCCAGGACCTGG GCCGACGGGAGTCTATTGCTTTCCG CAGTGAATCTGCCAAAGCCCAGAAG ATGCTCCAAGAACTGGTTGCCAGCA CCCGCCTGGGTACTTACTACAACTC TAGTTCTGTCTACTCCTTTGGGGAG GGACCCCTCACCTGCTTCTTCTGGT TTATCCTTGACATCCCTGAGTACCA GCGACTGACCCTGAGCCCTGAAGTA GTGCGCGAGCTCCTGGTGGATGAGC TACTGTCCAACAGCTCAACCCTGGC TTCCTATAAGACCGAATATGAGGTG GACCCGGAAGGCCTGGTGATCCTGG AAGCCAGTGTGAACGACATAGTCGT ACTGAATTCCACGCTGGGCTGTTAT CGCTACAGCTATGTGAACCCAGGCC AGGTCCTCCCATTGAAGGGGCCTGA CCAGCAGACCACAAGCTGCCTGTGG CATCTGCAAGGGCCCGAAGACCTCA TGATCAAAGTGCGCTGGAGTGGAC CCGGGTCGATTGCAGAGACAGGGTG GCGATGTACGACGCAGCTGGGCCCC TGGAGAAGAGACTTATCACCTCGGT CTATGGGTGCAGCCGCCAGGAACCT GTGATGGAGGTGCTGGCATCGGGCT CCGTCATGGCCGTGGTGTGGAAAAA GGGCATGCATAGCTACTATGACCCT TTCCTGCTCTCAGTGAAGTCTGTGG CCTTCCAGGACTGCCAGGTGAACCT GACACTGGAGGGCCGGCTGGACACA CAGGGCTTCCTCCGTACACCCTACT ACCCCAGTTACTACTCTCCCAGTAC CCACTGCTCCTGGCATCTCACGGTA CCCTCTCTGGACTACGGCTTGGCGC TCTGGTTCGATGCCTACGCACTGAG GAGGCAGAAGTACAACCGACTGTGT ACTCAGGGCCAGTGGATGATCCAGA ACAGGAGGCTGTGTGGCTTCCGTAC CCTGCAGCCATATGCTGAGAGGATC CCCATGGTGGCCTCAGATGGTGTCA CCATCAACTTCACCTCCCAGATCTC CCTCACAGGCCCGGGTGTGCAAGTG TACTACAGCTTGTACAACCAATCAG ACCCCTGCCCTGGTGAGTTCCTCTG CTCTGTGAATGGACTGTGTGTCCCT GCGTGTGACGGGATCAAGGACTGCC CCAATGGCCTGGATGAGAGAAACTG TGTCTGCAGAGCCATGTTCCAGTGC AAGAGGACAGCACGTGCATTTCAC TGCCTAGAGTCTGTGACCGGCAGCC CGACTGTCTCAATGGCAGTGACGAA GAACAGTGCCAAGAAGGAGTGCCCT GTGGGACATTCACTTTCCAGTGTGA GGACCGGAGCTGTGTGAAGAAGCCC AACCCAGAGTGTGACGGCCAGTCAG ATTGCAGAGACGGCTCAGATGAGCA ACACTGTGACTGTGGCCTCCAGGGC CTCTCCAGCCGTATTGTGGGCGGGA CCGTGTCCTCCGAGGGTGAGTGGCC ATGGCAGGCCAGCCTCCAGATTCGG GGTCGACACATCTGTGGGGGGCTC TCATCGCTGACCGCTGGGTCATAAC GGCCGCCCACTGCTTCCAGGAGGAC AGCATGGCCTCCCCGAAGCTGTGGA CCGTGTTCCTGGGAAAGATGCGGCA GAACTCGCGCTGGCCAGGCGAGGTG TCCTTCAAGGTGAGCCGTCTGTTCC TGCACCCGTACCACGAGGAGGACAG CCATGACTACGACGTGGCCCTGCTG CAGCTCGACCACCCCGTGGTGTACT CGGCCACTGTGCGCCCCGTCTGCCT GCCTGCCCGCTCCCACTTCTTTGAG CCAGGCCAGCACTGCTGGACTGACAG GCTGGGGAGCCCAGCGAGAGGGTGG TCCGGTGAGCAACACCCTGCAGAAG GTGGACGTACAGCTGGTCCCTCAGG ACCTCTGCAGTGAGGCCTACCGCTA CCAGGTGTCCCCACGCATGCTCTGT GCTGGCTACCGCAAGGGCAAGAAAG ATGCCTGCCAGGGTGACTCTGGAGG CCCACTGGTTTGCAGGGAGCCCAGT GGCCGCTGGTTCCTGGCAGGGTTGG TTAGCTGGGGCCTGGGCTGTGGCCG ACCCAATTTCTTTGGCGTCTACACC CGTGTCACACGTGTGATCAACTGGA TCCAGCAGGTGCTGACCTGAGGGCT GTTCTACAGAGCTGGACCTGCCTCC AGGCCAAGTTCAGGGTGTCCACCCA GCCAGGACACAAGTATTCTGGGGCA AGTGACCCTGCTAAGGCCTGTTTCC CTCAGGCCTACCCCAGTGACAGTAC AGAGAAGGATGTCAGCTGGTGGTTA GGATGCCTCCTGAGGTCCAGGGGCC AGCCTCGGCTAGGTTTCACTTCTAA CCCTTTCTTATTCTAGTCCTTTCCC CTCCCTGCTCCTACCACTGTTTTGG AGTGGGGTCTGGCGGCCATGACCTT GGCCTCCGGGTCTCTGTAGGAAAGA AAGAATCCTTCCCCTTGCAAAAGCC TCTTGGGGGAACTGCACAGAGAAAG AAGGTGCCTCTATCAAGGCTCTATC AGAGCCCTTGAGTCTGCCAAGTGGG CTGTACTCTAAGCCAAATCACCGGG CAGCCTCAGCTGCAGATGCCTGCTG AAGCTCTGCCTGCTACAGGGGCCTC CCTGCCATTCACTGGAGGCCCACTG TCTGTTCTGGGAATAAAGCACTTGA CCAAGCCCTGACACTGAAAAAAAAA AAAAAA |

What is claimed is:

1. An isolated antibody or antigen-binding fragment thereof that binds specifically to Transmembrane Protease Serine 6 (TMPRSS6) protein,
   wherein the antibody or antigen-binding fragment thereof binds to the catalytic domain of TMPRSS6 but does not bind to the catalytic triad of TMPRSS6;
   wherein the antibody or antigen-binding fragment thereof comprises three heavy chain complementarity determining regions (HCDRs) and three light chain complementarity determining regions (LCDRs),
   wherein the three heavy chain CDRs and three light chain CDRs comprise one of the following sets of CDRs:
   (a) SEQ ID NO: 4 (HCDR1), SEQ ID NO:6 (HCDR2), SEQ ID NO:8 (HCDR3), SEQ ID NO: 12 (LCDR1), SEQ ID NO:14 (LCDR2), and SEQ ID NO:16 (LCDR3);
   (b) SEQ ID NO: 24 (HCDR1), SEQ ID NO:26 (HCDR2), SEQ ID NO:28 (HCDR3), SEQ ID NO:12 (LCDR1), SEQ ID NO: 14 (LCDR2), and SEQ ID NO: 16 (LCDR3);
   (c) SEQ ID NO: 34 (HCDR1), SEQ ID NO:36 (HCDR2), SEQ ID NO:38 (HCDR3), SEQ ID NO: 12 (LCDR1), SEQ ID NO: 14 (LCDR2), and SEQ ID NO: 16 (LCDR3);
   (d) SEQ ID NO: 44 (HCDR1), SEQ ID NO:46 (HCDR2), SEQ ID NO:48 (HCDR3), SEQ ID NO:52 (LCDR1), SEQ ID NO:54 (LCDR2), and SEQ ID NO:56 (LCDR3);
   (e) SEQ ID NO: 64 (HCDR1), SEQ ID NO:66 (HCDR2), SEQ ID NO:68 (HCDR3), SEQ ID NO:72 (LCDR1), SEQ ID NO:74 (LCDR2), and SEQ ID NO: 76 (LCDR3);

(f) SEQ ID NO: 84 (HCDR1), SEQ ID NO:86 (HCDR2), SEQ ID NO:88 (HCDR3), SEQ ID NO:92 (LCDR1), SEQ ID NO:14 (LCDR2), and SEQ ID NO:94 (LCDR3); or (g) SEQ ID NO: 102 (HCDR1), SEQ ID NO:104 (HCDR2), SEQ ID NO: 106 (HCDR3), SEQ ID NO: 110 (LCDR1), SEQ ID NO: 14 (LCDR2), and SEQ ID NO: 112 (LCDR3).

2. The isolated antibody or antigen-binding fragment thereof of claim 1, wherein the antibody or antigen-binding fragment maintains TMPRSS6 in an inactive conformation that is capable of binding to but not cleaving a TMPRSS6 substrate.

3. The isolated antibody or antigen-binding fragment thereof of claim 2, wherein the TMPRSS6 substrate is hemojuvelin (HJV).

4. The isolated antibody or antigen-binding fragment thereof of claim 1, wherein the antibody or antigen-binding fragment thereof competes with hemojuvelin (HJV) for binding to TMPRSS6.

5. The antibody or antigen-binding fragment thereof of claim 1, wherein the three heavy chain CDRs and three light chain CDRs comprise the following set of CDRs:
SEQ ID NO: 102 (HCDR1), SEQ ID NO:104 (HCDR2), SEQ ID NO:106 (HCDR3), SEQ ID NO:110 (LCDR1), SEQ ID NO:14 (LCDR2), and SEQ ID NO:112 (LCDR3).

6. The antibody or antigen-binding fragment thereof of claim 1, wherein the antibody comprises a heavy chain variable region (HCVR)/a light chain variable region (LCVR) comprising the amino acid sequence pair of SEQ ID NOs: 100/108.

7. The antibody or antigen-binding fragment thereof of claim 1, wherein the antibody comprises a heavy chain (HC)/light chain (LC) comprising the amino acid sequence pair of SEQ ID NO: 114/116.

8. The antibody or antigen-binding fragment thereof of claim 1, wherein the antibody has one or more properties selected from:
(a) is a fully human monoclonal antibody;
(b) binds to human TMPRSS6 at 25° C. and at 37° C. with a dissociation constant ($K_D$) of less than about 21.2 nM, as measured in a surface plasmon resonance assay;
(c) binds to monkey TMPRSS6 at 25° C. and at 37° C. with a $K_D$ of less than about 25.7 nM, as measured in a surface plasmon resonance assay;
(d) binds to mouse TMPRSS6 at 25° C. and at 37° C. with a $K_D$ of less than about 703 nM, as measured in a surface plasmon resonance assay;
(e) binds to cells expressing human TMPRSS6 with $EC_{50}$ less than about 2.7 nM;
(f) binds to cells expressing monkey TMPRSS6 with $EC_{50}$ less than about 3.6 nM;
(g) binds to cells expressing mouse TMPRSS6 with $EC_{50}$ less than about 35 nM;
(h) inhibits protease-dependent release of cell surface hemojuvelin in the presence of human TMPRSS6 with percent inhibition greater than about 90%;
(i) inhibits protease-dependent release of cell surface hemojuvelin in the presence of human TMPRSS6 and exhibits an $IC_{50}$ less than about 200 pM;
(j) inhibits protease-dependent release of cell surface hemojuvelin in the presence of mouse TMPRSS6 with percent inhibition greater than about 42%;
(k) inhibits protease-dependent release of cell surface hemojuvelin in the presence of mouse TMPRSS6 and exhibits an $IC_{50}$ less than about 274 pM;
(l) inhibits human TMPRSS6 at 25° C. and at 37° C. with percent inhibition greater than about 65%;
(m) inhibits human TMPRSS6 at 25° C. and at 37° C. and exhibits an $IC_{50}$ less than about 10 nM;
(n) inhibits monkey TMPRSS6 at 25° C. and at 37° C. with percent inhibition greater than about 66%;
(o) inhibits monkey TMPRSS6 at 25° C. and at 37° C. and exhibits an $IC_{50}$ less than about 50 nM;
(p) inhibits mouse TMPRSS6 at 25° C. and at 37° C. with percent inhibition greater than about 58%;
(q) inhibits mouse TMPRSS6 at 25° C. and at 37° C. and exhibits an IC50 less than about 35 nM;
(r) when administered to a subject in need thereof, decreases serum iron levels of the subject;
(s) when administered to a subject in need thereof, increases serum hepcidin levels of the subject;
(t) when administered to a subject in need thereof, increases mature red blood cell levels of the subject;
(u) when administered to a subject in need thereof, increases mature red blood cell levels in the spleen and/or bone marrow of the subject;
(v) when administered to a subject in need thereof, increases hemoglobin levels of the subject; or
(w) when administered to a subject in need thereof, decreases transferrin saturation levels of the subject.

9. A pharmaceutical composition comprising an isolated antibody or antigen-binding fragment thereof that binds to TMPRSS6 according to claim 1 and a pharmaceutically acceptable carrier or diluent.

10. An isolated polynucleotide molecule comprising a polynucleotide sequence that encodes the antibody or antigen-binding fragment thereof as set forth in claim 7.

11. A host cell comprising the polynucleotide molecule of claim 10.

12. A method of producing an antibody or antigen-binding fragment thereof that binds specifically to TMPRSS6, comprising culturing the host cell of claim 11 under conditions permitting production of the antibody or antigen-binding fragment thereof, and recovering the antibody or antigen-binding fragment thereof so produced.

13. The method of claim 12, further comprising formulating the antibody or antigen-binding fragment thereof as a pharmaceutical composition comprising the antibody or antigen-binding fragment thereof and a pharmaceutically acceptable carrier.

14. A method of ameliorating at least one symptom or indication of a disease or disorder associated with iron overload, the method comprising administering a pharmaceutical composition comprising a therapeutically effective amount of an antibody or antigen-binding fragment thereof of claim 1 to a subject in need thereof.

15. The method of claim 14, wherein disease or disorder is a congenital dyserythropoeitic anemia, Diamond-Blackfan anemia, alpha thalassemia, beta thalassemia, a transfusion-dependent hemolytic anemia, myelodysplastic syndrome, sickle cell disease, polycythemia vera, hereditary hemochromatosis, or chronic liver disease.

16. The method of claim 15, wherein the disease or disorder is beta thalassemia.

* * * * *

SEQUENCE LISTING

<160> NUMBER OF SEQ ID NOS: 131

<210> SEQ ID NO 1
<211> LENGTH: 360
<212> TYPE: DNA
<213> ORGANISM: Artificial Sequence
<220> FEATURE:
<223> OTHER INFORMATION: Synthetic

<400> SEQUENCE: 1
caggtgcagc tggtggagtc tgggggaggc gtggtccagc ctgggaggtc cctgagactc      60
tcctgtgcag cctctggatt caccttcaat aactatggca tgcactgggt ccgccaggct     120
ccaggcaagg ggctggagtg ggtggcaatt atatcatatg atggaagtaa tgaatattat     180
tcagactccg tgaagggccg attcaccatc tccagagaca attccaagaa cacgctgtat     240
cttcaaatga acagcctgag agctgaggac acggctgtat attactgtgc gagagatcag     300
gactacggtg taacctcttt cattactggg gccagggaa ccctggtcac tgtctcctca     360

<210> SEQ ID NO 2
<211> LENGTH: 120
<212> TYPE: PRT
<213> ORGANISM: Artificial Sequence
<220> FEATURE:
<223> OTHER INFORMATION: Synthetic

<400> SEQUENCE: 2

Gln Val Gln Leu Val Glu Ser Gly Gly Gly Val Val Gln Pro Gly Arg
1               5                   10                  15

Ser Leu Arg Leu Ser Cys Ala Ala Ser Gly Phe Thr Phe Asn Asn Tyr
            20                  25                  30

Gly Met His Trp Val Arg Gln Ala Pro Gly Lys Gly Leu Glu Trp Val
        35                  40                  45

Ala Ile Ile Ser Tyr Asp Gly Ser Asn Glu Tyr Tyr Ser Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Asp Gln Asp Tyr Gly Gly Asn Leu Phe His Tyr Trp Gly Gln
            100                 105                 110

Gly Thr Leu Val Thr Val Ser Ser
        115                 120

<210> SEQ ID NO 3
<211> LENGTH: 24
<212> TYPE: DNA
<213> ORGANISM: Artificial Sequence
<220> FEATURE:
<223> OTHER INFORMATION: Synthetic

<400> SEQUENCE: 3
ggattcacct tcaataacta tggc                                              24

<210> SEQ ID NO 4
<211> LENGTH: 8
<212> TYPE: PRT
<213> ORGANISM: Artificial Sequence
<220> FEATURE:
<223> OTHER INFORMATION: Synthetic

<400> SEQUENCE: 4

Gly Phe Thr Phe Asn Asn Tyr Gly
1               5

<210> SEQ ID NO 5
<211> LENGTH: 24
<212> TYPE: DNA
<213> ORGANISM: Artificial Sequence
<220> FEATURE:
<223> OTHER INFORMATION: Synthetic

<400> SEQUENCE: 5
atatcatatg atggaagtaa tgaa                                          24

<210> SEQ ID NO 6
<211> LENGTH: 8
<212> TYPE: PRT
<213> ORGANISM: Artificial Sequence
<220> FEATURE:
<223> OTHER INFORMATION: Synthetic

<400> SEQUENCE: 6

Ile Ser Tyr Asp Gly Ser Asn Glu
1               5

<210> SEQ ID NO 7
<211> LENGTH: 39
<212> TYPE: DNA
<213> ORGANISM: Artificial Sequence
<220> FEATURE:
<223> OTHER INFORMATION: Synthetic

<400> SEQUENCE: 7
gcgagagatc aggactacgg tggtaacctc tttcattac                          39

<210> SEQ ID NO 8
<211> LENGTH: 13
<212> TYPE: PRT
<213> ORGANISM: Artificial Sequence
<220> FEATURE:
<223> OTHER INFORMATION: Synthetic

<400> SEQUENCE: 8

Ala Arg Asp Gln Asp Tyr Gly Gly Asn Leu Phe His Tyr
1               5                   10

<210> SEQ ID NO 9
<211> LENGTH: 324
<212> TYPE: DNA
<213> ORGANISM: Artificial Sequence
<220> FEATURE:
<223> OTHER INFORMATION: Synthetic

<400> SEQUENCE: 9
gacatccaga tgacccagtc tccatcctcc ctgtctgcat ctgtaggaga cagagtcacc    60
atcacttgcc gggcaagtca gagcattagc agctatttaa attggtatca gcagaaacca   120
gggaaagccc ctaagctcct gatctatgct gcatccagtt tgcaaagtgg ggtcccgtca   180
aggttcagtg gcagtggatc tgggacagat tcactctca ccatcagcag tctgcaacct    240
gaagattttg caacttacta ctgtcaacag agttacagta cccctccgat caccttcggc   300
caagggacac gactggagat taaa                                         324

<210> SEQ ID NO 10
<211> LENGTH: 108

```
<212> TYPE: PRT
<213> ORGANISM: Artificial Sequence
<220> FEATURE:
<223> OTHER INFORMATION: Synthetic

<400> SEQUENCE: 10

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Ser Ile Ser Ser Tyr
            20                  25                  30

Leu Asn Trp Tyr Gln Gln Lys Pro Gly Lys Ala Pro Lys Leu Leu Ile
        35                  40                  45

Tyr Ala Ala Ser Ser Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Ser Tyr Ser Thr Pro Pro
                85                  90                  95

Ile Thr Phe Gly Gln Gly Thr Arg Leu Glu Ile Lys
            100                 105

<210> SEQ ID NO 11
<211> LENGTH: 18
<212> TYPE: DNA
<213> ORGANISM: Artificial Sequence
<220> FEATURE:
<223> OTHER INFORMATION: Synthetic

<400> SEQUENCE: 11
cagagcatta gcagctat                                                   18

<210> SEQ ID NO 12
<211> LENGTH: 6
<212> TYPE: PRT
<213> ORGANISM: Artificial Sequence
<220> FEATURE:
<223> OTHER INFORMATION: Synthetic

<400> SEQUENCE: 12

Gln Ser Ile Ser Ser Tyr
1               5

<210> SEQ ID NO 13
<211> LENGTH: 9
<212> TYPE: DNA
<213> ORGANISM: Artificial Sequence
<220> FEATURE:
<223> OTHER INFORMATION: Synthetic

<400> SEQUENCE: 13 gctgcatcc                                                              9

<210> SEQ ID NO 14
<211> LENGTH: 3
<212> TYPE: PRT
<213> ORGANISM: Artificial Sequence
<220> FEATURE:
<223> OTHER INFORMATION: Synthetic

<400> SEQUENCE: 14

Ala Ala Ser
1
```

```
<210> SEQ ID NO 15
<211> LENGTH: 30
<212> TYPE: DNA
<213> ORGANISM: Artificial Sequence
<220> FEATURE:
<223> OTHER INFORMATION: Synthetic

<400> SEQUENCE: 15
caacagagtt acagtacccc tccgatcacc                                       30

<210> SEQ ID NO 16
<211> LENGTH: 10
<212> TYPE: PRT
<213> ORGANISM: Artificial Sequence
<220> FEATURE:
<223> OTHER INFORMATION: Synthetic

<400> SEQUENCE: 16

Gln Gln Ser Tyr Ser Thr Pro Pro Ile Thr
1               5                   10

<210> SEQ ID NO 17
<211> LENGTH: 1344
<212> TYPE: DNA
<213> ORGANISM: Artificial Sequence
<220> FEATURE:
<223> OTHER INFORMATION: Synthetic

<400> SEQUENCE: 17
caggtgcagc tggtggagtc tgggggaggc gtggtccagc ctggagggtc cctgagactc      60
tcctgtgcag cctctggatt caccttcaat aactatggca tgcactgggt ccgccaggct     120
ccaggcaagg ggctggagtg ggtggcaatt atatcatatg atggaagtaa tgaatattat     180
tcagactccg tgaagggccg attcaccatc tccagagaca attccaagaa cacgctgtat     240
cttcaaatga acagcctgag agctgaggac acggctgtat attactgtgc gagagatcag     300
gactacggtg gtaacctctt tcattactgg ggccagggaa ccctggtcac tgtctcctca     360
gcctccacca agggcccatc ggtcttcccc ctggcgccct gctccaggag cacctccgag     420
agcacagccg ccctgggctg cctggtcaag gactacttcc ccgaaccggt gacggtgtcg     480
tggaactcag gcgccctgac cagcggcgtg cacaccttcc cggctgtcct acagtcctca     540
ggactctact ccctcagcag cgtggtgacc gtgccctcca gcagcttggg cacgaagacc     600
tacacctgca acgtagatca caagcccagc aacaccaagg tggacaagag agttgagtcc     660
aaatatggtc cccatgccca ccctgccca gcacctgagt tcctgggggg accatcagtc      720
ttcctgttcc ccccaaaacc caaggacact ctcatgatct cccggacccc tgaggtcacg     780
tgcgtggtgg tggacgtgag ccaggaagac cccgaggtcc agttcaactg gtacgtggat     840
ggcgtggagg tgcataatgc caagacaaag ccgcgggagg agcagttcaa cagcacgtac     900
cgtgtggtca gcgtcctcac cgtcctgcac caggactggc tgaacggcaa ggagtacaag     960
tgcaaggtct ccaacaaagg cctcccgtcc tccatcgaga aaaccatctc caaagccaaa    1020
gggcagcccc gagagccaca ggtgtacacc ctgcccccat cccaggagga gatgaccaag    1080
aaccaggtca gcctgacctg cctggtcaaa ggcttctacc ccagcgacat cgccgtggag    1140
tgggagagca atgggcagcc ggagaacaac tacaagacca cgcctcccgt gctggactcc    1200
gacggctcct tcttcctcta cagcaggctc accgtggaca agagcaggtg gcaggagggg    1260
aatgtcttct catgctccgt gatgcatgag gctctgcaca accactacac acagaagtcc    1320
ctctccctgt ctctgggtaa atga                                          1344
```

<210> SEQ ID NO 18
<211> LENGTH: 447
<212> TYPE: PRT
<213> ORGANISM: Artificial Sequence
<220> FEATURE:
<223> OTHER INFORMATION: Synthetic

<400> SEQUENCE: 18

Gln Val Gln Leu Val Glu Ser Gly Gly Val Val Gln Pro Gly Arg
1               5                   10                  15

Ser Leu Arg Leu Ser Cys Ala Ala Ser Gly Phe Thr Phe Asn Asn Tyr
            20                  25                  30

Gly Met His Trp Val Arg Gln Ala Pro Gly Lys Gly Leu Glu Trp Val
        35                  40                  45

Ala Ile Ile Ser Tyr Asp Gly Ser Asn Glu Tyr Tyr Ser Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Asp Gln Asp Tyr Gly Gly Asn Leu Phe His Tyr Trp Gly Gln
            100                 105                 110

Gly Thr Leu Val Thr Val Ser Ser Ala Ser Thr Lys Gly Pro Ser Val
        115                 120                 125

Phe Pro Leu Ala Pro Cys Ser Arg Ser Thr Ser Glu Ser Thr Ala Ala
    130                 135                 140

Leu Gly Cys Leu Val Lys Asp Tyr Phe Pro Glu Pro Val Thr Val Ser
145                 150                 155                 160

Trp Asn Ser Gly Ala Leu Thr Ser Gly Val His Thr Phe Pro Ala Val
                165                 170                 175

Leu Gln Ser Ser Gly Leu Tyr Ser Leu Ser Ser Val Val Thr Val Pro
            180                 185                 190

Ser Ser Ser Leu Gly Thr Lys Thr Tyr Thr Cys Asn Val Asp His Lys
        195                 200                 205

Pro Ser Asn Thr Lys Val Asp Lys Arg Val Glu Ser Lys Tyr Gly Pro
    210                 215                 220

Pro Cys Pro Pro Cys Pro Ala Pro Glu Phe Leu Gly Gly Pro Ser Val
225                 230                 235                 240

Phe Leu Phe Pro Pro Lys Pro Lys Asp Thr Leu Met Ile Ser Arg Thr
                245                 250                 255

Pro Glu Val Thr Cys Val Val Val Asp Val Ser Gln Glu Asp Pro Glu
            260                 265                 270

Val Gln Phe Asn Trp Tyr Val Asp Gly Val Glu Val His Asn Ala Lys
        275                 280                 285

Thr Lys Pro Arg Glu Glu Gln Phe Asn Ser Thr Tyr Arg Val Val Ser
    290                 295                 300

Val Leu Thr Val Leu His Gln Asp Trp Leu Asn Gly Lys Glu Tyr Lys
305                 310                 315                 320

Cys Lys Val Ser Asn Lys Gly Leu Pro Ser Ser Ile Glu Lys Thr Ile
                325                 330                 335

Ser Lys Ala Lys Gly Gln Pro Arg Glu Pro Gln Val Tyr Thr Leu Pro
            340                 345                 350

Pro Ser Gln Glu Glu Met Thr Lys Asn Gln Val Ser Leu Thr Cys Leu
        355                 360                 365

Val Lys Gly Phe Tyr Pro Ser Asp Ile Ala Val Glu Trp Glu Ser Asn
        370                 375                 380

Gly Gln Pro Glu Asn Asn Tyr Lys Thr Thr Pro Pro Val Leu Asp Ser
385                 390                 395                 400

Asp Gly Ser Phe Phe Leu Tyr Ser Arg Leu Thr Val Asp Lys Ser Arg
                405                 410                 415

Trp Gln Glu Gly Asn Val Phe Ser Cys Ser Val Met His Glu Ala Leu
            420                 425                 430

His Asn His Tyr Thr Gln Lys Ser Leu Ser Leu Ser Leu Gly Lys
        435                 440                 445

<210> SEQ ID NO 19
<211> LENGTH: 648
<212> TYPE: DNA
<213> ORGANISM: Artificial Sequence
<220> FEATURE:
<223> OTHER INFORMATION: Synthetic

<400> SEQUENCE: 19

```
gacatccaga tgacccagtc tccatcctcc ctgtctgcat ctgtaggaga cagagtcacc    60
atcacttgcc gggcaagtca gagcattagc agctatttaa attggtatca gcagaaacca   120
gggaaagccc ctaagctcct gatctatgct gcatccagtt tgcaaagtgg ggtcccgtca   180
aggttcagtg gcagtggatc tgggacagat ttcactctca ccatcagcag tctgcaacct   240
gaagattttg caacttacta ctgtcaacag agttacagta cccctccgat caccttcggc   300
caagggacac gactggagat aaacgaact gtggctgcac catctgtctt catcttcccg    360
ccatctgatg agcagttgaa atctggaact gcctctgttg tgtgcctgct gaataacttc   420
tatcccagag aggccaaagt acagtggaag gtggataacg ccctccaatc gggtaactcc   480
caggagagtg tcacagagca ggacagcaag gacagcacct acagcctcag cagcaccctg   540
acgctgagca agcagactac gagaaacac aaagtctacg cctgcgaagt cacccatcag   600
ggcctgagct cgcccgtcac aaagagcttc aacaggggag agtgttag              648
```

<210> SEQ ID NO 20
<211> LENGTH: 215
<212> TYPE: PRT
<213> ORGANISM: Artificial Sequence
<220> FEATURE:
<223> OTHER INFORMATION: Synthetic

<400> SEQUENCE: 20

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Ser Ile Ser Ser Tyr
            20                  25                  30

Leu Asn Trp Tyr Gln Gln Lys Pro Gly Lys Ala Pro Lys Leu Leu Ile
        35                  40                  45

Tyr Ala Ala Ser Ser Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Ser Tyr Ser Thr Pro Pro
                85                  90                  95

Ile Thr Phe Gly Gln Gly Thr Arg Leu Glu Ile Lys Arg Thr Val Ala
            100                 105                 110

```
Ala Pro Ser Val Phe Ile Phe Pro Ser Asp Glu Gln Leu Lys Ser
        115                 120                 125

Gly Thr Ala Ser Val Val Cys Leu Leu Asn Asn Phe Tyr Pro Arg Glu
    130                 135                 140

Ala Lys Val Gln Trp Lys Val Asp Asn Ala Leu Gln Ser Gly Asn Ser
145                 150                 155                 160

Gln Glu Ser Val Thr Glu Gln Asp Ser Lys Asp Ser Thr Tyr Ser Leu
                165                 170                 175

Ser Ser Thr Leu Thr Leu Ser Lys Ala Asp Tyr Glu Lys His Lys Val
            180                 185                 190

Tyr Ala Cys Glu Val Thr His Gln Gly Leu Ser Ser Pro Val Thr Lys
        195                 200                 205

Ser Phe Asn Arg Gly Glu Cys
    210                 215

<210> SEQ ID NO 21
<211> LENGTH: 360
<212> TYPE: DNA
<213> ORGANISM: Artificial Sequence
<220> FEATURE:
<223> OTHER INFORMATION: Synthetic

<400> SEQUENCE: 21
caggtgcagc tggtggagtc tgggggaggc gtggtccagc ctgggaggtc cctgagactc    60
tcctgtgcag cctctggatt caccttcagt acctatggca tgcactgggt ccgccaggct   120
ccaggcaagg ggctggagtg ggtggcaatt atatcatatg atggaagtaa tgactactat   180
ttagactccg tgaagggccg attcaccatc tccagagaca attccaagaa cacgctgtat   240
ctgcaaatga acaacctgag agctgaggac acggctgtgt attactgtgc gaaagatcag   300
ggctacggtg gtaacctctt tgcctcctgg ggccagggaa ccctggtcac cgtctcctca   360

<210> SEQ ID NO 22
<211> LENGTH: 120
<212> TYPE: PRT
<213> ORGANISM: Artificial Sequence
<220> FEATURE:
<223> OTHER INFORMATION: Synthetic

<400> SEQUENCE: 22

Gln Val Gln Leu Val Glu Ser Gly Gly Gly Val Val Gln Pro Gly Arg
1               5                   10                  15

Ser Leu Arg Leu Ser Cys Ala Ala Ser Gly Phe Thr Phe Ser Thr Tyr
            20                  25                  30

Gly Met His Trp Val Arg Gln Ala Pro Gly Lys Gly Leu Glu Trp Val
        35                  40                  45

Ala Ile Ile Ser Tyr Asp Gly Ser Asn Asp Tyr Tyr Leu Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Asn Leu Arg Ala Glu Asp Thr Ala Val Tyr Tyr Cys
                85                  90                  95

Ala Lys Asp Gln Gly Tyr Gly Gly Asn Leu Phe Ala Ser Trp Gly Gln
            100                 105                 110

Gly Thr Leu Val Thr Val Ser Ser
        115                 120

<210> SEQ ID NO 23
```

<211> LENGTH: 24
<212> TYPE: DNA
<213> ORGANISM: Artificial Sequence
<220> FEATURE:
<223> OTHER INFORMATION: Synthetic

<400> SEQUENCE: 23
ggattcacct tcagtaccta tggc                                    24

<210> SEQ ID NO 24
<211> LENGTH: 8
<212> TYPE: PRT
<213> ORGANISM: Artificial Sequence
<220> FEATURE:
<223> OTHER INFORMATION: Synthetic

<400> SEQUENCE: 24

Gly Phe Thr Phe Ser Thr Tyr Gly
1               5

<210> SEQ ID NO 25
<211> LENGTH: 24
<212> TYPE: DNA
<213> ORGANISM: Artificial Sequence
<220> FEATURE:
<223> OTHER INFORMATION: Synthetic

<400> SEQUENCE: 25
atatcatatg atggaagtaa tgac                                    24

<210> SEQ ID NO 26
<211> LENGTH: 8
<212> TYPE: PRT
<213> ORGANISM: Artificial Sequence
<220> FEATURE:
<223> OTHER INFORMATION: Synthetic

<400> SEQUENCE: 26

Ile Ser Tyr Asp Gly Ser Asn Asp
1               5

<210> SEQ ID NO 27
<211> LENGTH: 39
<212> TYPE: DNA
<213> ORGANISM: Artificial Sequence
<220> FEATURE:
<223> OTHER INFORMATION: Synthetic

<400> SEQUENCE: 27
gcgaaagatc agggctacgg tggtaacctc tttgcctcc                    39

<210> SEQ ID NO 28
<211> LENGTH: 13
<212> TYPE: PRT
<213> ORGANISM: Artificial Sequence
<220> FEATURE:
<223> OTHER INFORMATION: Synthetic

<400> SEQUENCE: 28

Ala Lys Asp Gln Gly Tyr Gly Gly Asn Leu Phe Ala Ser
1               5                   10

<210> SEQ ID NO 29
<211> LENGTH: 1344
<212> TYPE: DNA
<213> ORGANISM: Artificial Sequence
<220> FEATURE:

<223> OTHER INFORMATION: Synthetic

<400> SEQUENCE: 29

```
caggtgcagc tggtggagtc tgggggaggc gtggtccagc ctggggaggtc cctgagactc    60
tcctgtgcag cctctggatt caccttcagt acctatggca tgcactgggt ccgccaggct   120
ccaggcaagg ggctggagtg ggtggcaatt atatcatatg atggaagtaa tgactactat   180
ttagactccg tgaagggccg attcaccatc tccagagaca attccaagaa cacgctgtat   240
ctgcaaatga acaacctgag agctgaggac acggctgtgt attactgtgc gaaagatcag   300
ggctacggtg gtaacctctt tgcctcctgg ggccagggaa ccctggtcac cgtctcctca   360
gcctccacca agggcccatc ggtcttcccc ctggcgccct gctccaggag cacctccgag   420
agcacagccg ccctgggctg cctggtcaag gactacttcc ccgaaccggt gacggtgtcg   480
tggaactcag gcgccctgac cagcggcgtg cacaccttcc cggctgtcct acagtcctca   540
ggactctact ccctcagcag cgtggtgacc gtgccctcca gcagcttggg cacgaagacc   600
tacacctgca acgtagatca caagcccagc aacaccaagg tggacaagag agttgagtcc   660
aaatatggtc cccatgccc accctgccca gcacctgagt tcctggggggg accatcagtc   720
ttcctgttcc ccccaaaacc caaggacact ctcatgatct cccggacccc tgaggtcacg   780
tgcgtggtgg tggacgtgag ccaggaagac cccgaggtcc agttcaactg gtacgtggat   840
ggcgtggagg tgcataatgc caagacaaag ccgcgggagg agcagttcaa cagcacgtac   900
cgtgtggtca gcgtcctcac cgtcctgcac caggactggc tgaacggcaa ggagtacaag   960
tgcaaggtct ccaacaaagg cctcccgtcc tccatcgaga aaaccatctc caaagccaaa  1020
gggcagcccc gagagccaca ggtgtacacc ctgcccccat cccaggagga tgaccaag   1080
aaccaggtca gcctgacctg cctggtcaaa ggcttctacc ccagcgacat cgccgtggag  1140
tgggagagca atgggcagcc ggagaacaac tacaagacca cgcctcccgt gctggactcc  1200
gacggctcct tcttcctcta cagcaggctc accgtggaca agagcaggtg gcaggagggg  1260
aatgtcttct catgctccgt gatgcatgag gctctgcaca accactacac acagaagtcc  1320
ctctccctgt ctctgggtaa atga                                         1344
```

<210> SEQ ID NO 30
<211> LENGTH: 447
<212> TYPE: PRT
<213> ORGANISM: Artificial Sequence
<220> FEATURE:
<223> OTHER INFORMATION: Synthetic

<400> SEQUENCE: 30

```
Gln Val Gln Leu Val Glu Ser Gly Gly Gly Val Val Gln Pro Gly Arg
  1               5                  10                  15

Ser Leu Arg Leu Ser Cys Ala Ala Ser Gly Phe Thr Phe Ser Thr Tyr
             20                  25                  30

Gly Met His Trp Val Arg Gln Ala Pro Gly Lys Gly Leu Glu Trp Val
         35                  40                  45

Ala Ile Ile Ser Tyr Asp Gly Ser Asn Asp Tyr Tyr Leu Asp Ser Val
     50                  55                  60

Lys Gly Arg Phe Thr Ile Ser Arg Asp Asn Ser Lys Asn Thr Leu Tyr
 65                  70                  75                  80

Leu Gln Met Asn Asn Leu Arg Ala Glu Asp Thr Ala Val Tyr Tyr Cys
                 85                  90                  95

Ala Lys Asp Gln Gly Tyr Gly Gly Asn Leu Phe Ala Ser Trp Gly Gln
```

```
                100                 105                 110
Gly Thr Leu Val Thr Val Ser Ser Ala Ser Thr Lys Gly Pro Ser Val
            115                 120                 125

Phe Pro Leu Ala Pro Cys Ser Arg Ser Thr Ser Glu Ser Thr Ala Ala
130                 135                 140

Leu Gly Cys Leu Val Lys Asp Tyr Phe Pro Glu Pro Val Thr Val Ser
145                 150                 155                 160

Trp Asn Ser Gly Ala Leu Thr Ser Gly Val His Thr Phe Pro Ala Val
                165                 170                 175

Leu Gln Ser Ser Gly Leu Tyr Ser Leu Ser Ser Val Val Thr Val Pro
                180                 185                 190

Ser Ser Ser Leu Gly Thr Lys Thr Tyr Thr Cys Asn Val Asp His Lys
                195                 200                 205

Pro Ser Asn Thr Lys Val Asp Lys Arg Val Glu Ser Lys Tyr Gly Pro
        210                 215                 220

Pro Cys Pro Pro Cys Pro Ala Pro Glu Phe Leu Gly Gly Pro Ser Val
225                 230                 235                 240

Phe Leu Phe Pro Pro Lys Pro Lys Asp Thr Leu Met Ile Ser Arg Thr
                245                 250                 255

Pro Glu Val Thr Cys Val Val Val Asp Val Ser Gln Glu Asp Pro Glu
                260                 265                 270

Val Gln Phe Asn Trp Tyr Val Asp Gly Val Glu Val His Asn Ala Lys
            275                 280                 285

Thr Lys Pro Arg Glu Glu Gln Phe Asn Ser Thr Tyr Arg Val Val Ser
        290                 295                 300

Val Leu Thr Val Leu His Gln Asp Trp Leu Asn Gly Lys Glu Tyr Lys
305                 310                 315                 320

Cys Lys Val Ser Asn Lys Gly Leu Pro Ser Ser Ile Glu Lys Thr Ile
                325                 330                 335

Ser Lys Ala Lys Gly Gln Pro Arg Glu Pro Gln Val Tyr Thr Leu Pro
                340                 345                 350

Pro Ser Gln Glu Glu Met Thr Lys Asn Gln Val Ser Leu Thr Cys Leu
            355                 360                 365

Val Lys Gly Phe Tyr Pro Ser Asp Ile Ala Val Glu Trp Glu Ser Asn
        370                 375                 380

Gly Gln Pro Glu Asn Asn Tyr Lys Thr Thr Pro Pro Val Leu Asp Ser
385                 390                 395                 400

Asp Gly Ser Phe Phe Leu Tyr Ser Arg Leu Thr Val Asp Lys Ser Arg
                405                 410                 415

Trp Gln Glu Gly Asn Val Phe Ser Cys Ser Val Met His Glu Ala Leu
                420                 425                 430

His Asn His Tyr Thr Gln Lys Ser Leu Ser Leu Ser Leu Gly Lys
            435                 440                 445

<210> SEQ ID NO 31
<211> LENGTH: 378
<212> TYPE: DNA
<213> ORGANISM: Artificial Sequence
<220> FEATURE:
<223> OTHER INFORMATION: Synthetic

<400> SEQUENCE: 31
gaggtgcagc tggtggagtc tggggggaggc ttggtaaagc cggggggtc ccttagactc      60 tcctgtgcag cctctggatt cactttcagt aacgcctgga tgagctgggt ccgccaggct    120
```

```
ccagggaagg ggctggagtg ggttggccgt attaaaagca aaactgatag tgggacaaca    180
gactacgctg cacccgtgaa aggcagattc accatctcaa gagatgattc aaaaaacacg    240
ctgtatctgc aaatgaacag cctgaaaacc gaggacacag ccgtgtatta ctgtaccaca    300
gtggataacg attttggag tggttattat aactggttcg acccctgggg ccagggaacc    360
ctggtcactg tctcctca                                                  378
```

<210> SEQ ID NO 32
<211> LENGTH: 126
<212> TYPE: PRT
<213> ORGANISM: Artificial Sequence
<220> FEATURE:
<223> OTHER INFORMATION: Synthetic

<400> SEQUENCE: 32

```
Glu Val Gln Leu Val Glu Ser Gly Gly Gly Leu Val Lys Pro Gly Gly
1               5                   10                  15

Ser Leu Arg Leu Ser Cys Ala Ala Ser Gly Phe Thr Phe Ser Asn Ala
            20                  25                  30

Trp Met Ser Trp Val Arg Gln Ala Pro Gly Lys Gly Leu Glu Trp Val
        35                  40                  45

Gly Arg Ile Lys Ser Lys Thr Asp Ser Gly Thr Thr Asp Tyr Ala Ala
    50                  55                  60

Pro Val Lys Gly Arg Phe Thr Ile Ser Arg Asp Asp Ser Lys Asn Thr
65                  70                  75                  80

Leu Tyr Leu Gln Met Asn Ser Leu Lys Thr Glu Asp Thr Ala Val Tyr
                85                  90                  95

Tyr Cys Thr Thr Val Asp Asn Asp Phe Trp Ser Gly Tyr Tyr Asn Trp
            100                 105                 110

Phe Asp Pro Trp Gly Gln Gly Thr Leu Val Thr Val Ser Ser
        115                 120                 125
```

<210> SEQ ID NO 33
<211> LENGTH: 24
<212> TYPE: DNA
<213> ORGANISM: Artificial Sequence
<220> FEATURE:
<223> OTHER INFORMATION: Synthetic

<400> SEQUENCE: 33

```
ggattcactt tcagtaacgc ctgg                                            24
```

<210> SEQ ID NO 34
<211> LENGTH: 8
<212> TYPE: PRT
<213> ORGANISM: Artificial Sequence
<220> FEATURE:
<223> OTHER INFORMATION: Synthetic

<400> SEQUENCE: 34

```
Gly Phe Thr Phe Ser Asn Ala Trp
1               5
```

<210> SEQ ID NO 35
<211> LENGTH: 30
<212> TYPE: DNA
<213> ORGANISM: Artificial Sequence
<220> FEATURE:
<223> OTHER INFORMATION: Synthetic

<400> SEQUENCE: 35
attaaaagca aaactgatag tgggacaaca                                           30

<210> SEQ ID NO 36
<211> LENGTH: 10
<212> TYPE: PRT
<213> ORGANISM: Artificial Sequence
<220> FEATURE:
<223> OTHER INFORMATION: Synthetic

<400> SEQUENCE: 36

Ile Lys Ser Lys Thr Asp Ser Gly Thr Thr
1               5                   10

<210> SEQ ID NO 37
<211> LENGTH: 51
<212> TYPE: DNA
<213> ORGANISM: Artificial Sequence
<220> FEATURE:
<223> OTHER INFORMATION: Synthetic

<400> SEQUENCE: 37
accacagtgg ataacgattt ttggagtggt tattataact ggttcgaccc c                  51

<210> SEQ ID NO 38
<211> LENGTH: 17
<212> TYPE: PRT
<213> ORGANISM: Artificial Sequence
<220> FEATURE:
<223> OTHER INFORMATION: Synthetic

<400> SEQUENCE: 38

Thr Thr Val Asp Asn Asp Phe Trp Ser Gly Tyr Tyr Asn Trp Phe Asp
1               5                   10                  15
Pro

<210> SEQ ID NO 39
<211> LENGTH: 1362
<212> TYPE: DNA
<213> ORGANISM: Artificial Sequence
<220> FEATURE:
<223> OTHER INFORMATION: Synthetic

<400> SEQUENCE: 39
gaggtgcagc tggtggagtc tgggggaggc ttggtaaagc cggggggggtc ccttagactc        60
tcctgtgcag cctctggatt cactttcagt aacgcctgga tgagctgggt ccgccaggct       120
ccagggaagg ggctggagtg ggttggccgt attaaaagca aaactgatag tgggacaaca       180
gactacgctg cacccgtgaa aggcagattc accatctcaa gagatgattc aaaaaacacg       240
ctgtatctgc aaatgaacag cctgaaaacc gaggacacag ccgtgtatta ctgtaccaca       300
gtggataacg attttggag tggttattat aactggttcg accctgggg ccagggaacc        360
ctggtcactg tctcctcagc ctccaccaag ggcccatcgg tcttccccct ggcgccctgc       420
tccaggagca cctccgagag cacagccgcc ctgggctgcc tggtcaagga ctacttcccc       480
gaaccggtga cggtgtcgtg gaactcaggc gccctgacca gcggcgtgca caccttcccg       540
gctgtcctac agtcctcagg actctactcc ctcagcagcg tggtgaccgt gcctccagc        600
agcttgggca cgaagaccta cacctgcaac gtagatcaca gcccagcaa caccaaggtg        660
gacaagagag ttgagtccaa atatggtccc ccatgcccac cctgcccagc acctgagttc       720
ctgggggac catcagtctt cctgttcccc ccaaaaccca aggacactct catgatctcc        780
cggacccctg aggtcacgtg cgtggtggtg gacgtgagcc aggaagaccc cgaggtccag       840

-continued

```
ttcaactggt acgtggatgg cgtggaggtg cataatgcca agacaaagcc gcgggaggag    900
cagttcaaca gcacgtaccg tgtggtcagc gtcctcaccg tcctgcacca ggactggctg    960
aacggcaagg agtacaagtg caaggtctcc aacaaaggcc tcccgtcctc catcgagaaa    1020
accatctcca aagccaaagg gcagccccga gagccacagg tgtacaccct gcccccatcc    1080
caggaggaga tgaccaagaa ccaggtcagc ctgacctgcc tggtcaaagg cttctacccc    1140
agcgacatcg ccgtggagtg ggagagcaat gggcagccgg agaacaacta caagaccacg    1200
cctcccgtgc tggactccga cggctccttc ttcctctaca gcaggctcac cgtggacaag    1260
agcaggtggc aggagggaa tgtcttctca tgctccgtga tgcatgaggc tctgcacaac    1320
cactacacac agaagtccct ctccctgtct ctgggtaaat ga    1362
```

<210> SEQ ID NO 40
<211> LENGTH: 453
<212> TYPE: PRT
<213> ORGANISM: Artificial Sequence
<220> FEATURE:
<223> OTHER INFORMATION: Synthetic

<400> SEQUENCE: 40

```
Glu Val Gln Leu Val Glu Ser Gly Gly Gly Leu Val Lys Pro Gly Gly
1               5                   10                  15

Ser Leu Arg Leu Ser Cys Ala Ala Ser Gly Phe Thr Phe Ser Asn Ala
            20                  25                  30

Trp Met Ser Trp Val Arg Gln Ala Pro Gly Lys Gly Leu Glu Trp Val
        35                  40                  45

Gly Arg Ile Lys Ser Lys Thr Asp Ser Gly Thr Thr Asp Tyr Ala Ala
    50                  55                  60

Pro Val Lys Gly Arg Phe Thr Ile Ser Arg Asp Asp Ser Lys Asn Thr
65                  70                  75                  80

Leu Tyr Leu Gln Met Asn Ser Leu Lys Thr Glu Asp Thr Ala Val Tyr
                85                  90                  95

Tyr Cys Thr Thr Val Asp Asn Asp Phe Trp Ser Gly Tyr Tyr Asn Trp
            100                 105                 110

Phe Asp Pro Trp Gly Gln Gly Thr Leu Val Thr Val Ser Ser Ala Ser
        115                 120                 125

Thr Lys Gly Pro Ser Val Phe Pro Leu Ala Pro Cys Ser Arg Ser Thr
    130                 135                 140

Ser Glu Ser Thr Ala Ala Leu Gly Cys Leu Val Lys Asp Tyr Phe Pro
145                 150                 155                 160

Glu Pro Val Thr Val Ser Trp Asn Ser Gly Ala Leu Thr Ser Gly Val
                165                 170                 175

His Thr Phe Pro Ala Val Leu Gln Ser Ser Gly Leu Tyr Ser Leu Ser
            180                 185                 190

Ser Val Val Thr Val Pro Ser Ser Ser Leu Gly Thr Lys Thr Tyr Thr
        195                 200                 205

Cys Asn Val Asp His Lys Pro Ser Asn Thr Lys Val Asp Lys Arg Val
    210                 215                 220

Glu Ser Lys Tyr Gly Pro Pro Cys Pro Pro Cys Pro Ala Pro Glu Phe
225                 230                 235                 240

Leu Gly Gly Pro Ser Val Phe Leu Phe Pro Pro Lys Pro Lys Asp Thr
                245                 250                 255

Leu Met Ile Ser Arg Thr Pro Glu Val Thr Cys Val Val Val Asp Val
            260                 265                 270
```

Ser Gln Glu Asp Pro Glu Val Gln Phe Asn Trp Tyr Val Asp Gly Val
              275                 280                 285

Glu Val His Asn Ala Lys Thr Lys Pro Arg Glu Glu Gln Phe Asn Ser
        290                 295                 300

Thr Tyr Arg Val Val Ser Val Leu Thr Val Leu His Gln Asp Trp Leu
305                 310                 315                 320

Asn Gly Lys Glu Tyr Lys Cys Lys Val Ser Asn Lys Gly Leu Pro Ser
                325                 330                 335

Ser Ile Glu Lys Thr Ile Ser Lys Ala Lys Gly Gln Pro Arg Glu Pro
            340                 345                 350

Gln Val Tyr Thr Leu Pro Pro Ser Gln Glu Met Thr Lys Asn Gln
        355                 360                 365

Val Ser Leu Thr Cys Leu Val Lys Gly Phe Tyr Pro Ser Asp Ile Ala
    370                 375                 380

Val Glu Trp Glu Ser Asn Gly Gln Pro Glu Asn Asn Tyr Lys Thr Thr
385                 390                 395                 400

Pro Pro Val Leu Asp Ser Asp Gly Ser Phe Phe Leu Tyr Ser Arg Leu
                405                 410                 415

Thr Val Asp Lys Ser Arg Trp Gln Glu Gly Asn Val Phe Ser Cys Ser
            420                 425                 430

Val Met His Glu Ala Leu His Asn His Tyr Thr Gln Lys Ser Leu Ser
        435                 440                 445

Leu Ser Leu Gly Lys
        450

<210> SEQ ID NO 41
<211> LENGTH: 363
<212> TYPE: DNA
<213> ORGANISM: Artificial Sequence
<220> FEATURE:
<223> OTHER INFORMATION: Synthetic

<400> SEQUENCE: 41
gaagtgcagc tggtggagtc tgggggaggc ttggttaagc ctgggggggtc cctgagaatt      60 tcctgtgcag cctctggatt tatttttgtt gattatgcca tgcactgggt ccggcaagct     120
ccagggaagg gcctgagtg ggtctcaggt attagttgga atagtggtag tataggctat     180
gcggactctg tgaagggccg attccacatc tccagagaca cgccaagaa gtccctgtat     240 ctgcaaatga gtggtctgag acctgaggac acggccttgt attattgtgt aaaaagtggg     300
ttctattacg ttaggtctta ctttgacaac tggggccagg gaaccctggt caccgtctcc     360
tca                                                                    363

<210> SEQ ID NO 42
<211> LENGTH: 121
<212> TYPE: PRT
<213> ORGANISM: Artificial Sequence
<220> FEATURE:
<223> OTHER INFORMATION: Synthetic

<400> SEQUENCE: 42

Glu Val Gln Leu Val Glu Ser Gly Gly Gly Leu Val Lys Pro Gly Gly
1               5                   10                  15

Ser Leu Arg Ile Ser Cys Ala Ala Ser Gly Phe Ile Phe Val Asp Tyr
            20                  25                  30

Ala Met His Trp Val Arg Gln Ala Pro Gly Lys Gly Leu Glu Trp Val
        35                  40                  45

```
Ser Gly Ile Ser Trp Asn Ser Gly Ser Ile Gly Tyr Ala Asp Ser Val
 50                  55                  60

Lys Gly Arg Phe Thr Ile Ser Arg Asp Asn Ala Lys Lys Ser Leu Tyr
 65                  70                  75                  80

Leu Gln Met Ser Gly Leu Arg Pro Glu Asp Thr Ala Leu Tyr Tyr Cys
                 85                  90                  95

Val Lys Ser Gly Phe Tyr Tyr Val Arg Ser Tyr Phe Asp Asn Trp Gly
             100                 105                 110

Gln Gly Thr Leu Val Thr Val Ser Ser
             115                 120
```

<210> SEQ ID NO 43
<211> LENGTH: 24
<212> TYPE: DNA
<213> ORGANISM: Artificial Sequence
<220> FEATURE:
<223> OTHER INFORMATION: Synthetic

<400> SEQUENCE: 43
ggatttattt ttgttgatta tgcc                                          24

<210> SEQ ID NO 44
<211> LENGTH: 8
<212> TYPE: PRT
<213> ORGANISM: Artificial Sequence
<220> FEATURE:
<223> OTHER INFORMATION: Synthetic

<400> SEQUENCE: 44

```
Gly Phe Ile Phe Val Asp Tyr Ala
 1               5
```

<210> SEQ ID NO 45
<211> LENGTH: 24
<212> TYPE: DNA
<213> ORGANISM: Artificial Sequence
<220> FEATURE:
<223> OTHER INFORMATION: Synthetic

<400> SEQUENCE: 45
attagttgga atagtggtag tata                                          24

<210> SEQ ID NO 46
<211> LENGTH: 8
<212> TYPE: PRT
<213> ORGANISM: Artificial Sequence
<220> FEATURE:
<223> OTHER INFORMATION: Synthetic

<400> SEQUENCE: 46

```
Ile Ser Trp Asn Ser Gly Ser Ile
 1               5
```

<210> SEQ ID NO 47
<211> LENGTH: 42
<212> TYPE: DNA
<213> ORGANISM: Artificial Sequence
<220> FEATURE:
<223> OTHER INFORMATION: Synthetic

<400> SEQUENCE: 47
gtaaaaagtg ggttctatta cgttaggtct tactttgaca ac                      42

```
<210> SEQ ID NO 48
<211> LENGTH: 14
<212> TYPE: PRT
<213> ORGANISM: Artificial Sequence
<220> FEATURE:
<223> OTHER INFORMATION: Synthetic

<400> SEQUENCE: 48

Val Lys Ser Gly Phe Tyr Tyr Val Arg Ser Tyr Phe Asp Asn
1               5                   10

<210> SEQ ID NO 49
<211> LENGTH: 339
<212> TYPE: DNA
<213> ORGANISM: Artificial Sequence
<220> FEATURE:
<223> OTHER INFORMATION: Synthetic

<400> SEQUENCE: 49
gatattgtga tgacccagtc tccactctcc ctgcccgtca cccctggaga gccggcctcc      60
atctcctgca ggtctagtca gagcctcttg gatagtgatg atggaaacac ctatttggac     120
tggtacctgc ggaagccagg gcagtctcca caactcctga tctatacgct ttcctatcgg     180
gcctctggag tcccagacag gttcagtggc agtgggtcag gcactgattt cacactgaaa     240
atcagtaggg tggaggctga cgatgttgga gtttattact gcatgcaacg tatagagttt     300
ccgctcactt tcggcggagg gaccaaggtg gagatcaaa                            339

<210> SEQ ID NO 50
<211> LENGTH: 113
<212> TYPE: PRT
<213> ORGANISM: Artificial Sequence
<220> FEATURE:
<223> OTHER INFORMATION: Synthetic

<400> SEQUENCE: 50

Asp Ile Val Met Thr Gln Ser Pro Leu Ser Leu Pro Val Thr Pro Gly
1               5                   10                  15

Glu Pro Ala Ser Ile Ser Cys Arg Ser Ser Gln Ser Leu Leu Asp Ser
            20                  25                  30

Asp Asp Gly Asn Thr Tyr Leu Asp Trp Tyr Leu Arg Lys Pro Gly Gln
        35                  40                  45

Ser Pro Gln Leu Leu Ile Tyr Thr Leu Ser Tyr Arg Ala Ser Gly Val
    50                  55                  60

Pro Asp Arg Phe Ser Gly Ser Gly Ser Gly Thr Asp Phe Thr Leu Lys
65                  70                  75                  80

Ile Ser Arg Val Glu Ala Asp Asp Val Gly Val Tyr Tyr Cys Met Gln
                85                  90                  95

Arg Ile Glu Phe Pro Leu Thr Phe Gly Gly Gly Thr Lys Val Glu Ile
            100                 105                 110

Lys

<210> SEQ ID NO 51
<211> LENGTH: 36
<212> TYPE: DNA
<213> ORGANISM: Artificial Sequence
<220> FEATURE:
<223> OTHER INFORMATION: Synthetic

<400> SEQUENCE: 51
cagagcctct tggatagtga tgatggaaac acctat                                36
```

<210> SEQ ID NO 52
<211> LENGTH: 12
<212> TYPE: PRT
<213> ORGANISM: Artificial Sequence
<220> FEATURE:
<223> OTHER INFORMATION: Synthetic

<400> SEQUENCE: 52

Gln Ser Leu Leu Asp Ser Asp Asp Gly Asn Thr Tyr
1               5                   10

<210> SEQ ID NO 53
<211> LENGTH: 9
<212> TYPE: DNA
<213> ORGANISM: Artificial Sequence
<220> FEATURE:
<223> OTHER INFORMATION: Synthetic

<400> SEQUENCE: 53 acgctttcc                                                                   9

<210> SEQ ID NO 54
<211> LENGTH: 3
<212> TYPE: PRT
<213> ORGANISM: Artificial Sequence
<220> FEATURE:
<223> OTHER INFORMATION: Synthetic

<400> SEQUENCE: 54

Thr Leu Ser
1

<210> SEQ ID NO 55
<211> LENGTH: 27
<212> TYPE: DNA
<213> ORGANISM: Artificial Sequence
<220> FEATURE:
<223> OTHER INFORMATION: Synthetic

<400> SEQUENCE: 55
atgcaacgta tagagtttcc gctcact                                              27

<210> SEQ ID NO 56
<211> LENGTH: 9
<212> TYPE: PRT
<213> ORGANISM: Artificial Sequence
<220> FEATURE:
<223> OTHER INFORMATION: Synthetic

<400> SEQUENCE: 56

Met Gln Arg Ile Glu Phe Pro Leu Thr
1               5

<210> SEQ ID NO 57
<211> LENGTH: 1347
<212> TYPE: DNA
<213> ORGANISM: Artificial Sequence
<220> FEATURE:
<223> OTHER INFORMATION: Synthetic

<400> SEQUENCE: 57
gaagtgcagc tggtggagtc tgggggaggc ttggttaagc ctggggggtc cctgagaatt          60
tcctgtgcag cctctggatt tattttttgtt gattatgcca tgcactgggt ccggcaagct       120
ccagggaagg gcctggagtg ggtctcaggt attagttgga atagtggtag tataggctat        180

```
gcggactctg tgaagggccg attcaccatc tccagagaca cgccaagaa gtccctgtat    240 ctgcaaatga gtggtctgag acctgaggac acggccttgt attattgtgt aaaaagtggg    300
ttctattacg ttaggtctta ctttgacaac tggggccagg gaaccctggt caccgtctcc    360
tcagcctcca ccaagggccc atcggtcttc cccctggcgc cctgctccag gagcacctcc    420
gagagcacag ccgccctggg ctgcctggtc aaggactact tccccgaacc ggtgacggtg    480
tcgtggaact caggcgccct gaccagcggc gtgcacacct tcccggctgt cctacagtcc    540
tcaggactct actccctcag cagcgtggtg accgtgccct ccagcagctt gggcacgaag    600
acctacacct gcaacgtaga tcacaagccc agcaacacca aggtggacaa gagagttgag    660
tccaaatatg gtcccccatg cccaccctgc ccagcacctg agttcctggg gggaccatca    720
gtcttcctgt tccccccaaa acccaaggac actctcatga tctcccggac ccctgaggtc    780
acgtgcgtgg tggtggacgt gagccaggaa gaccccgagg tccagttcaa ctggtacgtg    840
gatggcgtgg aggtgcataa tgccaagaca aagccgcggg aggagcagtt caacagcacg    900
taccgtgtgg tcagcgtcct caccgtcctg caccaggact ggctgaacgg caaggagtac    960
aagtgcaagg tctccaacaa aggcctcccg tcctccatcg agaaaaccat ctccaaagcc    1020
aaagggcagc cccgagagcc acaggtgtac accctgcccc catcccagga ggagatgacc    1080
aagaaccagg tcagcctgac ctgcctggtc aaaggcttct accccagcga catcgccgtg    1140
gagtgggaga gcaatgggca gccggagaac aactacaaga ccacgcctcc cgtgctggac    1200
tccgacggct ccttcttcct ctacagcagg ctcaccgtgg acaagagcag gtggcaggag    1260
gggaatgtct tctcatgctc cgtgatgcat gaggctctgc acaaccacta cacacagaag    1320
tccctctccc tgtctctggg taaatga                                         1347
```

<210> SEQ ID NO 58
<211> LENGTH: 448
<212> TYPE: PRT
<213> ORGANISM: Artificial Sequence
<220> FEATURE:
<223> OTHER INFORMATION: Synthetic

<400> SEQUENCE: 58

```
Glu Val Gln Leu Val Glu Ser Gly Gly Gly Leu Val Lys Pro Gly
1               5                   10                  15

Ser Leu Arg Ile Ser Cys Ala Ala Ser Gly Phe Ile Phe Val Asp Tyr
            20                  25                  30

Ala Met His Trp Val Arg Gln Ala Pro Gly Lys Gly Leu Glu Trp Val
        35                  40                  45

Ser Gly Ile Ser Trp Asn Ser Gly Ser Ile Gly Tyr Ala Asp Ser Val
    50                  55                  60

Lys Gly Arg Phe Thr Ile Ser Arg Asp Asn Ala Lys Lys Ser Leu Tyr
65                  70                  75                  80

Leu Gln Met Ser Gly Leu Arg Pro Glu Asp Thr Ala Leu Tyr Tyr Cys
                85                  90                  95

Val Lys Ser Gly Phe Tyr Tyr Val Arg Ser Tyr Phe Asp Asn Trp Gly
            100                 105                 110

Gln Gly Thr Leu Val Thr Val Ser Ser Ala Ser Thr Lys Gly Pro Ser
        115                 120                 125

Val Phe Pro Leu Ala Pro Cys Ser Arg Ser Thr Ser Glu Ser Thr Ala
    130                 135                 140

Ala Leu Gly Cys Leu Val Lys Asp Tyr Phe Pro Glu Pro Val Thr Val
145                 150                 155                 160
```

Ser Trp Asn Ser Gly Ala Leu Thr Ser Gly Val His Thr Phe Pro Ala
                165                 170                 175

Val Leu Gln Ser Ser Gly Leu Tyr Ser Leu Ser Ser Val Val Thr Val
            180                 185                 190

Pro Ser Ser Ser Leu Gly Thr Lys Thr Tyr Thr Cys Asn Val Asp His
        195                 200                 205

Lys Pro Ser Asn Thr Lys Val Asp Lys Arg Val Glu Ser Lys Tyr Gly
    210                 215                 220

Pro Pro Cys Pro Pro Cys Pro Ala Pro Glu Phe Leu Gly Gly Pro Ser
225                 230                 235                 240

Val Phe Leu Phe Pro Pro Lys Pro Lys Asp Thr Leu Met Ile Ser Arg
                245                 250                 255

Thr Pro Glu Val Thr Cys Val Val Val Asp Val Ser Gln Glu Asp Pro
            260                 265                 270

Glu Val Gln Phe Asn Trp Tyr Val Asp Gly Val Glu Val His Asn Ala
        275                 280                 285

Lys Thr Lys Pro Arg Glu Glu Gln Phe Asn Ser Thr Tyr Arg Val Val
    290                 295                 300

Ser Val Leu Thr Val Leu His Gln Asp Trp Leu Asn Gly Lys Glu Tyr
305                 310                 315                 320

Lys Cys Lys Val Ser Asn Lys Gly Leu Pro Ser Ser Ile Glu Lys Thr
                325                 330                 335

Ile Ser Lys Ala Lys Gly Gln Pro Arg Glu Pro Gln Val Tyr Thr Leu
            340                 345                 350

Pro Pro Ser Gln Glu Glu Met Thr Lys Asn Gln Val Ser Leu Thr Cys
        355                 360                 365

Leu Val Lys Gly Phe Tyr Pro Ser Asp Ile Ala Val Glu Trp Glu Ser
    370                 375                 380

Asn Gly Gln Pro Glu Asn Asn Tyr Lys Thr Thr Pro Pro Val Leu Asp
385                 390                 395                 400

Ser Asp Gly Ser Phe Phe Leu Tyr Ser Arg Leu Thr Val Asp Lys Ser
                405                 410                 415

Arg Trp Gln Glu Gly Asn Val Phe Ser Cys Ser Val Met His Glu Ala
            420                 425                 430

Leu His Asn His Tyr Thr Gln Lys Ser Leu Ser Leu Ser Leu Gly Lys
        435                 440                 445

<210> SEQ ID NO 59
<211> LENGTH: 663
<212> TYPE: DNA
<213> ORGANISM: Artificial Sequence
<220> FEATURE:
<223> OTHER INFORMATION: Synthetic

<400> SEQUENCE: 59
gatattgtga tgacccagtc tccactctcc ctgcccgtca cccctggaga gccggcctcc      60
atctcctgca ggtctagtca gagcctcttg gatagtgatg atggaaacac ctatttggac     120
tggtacctgc ggaagccagg gcagtctcca caactcctga tctatacgct ttcctatcgg     180
gcctctggag tcccagacag gttcagtggc agtgggtcag gcactgattt cacactgaaa     240
atcagtaggg tggaggctga cgatgttgga gtttattact gcatgcaacg tatagagttt     300
ccgctcactt tcggcggagg gaccaaggtg gagatcaaac gaactgtggc tgcaccatct     360
gtcttcatct tcccgccatc tgatgagcag ttgaaatctg gaactgcctc tgttgtgtgc     420

```
ctgctgaata acttctatcc cagagaggcc aaagtacagt ggaaggtgga taacgccctc    480
caatcgggta actcccagga gagtgtcaca gagcaggaca gcaaggacag cacctacagc    540
ctcagcagca ccctgacgct gagcaaagca gactacgaga aacacaaagt ctacgcctgc    600
gaagtcaccc atcagggcct gagctcgccc gtcacaaaga gcttcaacag gggagagtgt    660
tag                                                                  663
```

<210> SEQ ID NO 60
<211> LENGTH: 220
<212> TYPE: PRT
<213> ORGANISM: Artificial Sequence
<220> FEATURE:
<223> OTHER INFORMATION: Synthetic

<400> SEQUENCE: 60

```
Asp Ile Val Met Thr Gln Ser Pro Leu Ser Leu Pro Val Thr Pro Gly
1               5                   10                  15
Glu Pro Ala Ser Ile Ser Cys Arg Ser Ser Gln Ser Leu Leu Asp Ser
            20                  25                  30
Asp Asp Gly Asn Thr Tyr Leu Asp Trp Tyr Leu Arg Lys Pro Gly Gln
        35                  40                  45
Ser Pro Gln Leu Leu Ile Tyr Thr Leu Ser Tyr Arg Ala Ser Gly Val
    50                  55                  60
Pro Asp Arg Phe Ser Gly Ser Gly Ser Gly Thr Asp Phe Thr Leu Lys
65                  70                  75                  80
Ile Ser Arg Val Glu Ala Asp Asp Val Gly Val Tyr Tyr Cys Met Gln
                85                  90                  95
Arg Ile Glu Phe Pro Leu Thr Phe Gly Gly Gly Thr Lys Val Glu Ile
            100                 105                 110
Lys Arg Thr Val Ala Ala Pro Ser Val Phe Ile Phe Pro Pro Ser Asp
        115                 120                 125
Glu Gln Leu Lys Ser Gly Thr Ala Ser Val Val Cys Leu Leu Asn Asn
    130                 135                 140
Phe Tyr Pro Arg Glu Ala Lys Val Gln Trp Lys Val Asp Asn Ala Leu
145                 150                 155                 160
Gln Ser Gly Asn Ser Gln Glu Ser Val Thr Glu Gln Asp Ser Lys Asp
                165                 170                 175
Ser Thr Tyr Ser Leu Ser Ser Thr Leu Thr Leu Ser Lys Ala Asp Tyr
            180                 185                 190
Glu Lys His Lys Val Tyr Ala Cys Glu Val Thr His Gln Gly Leu Ser
        195                 200                 205
Ser Pro Val Thr Lys Ser Phe Asn Arg Gly Glu Cys
    210                 215                 220
```

<210> SEQ ID NO 61
<211> LENGTH: 372
<212> TYPE: DNA
<213> ORGANISM: Artificial Sequence
<220> FEATURE:
<223> OTHER INFORMATION: Synthetic

<400> SEQUENCE: 61

```
gaggtgcagc tggtggagtc tgggggaggc ttggtacagc cagggcggtc cctgagactc     60
tcctgtatag cttctggatt caactttggt gattatggta tgagctgggt ccgccaggct    120
ccagggaagg ggctggagtg ggtaggtttc attagaagca aagcttatgg tgggacaaca    180
gaatacgccg cgtctgtgaa aggcagattc accatctcaa gagatgattc caaaagcatc    240
```
gcctatctgc aaatgaacag cctgaaaacc gaggacgcag ccatgtatta ctgttctaga    300
gattattacg atattttgac tggttattat ggcgactact ggggccaggg aaccctggtc    360
accgtctcct ca                                                        372

<210> SEQ ID NO 62
<211> LENGTH: 124
<212> TYPE: PRT
<213> ORGANISM: Artificial Sequence
<220> FEATURE:
<223> OTHER INFORMATION: Synthetic

<400> SEQUENCE: 62

Glu Val Gln Leu Val Glu Ser Gly Gly Gly Leu Val Gln Pro Gly Arg
1               5                   10                  15

Ser Leu Arg Leu Ser Cys Ile Ala Ser Gly Phe Asn Phe Gly Asp Tyr
            20                  25                  30

Gly Met Ser Trp Val Arg Gln Ala Pro Gly Lys Gly Leu Glu Trp Val
        35                  40                  45

Gly Phe Ile Arg Ser Lys Ala Tyr Gly Gly Thr Thr Glu Tyr Ala Ala
    50                  55                  60

Ser Val Lys Gly Arg Phe Thr Ile Ser Arg Asp Asp Ser Lys Ser Ile
65                  70                  75                  80

Ala Tyr Leu Gln Met Asn Ser Leu Lys Thr Glu Asp Ala Ala Met Tyr
                85                  90                  95

Tyr Cys Ser Arg Asp Tyr Tyr Asp Ile Leu Thr Gly Tyr Tyr Gly Asp
            100                 105                 110

Tyr Trp Gly Gln Gly Thr Leu Val Thr Val Ser Ser
        115                 120

<210> SEQ ID NO 63
<211> LENGTH: 24
<212> TYPE: DNA
<213> ORGANISM: Artificial Sequence
<220> FEATURE:
<223> OTHER INFORMATION: Synthetic

<400> SEQUENCE: 63
ggattcaact ttggtgatta tggt                                           24

<210> SEQ ID NO 64
<211> LENGTH: 8
<212> TYPE: PRT
<213> ORGANISM: Artificial Sequence
<220> FEATURE:
<223> OTHER INFORMATION: Synthetic

<400> SEQUENCE: 64

Gly Phe Asn Phe Gly Asp Tyr Gly
1               5

<210> SEQ ID NO 65
<211> LENGTH: 30
<212> TYPE: DNA
<213> ORGANISM: Artificial Sequence
<220> FEATURE:
<223> OTHER INFORMATION: Synthetic

<400> SEQUENCE: 65
attagaagca aagcttatgg tgggacaaca                                     30

<210> SEQ ID NO 66
<211> LENGTH: 10
<212> TYPE: PRT
<213> ORGANISM: Artificial Sequence
<220> FEATURE:
<223> OTHER INFORMATION: Synthetic

<400> SEQUENCE: 66

Ile Arg Ser Lys Ala Tyr Gly Gly Thr Thr
1               5                   10

<210> SEQ ID NO 67
<211> LENGTH: 45
<212> TYPE: DNA
<213> ORGANISM: Artificial Sequence
<220> FEATURE:
<223> OTHER INFORMATION: Synthetic

<400> SEQUENCE: 67
tctagagatt attacgatat tttgactggt tattatggcg actac          45

<210> SEQ ID NO 68
<211> LENGTH: 15
<212> TYPE: PRT
<213> ORGANISM: Artificial Sequence
<220> FEATURE:
<223> OTHER INFORMATION: Synthetic

<400> SEQUENCE: 68

Ser Arg Asp Tyr Tyr Asp Ile Leu Thr Gly Tyr Tyr Gly Asp Tyr
1               5                   10                  15

<210> SEQ ID NO 69
<211> LENGTH: 321
<212> TYPE: DNA
<213> ORGANISM: Artificial Sequence
<220> FEATURE:
<223> OTHER INFORMATION: Synthetic

<400> SEQUENCE: 69
gacatccaga tgacccagtc tccttccacc ctgtctgcat ctgtaggaga cagagtcacc    60
atcacttgcc gggccagtca gagtattagt agctggttgg cctggtatca gcagaaacca   120
gggaaagccc ctaagctcct gatctatcag gcgtctagtt tagaaagtgg ggtcccatca   180
aggttcagcg gcagtggatc tgggacagaa ttcactctca ccatcagcag cctgcagcct   240
gaagattttg caacttatta ctgccaacaa tataatagtt attctcggac gttcggccaa   300
gggaccaagg tggaaatcaa a                                             321

<210> SEQ ID NO 70
<211> LENGTH: 107
<212> TYPE: PRT
<213> ORGANISM: Artificial Sequence
<220> FEATURE:
<223> OTHER INFORMATION: Synthetic

<400> SEQUENCE: 70

Asp Ile Gln Met Thr Gln Ser Pro Ser Thr Leu Ser Ala Ser Val Gly
1               5                   10                  15

Asp Arg Val Thr Ile Thr Cys Arg Ala Ser Gln Ser Ile Ser Ser Trp
            20                  25                  30

Leu Ala Trp Tyr Gln Gln Lys Pro Gly Lys Ala Pro Lys Leu Leu Ile
        35                  40                  45

Tyr Gln Ala Ser Ser Leu Glu Ser Gly Val Pro Ser Arg Phe Ser Gly

```
                50                  55                  60
Ser Gly Ser Gly Thr Glu Phe Thr Leu Thr Ile Ser Ser Leu Gln Pro
 65                  70                  75                  80

Glu Asp Phe Ala Thr Tyr Tyr Cys Gln Gln Tyr Asn Ser Tyr Ser Arg
                 85                  90                  95

Thr Phe Gly Gln Gly Thr Lys Val Glu Ile Lys
            100                 105
```

```
<210> SEQ ID NO 71
<211> LENGTH: 18
<212> TYPE: DNA
<213> ORGANISM: Artificial Sequence
<220> FEATURE:
<223> OTHER INFORMATION: Synthetic

<400> SEQUENCE: 71
cagagtatta gtagctgg                                                       18

<210> SEQ ID NO 72
<211> LENGTH: 6
<212> TYPE: PRT
<213> ORGANISM: Artificial Sequence
<220> FEATURE:
<223> OTHER INFORMATION: Synthetic

<400> SEQUENCE: 72

Gln Ser Ile Ser Ser Trp
1               5

<210> SEQ ID NO 73
<211> LENGTH: 9
<212> TYPE: DNA
<213> ORGANISM: Artificial Sequence
<220> FEATURE:
<223> OTHER INFORMATION: Synthetic

<400> SEQUENCE: 73 caggcgtct                                                                  9

<210> SEQ ID NO 74
<211> LENGTH: 3
<212> TYPE: PRT
<213> ORGANISM: Artificial Sequence
<220> FEATURE:
<223> OTHER INFORMATION: Synthetic

<400> SEQUENCE: 74

Gln Ala Ser
1

<210> SEQ ID NO 75
<211> LENGTH: 27
<212> TYPE: DNA
<213> ORGANISM: Artificial Sequence
<220> FEATURE:
<223> OTHER INFORMATION: Synthetic

<400> SEQUENCE: 75
caacaatata atagttattc tcggacg                                             27

<210> SEQ ID NO 76
<211> LENGTH: 9
<212> TYPE: PRT
<213> ORGANISM: Artificial Sequence
<220> FEATURE:
```

<223> OTHER INFORMATION: Synthetic

<400> SEQUENCE: 76

Gln Gln Tyr Asn Ser Tyr Ser Arg Thr
1               5

<210> SEQ ID NO 77
<211> LENGTH: 1356
<212> TYPE: DNA
<213> ORGANISM: Artificial Sequence
<220> FEATURE:
<223> OTHER INFORMATION: Synthetic

<400> SEQUENCE: 77

```
gaggtgcagc tggtggagtc tgggggaggc ttggtacagc cagggcggtc cctgagactc      60
tcctgtatag cttctggatt caactttggt gattatggta tgagctgggt ccgccaggct     120
ccagggaagg ggctggagtg ggtaggtttc attagaagca agcttatgg tgggacaaca      180
gaatacgccg cgtctgtgaa aggcagattc accatctcaa gagatgattc aaaaagcatc     240
gcctatctgc aaatgaacag cctgaaaacc gaggacgcag ccatgtatta ctgttctaga     300
gattattacg atattttgac tggttattat ggcgactact ggggccaggg aaccctggtc     360
accgtctcct cagcctccac caagggccca tcggtcttcc ccctggcgcc ctgctccagg     420
agcacctccg agagcacagc cgccctgggc tgcctggtca aggactactt ccccgaaccg     480
gtgacggtgt cgtggaactc aggcgccctg accagcggcg tgcacacctt cccggctgtc     540
ctacagtcct caggactcta ctccctcagc agcgtggtga ccgtgccctc cagcagcttg     600
ggcacgaaga cctacacctg caacgtagat cacaagccca gcaacaccaa ggtggacaag     660
agagttgagt ccaaatatgg tcccccatgc ccaccctgcc cagcacctga gttcctgggg     720
ggaccatcag tcttcctgtt ccccccaaaa cccaaggaca ctctcatgat ctcccggacc     780
cctgaggtca cgtgcgtggt ggtggacgtg agccaggaag accccgaggt ccagttcaac     840
tggtacgtgg atggcgtgga ggtgcataat gccaagacaa agccgcggga ggagcagttc     900
aacagcacgt accgtgtggt cagcgtcctc accgtcctgc accaggactg gctgaacggc     960
aaggagtaca agtgcaaggt ctccaacaaa ggcctcccgt cctccatcga gaaaaccatc    1020
tccaaagcca agggcagcc ccgagagcca caggtgtaca ccctgccccc atcccaggag    1080
gagatgacca gaaccaggt cagcctgacc tgcctggtca aaggcttcta ccccagcgac    1140
atcgccgtgg agtgggagag caatgggcag ccggagaaca actacaagac cacgcctccc    1200
gtgctggact ccgacggctc cttcttcctc tacagcaggc tcaccgtgga caagagcagg    1260
tggcaggagg ggaatgtctt ctcatgctcc gtgatgcatg aggctctgca caaccactac    1320
acacagaagt ccctctccct gtctctgggt aaatga                             1356
```

<210> SEQ ID NO 78
<211> LENGTH: 451
<212> TYPE: PRT
<213> ORGANISM: Artificial Sequence
<220> FEATURE:
<223> OTHER INFORMATION: Synthetic

<400> SEQUENCE: 78

Glu Val Gln Leu Val Glu Ser Gly Gly Gly Leu Val Gln Pro Gly Arg
1               5                   10                  15

Ser Leu Arg Leu Ser Cys Ile Ala Ser Gly Phe Asn Phe Gly Asp Tyr
            20                  25                  30

```
Gly Met Ser Trp Val Arg Gln Ala Pro Gly Lys Gly Leu Glu Trp Val
         35                  40                  45
Gly Phe Ile Arg Ser Lys Ala Tyr Gly Gly Thr Thr Glu Tyr Ala Ala
 50                  55                  60
Ser Val Lys Gly Arg Phe Thr Ile Ser Arg Asp Asp Ser Lys Ser Ile
 65                  70                  75                  80
Ala Tyr Leu Gln Met Asn Ser Leu Lys Thr Glu Asp Ala Ala Met Tyr
                 85                  90                  95
Tyr Cys Ser Arg Asp Tyr Tyr Asp Ile Leu Thr Gly Tyr Tyr Gly Asp
            100                 105                 110
Tyr Trp Gly Gln Gly Thr Leu Val Thr Val Ser Ser Ala Ser Thr Lys
        115                 120                 125
Gly Pro Ser Val Phe Pro Leu Ala Pro Cys Ser Arg Ser Thr Ser Glu
    130                 135                 140
Ser Thr Ala Ala Leu Gly Cys Leu Val Lys Asp Tyr Phe Pro Glu Pro
145                 150                 155                 160
Val Thr Val Ser Trp Asn Ser Gly Ala Leu Thr Ser Gly Val His Thr
                165                 170                 175
Phe Pro Ala Val Leu Gln Ser Ser Gly Leu Tyr Ser Leu Ser Ser Val
            180                 185                 190
Val Thr Val Pro Ser Ser Ser Leu Gly Thr Lys Thr Tyr Thr Cys Asn
        195                 200                 205
Val Asp His Lys Pro Ser Asn Thr Lys Val Asp Lys Arg Val Glu Ser
    210                 215                 220
Lys Tyr Gly Pro Pro Cys Pro Pro Cys Pro Ala Pro Glu Phe Leu Gly
225                 230                 235                 240
Gly Pro Ser Val Phe Leu Phe Pro Pro Lys Pro Lys Asp Thr Leu Met
                245                 250                 255
Ile Ser Arg Thr Pro Glu Val Thr Cys Val Val Val Asp Val Ser Gln
            260                 265                 270
Glu Asp Pro Glu Val Gln Phe Asn Trp Tyr Val Asp Gly Val Glu Val
        275                 280                 285
His Asn Ala Lys Thr Lys Pro Arg Glu Glu Gln Phe Asn Ser Thr Tyr
    290                 295                 300
Arg Val Val Ser Val Leu Thr Val Leu His Gln Asp Trp Leu Asn Gly
305                 310                 315                 320
Lys Glu Tyr Lys Cys Lys Val Ser Asn Lys Gly Leu Pro Ser Ser Ile
                325                 330                 335
Glu Lys Thr Ile Ser Lys Ala Lys Gly Gln Pro Arg Glu Pro Gln Val
            340                 345                 350
Tyr Thr Leu Pro Pro Ser Gln Glu Glu Met Thr Lys Asn Gln Val Ser
        355                 360                 365
Leu Thr Cys Leu Val Lys Gly Phe Tyr Pro Ser Asp Ile Ala Val Glu
    370                 375                 380
Trp Glu Ser Asn Gly Gln Pro Glu Asn Asn Tyr Lys Thr Thr Pro Pro
385                 390                 395                 400
Val Leu Asp Ser Asp Gly Ser Phe Phe Leu Tyr Ser Arg Leu Thr Val
                405                 410                 415
Asp Lys Ser Arg Trp Gln Glu Gly Asn Val Phe Ser Cys Ser Val Met
            420                 425                 430
His Glu Ala Leu His Asn His Tyr Thr Gln Lys Ser Leu Ser Leu Ser
        435                 440                 445
Leu Gly Lys
```

<210> SEQ ID NO 79
<211> LENGTH: 645
<212> TYPE: DNA
<213> ORGANISM: Artificial Sequence
<220> FEATURE:
<223> OTHER INFORMATION: Synthetic

<400> SEQUENCE: 79

```
gacatccaga tgacccagtc tccttccacc ctgtctgcat ctgtaggaga cagagtcacc    60
atcacttgcc gggccagtca gagtattagt agctggttgg cctggtatca gcagaaacca   120
gggaaagccc ctaagctcct gatctatcag gcgtctagtt tagaaagtgg ggtcccatca   180
aggttcagcg gcagtggatc tgggacagaa ttcactctca ccatcagcag cctgcagcct   240
gaagattttg caacttatta ctgccaacaa tataatagtt attctcggac gttcggccaa   300
gggaccaagg tggaaatcaa acgaactgtg gctgcaccat ctgtcttcat cttcccgcca   360
tctgatgagc agttgaaatc tggaactgcc tctgttgtgt gcctgctgaa taacttctat   420
cccagagagg ccaaagtaca gtggaaggtg gataacgccc tccaatcggg taactcccag   480
gagagtgtca cagagcagga cagcaaggac agcacctaca gcctcagcag cacccctgacg   540
ctgagcaaag cagactacga gaaacacaaa gtctacgcct gcgaagtcac ccatcagggc   600
ctgagctcgc ccgtcacaaa gagcttcaac aggggagagt gttag                   645
```

<210> SEQ ID NO 80
<211> LENGTH: 214
<212> TYPE: PRT
<213> ORGANISM: Artificial Sequence
<220> FEATURE:
<223> OTHER INFORMATION: Synthetic

<400> SEQUENCE: 80

```
Asp Ile Gln Met Thr Gln Ser Pro Ser Thr Leu Ser Ala Ser Val Gly
  1               5                  10                  15

Asp Arg Val Thr Ile Thr Cys Arg Ala Ser Gln Ser Ile Ser Ser Trp
                 20                  25                  30

Leu Ala Trp Tyr Gln Gln Lys Pro Gly Lys Ala Pro Lys Leu Leu Ile
             35                  40                  45

Tyr Gln Ala Ser Ser Leu Glu Ser Gly Val Pro Ser Arg Phe Ser Gly
         50                  55                  60

Ser Gly Ser Gly Thr Glu Phe Thr Leu Thr Ile Ser Ser Leu Gln Pro
 65                  70                  75                  80

Glu Asp Phe Ala Thr Tyr Tyr Cys Gln Gln Tyr Asn Ser Tyr Ser Arg
                 85                  90                  95

Thr Phe Gly Gln Gly Thr Lys Val Glu Ile Lys Arg Thr Val Ala Ala
            100                 105                 110

Pro Ser Val Phe Ile Phe Pro Pro Ser Asp Glu Gln Leu Lys Ser Gly
            115                 120                 125

Thr Ala Ser Val Val Cys Leu Leu Asn Asn Phe Tyr Pro Arg Glu Ala
        130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190
```

Ala Cys Glu Val Thr His Gln Gly Leu Ser Ser Pro Val Thr Lys Ser
         195                 200                 205
Phe Asn Arg Gly Glu Cys
    210

<210> SEQ ID NO 81
<211> LENGTH: 378
<212> TYPE: DNA
<213> ORGANISM: Artificial Sequence
<220> FEATURE:
<223> OTHER INFORMATION: Synthetic

<400> SEQUENCE: 81
gaggtgcagc tggtggagtc tgggggaggc ttggtaaagc ctggggggtc cctgagagtc      60
tcctgtgcag cctctggagt cactttcagt aacgtctgga tgagttgggt ccgccaggtt     120
ccagggaagg ggctggaatg ggttggccgt attaaaagca aaactgatgg tggacaaca     180 gactacgctg cacccgtgaa aggcagattt accatctcaa aagatgattc aaaaaatacg     240
ttgttcctgc aaatgaacag cctgaaaacc gaagacacag ccgtgtatta ctgtaccaca     300
gagaccggcg attttggag tggttattat cctcgcttcc agcactgggg ccagggcacc      360
ctggtcaccg tctcctca                                                  378

<210> SEQ ID NO 82
<211> LENGTH: 126
<212> TYPE: PRT
<213> ORGANISM: Artificial Sequence
<220> FEATURE:
<223> OTHER INFORMATION: Synthetic

<400> SEQUENCE: 82

Glu Val Gln Leu Val Glu Ser Gly Gly Gly Leu Val Lys Pro Gly Gly
1               5                   10                  15

Ser Leu Arg Val Ser Cys Ala Ala Ser Gly Val Thr Phe Ser Asn Val
            20                  25                  30

Trp Met Ser Trp Val Arg Gln Val Pro Gly Lys Gly Leu Glu Trp Val
        35                  40                  45

Gly Arg Ile Lys Ser Lys Thr Asp Gly Gly Thr Thr Asp Tyr Ala Ala
    50                  55                  60

Pro Val Lys Gly Arg Phe Thr Ile Ser Lys Asp Asp Ser Lys Asn Thr
65                  70                  75                  80

Leu Phe Leu Gln Met Asn Ser Leu Lys Thr Glu Asp Thr Ala Val Tyr
                85                  90                  95

Tyr Cys Thr Thr Glu Thr Gly Asp Phe Trp Ser Gly Tyr Tyr Pro Arg
            100                 105                 110

Phe Gln His Trp Gly Gln Gly Thr Leu Val Thr Val Ser Ser
        115                 120                 125

<210> SEQ ID NO 83
<211> LENGTH: 24
<212> TYPE: DNA
<213> ORGANISM: Artificial Sequence
<220> FEATURE:
<223> OTHER INFORMATION: Synthetic

<400> SEQUENCE: 83
ggagtcactt tcagtaacgt ctgg                                            24

<210> SEQ ID NO 84

<210> SEQ ID NO 84
<211> LENGTH: 8
<212> TYPE: PRT
<213> ORGANISM: Artificial Sequence
<220> FEATURE:
<223> OTHER INFORMATION: Synthetic

<400> SEQUENCE: 84

Gly Val Thr Phe Ser Asn Val Trp
1               5

<210> SEQ ID NO 85
<211> LENGTH: 30
<212> TYPE: DNA
<213> ORGANISM: Artificial Sequence
<220> FEATURE:
<223> OTHER INFORMATION: Synthetic

<400> SEQUENCE: 85
attaaaagca aaactgatgg tgggacaaca                                    30

<210> SEQ ID NO 86
<211> LENGTH: 10
<212> TYPE: PRT
<213> ORGANISM: Artificial Sequence
<220> FEATURE:
<223> OTHER INFORMATION: Synthetic

<400> SEQUENCE: 86

Ile Lys Ser Lys Thr Asp Gly Gly Thr Thr
1               5                   10

<210> SEQ ID NO 87
<211> LENGTH: 51
<212> TYPE: DNA
<213> ORGANISM: Artificial Sequence
<220> FEATURE:
<223> OTHER INFORMATION: Synthetic

<400> SEQUENCE: 87
accacagaga ccggcgattt ttggagtggt tattatcctc gcttccagca c            51

<210> SEQ ID NO 88
<211> LENGTH: 17
<212> TYPE: PRT
<213> ORGANISM: Artificial Sequence
<220> FEATURE:
<223> OTHER INFORMATION: Synthetic

<400> SEQUENCE: 88

Thr Thr Glu Thr Gly Asp Phe Trp Ser Gly Tyr Tyr Pro Arg Phe Gln
1               5                   10                  15
His

<210> SEQ ID NO 89
<211> LENGTH: 324
<212> TYPE: DNA
<213> ORGANISM: Artificial Sequence
<220> FEATURE:
<223> OTHER INFORMATION: Synthetic

<400> SEQUENCE: 89
gacatccaga tgacccagtc tccatcctcc ctgtctgcat ctgtaggaga cagagtcacc    60
atcacttgcc gggcaagtca gtatattagc acctatttaa attggtatca gcagaaacca   120
gggaaagccc ctagcctcct gatctatgct gcatccagtt tgcaaagtgg ggtcccatca   180

```
aggttcagtg gcagtggatc tgggacagat ttcactctca ccatcagcag tctgcaacct    240
gaagattttg catcttactc ctgtcaacag agttacagta cccctccgta cacttttggc    300
caggggacca agctggagat caaa                                           324
```

<210> SEQ ID NO 90
<211> LENGTH: 108
<212> TYPE: PRT
<213> ORGANISM: Artificial Sequence
<220> FEATURE:
<223> OTHER INFORMATION: Synthetic
<400> SEQUENCE: 90

```
Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Tyr Ile Ser Thr Tyr
            20                  25                  30

Leu Asn Trp Tyr Gln Gln Lys Pro Gly Lys Ala Pro Ser Leu Leu Ile
        35                  40                  45

Tyr Ala Ala Ser Ser Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Ser Tyr Ser Cys Gln Gln Ser Tyr Ser Thr Pro Pro
                85                  90                  95

Tyr Thr Phe Gly Gln Gly Thr Lys Leu Glu Ile Lys
            100                 105
```

<210> SEQ ID NO 91
<211> LENGTH: 18
<212> TYPE: DNA
<213> ORGANISM: Artificial Sequence
<220> FEATURE:
<223> OTHER INFORMATION: Synthetic
<400> SEQUENCE: 91

```
cagtatatta gcacctat                                                  18
```

<210> SEQ ID NO 92
<211> LENGTH: 6
<212> TYPE: PRT
<213> ORGANISM: Artificial Sequence
<220> FEATURE:
<223> OTHER INFORMATION: Synthetic
<400> SEQUENCE: 92

```
Gln Tyr Ile Ser Thr Tyr
1               5
```

<210> SEQ ID NO 93
<211> LENGTH: 30
<212> TYPE: DNA
<213> ORGANISM: Artificial Sequence
<220> FEATURE:
<223> OTHER INFORMATION: Synthetic
<400> SEQUENCE: 93

```
caacagagtt acagtacccc tccgtacact                                     30
```

<210> SEQ ID NO 94
<211> LENGTH: 10
<212> TYPE: PRT
<213> ORGANISM: Artificial Sequence

```
<220> FEATURE:
<223> OTHER INFORMATION: Synthetic

<400> SEQUENCE: 94

Gln Gln Ser Tyr Ser Thr Pro Pro Tyr Thr
1               5                   10

<210> SEQ ID NO 95
<211> LENGTH: 1362
<212> TYPE: DNA
<213> ORGANISM: Artificial Sequence
<220> FEATURE:
<223> OTHER INFORMATION: Synthetic

<400> SEQUENCE: 95
gaggtgcagc tggtggagtc tggggggaggc ttggtaaagc ctggggggtc cctgagagtc      60
tcctgtgcag cctctggagt cactttcagt aacgtctgga tgagttgggt ccgccaggtt     120
ccagggaagg ggctgaatgg ggttggccgt attaaaagca aaactgatgg tgggacaaca     180
gactacgctg cacccgtgaa aggcagattt accatctcaa agatgattc aaaaaatacg      240 ttgttcctgc aaatgaacag cctgaaaacc gaagacacag ccgtgtatta ctgtaccaca     300
gagaccggcg atttttggag tggttattat cctcgcttcc agcactgggg ccagggcacc     360
ctggtcaccg tctcctcagc ctccaccaag ggcccatcgg tcttccccct ggcgccctgc     420
tccaggagca cctccgagag cacagccgcc ctgggctgcc tggtcaagga ctacttcccc     480
gaaccggtga cggtgtcgtg gaactcaggc gccctgacca gcggcgtgca ccttcccg      540 gctgtcctac agtcctcagg actctactcc ctcagcagcg tggtgaccgt gccctccagc     600
agcttgggca cgaagaccta cacctgcaac gtagatcaca agcccagcaa caccaaggtg     660
gacaagagag ttgagtccaa atatggtccc catgcccac cctgcccagc acctgagttc      720
ctggggggac catcagtctt cctgttcccc ccaaaaccca aggacactct catgatctcc     780
cggacccctg aggtcacgtg cgtggtggtg gacgtgagcc aggaagaccc cgaggtccag     840
ttcaactggt acgtggatgg cgtggaggtg cataatgcca agacaaagcc gcgggaggag     900
cagttcaaca gcacgtaccg tgtggtcagc gtcctcaccg tcctgcacca ggactggctg     960
aacggcaagg agtacaagtg caaggtctcc aacaaaggcc tcccgtcctc catcgagaaa    1020
accatctcca aagccaaagg gcagccccga gagccacagg tgtacaccct gcccccatcc    1080
caggaggaga tgaccaagaa ccaggtcagc ctgacctgcc tggtcaaagg cttctacccc    1140
agcgacatcg ccgtggagtg ggagagcaat gggcagccgg agaacaacta caagaccacg    1200
cctcccgtgc tggactccga cggctccttc ttcctctaca gcaggctcac cgtggacaag    1260
agcaggtggc aggaggggaa tgtcttctca tgctccgtga tgcatgaggc tctgcacaac    1320
cactacacac agaagtccct ctccctgtct ctgggtaaat ga                       1362

<210> SEQ ID NO 96
<211> LENGTH: 453
<212> TYPE: PRT
<213> ORGANISM: Artificial Sequence
<220> FEATURE:
<223> OTHER INFORMATION: Synthetic

<400> SEQUENCE: 96

Glu Val Gln Leu Val Glu Ser Gly Gly Gly Leu Val Lys Pro Gly Gly
1               5                   10                  15

Ser Leu Arg Val Ser Cys Ala Ala Ser Gly Val Thr Phe Ser Asn Val
            20                  25                  30
```

-continued

Trp Met Ser Trp Val Arg Gln Val Pro Gly Lys Gly Leu Glu Trp Val
        35                  40                  45
Gly Arg Ile Lys Ser Lys Thr Asp Gly Gly Thr Thr Asp Tyr Ala Ala
    50                  55                  60
Pro Val Lys Gly Arg Phe Thr Ile Ser Lys Asp Asp Ser Lys Asn Thr
65                  70                  75                  80
Leu Phe Leu Gln Met Asn Ser Leu Lys Thr Glu Asp Thr Ala Val Tyr
                85                  90                  95
Tyr Cys Thr Thr Glu Thr Gly Asp Phe Trp Ser Gly Tyr Tyr Pro Arg
            100                 105                 110
Phe Gln His Trp Gly Gln Gly Thr Leu Val Thr Val Ser Ser Ala Ser
            115                 120                 125
Thr Lys Gly Pro Ser Val Phe Pro Leu Ala Pro Cys Ser Arg Ser Thr
        130                 135                 140
Ser Glu Ser Thr Ala Ala Leu Gly Cys Leu Val Lys Asp Tyr Phe Pro
145                 150                 155                 160
Glu Pro Val Thr Val Ser Trp Asn Ser Gly Ala Leu Thr Ser Gly Val
                165                 170                 175
His Thr Phe Pro Ala Val Leu Gln Ser Ser Gly Leu Tyr Ser Leu Ser
            180                 185                 190
Ser Val Val Thr Val Pro Ser Ser Ser Leu Gly Thr Lys Thr Tyr Thr
            195                 200                 205
Cys Asn Val Asp His Lys Pro Ser Asn Thr Lys Val Asp Lys Arg Val
        210                 215                 220
Glu Ser Lys Tyr Gly Pro Pro Cys Pro Pro Cys Pro Ala Pro Glu Phe
225                 230                 235                 240
Leu Gly Gly Pro Ser Val Phe Leu Phe Pro Pro Lys Pro Lys Asp Thr
                245                 250                 255
Leu Met Ile Ser Arg Thr Pro Glu Val Thr Cys Val Val Val Asp Val
            260                 265                 270
Ser Gln Glu Asp Pro Glu Val Gln Phe Asn Trp Tyr Val Asp Gly Val
        275                 280                 285
Glu Val His Asn Ala Lys Thr Lys Pro Arg Glu Gln Phe Asn Ser
    290                 295                 300
Thr Tyr Arg Val Val Ser Val Leu Thr Val Leu His Gln Asp Trp Leu
305                 310                 315                 320
Asn Gly Lys Glu Tyr Lys Cys Lys Val Ser Asn Lys Gly Leu Pro Ser
                325                 330                 335
Ser Ile Glu Lys Thr Ile Ser Lys Ala Lys Gly Gln Pro Arg Glu Pro
            340                 345                 350
Gln Val Tyr Thr Leu Pro Pro Ser Gln Glu Glu Met Thr Lys Asn Gln
        355                 360                 365
Val Ser Leu Thr Cys Leu Val Lys Gly Phe Tyr Pro Ser Asp Ile Ala
    370                 375                 380
Val Glu Trp Glu Ser Asn Gly Gln Pro Glu Asn Asn Tyr Lys Thr Thr
385                 390                 395                 400
Pro Pro Val Leu Asp Ser Asp Gly Ser Phe Phe Leu Tyr Ser Arg Leu
                405                 410                 415
Thr Val Asp Lys Ser Arg Trp Gln Glu Gly Asn Val Phe Ser Cys Ser
            420                 425                 430
Val Met His Glu Ala Leu His Asn His Tyr Thr Gln Lys Ser Leu Ser
        435                 440                 445

Leu Ser Leu Gly Lys
        450

<210> SEQ ID NO 97
<211> LENGTH: 648
<212> TYPE: DNA
<213> ORGANISM: Artificial Sequence
<220> FEATURE:
<223> OTHER INFORMATION: Synthetic

<400> SEQUENCE: 97

```
gacatccaga tgacccagtc tccatcctcc ctgtctgcat ctgtaggaga cagagtcacc      60
atcacttgcc gggcaagtca gtatattagc acctatttaa attggtatca gcagaaacca     120
gggaaagccc ctagcctcct gatctatgct gcatccagtt tgcaaagtgg ggtcccatca     180
aggttcagtg gcagtggatc tgggacagat ttcactctca ccatcagcag tctgcaacct     240
gaagattttg catcttactc ctgtcaacag agttacagta cccctccgta cacttttggc     300
caggggacca agctggagat caaacgaact gtggctgcac catctgtctt catcttcccg     360
ccatctgatg agcagttgaa atctggaact gcctctgttg tgtgcctgct gaataacttc     420
tatcccagag aggccaaagt acagtggaag gtggataacg ccctccaatc gggtaactcc     480
caggagagtg tcacagagca ggacagcaag gacagcacct acagcctcag cagcaccctg     540
acgctgagca agcagactac gagaaacac aaagtctacg cctgcgaagt cacccatcag     600
ggcctgagct cgcccgtcac aaagagcttc aacaggggag agtgttag                  648
```

<210> SEQ ID NO 98
<211> LENGTH: 215
<212> TYPE: PRT
<213> ORGANISM: Artificial Sequence
<220> FEATURE:
<223> OTHER INFORMATION: Synthetic

<400> SEQUENCE: 98

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Tyr Ile Ser Thr Tyr
            20                  25                  30

Leu Asn Trp Tyr Gln Gln Lys Pro Gly Lys Ala Pro Ser Leu Leu Ile
        35                  40                  45

Tyr Ala Ala Ser Ser Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Ser Tyr Ser Cys Gln Gln Ser Tyr Ser Thr Pro Pro
                85                  90                  95

Tyr Thr Phe Gly Gln Gly Thr Lys Leu Glu Ile Lys Arg Thr Val Ala
            100                 105                 110

Ala Pro Ser Val Phe Ile Phe Pro Pro Ser Asp Glu Gln Leu Lys Ser
        115                 120                 125

Gly Thr Ala Ser Val Val Cys Leu Leu Asn Asn Phe Tyr Pro Arg Glu
    130                 135                 140

Ala Lys Val Gln Trp Lys Val Asp Asn Ala Leu Gln Ser Gly Asn Ser
145                 150                 155                 160

Gln Glu Ser Val Thr Glu Gln Asp Ser Lys Asp Ser Thr Tyr Ser Leu
                165                 170                 175

Ser Ser Thr Leu Thr Leu Ser Lys Ala Asp Tyr Glu Lys His Lys Val

|  | 180 | | | 185 | | | | 190 | | | |
|---|---|---|---|---|---|---|---|---|---|---|---|

Tyr Ala Cys Glu Val Thr His Gln Gly Leu Ser Ser Pro Val Thr Lys
                     195                    200                   205

Ser Phe Asn Arg Gly Glu Cys
      210               215

<210> SEQ ID NO 99
<211> LENGTH: 372
<212> TYPE: DNA
<213> ORGANISM: Artificial Sequence
<220> FEATURE:
<223> OTHER INFORMATION: Synthetic

<400> SEQUENCE: 99

| gaggtgcagc | tggtggagtc | tgggggaggc | ttggtacagc | ctgggggtc | cctgagactc | 60 |
|---|---|---|---|---|---|---|
| tcctgtgcag | cctctggatt | cacctttagt | agctatgcca | tgacctgggt | ccgccaggct | 120 |
| ccagggaagg | ggctggagtg | ggtctcagct | attagtggta | gtgatactag | cacatactac | 180 |
| gcagactccg | tgaagggccg | gttcaccatc | tccagagaca | attccaagaa | cacgctgttt | 240 |
| ctgcaaatga | acagcctgag | agccgaggac | acggccgtat | attactgtgc | gaaacatcaa | 300 |
| gattacgatt | ttcctacta | ctactccgct | atggacgtct | ggggccaagg | gaccacggtc | 360 |
| accgtctcct | ca | | | | | 372 |

<210> SEQ ID NO 100
<211> LENGTH: 124
<212> TYPE: PRT
<213> ORGANISM: Artificial Sequence
<220> FEATURE:
<223> OTHER INFORMATION: Synthetic

<400> SEQUENCE: 100

Glu Val Gln Leu Val Glu Ser Gly Gly Gly Leu Val Gln Pro Gly Gly
1               5                   10                15

Ser Leu Arg Leu Ser Cys Ala Ala Ser Gly Phe Thr Phe Ser Ser Tyr
         20                    25                   30

Ala Met Thr Trp Val Arg Gln Ala Pro Gly Lys Gly Leu Glu Trp Val
        35                    40                   45

Ser Ala Ile Ser Gly Ser Asp Thr Ser Thr Tyr Tyr Ala Asp Ser Val
    50                    55                   60

Lys Gly Arg Phe Thr Ile Ser Arg Asp Asn Ser Lys Asn Thr Leu Phe
65               70                   75                   80

Leu Gln Met Asn Ser Leu Arg Ala Glu Asp Thr Ala Val Tyr Tyr Cys
              85                    90                   95

Ala Lys His Gln Asp Tyr Asp Phe Ser Tyr Tyr Tyr Ser Ala Met Asp
        100                 105               110

Val Trp Gly Gln Gly Thr Thr Val Thr Val Ser Ser
        115                    120

<210> SEQ ID NO 101
<211> LENGTH: 24
<212> TYPE: DNA
<213> ORGANISM: Artificial Sequence
<220> FEATURE:
<223> OTHER INFORMATION: Synthetic

<400> SEQUENCE: 101

| ggattcacct | ttagtagcta | tgcc | 24 |
|---|---|---|---|

```
<210> SEQ ID NO 102
<211> LENGTH: 8
<212> TYPE: PRT
<213> ORGANISM: Artificial Sequence
<220> FEATURE:
<223> OTHER INFORMATION: Synthetic

<400> SEQUENCE: 102

Gly Phe Thr Phe Ser Ser Tyr Ala
1               5

<210> SEQ ID NO 103
<211> LENGTH: 24
<212> TYPE: DNA
<213> ORGANISM: Artificial Sequence
<220> FEATURE:
<223> OTHER INFORMATION: Synthetic

<400> SEQUENCE: 103
attagtggta gtgatactag caca                                          24

<210> SEQ ID NO 104
<211> LENGTH: 8
<212> TYPE: PRT
<213> ORGANISM: Artificial Sequence
<220> FEATURE:
<223> OTHER INFORMATION: Synthetic

<400> SEQUENCE: 104

Ile Ser Gly Ser Asp Thr Ser Thr
1               5

<210> SEQ ID NO 105
<211> LENGTH: 51
<212> TYPE: DNA
<213> ORGANISM: Artificial Sequence
<220> FEATURE:
<223> OTHER INFORMATION: Synthetic

<400> SEQUENCE: 105
gcgaaacatc aagattacga ttttccctac tactactccg ctatggacgt c            51

<210> SEQ ID NO 106
<211> LENGTH: 17
<212> TYPE: PRT
<213> ORGANISM: Artificial Sequence
<220> FEATURE:
<223> OTHER INFORMATION: Synthetic

<400> SEQUENCE: 106

Ala Lys His Gln Asp Tyr Asp Phe Ser Tyr Tyr Tyr Ser Ala Met Asp
1               5                   10                  15

Val

<210> SEQ ID NO 107
<211> LENGTH: 321
<212> TYPE: DNA
<213> ORGANISM: Artificial Sequence
<220> FEATURE:
<223> OTHER INFORMATION: Synthetic

<400> SEQUENCE: 107
gacatccaga tgacccagtc tccatcctcc ctgtctgcat ctgtaggaga cagagtcatc    60
atcacttgtc gggcgagtca ggatttcaac agctggttag cctggtatca gcagaaacca   120
gggaaagccc ctaaactcct gatctatgct gcatccagtt tgcaaagtgg ggtcccatca   180
```
aggttcagcg gcagtggatc tgggacagat ttcactctca ccatcagcag cctgcagcct    240
gaagattttg cgacttacta ttgtcagcag actgacagtt tcccattcac ttttggccct    300
gggaccaaag tggatatcaa a    321

<210> SEQ ID NO 108
<211> LENGTH: 107
<212> TYPE: PRT
<213> ORGANISM: Artificial Sequence
<220> FEATURE:
<223> OTHER INFORMATION: Synthetic

<400> SEQUENCE: 108

Asp Ile Gln Met Thr Gln Ser Pro Ser Ser Leu Ser Ala Ser Val Gly
1               5                   10                  15

Asp Arg Val Ile Ile Thr Cys Arg Ala Ser Gln Asp Phe Asn Ser Trp
            20                  25                  30

Leu Ala Trp Tyr Gln Gln Lys Pro Gly Lys Ala Pro Lys Leu Leu Ile
        35                  40                  45

Tyr Ala Ala Ser Ser Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Thr Asp Ser Phe Pro Phe
                85                  90                  95

Thr Phe Gly Pro Gly Thr Lys Val Asp Ile Lys
            100                 105

<210> SEQ ID NO 109
<211> LENGTH: 18
<212> TYPE: DNA
<213> ORGANISM: Artificial Sequence
<220> FEATURE:
<223> OTHER INFORMATION: Synthetic

<400> SEQUENCE: 109
caggatttca acagctgg    18

<210> SEQ ID NO 110
<211> LENGTH: 6
<212> TYPE: PRT
<213> ORGANISM: Artificial Sequence
<220> FEATURE:
<223> OTHER INFORMATION: Synthetic

<400> SEQUENCE: 110

Gln Asp Phe Asn Ser Trp
1               5

<210> SEQ ID NO 111
<211> LENGTH: 27
<212> TYPE: DNA
<213> ORGANISM: Artificial Sequence
<220> FEATURE:
<223> OTHER INFORMATION: Synthetic

<400> SEQUENCE: 111
cagcagactg acagtttccc attcact    27

<210> SEQ ID NO 112
<211> LENGTH: 9
<212> TYPE: PRT

<213> ORGANISM: Artificial Sequence
<220> FEATURE:
<223> OTHER INFORMATION: Synthetic

<400> SEQUENCE: 112

Gln Gln Thr Asp Ser Phe Pro Phe Thr
1               5

<210> SEQ ID NO 113
<211> LENGTH: 1356
<212> TYPE: DNA
<213> ORGANISM: Artificial Sequence
<220> FEATURE:
<223> OTHER INFORMATION: Synthetic

<400> SEQUENCE: 113

```
gaggtgcagc tggtggagtc tgggggaggc ttggtacagc ctggggggtc cctgagactc      60
tcctgtgcag cctctggatt cacctttagt agctatgcca tgacctgggt ccgccaggct     120
ccagggaagg ggctggagtg ggtctcagct attagtggta gtgatactag cacatactac     180
gcagactccg tgaagggccg gttcaccatc tccagagaca attccaagaa cacgctgttt     240
ctgcaaatga acagcctgag agccgaggac acggccgtat attactgtgc gaaacatcaa     300
gattacgatt ttcctacta ctactccgct atggacgtct ggggccaagg gaccacggtc     360
accgtctcct cagcctccac caagggccca tcggtcttcc ccctggcgcc ctgctccagg     420
agcacctccg agagcacagc cgccctgggc tgcctggtca aggactactt ccccgaaccg     480
gtgacggtgt cgtggaactc aggcgccctg accagcggcg tgcacacctt cccggctgtc     540
ctacagtcct caggactcta ctccctcagc agcgtggtga ccgtgccctc agcagcttg     600
ggcacgaaga cctacacctg caacgtagat cacaagccca gcaacaccaa ggtggacaag     660
agagttgagt ccaaatatgg tccccatgc ccaccctgcc cagcacctga gttcctgggg     720
ggaccatcag tcttcctgtt ccccccaaaa cccaaggaca ctctcatgat ctcccggacc     780
cctgaggtca cgtgcgtggt ggtggacgtg agccaggaag accccgaggt ccagttcaac     840
tggtacgtgg atggcgtgga ggtgcataat gccaagacaa agccgcggga ggagcagttc     900
aacagcacgt accgtgtggt cagcgtcctc accgtcctgc accaggactg gctgaacggc     960
aaggagtaca agtgcaaggt ctccaacaaa ggcctcccgt cctccatcga gaaaaccatc    1020
tccaaagcca aagggcagcc ccgagagcca caggtgtaca ccctgccccc atcccaggag    1080
gagatgacca gaaccaggt cagcctgacc tgcctggtca aaggcttcta ccccagcgac    1140
atcgccgtgg agtgggagag caatgggcag ccggagaaca actacaagac cacgcctccc    1200
gtgctggact ccgacggctc cttcttcctc tacagcaggc tcaccgtgga caagagcagg    1260
tggcaggagg ggaatgtctt ctcatgctcc gtgatgcatg aggctctgca caaccactac    1320
acacagaagt ccctctcccct gtctctgggt aaatga                             1356
```

<210> SEQ ID NO 114
<211> LENGTH: 451
<212> TYPE: PRT
<213> ORGANISM: Artificial Sequence
<220> FEATURE:
<223> OTHER INFORMATION: Synthetic

<400> SEQUENCE: 114

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr

```
                    20                  25                  30
Ala Met Thr Trp Val Arg Gln Ala Pro Gly Lys Gly Leu Glu Trp Val
                35                  40                  45
Ser Ala Ile Ser Gly Ser Asp Thr Ser Thr Tyr Tyr Ala Asp Ser Val
 50                  55                  60
Lys Gly Arg Phe Thr Ile Ser Arg Asp Asn Ser Lys Asn Thr Leu Phe
 65                  70                  75                  80
Leu Gln Met Asn Ser Leu Arg Ala Glu Asp Thr Ala Val Tyr Tyr Cys
                85                  90                  95
Ala Lys His Gln Asp Tyr Asp Phe Ser Tyr Tyr Tyr Ser Ala Met Asp
                100                 105                 110
Val Trp Gly Gln Gly Thr Thr Val Thr Val Ser Ser Ala Ser Thr Lys
                115                 120                 125
Gly Pro Ser Val Phe Pro Leu Ala Pro Cys Ser Arg Ser Thr Ser Glu
                130                 135                 140
Ser Thr Ala Ala Leu Gly Cys Leu Val Lys Asp Tyr Phe Pro Glu Pro
145                 150                 155                 160
Val Thr Val Ser Trp Asn Ser Gly Ala Leu Thr Ser Gly Val His Thr
                165                 170                 175
Phe Pro Ala Val Leu Gln Ser Ser Gly Leu Tyr Ser Leu Ser Ser Val
                180                 185                 190
Val Thr Val Pro Ser Ser Ser Leu Gly Thr Lys Thr Tyr Thr Cys Asn
                195                 200                 205
Val Asp His Lys Pro Ser Asn Thr Lys Val Asp Lys Arg Val Glu Ser
                210                 215                 220
Lys Tyr Gly Pro Pro Cys Pro Pro Cys Pro Ala Pro Glu Phe Leu Gly
225                 230                 235                 240
Gly Pro Ser Val Phe Leu Phe Pro Pro Lys Pro Lys Asp Thr Leu Met
                245                 250                 255
Ile Ser Arg Thr Pro Glu Val Thr Cys Val Val Val Asp Val Ser Gln
                260                 265                 270
Glu Asp Pro Glu Val Gln Phe Asn Trp Tyr Val Asp Gly Val Glu Val
                275                 280                 285
His Asn Ala Lys Thr Lys Pro Arg Glu Glu Gln Phe Asn Ser Thr Tyr
                290                 295                 300
Arg Val Val Ser Val Leu Thr Val Leu His Gln Asp Trp Leu Asn Gly
305                 310                 315                 320
Lys Glu Tyr Lys Cys Lys Val Ser Asn Lys Gly Leu Pro Ser Ser Ile
                325                 330                 335
Glu Lys Thr Ile Ser Lys Ala Lys Gly Gln Pro Arg Glu Pro Gln Val
                340                 345                 350
Tyr Thr Leu Pro Pro Ser Gln Glu Glu Met Thr Lys Asn Gln Val Ser
                355                 360                 365
Leu Thr Cys Leu Val Lys Gly Phe Tyr Pro Ser Asp Ile Ala Val Glu
                370                 375                 380
Trp Glu Ser Asn Gly Gln Pro Glu Asn Asn Tyr Lys Thr Thr Pro Pro
385                 390                 395                 400
Val Leu Asp Ser Asp Gly Ser Phe Phe Leu Tyr Ser Arg Leu Thr Val
                405                 410                 415
Asp Lys Ser Arg Trp Gln Glu Gly Asn Val Phe Ser Cys Ser Val Met
                420                 425                 430
His Glu Ala Leu His Asn His Tyr Thr Gln Lys Ser Leu Ser Leu Ser
                435                 440                 445
```

Leu Gly Lys
    450

<210> SEQ ID NO 115
<211> LENGTH: 645
<212> TYPE: DNA
<213> ORGANISM: Artificial Sequence
<220> FEATURE:
<223> OTHER INFORMATION: Synthetic

<400> SEQUENCE: 115

```
gacatccaga tgacccagtc tccatcctcc ctgtctgcat ctgtaggaga cagagtcatc    60
atcacttgtc gggcgagtca ggatttcaac agctggttag cctggtatca gcagaaacca   120
gggaaagccc ctaaactcct gatctatgct gcatccagtt tgcaaagtgg ggtcccatca   180
aggttcagcg gcagtggatc tgggacagat ttcactctca ccatcagcag cctgcagcct   240
gaagattttg cgacttacta ttgtcagcag actgacagtt tcccattcac ttttggccct   300
gggaccaaag tggatatcaa acgaactgtg gctgcaccat ctgtcttcat cttcccgcca   360
tctgatgagc agttgaaatc tggaactgcc tctgttgtgt gcctgctgaa taacttctat   420
cccagagagg ccaaagtaca gtggaaggtg gataacgccc tccaatcggg taactcccag   480
gagagtgtca cagagcagga cagcaaggac agcacctaca gcctcagcag caccctgacg   540
ctgagcaaag cagactacga aaacacaaa gtctacgcct gcgaagtcac ccatcagggc   600
ctgagctcgc ccgtcacaaa gagcttcaac aggggagagt gttag                   645
```

<210> SEQ ID NO 116
<211> LENGTH: 214
<212> TYPE: PRT
<213> ORGANISM: Artificial Sequence
<220> FEATURE:
<223> OTHER INFORMATION: Synthetic

<400> SEQUENCE: 116

Asp Ile Gln Met Thr Gln Ser Pro Ser Ser Leu Ser Ala Ser Val Gly
1               5                   10                  15

Asp Arg Val Ile Ile Thr Cys Arg Ala Ser Gln Asp Phe Asn Ser Trp
            20                  25                  30

Leu Ala Trp Tyr Gln Gln Lys Pro Gly Lys Ala Pro Lys Leu Leu Ile
        35                  40                  45

Tyr Ala Ala Ser Ser Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Thr Asp Ser Phe Pro Phe
                85                  90                  95

Thr Phe Gly Pro Gly Thr Lys Val Asp Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

```
Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 117
<211> LENGTH: 763
<212> TYPE: PRT
<213> ORGANISM: Artificial Sequence
<220> FEATURE:
<223> OTHER INFORMATION: Synthetic

<400> SEQUENCE: 117

Gly Tyr Lys Ala Glu Val Met Val Ser Gln Val Tyr Ser Gly Ser Leu
1               5                   10                  15

Arg Val Leu Asn Arg His Phe Ser Gln Asp Leu Thr Arg Arg Glu Ser
            20                  25                  30

Ser Ala Phe Arg Ser Glu Thr Ala Lys Ala Gln Lys Met Leu Lys Glu
        35                  40                  45

Leu Ile Thr Ser Thr Arg Leu Gly Thr Tyr Tyr Asn Ser Ser Ser Val
    50                  55                  60

Tyr Ser Phe Gly Glu Gly Pro Leu Thr Cys Phe Phe Trp Phe Ile Leu
65                  70                  75                  80

Gln Ile Pro Glu His Arg Arg Leu Met Leu Ser Pro Glu Val Val Gln
                85                  90                  95

Ala Leu Leu Val Glu Glu Leu Leu Ser Thr Val Asn Ser Ser Ala Ala
            100                 105                 110

Val Pro Tyr Arg Ala Glu Tyr Glu Val Asp Pro Glu Gly Leu Val Ile
        115                 120                 125

Leu Glu Ala Ser Val Lys Asp Ile Ala Ala Leu Asn Ser Thr Leu Gly
    130                 135                 140

Cys Tyr Arg Tyr Ser Tyr Val Gly Gln Gly Gln Val Leu Arg Leu Lys
145                 150                 155                 160

Gly Pro Asp His Leu Ala Ser Ser Cys Leu Trp His Leu Gln Gly Pro
                165                 170                 175

Lys Asp Leu Met Leu Lys Leu Arg Leu Glu Trp Thr Leu Ala Glu Cys
            180                 185                 190

Arg Asp Arg Leu Ala Met Tyr Asp Val Ala Gly Pro Leu Glu Lys Arg
        195                 200                 205

Leu Ile Thr Ser Val Tyr Gly Cys Ser Arg Gln Glu Pro Val Val Glu
    210                 215                 220

Val Leu Ala Ser Gly Ala Ile Met Ala Val Val Trp Lys Lys Gly Leu
225                 230                 235                 240

His Ser Tyr Tyr Asp Pro Phe Val Leu Ser Val Gln Pro Val Val Phe
                245                 250                 255

Gln Ala Cys Glu Val Asn Leu Thr Leu Asp Asn Arg Leu Asp Ser Gln
            260                 265                 270

Gly Val Leu Ser Thr Pro Tyr Phe Pro Ser Tyr Tyr Ser Pro Gln Thr
        275                 280                 285

His Cys Ser Trp His Leu Thr Val Pro Ser Leu Asp Tyr Gly Leu Ala
    290                 295                 300

Leu Trp Phe Asp Ala Tyr Ala Leu Arg Arg Gln Lys Tyr Asp Leu Pro
305                 310                 315                 320
```

-continued

```
Cys Thr Gln Gly Gln Trp Thr Ile Gln Asn Arg Arg Leu Cys Gly Leu
                325                 330                 335
Arg Ile Leu Gln Pro Tyr Ala Glu Arg Ile Pro Val Val Ala Thr Ala
            340                 345                 350
Gly Ile Thr Ile Asn Phe Thr Ser Gln Ile Ser Leu Thr Gly Pro Gly
        355                 360                 365
Val Arg Val His Tyr Gly Leu Tyr Asn Gln Ser Asp Pro Cys Pro Gly
    370                 375                 380
Glu Phe Leu Cys Ser Val Asn Gly Leu Cys Val Pro Ala Cys Asp Gly
385                 390                 395                 400
Val Lys Asp Cys Pro Asn Gly Leu Asp Glu Arg Asn Cys Val Cys Arg
                405                 410                 415
Ala Thr Phe Gln Cys Lys Glu Asp Ser Thr Cys Ile Ser Leu Pro Lys
            420                 425                 430
Val Cys Asp Gly Gln Pro Asp Cys Leu Asn Gly Ser Asp Glu Glu Gln
        435                 440                 445
Cys Gln Glu Gly Val Pro Cys Gly Thr Phe Thr Phe Gln Cys Glu Asp
    450                 455                 460
Arg Ser Cys Val Lys Lys Pro Asn Pro Gln Cys Asp Gly Arg Pro Asp
465                 470                 475                 480
Cys Arg Asp Gly Ser Asp Glu His Cys Asp Cys Gly Leu Gln Gly
                485                 490                 495
Pro Ser Ser Arg Ile Val Gly Gly Ala Val Ser Ser Glu Gly Glu Trp
            500                 505                 510
Pro Trp Gln Ala Ser Leu Gln Val Arg Gly Arg His Ile Cys Gly Gly
        515                 520                 525
Ala Leu Ile Ala Asp Arg Trp Val Ile Thr Ala Ala His Cys Phe Gln
    530                 535                 540
Glu Asp Ser Met Ala Ser Thr Val Leu Trp Thr Val Phe Leu Gly Lys
545                 550                 555                 560
Val Trp Gln Asn Ser Arg Trp Pro Gly Glu Val Ser Phe Lys Val Ser
                565                 570                 575
Arg Leu Leu Leu His Pro Tyr His Glu Glu Asp Ser His Asp Tyr Asp
            580                 585                 590
Val Ala Leu Leu Gln Leu Asp His Pro Val Val Arg Ser Ala Ala Val
        595                 600                 605
Arg Pro Val Cys Leu Pro Ala Arg Ser His Phe Phe Glu Pro Gly Leu
    610                 615                 620
His Cys Trp Ile Thr Gly Trp Gly Ala Leu Arg Glu Gly Gly Pro Ile
625                 630                 635                 640
Ser Asn Ala Leu Gln Lys Val Asp Val Gln Leu Ile Pro Gln Asp Leu
                645                 650                 655
Cys Ser Glu Val Tyr Arg Tyr Gln Val Thr Pro Arg Met Leu Cys Ala
            660                 665                 670
Gly Tyr Arg Lys Gly Lys Lys Asp Ala Cys Gln Gly Asp Ala Gly Gly
        675                 680                 685
Pro Leu Val Cys Lys Ala Leu Ser Gly Arg Trp Phe Leu Ala Gly Leu
    690                 695                 700
Val Ser Trp Gly Leu Gly Cys Gly Arg Pro Asn Tyr Phe Gly Val Tyr
705                 710                 715                 720
Thr Arg Ile Thr Gly Val Ile Ser Trp Ile Gln Gln Val Val Thr Glu
                725                 730                 735
Gln Lys Leu Ile Ser Glu Glu Asp Leu Gly Gly Glu Gln Lys Leu Ile
```

```
                        740                 745                 750
Ser Glu Glu Asp Leu His His His His His
                755                 760

<210> SEQ ID NO 118
<211> LENGTH: 759
<212> TYPE: PRT
<213> ORGANISM: Artificial Sequence
<220> FEATURE:
<223> OTHER INFORMATION: Synthetic

<400> SEQUENCE: 118

Lys Ala Glu Val Thr Val Ser Gln Val Tyr Ser Gly Ser Leu Arg Val
1               5                   10                  15

Leu Asn Arg His Phe Ser Gln Asp Leu Gly Arg Arg Glu Ser Ile Ala
            20                  25                  30

Phe Arg Ser Glu Ser Ala Lys Ala Gln Lys Met Leu Gln Glu Leu Val
        35                  40                  45

Ala Ser Thr Arg Leu Gly Thr Tyr Tyr Asn Ser Ser Val Tyr Ser
    50                  55                  60

Phe Gly Glu Gly Pro Leu Thr Cys Phe Phe Trp Phe Ile Leu Asp Ile
65                  70                  75                  80

Pro Glu Tyr Gln Arg Leu Thr Leu Ser Pro Glu Val Val Arg Glu Leu
                85                  90                  95

Leu Val Asp Glu Leu Leu Ser Asn Ser Ser Thr Leu Ala Ser Tyr Lys
            100                 105                 110

Thr Glu Tyr Glu Val Asp Pro Glu Gly Leu Val Ile Leu Glu Ala Ser
        115                 120                 125

Val Asn Asp Ile Val Val Leu Asn Ser Thr Leu Gly Cys Tyr Arg Tyr
    130                 135                 140

Ser Tyr Val Asn Pro Gly Gln Val Leu Pro Leu Lys Gly Pro Asp Gln
145                 150                 155                 160

Gln Thr Thr Ser Cys Leu Trp His Leu Gln Gly Pro Glu Asp Leu Met
                165                 170                 175

Ile Lys Val Arg Leu Glu Trp Thr Arg Val Asp Cys Arg Asp Arg Val
            180                 185                 190

Ala Met Tyr Asp Ala Ala Gly Pro Leu Glu Lys Arg Leu Ile Thr Ser
        195                 200                 205

Val Tyr Gly Cys Ser Arg Gln Glu Pro Val Met Glu Val Leu Ala Ser
    210                 215                 220

Gly Ser Val Met Ala Val Val Trp Lys Lys Gly Met His Ser Tyr Tyr
225                 230                 235                 240

Asp Pro Phe Leu Leu Ser Val Lys Ser Val Ala Phe Gln Asp Cys Gln
                245                 250                 255

Val Asn Leu Thr Leu Glu Gly Arg Leu Asp Thr Gln Gly Phe Leu Arg
            260                 265                 270

Thr Pro Tyr Tyr Pro Ser Tyr Tyr Ser Pro Ser Thr His Cys Ser Trp
        275                 280                 285

His Leu Thr Val Pro Ser Leu Asp Tyr Gly Leu Ala Leu Trp Phe Asp
    290                 295                 300

Ala Tyr Ala Leu Arg Arg Gln Lys Tyr Asn Arg Leu Cys Thr Gln Gly
305                 310                 315                 320

Gln Trp Met Ile Gln Asn Arg Arg Leu Cys Gly Phe Arg Thr Leu Gln
                325                 330                 335

Pro Tyr Ala Glu Arg Ile Pro Met Val Ala Ser Asp Gly Val Thr Ile
```

```
                340             345             350
Asn Phe Thr Ser Gln Ile Ser Leu Thr Gly Pro Gly Val Gln Val Tyr
            355                 360             365

Tyr Ser Leu Tyr Asn Gln Ser Asp Pro Cys Pro Gly Glu Phe Leu Cys
            370                 375             380

Ser Val Asn Gly Leu Cys Val Pro Ala Cys Asp Gly Ile Lys Asp Cys
385                 390                 395                 400

Pro Asn Gly Leu Asp Glu Arg Asn Cys Val Cys Arg Ala Met Phe Gln
                405                 410             415

Cys Gln Glu Asp Ser Thr Cys Ile Ser Leu Pro Arg Val Cys Asp Arg
            420                 425             430

Gln Pro Asp Cys Leu Asn Gly Ser Asp Glu Glu Cys Gln Glu Gly
            435                 440             445

Val Pro Cys Gly Thr Phe Thr Phe Gln Cys Glu Asp Arg Ser Cys Val
    450                 455                 460

Lys Lys Pro Asn Pro Glu Cys Asp Gly Gln Ser Asp Cys Arg Asp Gly
465                 470                 475                 480

Ser Asp Glu Gln His Cys Asp Cys Gly Leu Gln Gly Leu Ser Ser Arg
                485                 490                 495

Ile Val Gly Gly Thr Val Ser Ser Glu Gly Glu Trp Pro Trp Gln Ala
            500                 505                 510

Ser Leu Gln Ile Arg Gly Arg His Ile Cys Gly Gly Ala Leu Ile Ala
            515                 520                 525

Asp Arg Trp Val Ile Thr Ala Ala His Cys Phe Gln Glu Asp Ser Met
            530                 535                 540

Ala Ser Pro Lys Leu Trp Thr Val Phe Leu Gly Lys Met Arg Gln Asn
545                 550                 555                 560

Ser Arg Trp Pro Gly Glu Val Ser Phe Lys Val Ser Arg Leu Phe Leu
                565                 570                 575

His Pro Tyr His Glu Glu Asp Ser His Asp Tyr Asp Val Ala Leu Leu
                580                 585                 590

Gln Leu Asp His Pro Val Val Tyr Ser Ala Thr Val Arg Pro Val Cys
            595                 600                 605

Leu Pro Ala Arg Ser His Phe Phe Glu Pro Gly Gln His Cys Trp Ile
    610                 615                 620

Thr Gly Trp Gly Ala Gln Arg Glu Gly Gly Pro Val Ser Asn Thr Leu
625                 630                 635                 640

Gln Lys Val Asp Val Gln Leu Val Pro Gln Asp Leu Cys Ser Glu Ala
                645                 650                 655

Tyr Arg Tyr Gln Val Ser Pro Arg Met Leu Cys Ala Gly Tyr Arg Lys
                660                 665                 670

Gly Lys Lys Asp Ala Cys Gln Gly Asp Ala Gly Gly Pro Leu Val Cys
            675                 680                 685

Arg Glu Pro Ser Gly Arg Trp Phe Leu Ala Gly Leu Val Ser Trp Gly
    690                 695                 700

Leu Gly Cys Gly Arg Pro Asn Phe Phe Gly Val Tyr Thr Arg Val Thr
705                 710                 715                 720

Arg Val Ile Asn Trp Ile Gln Gln Val Leu Thr Glu Gln Lys Leu Ile
                725                 730                 735

Ser Glu Glu Asp Leu Gly Gly Glu Gln Lys Leu Ile Ser Glu Glu Asp
            740                 745                 750

Leu His His His His His His
            755
```

<210> SEQ ID NO 119
<211> LENGTH: 763
<212> TYPE: PRT
<213> ORGANISM: Artificial Sequence
<220> FEATURE:
<223> OTHER INFORMATION: Synthetic

<400> SEQUENCE: 119

```
Gly Tyr Lys Ala Glu Val Thr Val Ser Gln Val Tyr Ser Gly Ser Leu
1               5                   10                  15

Arg Val Leu Asn Arg His Phe Ser Gln Asp Leu Thr Arg Arg Glu Ser
            20                  25                  30

Ser Ala Phe Arg Ser Glu Thr Ala Lys Ala Gln Lys Met Leu Lys Glu
        35                  40                  45

Leu Ile Ala Ser Thr Arg Leu Gly Thr Tyr Tyr Asn Ser Ser Ser Val
    50                  55                  60

Tyr Ser Phe Gly Glu Gly Pro Leu Thr Cys Phe Phe Trp Phe Ile Leu
65                  70                  75                  80

Gln Ile Pro Glu His Arg Arg Leu Met Leu Ser Pro Glu Val Val Gln
                85                  90                  95

Ala Leu Leu Val Glu Leu Leu Ser Thr Val Asn Ser Ser Ala Ala
            100                 105                 110

Val Pro Tyr Arg Ala Glu Tyr Glu Val Asp Pro Glu Gly Leu Val Ile
        115                 120                 125

Leu Glu Ala Ser Val Lys Asp Ile Ala Ala Leu Asn Ser Thr Leu Gly
    130                 135                 140

Cys Tyr Arg Tyr Ser Tyr Val Gly Gln Gly Gln Val Leu Arg Leu Lys
145                 150                 155                 160

Gly Pro Asp His Leu Ala Ser Ser Cys Leu Trp His Leu Gln Gly Pro
                165                 170                 175

Glu Asp Leu Met Leu Lys Leu Arg Leu Glu Trp Thr Leu Ala Glu Cys
            180                 185                 190

Arg Asp Arg Leu Ala Met Tyr Asp Val Ala Gly Pro Leu Glu Lys Arg
        195                 200                 205

Leu Ile Thr Ser Val Tyr Gly Cys Ser Arg Gln Glu Pro Val Val Glu
    210                 215                 220

Val Leu Ala Ser Gly Ala Ile Met Ala Val Val Trp Lys Lys Gly Leu
225                 230                 235                 240

His Ser Tyr Tyr Asp Pro Phe Met Leu Ser Val Gln Ser Val Val Phe
                245                 250                 255

Gln Ala Cys Glu Val Asn Leu Thr Leu Asp Asp Arg Leu Asp Ser Gln
            260                 265                 270

Gly Val Leu Ser Thr Pro Tyr Phe Pro Ser Tyr Tyr Ser Pro Arg Thr
        275                 280                 285

His Cys Ser Trp His Leu Thr Val Pro Ser Leu Asp Tyr Gly Leu Ala
    290                 295                 300

Leu Trp Phe Asp Ala Tyr Ala Leu Arg Arg Gln Lys Tyr Asp Leu Pro
305                 310                 315                 320

Cys Thr Gln Gly Gln Trp Thr Ile Gln Asn Arg Arg Leu Cys Gly Leu
                325                 330                 335

Arg Ile Leu Gln Pro Tyr Ala Glu Arg Ile Pro Val Val Ala Thr Ala
            340                 345                 350

Gly Ile Thr Ile Asn Phe Thr Ser Gln Ile Ser Leu Thr Gly Pro Gly
        355                 360                 365
```

Val Arg Val His Tyr Gly Leu Tyr Asn Gln Ser Asp Pro Cys Pro Gly
    370                 375                 380

Glu Phe Leu Cys Ser Val Asn Gly Leu Cys Val Pro Ala Cys Asp Gly
385                 390                 395                 400

Val Lys Asp Cys Pro Asn Gly Leu Asp Glu Arg Asn Cys Val Cys Arg
            405                 410                 415

Ala Thr Phe Gln Cys Gln Glu Asp Ser Thr Cys Ile Ser Leu Leu Lys
            420                 425                 430

Val Cys Asp Gly Gln Pro Asp Cys Leu Asn Gly Ser Asp Glu Glu Arg
            435                 440                 445

Cys Gln Glu Gly Val Pro Cys Gly Thr Phe Thr Phe Gln Cys Glu Asp
            450                 455                 460

Gln Ser Cys Val Lys Lys Pro Asn Pro Gln Cys Asp Gly Arg Pro Asp
465                 470                 475                 480

Cys Arg Asp Gly Ser Asp Glu Gln His Cys Asp Cys Gly Leu Gln Gly
            485                 490                 495

Pro Ser Ser Arg Ile Val Gly Gly Ala Val Ser Ser Glu Gly Glu Trp
            500                 505                 510

Pro Trp Gln Ala Ser Leu Gln Val Arg Gly Arg His Ile Cys Gly Gly
        515                 520                 525

Ala Leu Ile Ala Asp Arg Trp Val Ile Ala Ala His Cys Phe Gln
530                 535                 540

Glu Asp Ser Met Ala Ser Pro Ala Leu Trp Thr Val Phe Leu Gly Lys
545                 550                 555                 560

Val Trp Gln Asn Ser Arg Trp Pro Gly Glu Val Ser Phe Lys Val Ser
            565                 570                 575

Arg Leu Leu Leu His Pro Tyr His Glu Glu Asp Ser His Asp Tyr Asp
            580                 585                 590

Val Ala Leu Leu Gln Leu Asp His Pro Val Val Arg Ser Ala Ala Val
            595                 600                 605

Arg Pro Val Cys Leu Pro Ala Arg Ser His Phe Phe Glu Pro Gly Leu
        610                 615                 620

His Cys Trp Ile Thr Gly Trp Gly Ala Leu Arg Glu Gly Gly Pro Thr
625                 630                 635                 640

Ser Asn Ala Leu Gln Lys Val Asp Val Gln Leu Ile Pro Gln Asp Leu
            645                 650                 655

Cys Ser Glu Ala Tyr Arg Tyr Gln Val Thr Pro Arg Met Leu Cys Ala
            660                 665                 670

Gly Tyr Arg Lys Gly Lys Lys Asp Ala Cys Gln Gly Asp Ala Gly Gly
            675                 680                 685

Pro Leu Val Cys Lys Ala Leu Ser Gly Arg Trp Phe Leu Ala Gly Leu
            690                 695                 700

Val Ser Trp Gly Leu Gly Cys Gly Arg Pro Asn Tyr Phe Gly Val Tyr
705                 710                 715                 720

Thr Arg Ile Thr Gly Val Ile Gly Trp Ile Gln Val Val Thr Glu
                725                 730                 735

Gln Lys Leu Ile Ser Glu Glu Asp Leu Gly Gly Glu Gln Lys Leu Ile
            740                 745                 750

Ser Glu Glu Asp Leu His His His His His
            755                 760

<210> SEQ ID NO 120
<211> LENGTH: 11

```
<212> TYPE: PRT
<213> ORGANISM: Artificial Sequence
<220> FEATURE:
<223> OTHER INFORMATION: Synthetic

<400> SEQUENCE: 120

Ser His Phe Phe Glu Pro Gly Leu His Cys Trp
1               5                   10

<210> SEQ ID NO 121
<211> LENGTH: 26
<212> TYPE: PRT
<213> ORGANISM: Artificial Sequence
<220> FEATURE:
<223> OTHER INFORMATION: Synthetic

<400> SEQUENCE: 121

Leu Val Ser Trp Gly Leu Gly Cys Gly Arg Pro Asn Tyr Phe Gly Val
1               5                   10                  15

Tyr Thr Arg Ile Thr Gly Val Ile Ser Trp
            20                  25

<210> SEQ ID NO 122
<211> LENGTH: 9
<212> TYPE: PRT
<213> ORGANISM: Artificial Sequence
<220> FEATURE:
<223> OTHER INFORMATION: Synthetic

<400> SEQUENCE: 122

Leu Ile Thr Ser Thr Arg Leu Gly Thr
1               5

<210> SEQ ID NO 123
<211> LENGTH: 9
<212> TYPE: PRT
<213> ORGANISM: Artificial Sequence
<220> FEATURE:
<223> OTHER INFORMATION: Synthetic

<400> SEQUENCE: 123

Gly Glu Trp Pro Trp Gln Ala Ser Leu
1               5

<210> SEQ ID NO 124
<211> LENGTH: 25
<212> TYPE: PRT
<213> ORGANISM: Artificial Sequence
<220> FEATURE:
<223> OTHER INFORMATION: Synthetic

<400> SEQUENCE: 124

Ser Thr Val Leu Trp Thr Val Phe Leu Gly Lys Val Trp Gln Asn Ser
1               5                   10                  15

Arg Trp Pro Gly Glu Val Ser Phe Lys
            20                  25

<210> SEQ ID NO 125
<211> LENGTH: 21
<212> TYPE: PRT
<213> ORGANISM: Artificial Sequence
<220> FEATURE:
<223> OTHER INFORMATION: Synthetic

<400> SEQUENCE: 125

Ile Thr Gly Trp Gly Ala Leu Arg Glu Gly Gly Pro Ile Ser Asn Ala
```

Leu Gln Lys Val Asp
            20

<210> SEQ ID NO 126
<211> LENGTH: 811
<212> TYPE: PRT
<213> ORGANISM: Artificial Sequence
<220> FEATURE:
<223> OTHER INFORMATION: Synthetic

<400> SEQUENCE: 126

Met Leu Leu Leu Phe His Ser Lys Arg Met Pro Val Ala Glu Ala Pro
1               5                   10                  15

Gln Val Ala Gly Gly Gln Gly Asp Gly Gly Asp Gly Glu Glu Ala Glu
            20                  25                  30

Pro Glu Gly Met Phe Lys Ala Cys Glu Asp Ser Lys Arg Lys Ala Arg
        35                  40                  45

Gly Tyr Leu Arg Leu Val Pro Leu Phe Val Leu Leu Ala Leu Leu Val
    50                  55                  60

Leu Ala Ser Ala Gly Val Leu Leu Trp Tyr Phe Leu Gly Tyr Lys Ala
65                  70                  75                  80

Glu Val Met Val Ser Gln Val Tyr Ser Gly Ser Leu Arg Val Leu Asn
                85                  90                  95

Arg His Phe Ser Gln Asp Leu Thr Arg Arg Glu Ser Ser Ala Phe Arg
            100                 105                 110

Ser Glu Thr Ala Lys Ala Gln Lys Met Leu Lys Glu Leu Ile Thr Ser
        115                 120                 125

Thr Arg Leu Gly Thr Tyr Tyr Asn Ser Ser Ser Val Tyr Ser Phe Gly
    130                 135                 140

Glu Gly Pro Leu Thr Cys Phe Phe Trp Phe Ile Leu Gln Ile Pro Glu
145                 150                 155                 160

His Arg Arg Leu Met Leu Ser Pro Glu Val Gln Ala Leu Leu Val
                165                 170                 175

Glu Glu Leu Leu Ser Thr Val Asn Ser Ser Ala Ala Val Pro Tyr Arg
            180                 185                 190

Ala Glu Tyr Glu Val Asp Pro Glu Gly Leu Val Ile Leu Glu Ala Ser
        195                 200                 205

Val Lys Asp Ile Ala Ala Leu Asn Ser Thr Leu Gly Cys Tyr Arg Tyr
    210                 215                 220

Ser Tyr Val Gly Gln Gly Gln Val Leu Arg Leu Lys Gly Pro Asp His
225                 230                 235                 240

Leu Ala Ser Ser Cys Leu Trp His Leu Gln Gly Pro Lys Asp Leu Met
                245                 250                 255

Leu Lys Leu Arg Leu Glu Trp Thr Leu Ala Glu Cys Arg Asp Arg Leu
            260                 265                 270

Ala Met Tyr Asp Val Ala Gly Pro Leu Glu Lys Arg Leu Ile Thr Ser
        275                 280                 285

Val Tyr Gly Cys Ser Arg Gln Glu Pro Val Val Glu Val Leu Ala Ser
    290                 295                 300

Gly Ala Ile Met Ala Val Val Trp Lys Lys Gly Leu His Ser Tyr Tyr
305                 310                 315                 320

Asp Pro Phe Val Leu Ser Val Gln Pro Val Val Phe Gln Ala Cys Glu
                325                 330                 335

Val Asn Leu Thr Leu Asp Asn Arg Leu Asp Ser Gln Gly Val Leu Ser

```
                    340             345             350
Thr Pro Tyr Phe Pro Ser Tyr Tyr Ser Pro Gln Thr His Cys Ser Trp
            355                 360             365

His Leu Thr Val Pro Ser Leu Asp Tyr Gly Leu Ala Leu Trp Phe Asp
    370                 375             380

Ala Tyr Ala Leu Arg Arg Gln Lys Tyr Asp Leu Pro Cys Thr Gln Gly
385                 390             395                 400

Gln Trp Thr Ile Gln Asn Arg Arg Leu Cys Gly Leu Arg Ile Leu Gln
                405             410             415

Pro Tyr Ala Glu Arg Ile Pro Val Val Ala Thr Ala Gly Ile Thr Ile
            420             425             430

Asn Phe Thr Ser Gln Ile Ser Leu Thr Gly Pro Gly Val Arg Val His
        435             440             445

Tyr Gly Leu Tyr Asn Gln Ser Asp Pro Cys Pro Gly Glu Phe Leu Cys
    450             455             460

Ser Val Asn Gly Leu Cys Val Pro Ala Cys Asp Gly Val Lys Asp Cys
465             470             475             480

Pro Asn Gly Leu Asp Glu Arg Asn Cys Val Cys Arg Ala Thr Phe Gln
                485             490             495

Cys Lys Glu Asp Ser Thr Cys Ile Ser Leu Pro Lys Val Cys Asp Gly
            500             505             510

Gln Pro Asp Cys Leu Asn Gly Ser Asp Glu Glu Cys Gln Glu Gly
            515             520             525

Val Pro Cys Gly Thr Phe Thr Phe Gln Cys Glu Asp Arg Ser Cys Val
            530             535             540

Lys Lys Pro Asn Pro Gln Cys Asp Gly Arg Pro Asp Cys Arg Asp Gly
545                 550             555                 560

Ser Asp Glu Glu His Cys Asp Cys Gly Leu Gln Gly Pro Ser Ser Arg
                565             570             575

Ile Val Gly Gly Ala Val Ser Ser Glu Gly Glu Trp Pro Trp Gln Ala
            580             585             590

Ser Leu Gln Val Arg Gly Arg His Ile Cys Gly Gly Ala Leu Ile Ala
        595             600             605

Asp Arg Trp Val Ile Thr Ala Ala His Cys Phe Gln Glu Asp Ser Met
        610             615             620

Ala Ser Thr Val Leu Trp Thr Val Phe Leu Gly Lys Val Trp Gln Asn
625             630             635             640

Ser Arg Trp Pro Gly Glu Val Ser Phe Lys Val Ser Arg Leu Leu Leu
                645             650             655

His Pro Tyr His Glu Glu Asp Ser His Asp Tyr Asp Val Ala Leu Leu
                660             665             670

Gln Leu Asp His Pro Val Val Arg Ser Ala Ala Val Arg Pro Val Cys
            675             680             685

Leu Pro Ala Arg Ser His Phe Phe Glu Pro Gly Leu His Cys Trp Ile
        690             695             700

Thr Gly Trp Gly Ala Leu Arg Glu Gly Gly Pro Ile Ser Asn Ala Leu
705             710             715             720

Gln Lys Val Asp Val Gln Leu Ile Pro Gln Asp Leu Cys Ser Glu Val
                725             730             735

Tyr Arg Tyr Gln Val Thr Pro Arg Met Leu Cys Ala Gly Tyr Arg Lys
            740             745             750

Gly Lys Lys Asp Ala Cys Gln Gly Asp Ser Gly Gly Pro Leu Val Cys
            755             760             765
```

```
Lys Ala Leu Ser Gly Arg Trp Phe Leu Ala Gly Leu Val Ser Trp Gly
            770                 775                 780

Leu Gly Cys Gly Arg Pro Asn Tyr Phe Gly Val Tyr Thr Arg Ile Thr
785                 790                 795                 800

Gly Val Ile Ser Trp Ile Gln Gln Val Val Thr
                805                 810

<210> SEQ ID NO 127
<211> LENGTH: 3209
<212> TYPE: DNA
<213> ORGANISM: Artificial Sequence
<220> FEATURE:
<223> OTHER INFORMATION: Synthetic

<400> SEQUENCE: 127
```

| | | | | | |
|---|---|---|---|---|---|
| cttgagccag | acccagtcca | gctctggtgc | ctgccctctg | gtgcgagctg | acctgagatg | 60 |
| cacttccctc | ctctgtgagc | tgtctcggca | cccacttgca | gtcactgccg | cctgatgttg | 120 |
| ttactcttcc | actccaaaag | gatgcccgtg | gccgaggccc | ccaggtggc | tggcgggcag | 180 |
| ggggacggag | gtgatggcga | ggaagcggag | ccggagggga | tgttcaaggc | ctgtgaggac | 240 |
| tccaagagaa | aagcccgggg | ctacctccgc | ctggtgcccc | tgtttgtgct | gctggccctg | 300 |
| ctcgtgctgg | cttcggcggg | ggtgctactc | tggtatttcc | tagggtacaa | ggcggaggtg | 360 |
| atggtcagcc | aggtgtactc | aggcagtctg | cgtgtactca | atcgccactt | ctcccaggat | 420 |
| cttacccgcc | gggaatctag | tgccttccgc | agtgaaaccg | ccaaagccca | gaagatgctc | 480 |
| aaggagctca | tcaccagcac | ccgcctggga | acttactaca | actccagctc | cgtctattcc | 540 |
| tttgggagg | gacccctcac | ctgcttcttc | tggttcattc | tccaaatccc | cgagcaccgc | 600 |
| cggctgatgc | tgagcccga | ggtggtgcag | gcactgctgg | tggaggagct | gctgtccaca | 660 |
| gtcaacagct | cggctgccgt | ccctacagg | gccgagtacg | aagtggaccc | cgagggccta | 720 |
| gtgatcctgg | aagccagtgt | gaaagacata | gctgcattga | attccacgct | gggttgttac | 780 |
| cgctacagct | acgtgggcca | gggccaggtc | ctccggctga | aggggcctga | ccacctggcc | 840 |
| tccagctgcc | tgtggcacct | gcagggcccc | aaggacctca | tgctcaaact | ccggctggag | 900 |
| tggacgctgg | cagagtgccg | ggaccgactg | gccatgtatg | acgtggccgg | gcccctggag | 960 |
| aagaggctca | tcacctcggt | gtacggctgc | agccgccagg | agcccgtggt | ggaggttctg | 1020 |
| gcgtcggggg | ccatcatggc | ggtcgtctgg | aagaagggcc | tgcacagcta | ctacgacccc | 1080 |
| ttcgtgctct | ccgtgcagcc | ggtggtcttc | caggcctgtg | aagtgaacct | gacgctggac | 1140 |
| aacaggctcg | actcccaggg | cgtcctcagc | accccgtact | cccagcta | ctactcgccc | 1200 |
| caaacccact | gctcctggca | cctcacggtg | ccctctctgg | actacggctt | ggccctctgg | 1260 |
| tttgatgcct | atgcactgag | gaggcagaag | tatgatttgc | cgtgcaccca | gggccagtgg | 1320 |
| acgatccaga | acaggaggct | gtgtggcttg | cgcatcctgc | agcccctacgc | cgagaggatc | 1380 |
| cccgtggtgg | ccacggccgg | gatcaccatc | aacttcacct | cccagatctc | cctcaccggg | 1440 |
| cccggtgtgc | gggtgcacta | tggcttgtac | aaccagtcgg | accctgccc | tggagagttc | 1500 |
| ctctgttctg | tgaatggact | ctgtgtccct | gcctgtgatg | gggtcaagga | ctgccccaac | 1560 |
| ggcctggatg | agagaaactg | cgtttgcaga | gccacattcc | agtgcaaaga | ggacagcaca | 1620 |
| tgcatctcac | tgcccaaggt | ctgtgatggg | cagcctgatt | gtctcaacgg | cagcgacgaa | 1680 |
| gagcagtgcc | aggaaggggt | gccatgtggg | acattcacct | tccagtgtga | ggaccggagc | 1740 |
| tgcgtgaaga | agcccaaccc | gcagtgtgat | gggcggcccg | actgcaggga | cggctcggat | 1800 |

```
gaggagcact gtgactgtgg cctccagggc ccctccagcc gcattgttgg tggagctgtg    1860
tcctccgagg gtgagtggcc atggcaggcc agcctccagg ttcggggtcg acacatctgt    1920
gggggggccc tcatcgctga ccgctgggtg ataacagctg cccactgctt ccaggaggac    1980
agcatggcct ccacggtgct gtggaccgtg ttcctgggca aggtgtggca gaactcgcgc    2040
tggcctggag aggtgtcctt caaggtgagc cgcctgctcc tgcacccgta ccacgaagag    2100
gacagccatg actacgacgt ggcgctgctg cagctcgacc accggtggt gcgctcggcc    2160 gccgtgcgcc ccgtctgcct gcccgcgcgc tcccacttct tcgagcccgg cctgcactgc    2220
tggattacgg gctggggcgc cttgcgcgag gcggccccca tcagcaacgc tctgcagaaa    2280
gtggatgtgc agttgatccc acaggacctg tgcagcgagg tctatcgcta ccaggtgacg    2340
ccacgcatgc tgtgtgccgg ctaccgcaag ggcaagaagg atgcctgtca gggtgactca    2400
ggtggtccgc tggtgtgcaa ggcactcagt ggccgctggt tcctggcggg gctggtcagc    2460
tggggcctgg gctgtggccg gcctaactac ttcggcgtct acacccgcat cacaggtgtg    2520
atcagctgga tccagcaagt ggtgacctga ggaactgccc ccctgcaaag cagggcccac    2580
ctcctggact cagagagccc agggcaactg ccaagcaggg ggacaagtat tctggcgggg    2640
ggtgggggag agagcaggcc ctgtggtggc aggaggtggc atcttgtctc gtccctgatg    2700
tctgctccag tgatggcagg aggatggaga agtgccagca gctgggggtc aagacgtccc    2760
ctgaggaccc aggcccacac ccagcccttc tgcctcccaa ttctctctcc tccgtccct    2820 tcctccactg ctgcctaatg caaggcagtg gctcagcagc aagaatgctg gttctacatc    2880
ccgaggagtg tctgaggtgc gccccactct gtacagaggc tgtttgggca gccttgcctc    2940
cagagagcag attccagctt cggaagcccc tggtctaact tgggatctgg aatggaagg    3000 tgctcccatc ggaggggacc ctcagagccc tggagactgc caggtgggcc tgctgccact    3060
gtaagccaaa aggtggggaa gtcctgactc cagggtcctt gccccacccc tgcctgccac    3120
ctgggccctc acagcccaga ccctcactgg gaggtgagct cagctgccct ttggaataaa    3180
gctgcctgat ccaaaaaaaa aaaaaaaaa                                      3209
```

<210> SEQ ID NO 128
<211> LENGTH: 800
<212> TYPE: PRT
<213> ORGANISM: Artificial Sequence
<220> FEATURE:
<223> OTHER INFORMATION: Synthetic

<400> SEQUENCE: 128

```
Met Pro Val Ala Lys Ala Pro Gln Val Ala Gly Gly Gln Gly Asp Gly
1               5                   10                  15

Gly Asp Gly Glu Glu Ala Glu Pro Glu Gly Met Phe Glu Ala Cys Glu
            20                  25                  30

Asp Ser Lys Arg Lys Ala Arg Gly Tyr Leu Arg Leu Ala Pro Leu Trp
        35                  40                  45

Leu Thr Leu Val Val Leu Thr Ser Val Gly Val Leu Leu Trp Tyr Phe
    50                  55                  60

Leu Gly Tyr Lys Ala Glu Val Thr Val Ser Gln Val Tyr Ser Gly Ser
65                  70                  75                  80

Leu Arg Val Leu Asn Arg His Phe Ser Gln Asp Leu Thr Arg Arg Glu
                85                  90                  95

Ser Ser Ala Phe Arg Ser Glu Thr Ala Lys Ala Gln Lys Met Leu Lys
            100                 105                 110
```

```
Glu Leu Ile Ala Ser Thr Arg Leu Gly Thr Tyr Tyr Asn Ser Ser
            115                 120                 125

Val Tyr Ser Phe Gly Glu Gly Pro Leu Thr Cys Phe Phe Trp Phe Ile
130                 135                 140

Leu Gln Ile Pro Glu His Arg Arg Leu Met Leu Ser Pro Glu Val Val
145                 150                 155                 160

Gln Ala Leu Leu Val Glu Glu Leu Leu Ser Thr Val Asn Ser Ser Ala
                165                 170                 175

Ala Val Pro Tyr Arg Ala Glu Tyr Glu Val Asp Pro Glu Gly Leu Val
                180                 185                 190

Ile Leu Glu Ala Ser Val Lys Asp Ile Ala Ala Leu Asn Ser Thr Leu
            195                 200                 205

Gly Cys Tyr Arg Tyr Ser Tyr Val Gly Gln Gly Gln Val Leu Arg Leu
        210                 215                 220

Lys Gly Pro Asp His Leu Ala Ser Ser Cys Leu Trp His Leu Gln Gly
225                 230                 235                 240

Pro Glu Asp Leu Met Leu Lys Leu Arg Leu Glu Trp Thr Leu Ala Glu
                245                 250                 255

Cys Arg Asp Arg Leu Ala Met Tyr Asp Val Ala Gly Pro Leu Glu Lys
            260                 265                 270

Arg Leu Ile Thr Ser Val Tyr Gly Cys Ser Arg Gln Glu Pro Val Val
        275                 280                 285

Glu Val Leu Ala Ser Gly Ala Ile Met Ala Val Val Trp Lys Lys Gly
    290                 295                 300

Leu His Ser Tyr Tyr Asp Pro Phe Met Leu Ser Val Gln Ser Val Val
305                 310                 315                 320

Phe Gln Ala Cys Glu Val Asn Leu Thr Leu Asp Asp Arg Leu Asp Ser
                325                 330                 335

Gln Gly Val Leu Ser Thr Pro Tyr Phe Pro Ser Tyr Tyr Ser Pro Arg
            340                 345                 350

Thr His Cys Ser Trp His Leu Thr Val Pro Ser Leu Asp Tyr Gly Leu
        355                 360                 365

Ala Leu Trp Phe Asp Ala Tyr Ala Leu Arg Arg Gln Lys Tyr Asp Leu
    370                 375                 380

Pro Cys Thr Gln Gly Gln Trp Thr Ile Gln Asn Arg Arg Leu Cys Gly
385                 390                 395                 400

Leu Arg Ile Leu Gln Pro Tyr Ala Glu Arg Ile Pro Val Val Ala Thr
                405                 410                 415

Ala Gly Ile Thr Ile Asn Phe Thr Ser Gln Ile Ser Leu Thr Gly Pro
            420                 425                 430

Gly Val Arg Val His Tyr Gly Leu Tyr Asn Gln Ser Asp Pro Cys Pro
        435                 440                 445

Gly Glu Phe Leu Cys Ser Val Asn Gly Leu Cys Val Pro Ala Cys Asp
    450                 455                 460

Gly Val Lys Asp Cys Pro Asn Gly Leu Asp Glu Arg Asn Cys Val Cys
465                 470                 475                 480

Arg Ala Thr Phe Gln Cys Gln Glu Asp Ser Thr Cys Ile Ser Leu Leu
                485                 490                 495

Lys Val Cys Asp Gly Gln Pro Asp Cys Leu Asn Gly Ser Asp Glu Glu
            500                 505                 510

Arg Cys Gln Glu Gly Val Pro Cys Gly Thr Phe Thr Phe Gln Cys Glu
        515                 520                 525
```

```
Asp Gln Ser Cys Val Lys Lys Pro Asn Pro Gln Cys Asp Gly Arg Pro
    530                 535                 540
Asp Cys Arg Asp Gly Ser Asp Glu Gln His Cys Asp Cys Gly Leu Gln
545                 550                 555                 560
Gly Pro Ser Ser Arg Ile Val Gly Ala Val Ser Ser Glu Gly Glu
                565                 570                 575
Trp Pro Trp Gln Ala Ser Leu Gln Val Arg Gly Arg His Ile Cys Gly
            580                 585                 590
Gly Ala Leu Ile Ala Asp Arg Trp Val Ile Thr Ala Ala His Cys Phe
        595                 600                 605
Gln Glu Asp Ser Met Ala Ser Pro Ala Leu Trp Thr Val Phe Leu Gly
    610                 615                 620
Lys Val Trp Gln Asn Ser Arg Trp Pro Gly Glu Val Ser Phe Lys Val
625                 630                 635                 640
Ser Arg Leu Leu Leu His Pro Tyr His Glu Glu Asp Ser His Asp Tyr
                645                 650                 655
Asp Val Ala Leu Leu Gln Leu Asp His Pro Val Val Arg Ser Ala Ala
            660                 665                 670
Val Arg Pro Val Cys Leu Pro Ala Arg Ser His Phe Phe Glu Pro Gly
        675                 680                 685
Leu His Cys Trp Ile Thr Gly Trp Gly Ala Leu Arg Glu Gly Gly Pro
    690                 695                 700
Thr Ser Asn Ala Leu Gln Lys Val Asp Val Gln Leu Ile Pro Gln Asp
705                 710                 715                 720
Leu Cys Ser Glu Ala Tyr Arg Tyr Gln Val Thr Pro Arg Met Leu Cys
                725                 730                 735
Ala Gly Tyr Arg Lys Gly Lys Lys Asp Ala Cys Gln Gly Asp Ser Gly
            740                 745                 750
Gly Pro Leu Val Cys Lys Ala Leu Ser Gly Arg Trp Phe Leu Ala Gly
        755                 760                 765
Leu Val Ser Trp Gly Leu Gly Cys Gly Arg Pro Asn Tyr Phe Gly Val
    770                 775                 780
Tyr Thr Arg Ile Thr Gly Val Ile Gly Trp Ile Gln Gln Val Val Thr
785                 790                 795                 800

<210> SEQ ID NO 129
<211> LENGTH: 3262
<212> TYPE: DNA
<213> ORGANISM: Artificial Sequence
<220> FEATURE:
<223> OTHER INFORMATION: Synthetic

<400> SEQUENCE: 129
ctcagtcaca gtgccgtcct gggcccagca ggaggagccc catggagcct ggggccacag      60
gccacagggg acaagggcca gacaccctgg ccatggctct aggccattga tccaggccgg     120
gctggcacgg tgggggtagg gaggccttgg cctggacaaa caaaggcttc tgaggcctgc     180
gtgcaggccc agcacctatc cgccactccc aaaggatgcc tgtggccaag ccccccagg      240 tggctggtgg gcaggggac ggaggtgatg gcgaggaagc ggagccagag gggatgttcg      300
aggcctgtga ggactccaag agaaaagccc ggggctaccc ccgcctggcg ccctgtggc      360 tgaccctggt tgtgctgact tcagtggggg tgctactctg gtatttccta gggtacaagg     420
cggaggtgac ggtcagccag gtgtactcag gcagccttcg cgtgctcaat cgccacttct     480
cccaggatct tacccgccgg gaatccagtg ccttccgcag tgaaaccgcc aaagcccaga     540
```

-continued

```
agatgctcaa ggagctcatc gccagcaccc gcctgggaac ttattacaac tccagctccg    600
tctattcctt tggggaggga ccgctcacct gcttcttctg gttcattctc caaatccccg    660
agcaccgccg gctgatgctg agcccgagg tggtgcaggc actgctggtg gaggagctgc    720
tgtccacagt caacagctcg gcggccgtcc cctacagggc cgagtacgaa gtggaccccg    780
agggcctagt gatcctagaa gccagtgtga aagacatagc tgcactgaat tccacgctgg    840
gttgttaccg ctacagctac gtgggccagg gtcaggtcct ccggctgaag ggacccgacc    900
acctggcctc cagctgcctg tggcacctgc agggccccga agacctcatg ctgaaactcc    960
ggctggagtg gacgctggcc gagtgccggg accgactggc catgtatgac gtggctgggc   1020
ccctggagaa gaggctcatc acctcggtgt atggctgcag ccgccaggag cctgtggtgg   1080
aagtcctggc atcggggggcc atcatggcgg tggtctggaa gaagggcctg cacagctact   1140
acgacccctt tatgctctcc gtgcagtcgg tggtcttcca ggcctgcgag gtaaacctga   1200
cgctggatga caggctggac tcccaggggcg tcctcagcac cccgtacttc ccagctact   1260
actcgccccg aacccactgc tcctggcacc tcacggtgcc ttctctggac tacggcttgg   1320
ccctctggtt tgacgcctac gcactgcgga ggcagaagta tgatttgccg tgcacccagg   1380
gccagtggac gatccagaac aggaggctgt gtggcctgcg catcctgcag ccttacgctg   1440
agaggatccc cgtggtggcc acggccggca tcaccatcaa tttcacctcc cagatctccc   1500
tcacagggcc tggtgtgcgg gtgcactatg gcttgtacaa ccagtcggac ccctgccctg   1560
gagagttcct ctgctctgtg aacggactct gcgtccctgc ctgtgatggg gtcaaggact   1620
gccccaacgg cctggatgag agaaactgcg tttgcagagc cacattccag tgccaagagg   1680
acagcacgtg catctcactg cttaaggtct gtgacgggca gcctgactgt ctcaacggca   1740
gcgatgaaga gcgtgccag gaaggggtgc cctgcgggac attcaccttc cagtgtgagg   1800
accagagctg cgtgaagaag cccaacccac agtgtgatgg gcggcccgac tgcagggacg   1860
gctcagacga gcagcactgt gactgtggcc tccaggccc ctccagtcgc attgttggtg   1920
gggccgtgtc ctccgagggt gagtggccat ggcaggccag cctccaggtt cggggtcgac   1980
acatctgtgg gggcgccctc atcgctgacc gctgggtgat aacagctgcc cattgcttcc   2040
aggaggacag catggcctcc ccggcgctgt ggacggtgtt cctgggcaag gtgtggcaga   2100
actcgcgctg gcctggagag gtgtccttca aggtgagccg cctactcctg catccgtatc   2160
acgaagagga cagccacgac tacgacgtgg cgctgttgca gctcgaccac ccggtggtgc   2220
gctcggccgc cgtgcgtcca gtctgcctgc ccgcgcgctc ccacttcttc gaacccggcc   2280
tgcactgctg gatcactggc tggggcgccc tgcgcgaagg cggccccacc agcaatgctc   2340
tgcagaaagt ggacgtgcag ttgatcccac aggacctgtg cagcgaggcc tatgctacc   2400
aggtgacgcc acgcatgctg tgtgccggct accgcaaggg caagaaggat gcctgccagg   2460
gtgactcggg tggtccgctg gtatgcaagg cactcagtgg ccgctggttc ctggcagggc   2520
tggtcagctg gggcctgggc tgtggccgac taactactt cggcgtctac acccgcatca   2580
caggtgtgat cggctggatc cagcaagtgg tgacctgagg aactgccccc ctgcagagca   2640
ggtcccacct cttggactca gagagcccag ggcaattgcc aagcaggggg acaagtattc   2700
tgggggagg ggggcgcgag caggccctgt ggtggcagga ggtggcatct tgtcttgtcc   2760
ctgatgtctg ctccagtgat ggcaggagga tggaggagtg ccagcagctg ggggtcaaga   2820
cgtccctgg ggacccaggc ccacacccag cccttctgcc tccgattct ctctcctccg   2880
tccccttcct ccactgctgc ctattgcaag gaagtggctc agcagcaaga atgctggctc   2940
```

```
tacgtcccca ggagtgtctg agctgtgccc cgctctgtac agaggctgct tgggcagcct    3000
tgcctctaga gagcagatgc cagcttcgga agccctggt ctaacttggg atctgggaat    3060
ggaaggtgcc cccataggag gggaccctca cagccctggg gactgccagg tgggccggct    3120
gccaccgtaa gccaaaaaag gtggggaagc cctgactcca aggtccttgc cccacccctg    3180
cctgccacct ggcccctcac agcccagacc ctcaccggca ggtgagctca gctgcccttt    3240
ggaataaagc tgcctgatcc aa                                            3262
```

<210> SEQ ID NO 130
<211> LENGTH: 811
<212> TYPE: PRT
<213> ORGANISM: Artificial Sequence
<220> FEATURE:
<223> OTHER INFORMATION: Synthetic

<400> SEQUENCE: 130

```
Met Pro Arg Cys Phe Gln Leu Pro Cys Ser Thr Arg Met Pro Thr Thr
1               5                   10                  15

Glu Val Pro Gln Ala Ala Asp Gly Gln Gly Asp Ala Gly Asp Gly Glu
            20                  25                  30

Glu Ala Ala Glu Pro Glu Gly Lys Phe Lys Pro Lys Asn Thr Lys
        35                  40                  45

Arg Lys Asn Arg Asp Tyr Val Arg Phe Thr Pro Leu Leu Leu Val Leu
    50                  55                  60

Ala Ala Leu Val Ser Ala Gly Val Met Leu Trp Tyr Phe Leu Gly Tyr
65                  70                  75                  80

Lys Ala Glu Val Thr Val Ser Gln Val Tyr Ser Gly Ser Leu Arg Val
                85                  90                  95

Leu Asn Arg His Phe Ser Gln Asp Leu Gly Arg Arg Glu Ser Ile Ala
            100                 105                 110

Phe Arg Ser Glu Ser Ala Lys Ala Gln Lys Met Leu Gln Glu Leu Val
        115                 120                 125

Ala Ser Thr Arg Leu Gly Thr Tyr Tyr Asn Ser Ser Ser Val Tyr Ser
    130                 135                 140

Phe Gly Glu Gly Pro Leu Thr Cys Phe Phe Trp Phe Ile Leu Asp Ile
145                 150                 155                 160

Pro Glu Tyr Gln Arg Leu Thr Leu Ser Pro Glu Val Val Arg Glu Leu
                165                 170                 175

Leu Val Asp Glu Leu Leu Ser Asn Ser Ser Thr Leu Ala Ser Tyr Lys
            180                 185                 190

Thr Glu Tyr Glu Val Asp Pro Glu Gly Leu Val Ile Leu Glu Ala Ser
        195                 200                 205

Val Asn Asp Ile Val Val Leu Asn Ser Thr Leu Gly Cys Tyr Arg Tyr
    210                 215                 220

Ser Tyr Val Asn Pro Gly Gln Val Leu Pro Leu Lys Gly Pro Asp Gln
225                 230                 235                 240

Gln Thr Thr Ser Cys Leu Trp His Leu Gln Gly Pro Glu Asp Leu Met
                245                 250                 255

Ile Lys Val Arg Leu Glu Trp Thr Arg Val Asp Cys Arg Asp Arg Val
            260                 265                 270

Ala Met Tyr Asp Ala Ala Gly Pro Leu Glu Lys Arg Leu Ile Thr Ser
        275                 280                 285

Val Tyr Gly Cys Ser Arg Gln Glu Pro Val Met Glu Val Leu Ala Ser
    290                 295                 300
```

```
Gly Ser Val Met Ala Val Val Trp Lys Lys Gly Met His Ser Tyr Tyr
305                 310                 315                 320

Asp Pro Phe Leu Leu Ser Val Lys Ser Val Ala Phe Gln Asp Cys Gln
            325                 330                 335

Val Asn Leu Thr Leu Glu Gly Arg Leu Asp Thr Gln Gly Phe Leu Arg
                340                 345                 350

Thr Pro Tyr Tyr Pro Ser Tyr Tyr Ser Pro Ser Thr His Cys Ser Trp
            355                 360                 365

His Leu Thr Val Pro Ser Leu Asp Tyr Gly Leu Ala Leu Trp Phe Asp
        370                 375                 380

Ala Tyr Ala Leu Arg Arg Gln Lys Tyr Asn Arg Leu Cys Thr Gln Gly
385                 390                 395                 400

Gln Trp Met Ile Gln Asn Arg Arg Leu Cys Gly Phe Arg Thr Leu Gln
                405                 410                 415

Pro Tyr Ala Glu Arg Ile Pro Met Val Ala Ser Asp Gly Val Thr Ile
            420                 425                 430

Asn Phe Thr Ser Gln Ile Ser Leu Thr Gly Pro Gly Val Gln Val Tyr
                435                 440                 445

Tyr Ser Leu Tyr Asn Gln Ser Asp Pro Cys Pro Gly Glu Phe Leu Cys
450                 455                 460

Ser Val Asn Gly Leu Cys Val Pro Ala Cys Asp Gly Ile Lys Asp Cys
465                 470                 475                 480

Pro Asn Gly Leu Asp Glu Arg Asn Cys Val Cys Arg Ala Met Phe Gln
            485                 490                 495

Cys Gln Glu Asp Ser Thr Cys Ile Ser Leu Pro Arg Val Cys Asp Arg
            500                 505                 510

Gln Pro Asp Cys Leu Asn Gly Ser Asp Glu Glu Gln Cys Gln Glu Gly
        515                 520                 525

Val Pro Cys Gly Thr Phe Thr Phe Gln Cys Glu Asp Arg Ser Cys Val
    530                 535                 540

Lys Lys Pro Asn Pro Glu Cys Asp Gly Gln Ser Asp Cys Arg Asp Gly
545                 550                 555                 560

Ser Asp Glu Gln His Cys Asp Cys Gly Leu Gln Gly Leu Ser Ser Arg
                565                 570                 575

Ile Val Gly Gly Thr Val Ser Ser Glu Gly Glu Trp Pro Trp Gln Ala
            580                 585                 590

Ser Leu Gln Ile Arg Gly Arg His Ile Cys Gly Gly Ala Leu Ile Ala
        595                 600                 605

Asp Arg Trp Val Ile Thr Ala Ala His Cys Phe Gln Glu Asp Ser Met
    610                 615                 620

Ala Ser Pro Lys Leu Trp Thr Val Phe Leu Gly Lys Met Arg Gln Asn
625                 630                 635                 640

Ser Arg Trp Pro Gly Glu Val Ser Phe Lys Val Ser Arg Leu Phe Leu
            645                 650                 655

His Pro Tyr His Glu Glu Asp Ser His Asp Tyr Asp Val Ala Leu Leu
            660                 665                 670

Gln Leu Asp His Pro Val Val Tyr Ser Ala Thr Val Arg Pro Val Cys
        675                 680                 685

Leu Pro Ala Arg Ser His Phe Phe Glu Pro Gly Gln His Cys Trp Ile
    690                 695                 700

Thr Gly Trp Gly Ala Gln Arg Glu Gly Gly Pro Val Ser Asn Thr Leu
705                 710                 715                 720
```

-continued

```
Gln Lys Val Asp Val Gln Leu Val Pro Gln Asp Leu Cys Ser Glu Ala
            725                 730                 735

Tyr Arg Tyr Gln Val Ser Pro Arg Met Leu Cys Ala Gly Tyr Arg Lys
        740                 745                 750

Gly Lys Lys Asp Ala Cys Gln Gly Asp Ser Gly Gly Pro Leu Val Cys
        755                 760                 765

Arg Glu Pro Ser Gly Arg Trp Phe Leu Ala Gly Leu Val Ser Trp Gly
    770                 775                 780

Leu Gly Cys Gly Arg Pro Asn Phe Phe Gly Val Tyr Thr Arg Val Thr
785                 790                 795                 800

Arg Val Ile Asn Trp Ile Gln Gln Val Leu Thr
                805                 810

<210> SEQ ID NO 131
<211> LENGTH: 3206
<212> TYPE: DNA
<213> ORGANISM: Artificial Sequence
<220> FEATURE:
<223> OTHER INFORMATION: Synthetic

<400> SEQUENCE: 131
```

| | | | | | |
|---|---|---|---|---|---|
| agtttcattg | tcgccctgga | cctgacagga | gaggcccatg | gaacttgggg | ccacaggcca | 60 |
| caagggacaa | gggccagaca | ccccagccat | ggctccaggc | cattgatcca | acctaagctg | 120 |
| gccagttggg | ggtggaaaga | ccttggcctg | ataaacaga | ggcctccagg | cctgtgtgca | 180 |
| ggcccggcac | ctaccttcca | ctcttgaaga | tgccgagatg | tttccagctc | cctgttcta | 240 |
| ccaggatgcc | caccaccgag | gtcccccaag | cggctgatgg | tcagggcgat | gcgggtgatg | 300 |
| gagaggaagc | tgctgagcca | gaggggaagt | tcaagccccc | aaaaaacacc | aagagaaaaa | 360 |
| accgggacta | cgtccgcttc | acgccactgt | tgctggtctt | ggctgcgctg | gtctcagcag | 420 |
| gggtcatgct | ttggtatttc | ctagggtaca | aagcggaagt | gaccgtaagc | caggtgtact | 480 |
| ctggcagcct | ccgggtgctc | aaccgtcatt | tctcccagga | cctgggccga | cgggagtcta | 540 |
| ttgctttccg | cagtgaatct | gccaaagccc | agaagatgct | ccaagaactg | gttgccagca | 600 |
| cccgcctggg | tacttactac | aactctagtt | ctgtctactc | cttgggag | ggaccccctca | 660 |
| cctgcttctt | ctggtttatc | cttgacatcc | ctgagtacca | gcgactgacc | ctgagccctg | 720 |
| aagtagtgcg | cgagctcctg | gtggatgagc | tactgtccaa | cagctcaacc | ctggcttcct | 780 |
| ataagaccga | atatgaggtg | gacccggaag | gcctggtgat | cctggaagcc | agtgtgaacg | 840 |
| acatagtcgt | actgaattcc | acgctgggct | gttatcgcta | cagctatgtg | aacccaggcc | 900 |
| aggtcctccc | attgaagggg | cctgaccagc | agaccacaag | ctgcctgtgg | catctgcaag | 960 |
| ggcccgaaga | cctcatgatc | aaagtgcggc | tggagtggac | ccgggtcgat | tgcagagaca | 1020 |
| gggtggcgat | gtacgacgca | gctgggcccc | tggagaagag | acttatcacc | tcggtctatg | 1080 |
| ggtgcagccg | ccaggaacct | gtgatggagg | tgctggcatc | gggctccgtc | atggccgtgg | 1140 |
| tgtggaaaaa | gggcatgcat | agctactatg | acccttttcct | gctctcagtg | aagtctgtgg | 1200 |
| ccttccagga | ctgccaggtg | aacctgacac | tggagggccg | gctggacaca | cagggcttcc | 1260 |
| tccgtacacc | ctactacccc | agttactact | ctcccagtac | ccactgctcc | tggcatctca | 1320 |
| cggtaccctc | tctggactac | ggcttggcgc | tctggttcga | tgcctacgca | ctgaggaggc | 1380 |
| agaagtacaa | ccgactgtgt | actcaggcc | agtggatgat | ccagaacagg | aggctgtgtg | 1440 |
| gcttccgtac | cctgcagcca | tatgctgaga | ggatccccat | ggtggcctca | gatggtgtca | 1500 |
| ccatcaactt | cacctcccag | atctccctca | caggcccggg | tgtgcaagtg | tactacagct | 1560 |

-continued

```
tgtacaacca atcagacccc tgccctggtg agttcctctg ctctgtgaat ggactgtgtg    1620
tccctgcgtg tgacgggatc aaggactgcc ccaatggcct ggatgagaga aactgtgtct    1680
gcagagccat gttccagtgc aagaggaca gcacgtgcat ttcactgcct agagtctgtg    1740
accggcagcc cgactgtctc aatggcagtg acgaagaaca gtgccaagaa ggagtgccct    1800
gtgggacatt cactttccag tgtgaggacc ggagctgtgt gaagaagccc aacccagagt    1860
gtgacggcca gtcagattgc agagacggct cagatgagca acactgtgac tgtggcctcc    1920
agggcctctc cagccgtatt gtgggcggga ccgtgtcctc cgagggtgag tggccatggc    1980
aggccagcct ccagattcgg ggtcgacaca tctgtggggg ggctctcatc gctgaccgct    2040
gggtcataac ggccgcccac tgcttccagg aggacagcat ggcctccccg aagctgtgga    2100
ccgtgttcct gggaaagatg cggcagaact cgcgctggcc aggcgaggtg tccttcaagg    2160
tgagccgtct gttcctgcac ccgtaccacg aggaggacag ccatgactac gacgtggccc    2220
tgctgcagct cgaccacccc gtggtgtact cggccactgt gcgccccgtc tgcctgcctg    2280
cccgctccca cttctttgag ccaggccagc actgctggat cacaggctgg ggagcccagc    2340
gagagggtgg tccggtgagc aacaccctgc agaaggtgga cgtacagctg gtccctcagg    2400
acctctgcag tgaggcctac cgctaccagg tgtccccacg catgctctgt gctggctacc    2460
gcaagggcaa gaaagatgcc tgccagggtg actctggagg cccactggtt tgcagggagc    2520
ccagtggccg ctggttcctg gcagggttgg ttagctgggg cctgggctgt ggccgaccca    2580
atttctttgg cgtctacacc cgtgtcacac gtgtgatcaa ctggatccag caggtgctga    2640
cctgagggct gttctacaga gctggacctg cctccaggcc aagttcaggg tgtccaccca    2700
gccaggacac aagtattctg gggcaagtga ccctgctaag gcctgttttcc ctcaggccta    2760 ccccagtgac agtacagaga aggatgtcag ctggtggtta ggatgcctcc tgaggtccag    2820
gggccagcct cggctaggtt tcacttctaa ccctttctta ttctagtcct ttcccctccc    2880
tgctcctacc actgttttgg agtggggtct ggcggccatg accttggcct ccgggtctct    2940
gtaggaaaga aagaatcctt ccccttgcaa aagcctcttg ggggaactgc acagagaaag    3000
aaggtgcctc tatcaaggct ctatcagagc ccttgagtct gccaagtggg ctgtactcta    3060
agccaaatca ccgggcagcc tcagctgcag atgcctgctg aagctctgcc tgctacaggg    3120
gcctccctgc cattcactgg aggcccactg tctgttctgg gaataaagca cttgaccaag    3180
ccctgacact gaaaaaaaaa aaaaaa                                         3206
```